(12) United States Patent
Galicki

(10) Patent No.: US 7,185,138 B1
(45) Date of Patent: Feb. 27, 2007

(54) MULTI-DIMENSIONAL DATA ROUTING FABRIC

(76) Inventor: Peter Galicki, 1915 Park Hollow, Sugar Land, TX (US) 77479

( * ) Notice: Subject to any disclaimer, the term of this patent is extended or adjusted under 35 U.S.C. 154(b) by 116 days.

(21) Appl. No.: 11/124,850

(22) Filed: May 9, 2005

Related U.S. Application Data

(60) Provisional application No. 60/571,674, filed on May 14, 2004.

(51) Int. Cl.
  *G06F 13/00* (2006.01)
(52) U.S. Cl. .......................... 710/316; 710/34; 710/36
(58) Field of Classification Search ................. 710/241
  See application file for complete search history.

(56) References Cited

U.S. PATENT DOCUMENTS

| | | | |
|---|---|---|---|
| 4,270,169 | A | 5/1981 | Hunt |
| 4,805,091 | A | 2/1989 | Thiel |
| 4,908,751 | A | 3/1990 | Smith |
| 4,933,836 | A | 6/1990 | Tulpule |
| 5,133,073 | A | 7/1992 | Jackson |
| 5,170,482 | A | 12/1992 | Shu |
| 5,255,368 | A | 10/1993 | Barry |
| 5,341,504 | A | 8/1994 | Mori |
| 5,345,578 | A | 9/1994 | Manasse |
| 5,379,440 | A | 1/1995 | Kelly |
| 5,430,885 | A | 7/1995 | Kaneko |
| 5,430,887 | A | 7/1995 | Hsiao |
| 5,598,570 | A | 1/1997 | Ho |
| 5,642,524 | A | 6/1997 | Keeling |
| 5,669,008 | A | 9/1997 | Galles |
| 5,675,823 | A | 10/1997 | Hsiao |
| 5,689,722 | A | 11/1997 | Swarztrauber |
| 5,826,033 | A | 10/1998 | Hayashi |
| 5,841,775 | A | 11/1998 | Huang |
| 5,842,031 | A | 11/1998 | Barker |
| 5,842,034 | A | 11/1998 | Bolstad |
| 6,038,688 | A | 3/2000 | Yoon |
| 6,230,252 | B1 | 5/2001 | Passint |
| 6,240,090 | B1 * | 5/2001 | Enhager ................. 370/241.1 |
| 6,426,952 | B1 | 7/2002 | Francis |

(Continued)

OTHER PUBLICATIONS

McGregor, Interconnects Target SoC Design, Microprocessor Report, Jun. 28, 2004, In-Stat/MDR Publication, Reed Electronics Group, US.

(Continued)

*Primary Examiner*—Rehana Perveen
*Assistant Examiner*—Mohammed H. Rehman

(57) ABSTRACT

Multi-dimensional data routing fabric simultaneously transfers multiple data packets between data processing components. Data packets are transported by arrays of data routing junctions dispersed along multiple routing dimensions. Data routing junctions are interconnected along each of routing dimensions with a mesh of data routing lines. Data transfers are accomplished by source components launching data packets into the multi-dimensional data routing fabric, and destination components receiving the routed data packets from the fabric. Each packet is guided by a chain of adjacent data routing junctions to converge on its destination. Individual data routing junctions along the packet's path make routing decisions by comparing the current location and direction of movement of the packet to the location of its destination. Based on the results of these comparisons, data packets are passed straight through to the next junction ahead, or are turned to an adjacent junction to the side of the current path.

12 Claims, 150 Drawing Sheets

U.S. PATENT DOCUMENTS

| | | |
|---|---|---|
| 2002/0018470 A1 | 2/2002 | Galicki |
| 2002/0018480 A1 | 2/2002 | Galicki |
| 2002/0027908 A1 | 3/2002 | Kalkunte |
| 2002/0027912 A1 | 3/2002 | Galicki |
| 2002/0085578 A1 | 7/2002 | Dell |
| 2002/0105972 A1 | 8/2002 | Richter |

OTHER PUBLICATIONS

Galicki, Multiprocessing I/O Enables Efficient 3G Base-Station Designs, EDN, Jul. 24, 2003, Reed Electronics Group, Highland Ranch CO.

Galicki, Connectivity Fabric Eases Base-Station Woes, Wireless Systems Design, Jun. 2003, Penton Technology Media, Paramus NJ.

Galicki, FPGAs Have the Multiprocessing I/O Infrastructure to Meet 3G Base Station Design Goals, Spring 2003, Xcell Journal, Xilinx, San Jose, CA.

* cited by examiner

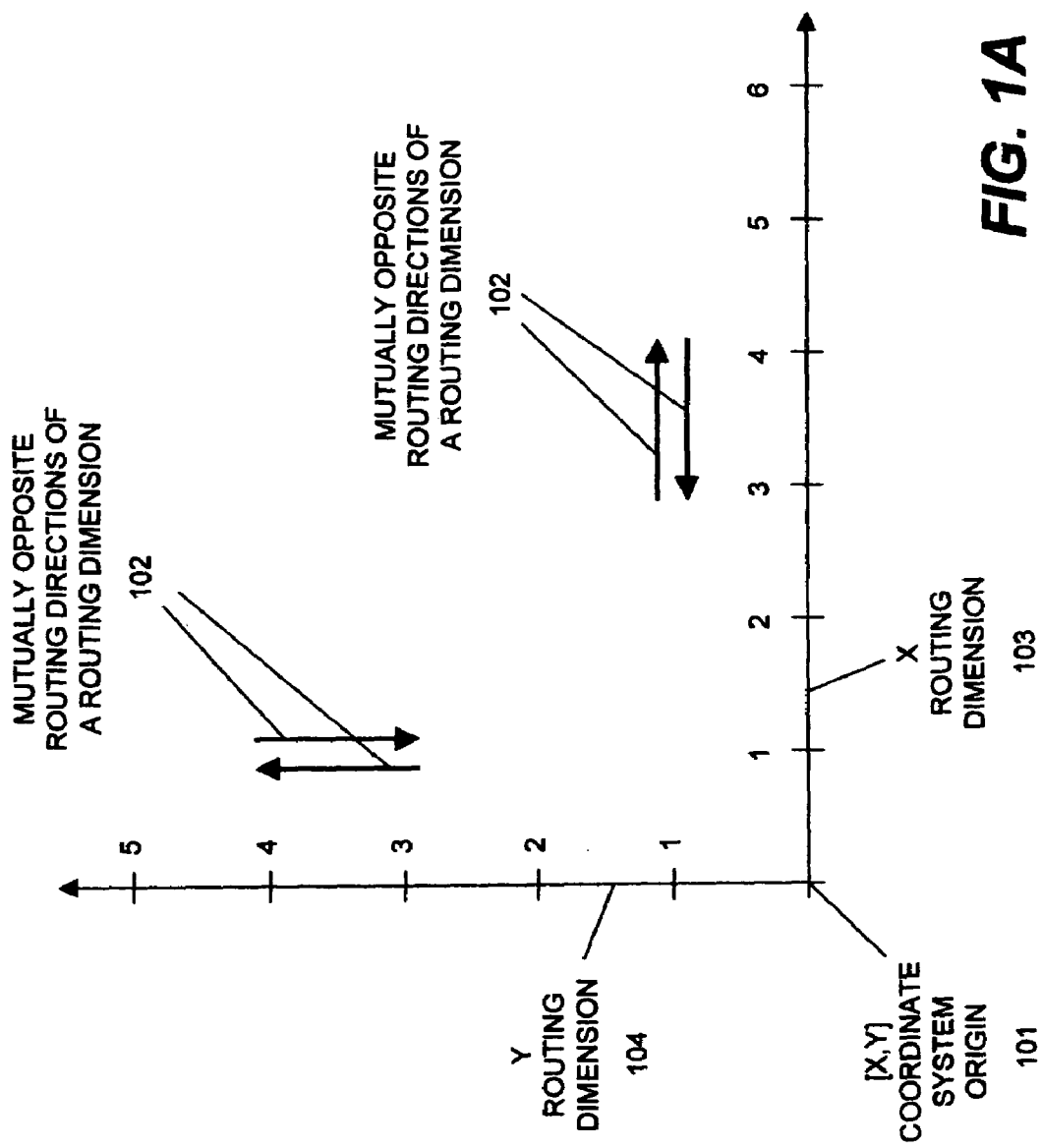

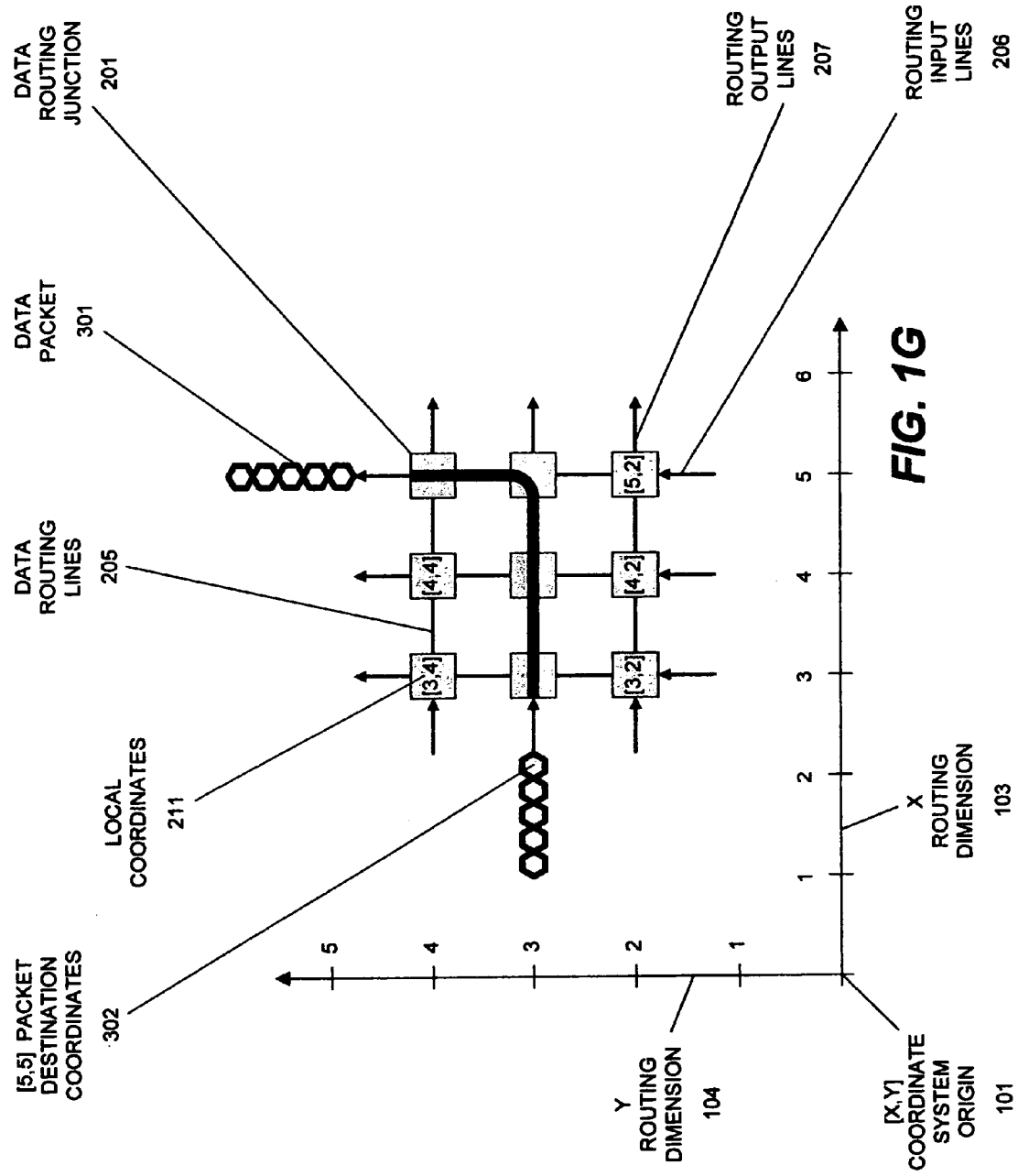

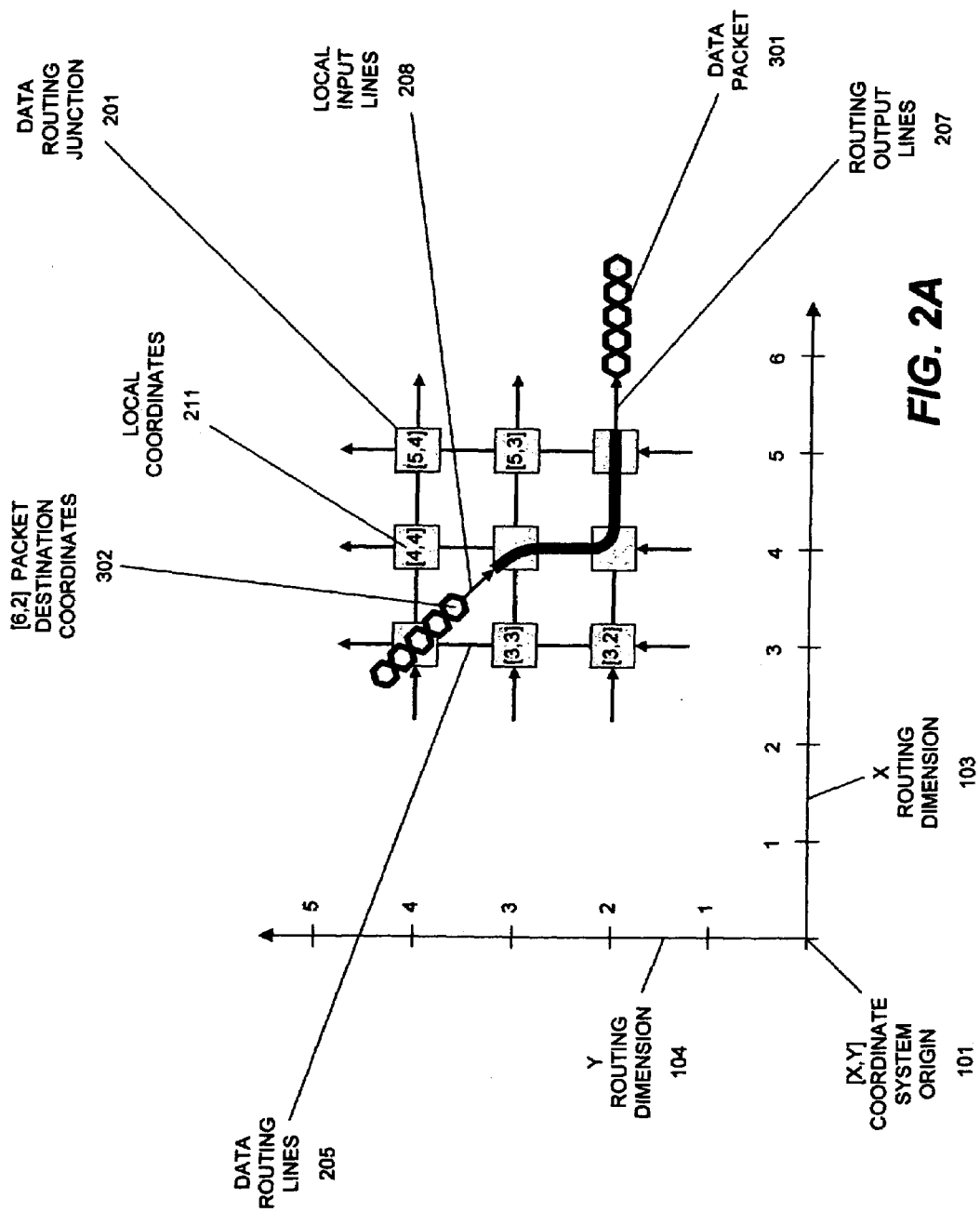

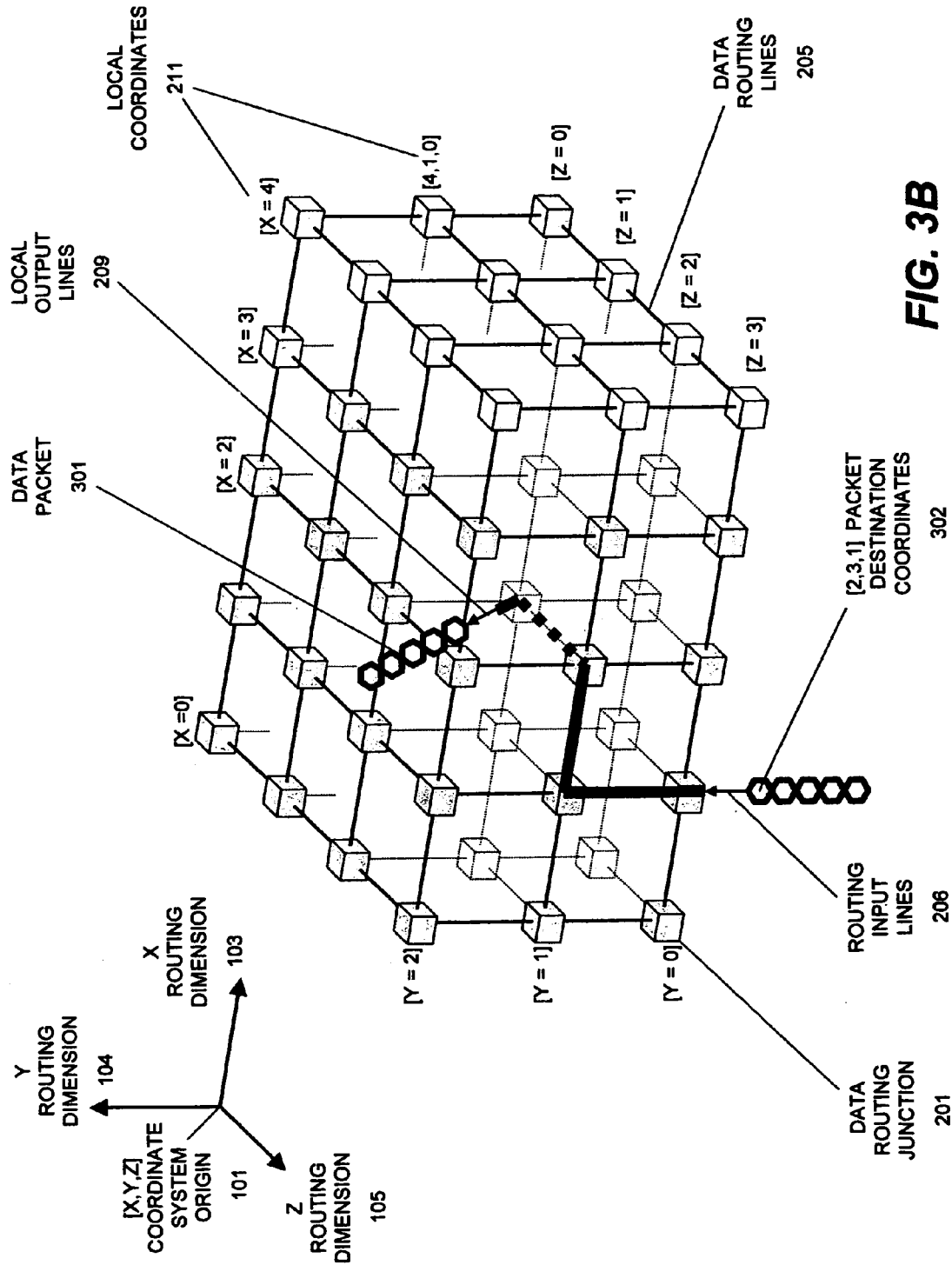

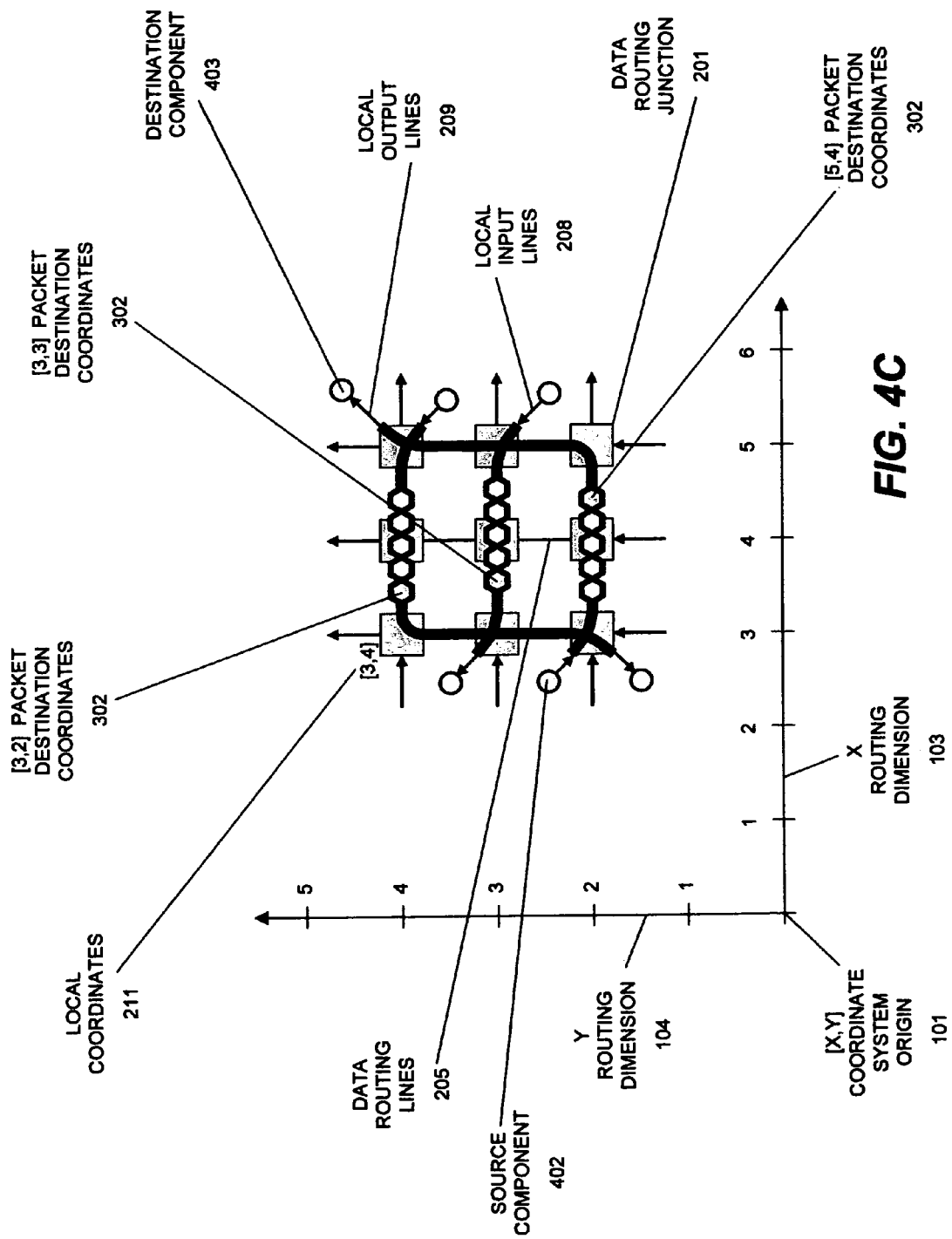

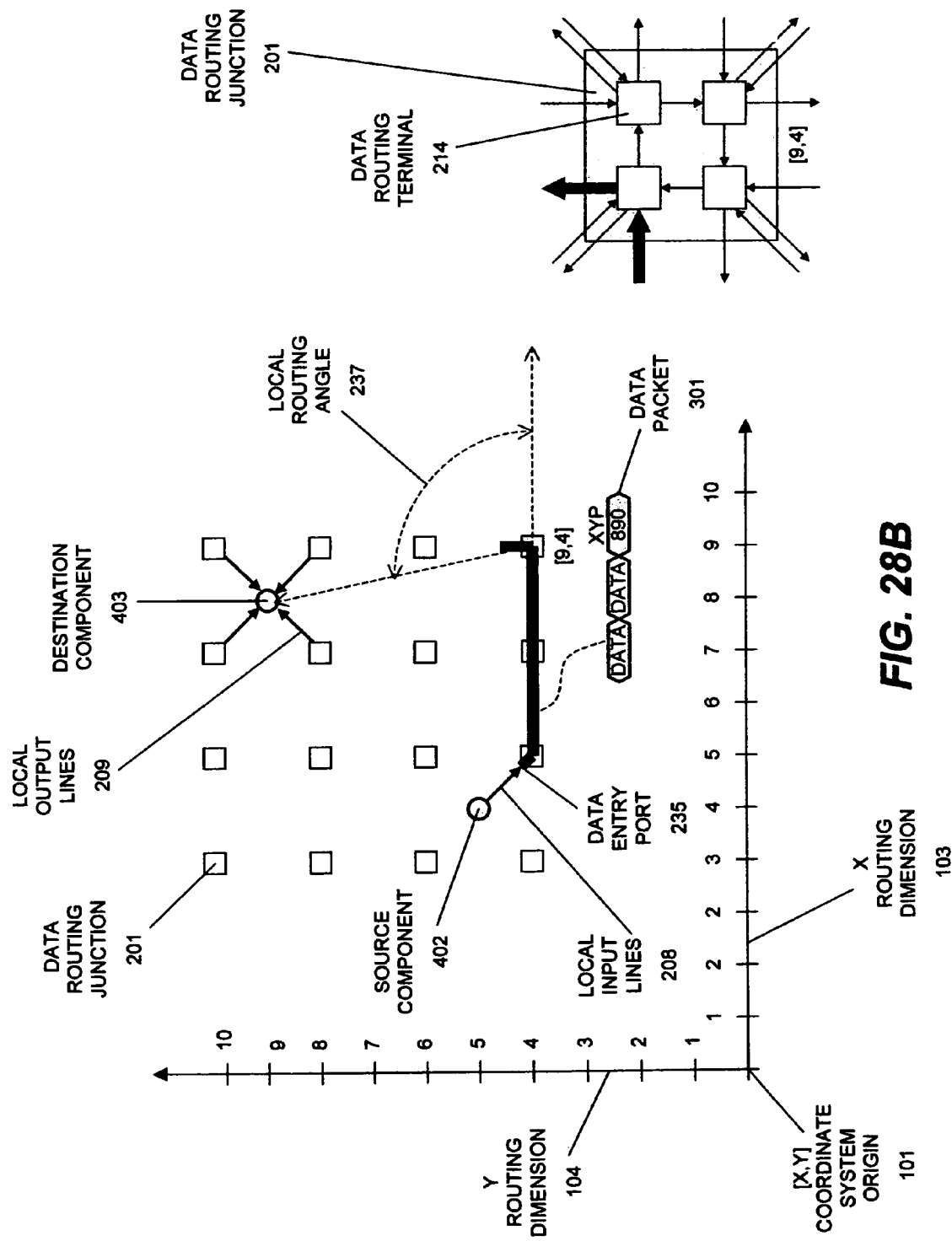

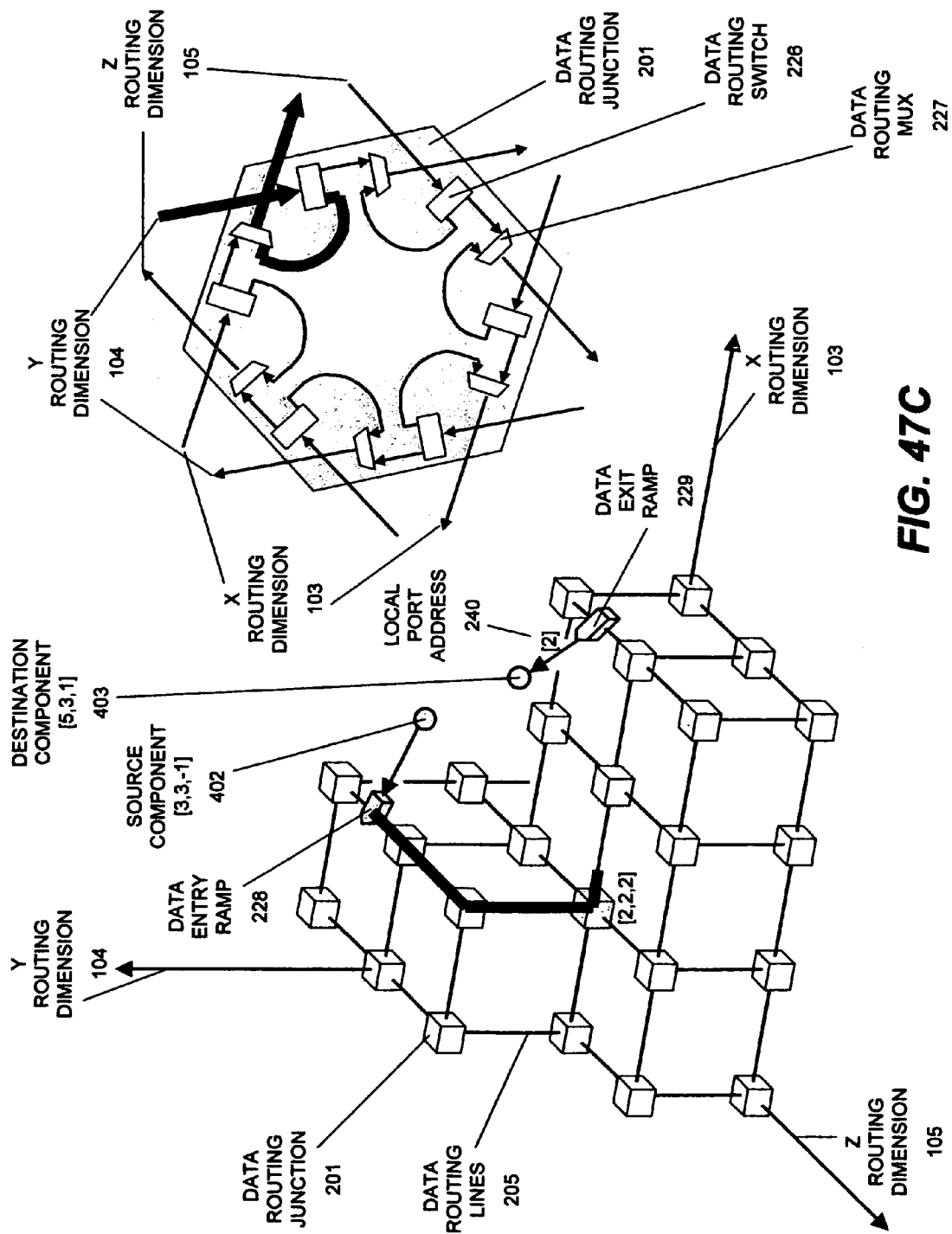

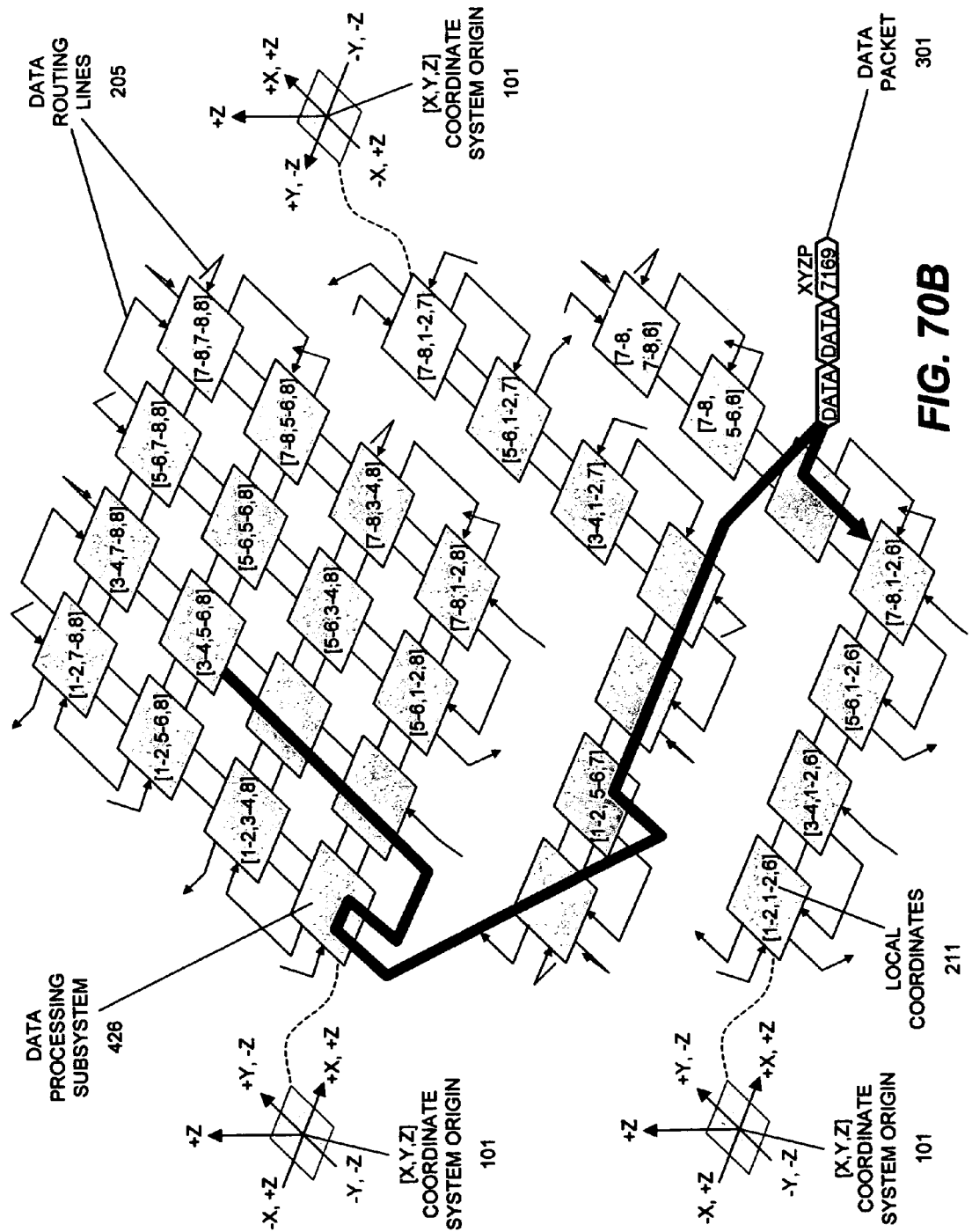

MULTI-DIMENSIONAL DATA ROUTING FABRIC

CROSS-REFERENCE TO RELATED APPLICATIONS

This application is entitled to the benefit of Provisional Patent Application Ser. No. 60/571,674, filed 2004 May 14.

FEDERALLY SPONSORED RESEARCH

Not Applicable

SEQUENCE LISTING OR PROGRAM

Not Applicable

BACKGROUND OF THE INVENTION

1. Technical Field of the Invention

The technical field of this invention is data communication among plurality of data processing components, specifically involving structures that simultaneously route multiple data transfers in multiple dimensions.

2. Discussion of Prior Art

In the past, when the semiconductor manufacturing process was in the early stages of development, the number of transistors available to system designers was low and the cost of implementing data processing functions in silicon was high. During the 1980's, most data processing systems featured no more than one processor, memory and a few peripherals.

Typical data communication methods of early data processing systems were based on parallel bus structures connecting one processor with memory and a few peripherals. Parallel bus represented a 1-dimensional data communication structure in which all components were arranged in a line along the bus signals. A typical processor sequentially accessed memory and peripheral data by issuing read and write bus cycles to bus locations encoded in the bus address according to a linear (1-dimensional) memory map. Even though buses could only support one data transfer at a time, their data transfer bandwidth was sufficient due to relatively low performance requirements of early systems.

As the semiconductor manufacturing process has improved, the number of transistors available to designs has increased exponentially and the cost of implementing data processing functions in silicon has plummeted. Subsequently, system designers were no longer limited by how many processors or peripherals they could put in a design. During the 1990's, many data processing systems featured dozens of processors and peripherals, and in some cases the distinction between master processors and slave peripherals has been erased as increasing numbers of peripherals were implemented with processors. Some systems were built as data processing farms containing 2-dimensional arrays of interconnected data processing components.

While the physical and functional structures of many high performance systems of the early 2000's assumed forms of 2-dimensional arrays with hundreds of data processing components, the 1-dimensional bus structures of the 1960's continued to dominate the data communication methods used to interconnect these components. This created several problems.

Attaching additional components to a bus increases the length of the shared bus lines and the electrical loading that the components must drive to send data. These side effects slow down the bus speed, increase power consumption and complicate routing of signals between data processing components.

Adding master components to a bus also requires additional bus arbitration logic to arbitrate between simultaneous bus requests from multiple masters. Linking multiple buses with bus bridges requires additional bus arbitration logic. In addition to slowing down the data transfers, bus arbiters and bridges also introduce significant latency to all transfers resulting in system-wide loss of data transfer determinism. Not knowing the precise time needed for transfers to complete, system designers resigned to padding of available bus bandwidth with dead cycles to ensure on-time data delivery. While improving transfer determinism, this clumsy method wastes valuable bus cycles that could instead be used to improve system performance or to reduce cost.

Parallel bus communication could be compared to a city transportation system with one bus vehicle making frequent stops on a 2-way street.

Other data communication methods have been recently introduced for connecting arrays of components. Crossbars, transfer controllers and shared memory arrays are used to connect multiple components through central switching/storage structures. While in most cases faster then buses, crossbars have limited fanout, scalability and suffer from high pin counts and high power consumption. Crossbars, transfer controllers and shared memory often increase system component count by several large devices, making them prohibitively expensive for many designs.

Centralized communications can be compared to a city transportation system where cars travel on a road system resembling spokes of a wheel, with the ends of the spokes being the on and off ramps, and the hub being the single intersection point where cars can change their direction of travel.

Linear tunnels and rings connect adjacent data processing components with short point-to-point data links, stringing the components along a single line. While solving the electrical loading problem of a bus, linear tunnels do not improve data transfer latency over buses. The inherently poor latency performance of linear tunnels stems from the heavy sharing of individual links during most transfers. Tunnel latency is further degraded by inability of some tunnels to support peer-to-peer transfers, requiring every transfer to pass through one master, thus rendering them relatively useless for directly connecting, say, one hundred components.

Linear tunnel communication can be compared to a city transportation system consisting of one cab company with one dispatcher scheduling taxi rides on a single 2-way street.

Datapipes, like linear tunnels, are 1-dimensional data communications structures with left and right ports. Each left and right port can have multiple data communication links, some of which can be bent by 90 degrees to emulate other data communication structures like orthogonal mesh and tree topologies. While datapipe links, like buses or tunnels, can be oriented in any direction, the datapipe routing logic is limited to routing data in two directions of one dimension—left and right.

Datapipes cannot be directly accessed by slave peripherals to send or receive data. Instead, datapipes work like programmable processors using op-code driven receiver and transmitter masters to drive data transfers to and from local I/O memories, according to instructions fetched from those memories. Thus, system data processing components, being unable to communicate directly, have to first deposit instructions and data in I/O memory before the datapipes can transmit any data.

To receive data, components have to wait until their local receiver interprets the arriving op-codes to deposit incoming data in local I/O memory, before being able to read it. Receivers, transmitters and I/O memory represent additional elements that have to be added to each connected data processing component, thus significantly increasing system gate count and cost.

In addition, the 1-dimensional routing method used by the datapipes requires that each datapipe routing node must have detailed knowledge of relative locations of all other datapipe nodes in the left and right routing directions. This routing method requires a complex initialization process and tedious configuration changes to all datapipe routing nodes every time a component is added, removed or transferred to another location. Internally, datapipes use 1-dimensional addressing to route variable-sized data packets in left and right directions of one dimension, according to stored direction id codes for the left and right directions.

During initialization, sets of unique data routing directions are individually assigned at each node for every possible packet destination, as the datapipe routing logic does not use uniform routing methods to transport data between nodes. Accordingly, each datapipe routing node has no inherent knowledge of how data packets are routed by other datapipe nodes in the system.

Datapipe's non-deterministic routing methods combined with variable size of data packets increases worst-case transfer latency and renders all data transfers non-deterministic under heavy data loading conditions. At best, non-deterministic data transfers result in wasted data processing cycles as components are forced to wait for data. At worst, non-deterministic transfers can produce data gridlock conditions resulting in catastrophic system shutdowns.

Datapipe communication can be compared to a city transportation system with a grid of one-way streets and a policeman at every intersection giving motorists directions to the next intersection on their path.

Buses, central switches, linear tunnels and datapipes represent centralized and 1-dimensional data communications structures that are not distributed and uniform in multiple dimensions. They are therefore inherently not efficient for connecting large 2-dimensional arrays of components on chips or boards. They are even less suitable in providing data communications for 3-dimensional computing structures such as linear arrays of boards. Non multi-dimensional data communication structures create data communication choke points and result in high power dissipation congested routing and non-deterministic data transfer latencies.

Comparing system data communication to a city transportation system, small towns with less then a dozen households can be sufficiently served by one vehicle on a single street, or by multiple vehicles on several one-way streets with policemen scheduling car routes at every intersection. However, when a city grows beyond a certain point, traffic scheduling delays and gridlock conditions are inevitably bound to bring any centralized or 1-dimensional transportation system to a halt.

With shrinking semiconductor process features steadily increasing the number of data processing components inside designs, data communication structures that are not scalable and uniform in multiple dimensions are increasingly difficult to schedule and verify to the point where system verification is becoming a major design bottleneck.

BACKGROUND OF THE
INVENTION—OBJECTS AND ADVANTAGES

These and other problems related to data communications between a large number of components are solved by a distributed data routing fabric directly capable of routing data in multiple routing dimensions. Several objects and advantages of my invention are listed below.

Multi-dimensional data routing fabric of the present application distributes data routing logic over the entire area or volume of the design to enable simultaneous non-interfering transfers, and to minimize transfer latency to deterministic and manageable levels for transfers that occasionally do have to share common data transfer paths.

Large cities need a distributed and uniform network of highways to keep traffic flowing smoothly in 2-dimensions, with dedicated on-off ramps allowing cars to enter and exit without slowing down other traffic. In the same spirit, large data processing designs need a multi-dimensional data routing fabric to provide a uniform and scalable communication infrastructure for efficient transport of data between arrays of system components.

The multi-dimensional data routing fabric uses uniform and scalable sets of point-to-point data routing lines arranged in multiple dimensions to transfer data between system components. While a typical bus must drive multiple electrical loads on long bus lines, the transport links only have to drive one load on each dedicated set of short lines. Shorter lines with fewer loads increase data transfer speed and decrease system power consumption.

In 2-dimensional implementations of the multi-dimensional data routing fabric, the horizontal and vertical transport links never cross one another, thus all system components can be connected using only one signal layer. In contrast, connecting arrays of components with buses may require 25 or more signal layers. Fewer signal layers required by the multi-dimensional data routing fabric reduces system cost and improves reliability, as boards with one signal layer are substantially more reliable then boards with 25 signal layers.

Having more then one master accessing a bus requires addition of bus arbitration circuits. Multi-dimensional data routing fabric can connect multiple masters without additional bus arbitration logic. In fact, all multi-dimensional fabric components can be masters without creating any negative side effects for the system or its data communications.

Buses can directly connect only a small number of components beyond which the components must be split between multiple buses interconnected with additional bus bridge logic. In contrast, the multi-dimensional data routing fabric can directly link hundreds of components without any additional bridge logic.

Bus arbiters and bus bridges can also add long latency periods reducing the determinism for all data transfers in the system. The multi-dimensional data routing fabric spreads out data transfers over the entire area or volume of the design to enable multiple simultaneous transfers to complete without interference or with minimal interference, thus preserving data transfer determinism for the system.

Buses can only issue one transfer at a time and have fixed bandwidth that doesn't change when new components are added to the system. These I/O restrictions significantly limit the growth potential of bus-based systems. The data communication bandwidth of the multi-dimensional data routing fabric increases in step with addition of new components, thus enabling system growth by preserving the balance between processing performance and I/O bandwidth.

Similar to buses, central switching/storage structures can only connect a small number of components, beyond which secondary switches have to be introduced to connect clusters of primary switches. The multi-dimensional data routing fabric can directly connect hundreds of components without clustering or multiple routing layers. Clustering of multiple routing layers is undesirable because it increases transfer latency and reduces data transfer determinism for all transfers. In addition, central switches and crossbars represent additional glue logic that increases system size and power consumption. The multi-dimensional data routing fabric requires no glue logic and has a uniform structure that is not based on multiple routing layers.

Linear tunnels can only route data packets in two directions of a single routing dimension. Even if components are arranged in a 2-dimensional array, the linear tunnels must force all data transfers to flow along a single line in a snaking pattern around the 2-dimensional array, increasing data transfer latency and reducing transfer determinism. In contrast, the multi-dimensional routing fabric allows data transfers to take shortcuts across dimensions to substantially reduce the distance that packets have to travel, thus reducing routing congestion and increasing system performance.

Datapipes resemble processor-like devices, using op-code driven transmitter and receiver masters to launch and receive all data transfers between I/O memory blocks of source and destination components. The multi-dimensional data transfer fabric, on the other hand, is a simple slave peripheral that can be driven directly by components without using transmitters, receivers or I/O memories. Not having to use transmitters, receivers and I/O memory blocks for every connected data processing component significantly reduces overall system gate count and data transfer latency, resulting in smaller systems with more deterministic transfers.

The variable-sized data packets of datapipes degrade data transfer determinism as one long packet can block several other packets from moving, thus stalling data transfers for an undetermined amount of time. Multiple stalled transfers may cause catastrophic gridlock conditions that can shut down all system communications. Multi-dimensional data routing fabric uses fixed-sized short packets that can only stall other packets for a short and precisely deterministic amount of time. Short packets routed in multiple dimensions preserve data transfer determinism and eliminate the possibility of data transfer gridlock.

Datapipes use a 1-dimensional routing method requiring each routing node to have knowledge of relative locations of all other system nodes in the left and right directions of a single dimension. This requires complex initialization sequences as different sets of relative locations for all routing nodes have to be loaded into every node. Once initialized, any changes to system topography may require re-initialization of the entire system with new sets of relative direction codes.

The data routing junctions of the multi-dimensional data routing fabric use absolute multi-dimensional coordinates to locate transfer destinations. The data routing junctions require one-time initialization with one set of local (their own) coordinates, and are not required to have the knowledge of the locations of any other routing junctions in the system. Data routing junctions do not have to be re-initialized as components are added, removed on re-positioned. Adding to the flexibility of use, all data routing junctions of the multi-dimensional data routing fabric can be initialized from a single component attached to any data routing junction.

The 1-dimensional routing logic used by the datapipes can be used for orthogonal routing if either right or left data transfer lines are rotated by 90 degrees relative to the other direction. This approach is not fully 2-dimensional since the data can only be routed in only one direction of each dimension while still using the 1-dimensional addressing based on left and right direction id codes.

A 2-dimensional data routing fabric uses true 2-dimensional destination coordinates to route data in both directions of each of dimension used. This doubles the number of horizontal and vertical transport links available for reducing routing congestion, thus making all transfers more deterministic. Use of absolute multi-dimensional coordinates instead of relative one-dimensional direction codes significantly improves data transfer latency and ease of use, while reducing the complexity of the routing logic.

By using small fixed-sized packets for routing of all data according to a consistent and uniform routing mechanism based on absolute multi-dimensional coordinates, the multi-dimensional data routing fabric removes dependencies between system components. Small packets and uniform I/O structure reduce worst-case transfer latency, thus enabling fully deterministic data transfer performance at all times.

By preserving transfer determinism under best and worst data loading conditions, the multi-dimensional data routing fabric allows more verification to be done locally inside system components and less at the system level, where it is more difficult. Re-distribution of verification cycles from system level into the components substantially improves the overall verification process for high performance data processing systems.

Flexible I/O topography and bandwidth of the multi-dimensional data routing fabric improve system scalability that make it easy for data processing components to be added, removed or re-positioned without affecting other components. Deterministic data transfers enable re-use of component between multiple designs. System scalability and component re-use can substantially accelerate system design and verification and reduce product time-to-market.

BACKGROUND OF THE INVENTION—ADDITIONAL OBJECTS AND ADVANTAGES

Other objects and advantages of the multi-dimensional data routing fabric include encoding of packet transfer parameters in the address of the source components, and using system's edge routing termination to enhance packet transfer flexibility. Additional objects and advantages described below also include connecting multi-dimensional arrays of data processing components through a number of routing dimensions that exceed the number of dimensions in which the components are physically arranged.

The multi-dimensional data routing fabric interconnects system components through data routing junctions linked with a mesh of data routing lines. Individual data routing junctions can appear to system components as conventional peripherals on their local buses. Components launching the packets can use local bus address fields to encode packet's destination coordinates, exit direction and destination response information (if needed).

This new addressing method makes the multi-dimensional routing fabric as easy to use as accessing local bus memory, while extending the reach of conventional buses beyond the local components, to also include other buses and their respective components.

System data processing components launching data packets can use exit direction fields of their local address buses to control the direction in which packets enter the multi-dimensional data routing fabric. This enables source components to launch data packets in any direction of any routing dimension in order to avoid interference with other packets.

This new packet launching method reduces the number of packet stalls due to simultaneous attempts to use shared data routing lines, thus further improving transfer latency and overall system performance.

Additionally, if avoiding other packets is not the primary concern, packets launched in arbitrary directions are still delivered to their destinations, although through possibly longer paths. This directional control and flexibility for launching of packets is made possible by the multi-dimensional data routing topology and by termination of system's edge data routing lines with sets of edge turnaround lines to reflect any stray packets back into the system.

The autonomous convergence of packets with their destinations is further enabled by a halt signal propagating against the flow of the data for orderly slow-down of data traffic in heavy data loading conditions.

Data processing components can use destination coordinates fields of the address bus to encode the coordinates of the destination components inside the data packets. Whether the packets are launched in a specific direction or in arbitrary directions, the multi-dimensional data routing fabric uses the destination coordinates to autonomously deliver the packets to their respective destinations, without further involving the source component. Autonomous transfers relieve components from having to track or manage data packets, thus enabling more cycles to be available for processing of data.

Data processing components launching data packets into the multi-dimensional data routing fabric can also use destination response fields of the address bus to trigger events in response to packets' arrival at their destination components. The source component encodes destination response fields in packets alongside the payload and the destination coordinates. When packets arrive at their destinations, the data routing junctions of the destination components may deliver the destination response fields to destination components in the form of status lines or interrupts.

Individual interrupts can trigger respective interrupt service routines, for example, to sort the incoming packets into data storage bins according to their point of origin or functional classification.

The header fields of packets may also contain a destination port identification field to deliver the packet to its destination through a specific local port, if the destination has more then one port for receiving packets.

Arrays of system components arranged in 2-dimensional spaces can just as well be connected with a 3-dimensional data routing fabric, instead of a 2-dimensional fabric. This approach provides 3 dimensions for routing of data in total of 6 directions to enable even more non-interfering data transfers. Additional routing dimensions further reduce the number of packet stalls in transfers that sometimes do have to share the same sets of data routing lines.

When used to implement systems on chip, the additional routing dimensions do not present any obstacles as the chip implementation tools automatically collapse the 3-dimensional data routing fabric to a 2-dimensional chip place-and-route task, while preserving the underlying 3-dimensional data communication structure.

With the multi-dimensional data routing fabric, system designers can thus increase (or reduce) the number of data routing dimensions to any level beyond the number of physical dimensions in which the data processing components are arranged physically. Components laid out in 2- or 3-dimensions can thus be interconnected with 4-, 5- or 7-dimensional data routing fabrics to reduce worst-case data transfer latencies and to further increase system performance.

In addition, the types of multi-dimensional routing coordinates used in the multi-dimensional data routing fabric do not even have to mirror the types of dimensions used to implement the design, and thus can include Cartesian, cylindrical, radial and other types of coordinate systems. This de-coupling of data communication topography from the physical layout of data processing components enables system communications to be more closely mapped to the data flows of their respective applications, thus further improving system efficiency and performance over non multi-dimensional data routing methods.

The few types of data transfer link signals implementing a single data transfer protocol in the multi-dimensional data routing fabric make it easy to monitor system operation, especially when compared to hundreds of signal types and many data transfer protocols of systems that are based on non-uniform connectivity methods.

Multi-dimensional data routing fabric effectively de-couples data connectivity from functionality of subsystems it connects. This enables subsystems to be developed without the knowledge of other subsystems and the system in which they reside, enabling encapsulation of subsystems and practical reuse of system components.

De-coupling of system functionality from connectivity also enables sharing of fixed-function subsystem cores (as opposed to bus-based programmable subsystems) by manipulating the destination fields of result packets exiting a fixed-function core based on the type of the operand packets that are received by the fixed-function core.

Further objects and advantages of my invention will become apparent from a consideration of the drawings and ensuing description.

SUMMARY OF THE INVENTION

This invention describes a multi-dimensional data routing method that minimizes interference between multiple data transfers, including transfers that occur simultaneously. Multi-dimensional data routing fabric enables simultaneous data transfers over shared data lines between a large number of components without incurring communication bottlenecks and other drawbacks of non multi-dimensional routing methods.

DRAWINGS—BRIEF DESCRIPTION

These and other aspects of this invention are illustrated in the drawings, in which:

FIG. 1A shows an example of a 2-dimensional coordinate system;

FIG. 1G shows a data packet being routed through a 2-dimensional data routing fabric;

FIG. 2A shows a data packet entering a 2-dimensional data routing fabric through an internal location;

FIG. 3B shows a data packet exiting from an internal location of a 3-dimensional data routing fabric;

FIG. 4C shows a 2-dimensional data routing fabric simultaneously transporting three data packets between three component pairs;

FIG. 11D shows a 3-dimensional data routing junction simultaneously turning two data packets and passing one data packet straight through;

FIG. 11E shows a 4-dimensional data routing junction simultaneously turning three data packets and passing one data packet straight through;

FIG. 28B shows a horizontal data packet making a left turn inside a data routing junction because its local routing angle is greater then 90 degrees;

FIG. 41 also shows data entry ramps for launching new packets into the fabric and data exit ramps for receiving packets from the fabric;

FIG. 42 also shows data entry ramps for launching new packets into the fabric and data exit ramps for receiving packets from the fabric;

FIG. 47A also shows the data packet traveling in the [Z] direction passing straight through a data routing junction because its local routing angle is smaller then 90 degrees;

FIG. 47C shows a data packet traveling in the [−Y] direction making a turn inside a data routing junction because its local routing angle is greater then 90 degrees;

FIG. 47E also shows the data packet exiting the fabric into its destination component via a data exit ramp;

Figure 69:
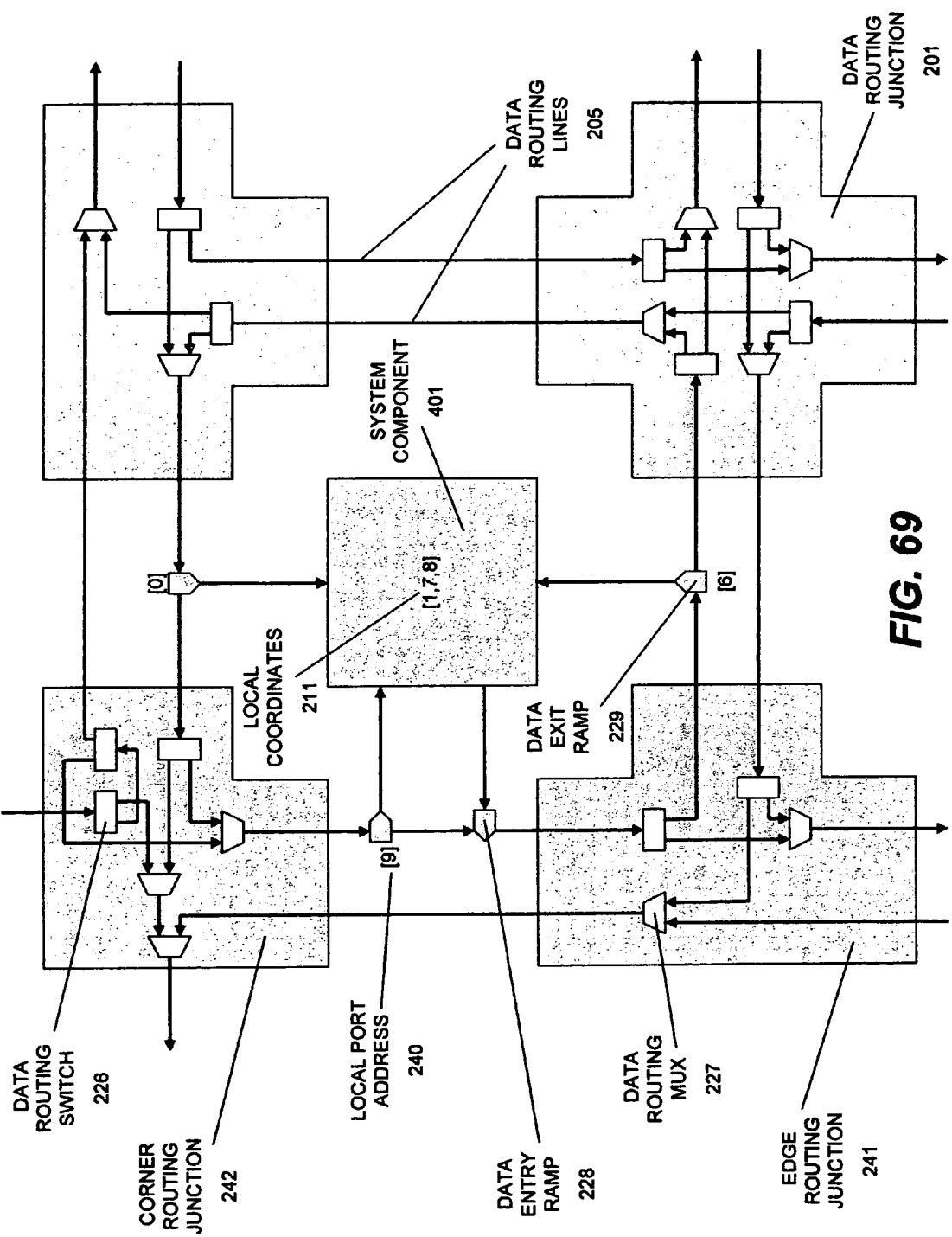
Figure 70A:
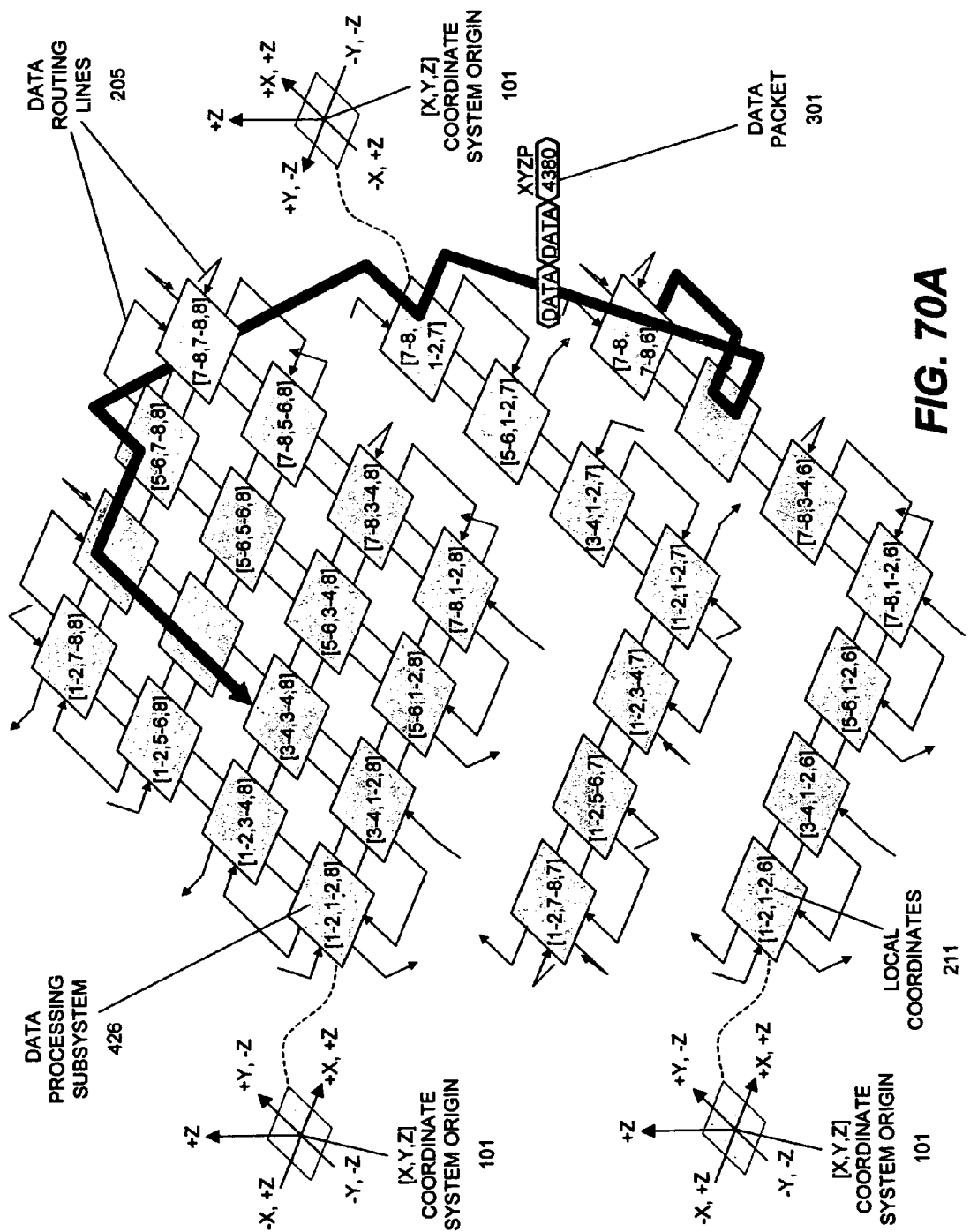
Figure 70C:
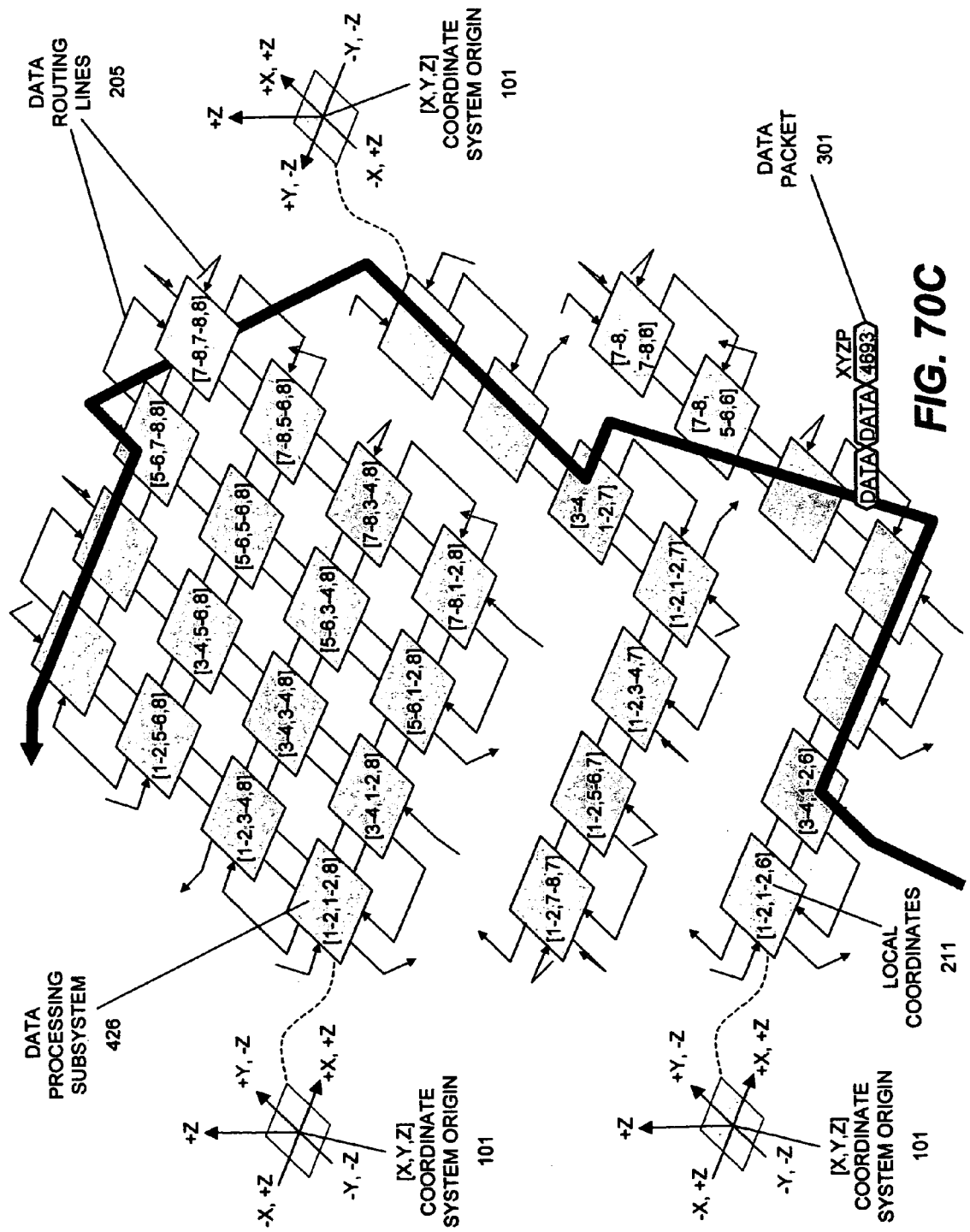
Figure 71:
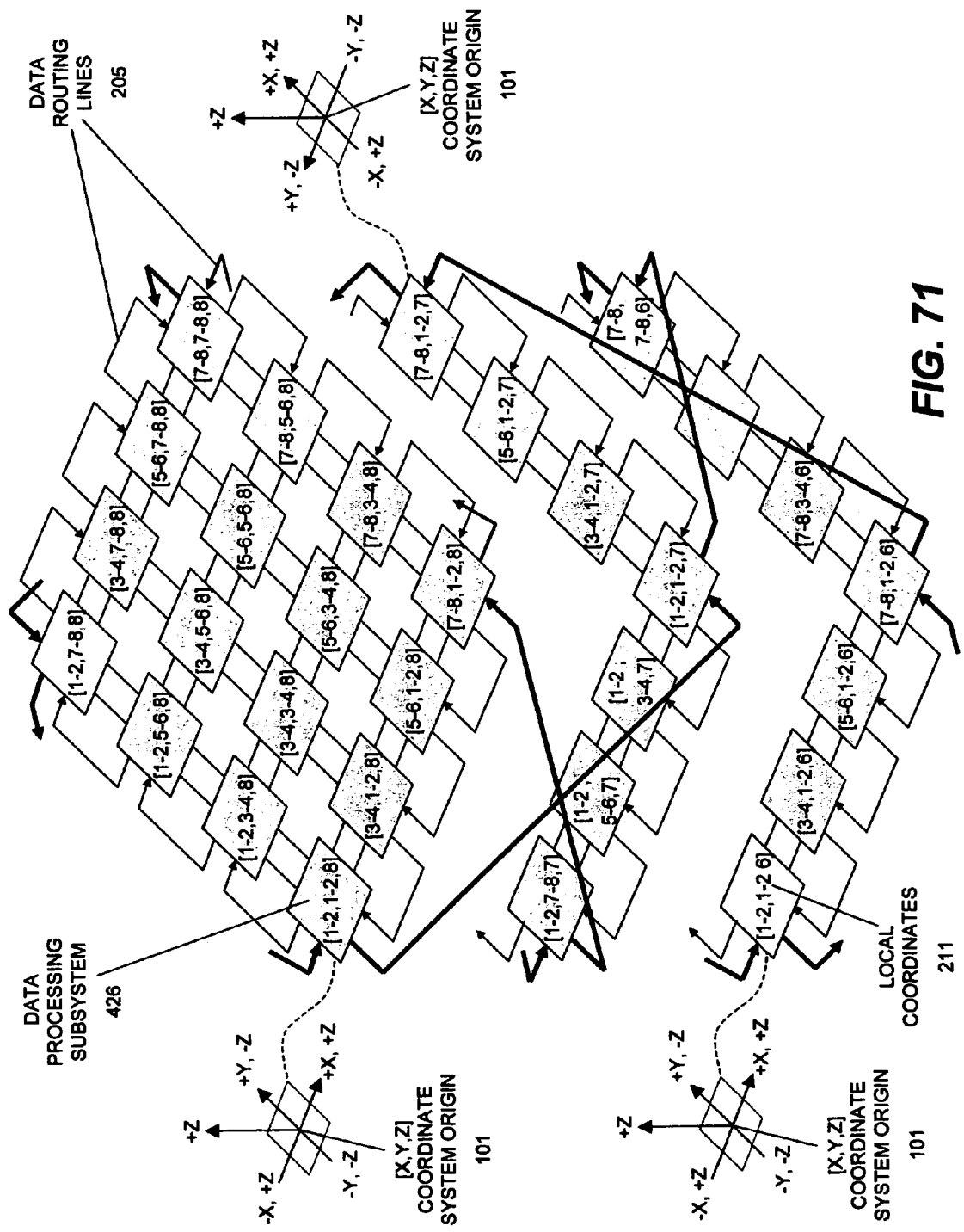
Figure 72:
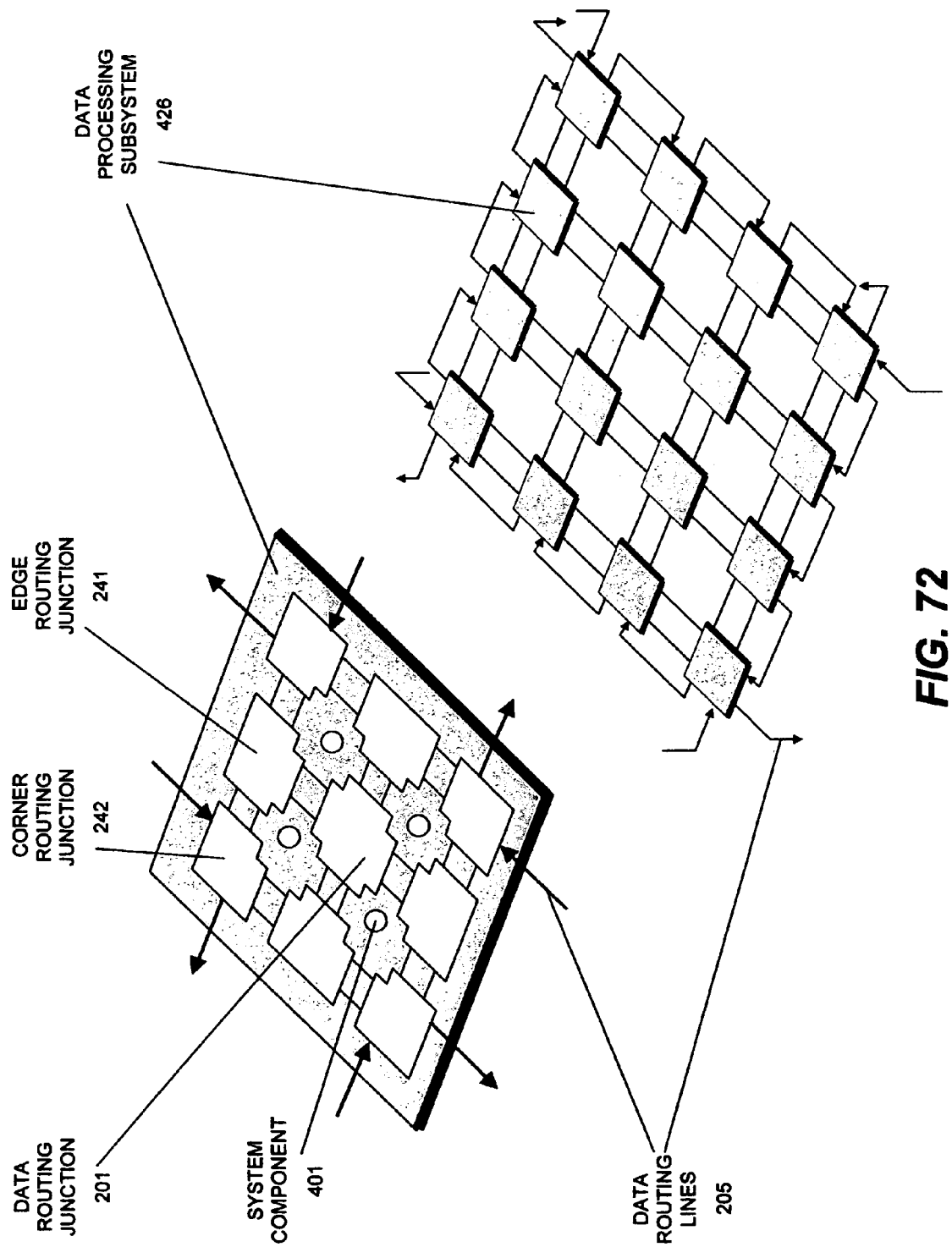
Figure 73A:
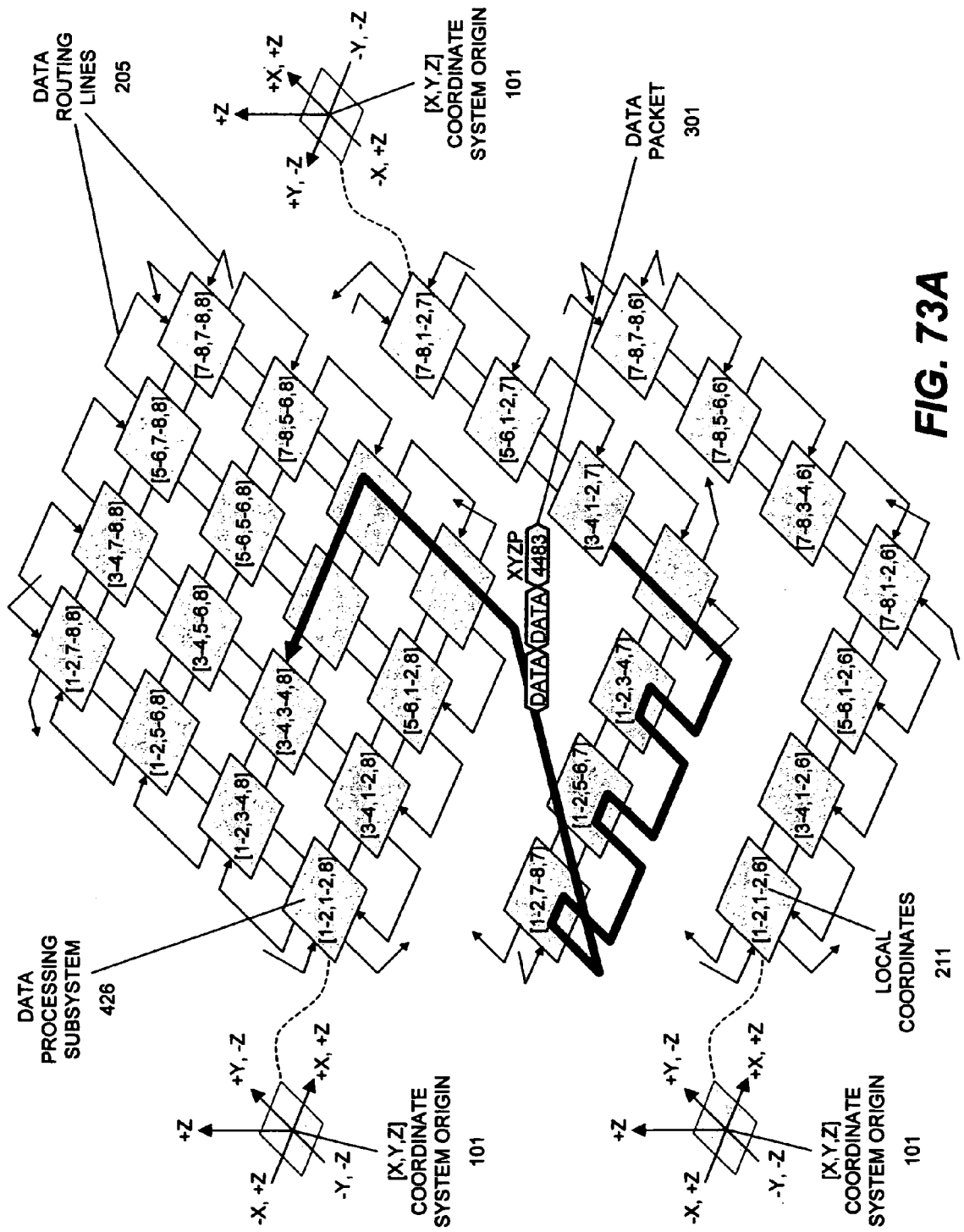
Figure 73B:
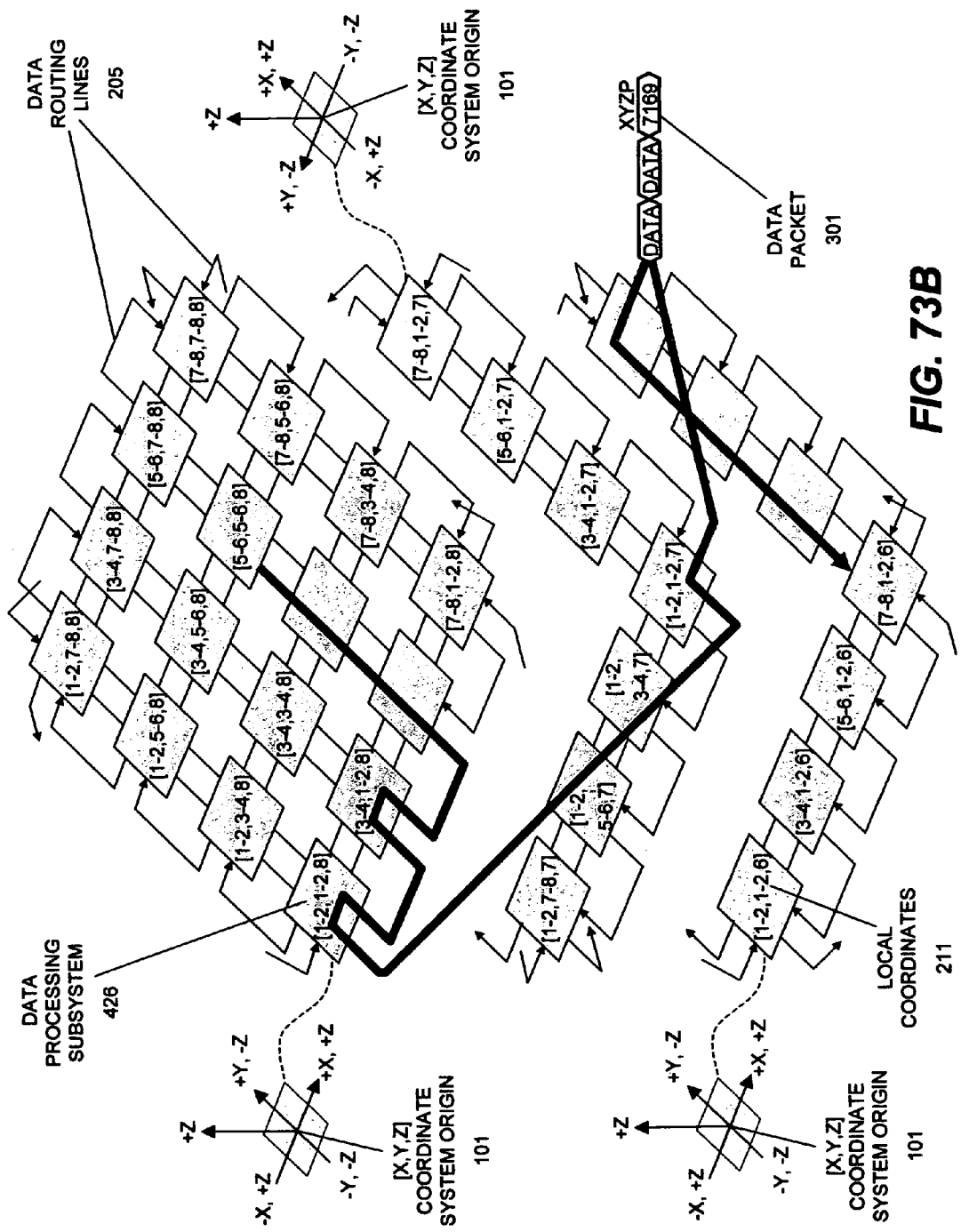
Figure 73C:
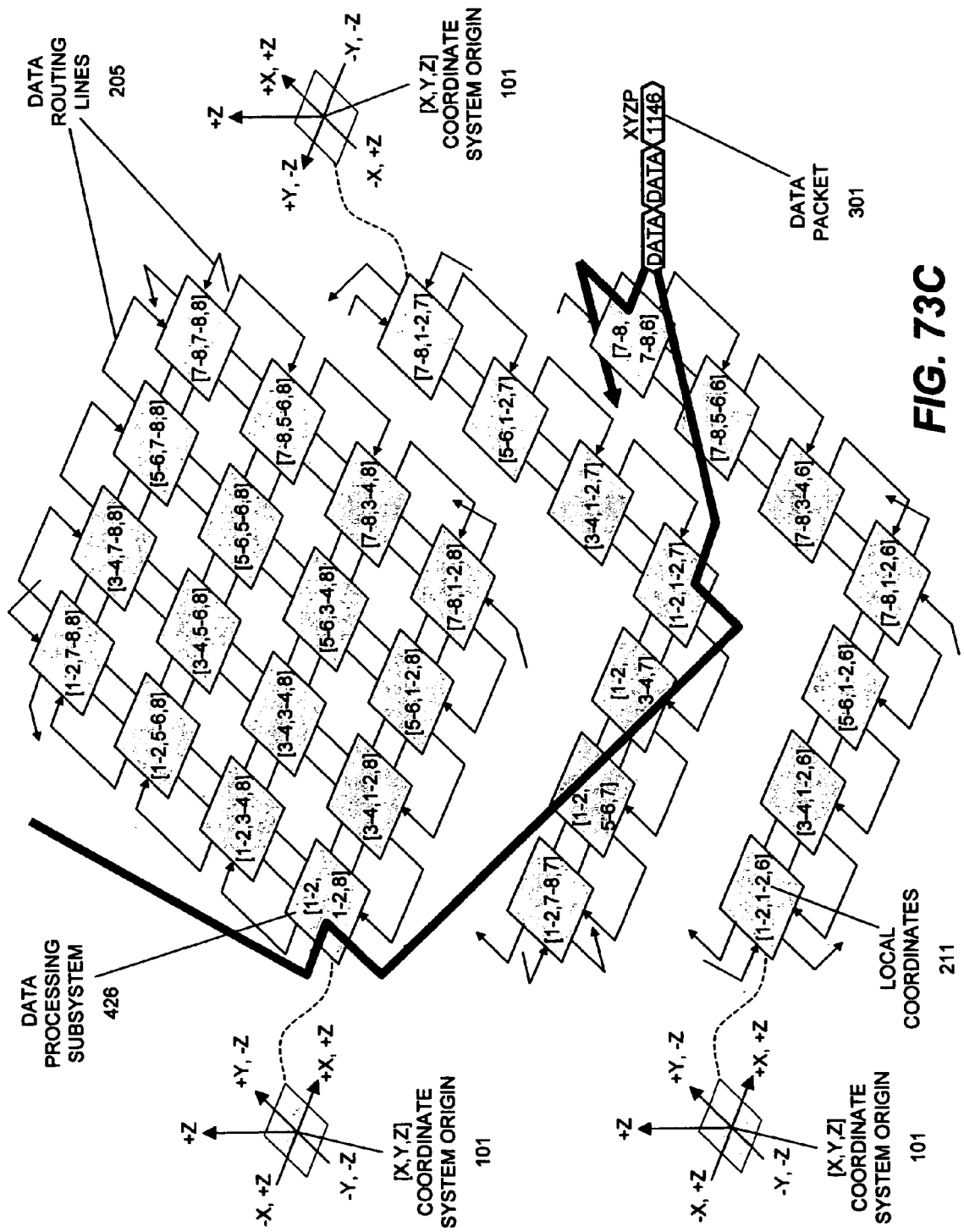
Figure 74:
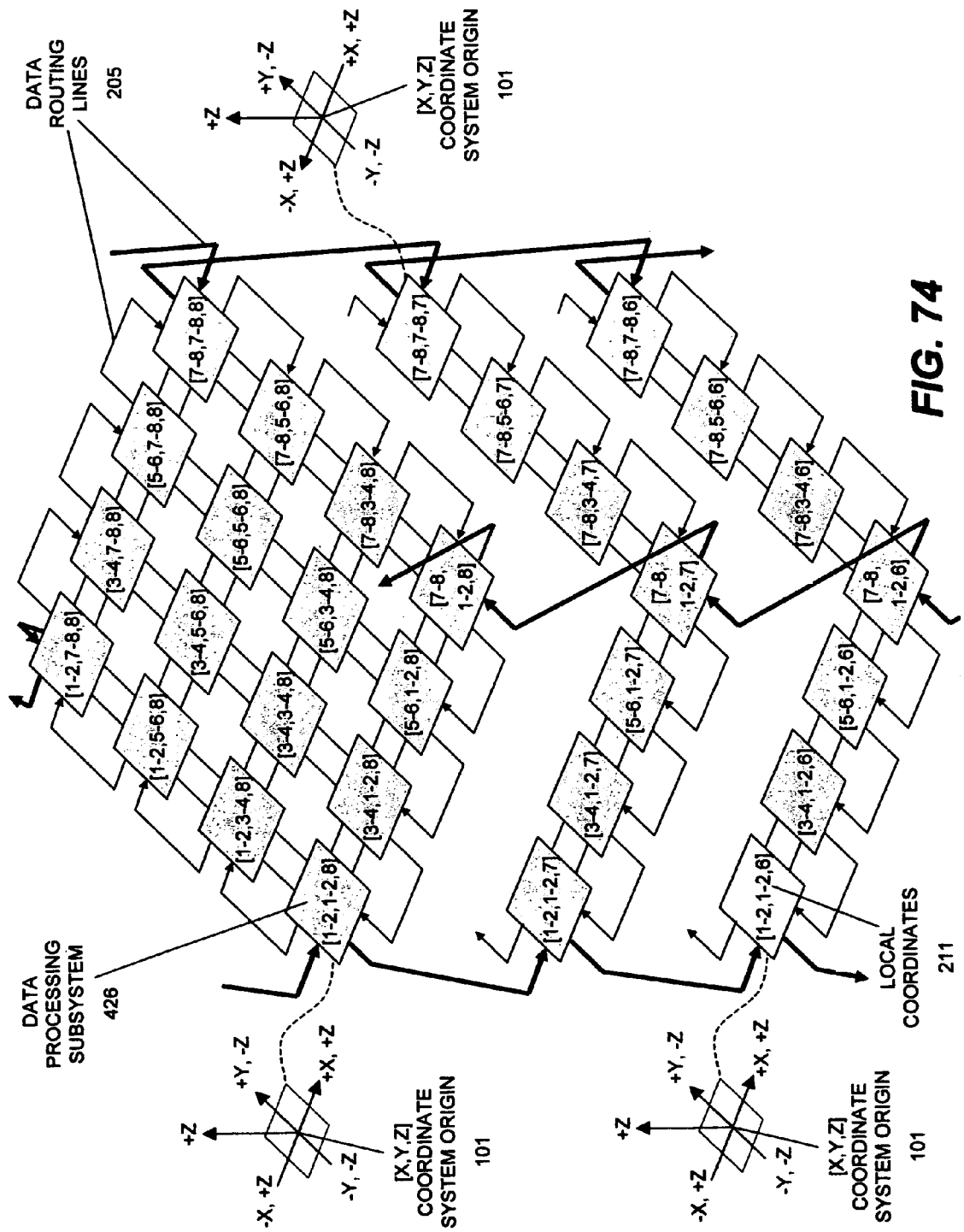
Figure 75A:
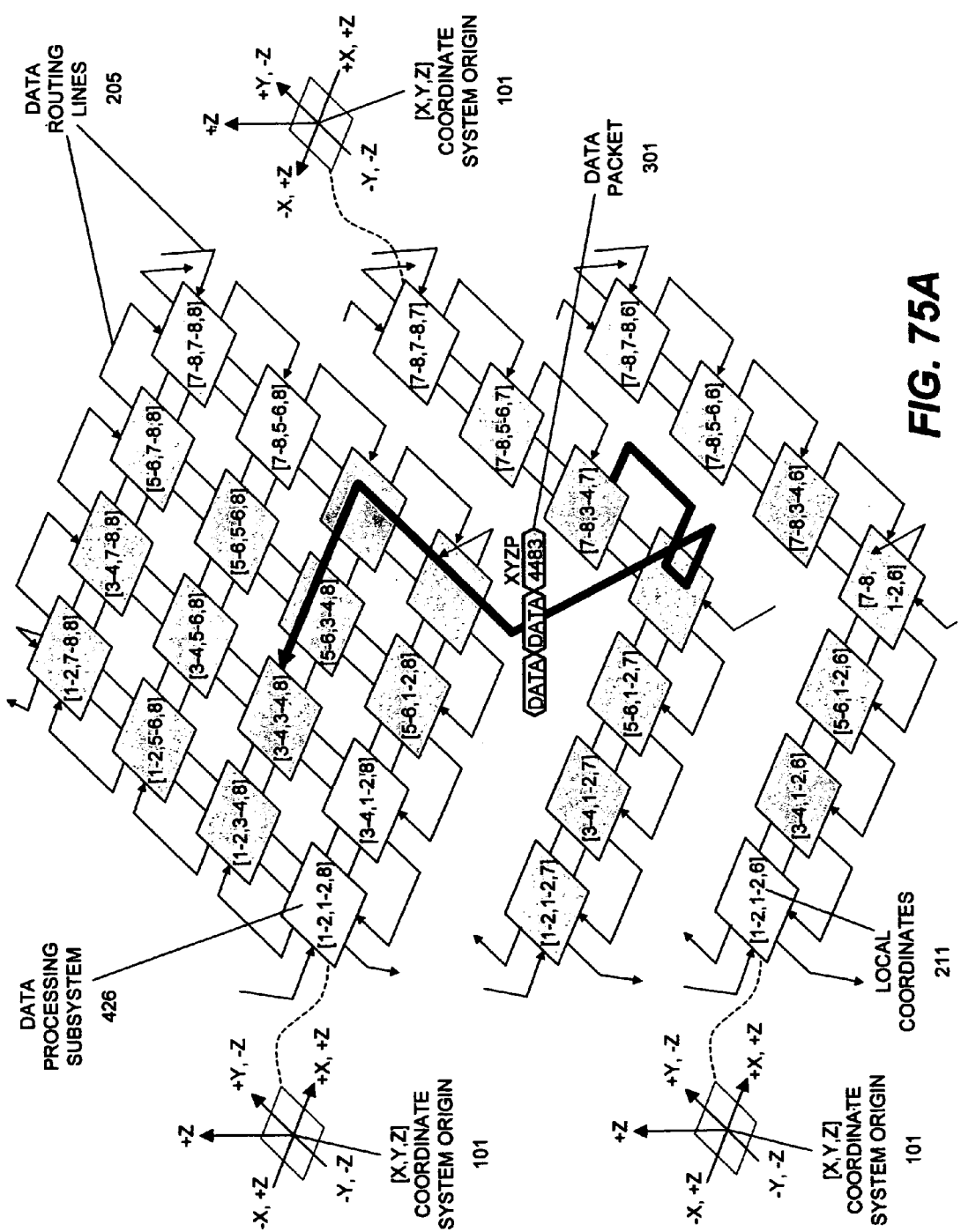
Figure 75B:
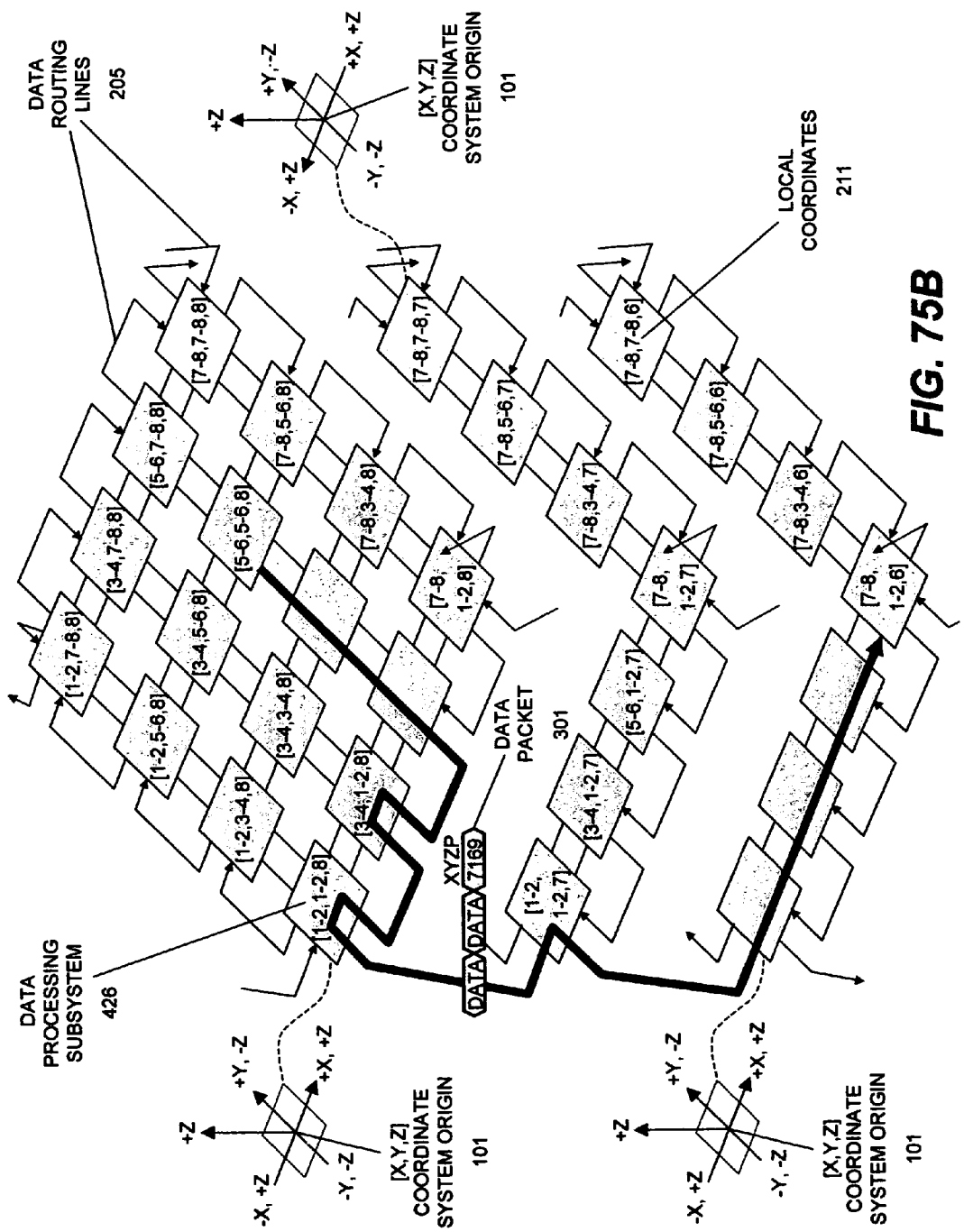
Figure 75C:
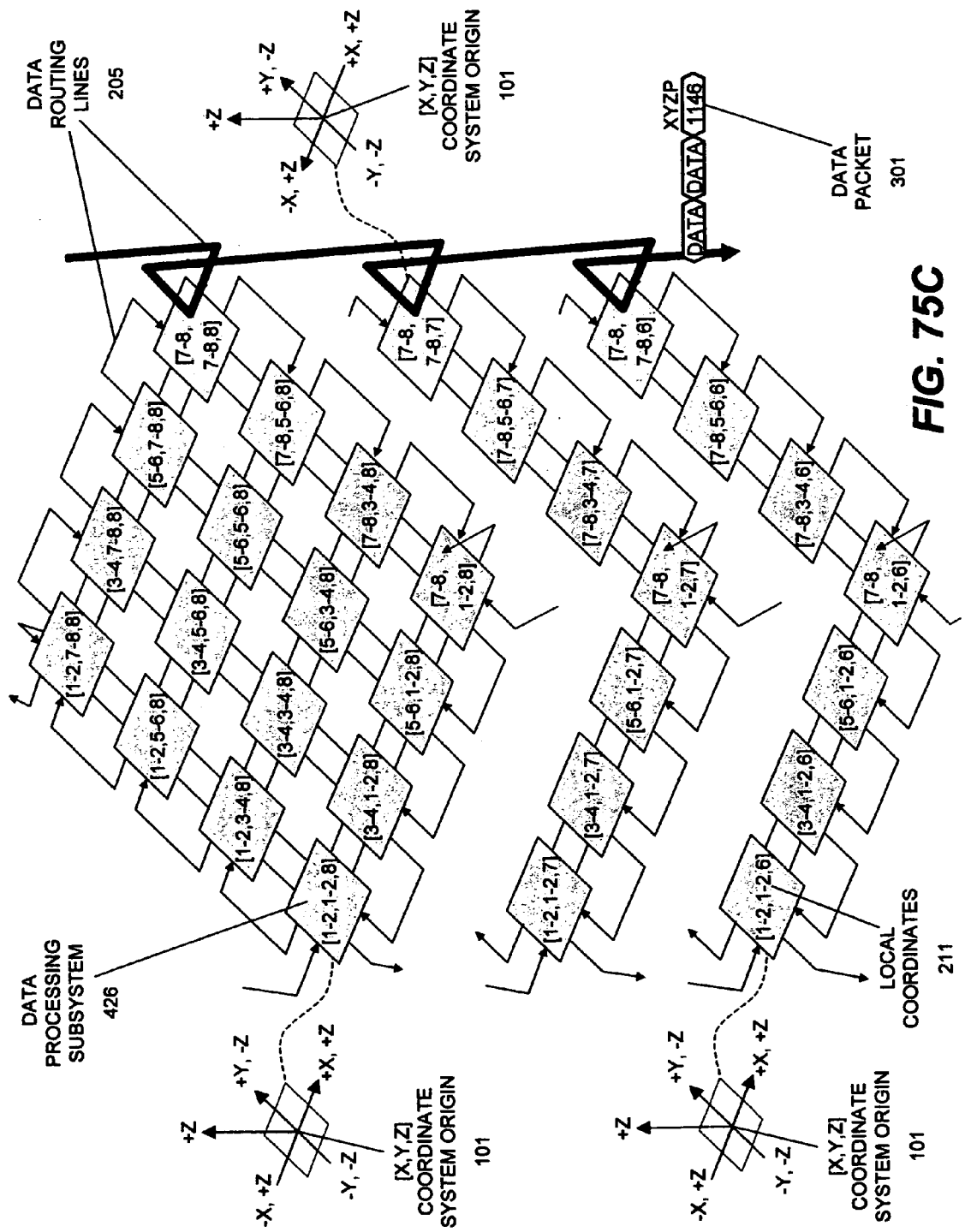
Figure 76:
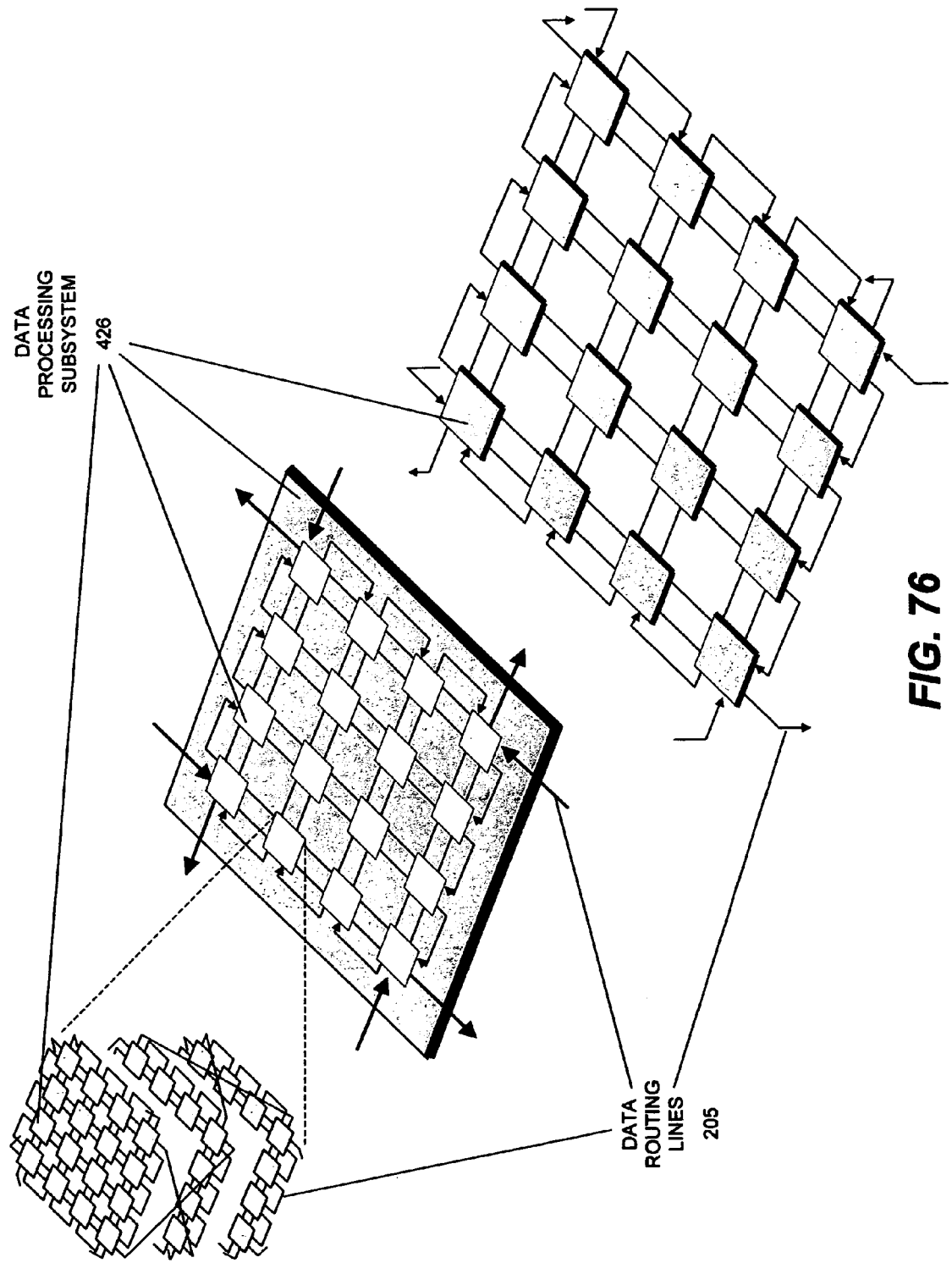

FIG. 69 shows the internal data routing structure and the external connections for a data processing subsystem of a chain-like 3-dimensional data routing fabric containing 2-dimensional sets of 2-dimensional subsystems, where the adjacent 2 dimensional subsystems are horizontally or vertically connected at every corner junction;

FIG. 70A shows a double-x chain-like 3-dimensional data routing fabric using two slanted edge sets of data routing lines to transfer a data packet between the bottom and top sets of data processing subsystems of a vertical stack of 2-dimensional sets of 2-dimensional subsystems;

FIG. 70B shows a double-x chain-like 3-dimensional data routing fabric using two slanted edge sets of data routing lines to transfer a data packet between the top and bottom sets of data processing subsystems of a vertical stack of 2-dimensional sets of 2-dimensional subsystems;

FIG. 70C shows a double-x chain-like 3-dimensional data routing fabric using multiple slanted edge sets of data routing lines to transfer a data packet through a vertical stack of 2-dimensional sets of 2-dimensional subsystems;

FIG. 71 shows a 3-dimensional data routing fabric formed by a chain-like linkage of three 2-dimensional sets of 2-dimensional data processing subsystems, with one slanted x-like chain connection applied at each outside edge of every corner subsystem of each set;

FIG. 72 shows a 4×4 set of data routing subsystems with only the edge connections closest to the corners being bent up or down (in the same direction at opposite facing edges) to connect to the hidden sets above and below, while the remainder of edge connections loop-back to adjacent subsystems within the shown set;

FIG. 73A shows a single-x chain-like 3-dimensional data routing fabric using one slanted edge set of data routing lines to transfer a data packet between two adjacent sets of data processing subsystems of a vertical stack of 2-dimensional sets of 2-dimensional subsystems;

FIG. 73B shows a single-x chain-like 3-dimensional data routing fabric using two slanted edge sets of data routing lines to transfer a data packet between the top and bottom sets of data processing subsystems of a vertical stack of 2-dimensional sets of 2-dimensional subsystems;

FIG. 73C shows a single-x chain-like 3-dimensional data routing fabric using multiple slanted edge sets of data routing lines to transfer a data packet through a vertical stack of 2-dimensional sets of 2-dimensional subsystems;

FIG. 74 shows a 3-dimensional data routing fabric formed by a lace-like linkage of three 2-dimensional sets of 2-dimensional data processing subsystems, with one lace-like connection applied up and down between every corner subsystem of each set;

FIG. 75A shows a chain-like 3-dimensional data routing fabric using one corner set of data routing lines to transfer a data packet between two adjacent sets of data processing subsystems of a vertical stack of 2-dimensional sets of 2-dimensional subsystems;

FIG. 75B shows a chain-like 3-dimensional data routing fabric using two corner sets of data routing lines to transfer a data packet between the top and bottom sets of data processing subsystems of a vertical stack of 2-dimensional sets of 2-dimensional subsystems;

FIG. 75C shows a chain-like 3-dimensional data routing fabric using multiple corner sets of data routing lines to transfer a data packet through a vertical stack of 2-dimensional sets of 2-dimensional subsystems;

FIG. 76 shows a hierarchical nesting of white-level data processing subsystems 426 inside a gray-level subsystem.

DRAWINGS—REFERENCE NUMERALS

Multi-dimensional coordinate system numerals:

| | |
|---|---|
| 101. | Coordinate system origin |
| 102. | Routing directions of a routing dimension |
| 103. | X routing dimension |
| 104. | Y routing dimension |
| 105. | Z routing dimension |
| 106. | P routing dimension |
| 107. | Q routing dimension |
| 108. | R routing dimension |
| 109. | S routing dimension |
| 110. | T radial dimension |
| 111. | U azimuth dimension |
| 112. | V elevation dimension |
| 113. | W cylindrical dimension |

Multi-dimensional data routing fabric numerals:

| | |
|---|---|
| 200. | Initialization order |
| 201. | Data routing junction |
| 202. | Routing junction initialized first |
| 203. | Routing junction initialized last |
| 204. | Edge turnaround lines |
| 205. | Data routing lines |
| 206. | Routing input lines |
| 207. | Routing output lines |
| 208. | Local input lines |
| 209. | Local output lines |
| 210. | Local data lines |
| 211. | Local coordinates |
| 212. | Junction configuration |
| 213. | Packet turn lines |
| 214. | Data routing terminal |
| 215. | Terminal configuration |
| 216. | Exit circuit |
| 217. | Pass circuit |
| 218. | Turn circuit |
| 219. | Packet mux |
| 220. | Packet control |
| 221. | Configuration data lines |
| 222. | Configuration input lines |
| 223. | Configuration output lines |
| 224. | Turn input lines |
| 225. | Turn output lines |
| 226. | Data routing switch |
| 227. | Data routing mux |
| 228. | Data entry ramp |
| 229. | Data exit ramp |
| 230. | Mux input lines |
| 231. | Switch output lines |
| 232. | Routing address unit |
| 233. | Routing address comparator |
| 234. | Destination lookup table |
| 235. | Data entry port |
| 236. | Data exit port |
| 237. | Local routing angle |
| 238. | Destination coordinate plane |
| 239. | Terminal configuration |
| 240. | Local port address |
| 241. | Edge routing junction |
| 242. | Corner routing junction |

Data packet numerals:

| | |
|---|---|
| 301. | Data packet |
| 302. | Packet destination coordinates |
| 303. | Packet destination response |
| 304. | Packet payload |
| 305. | Packet boundary |
| 306. | Packet body |
| 307. | Transport clock |
| 308. | Transfer halt |
| 309. | Initialization packet |
| 310. | Transfer request |
| 311. | Transfer acknowledge |
| 312. | Packet type identifier |
| 313. | Destination region coordinates |
| 314. | Destination port address |
| 315. | System clock |

System component numerals:

| | |
|---|---|
| 400. | Initialization host |
| 401. | System component |
| 402. | Source component |
| 403. | Destination component |
| 404. | Data processing unit |
| 405. | Read interface |
| 406. | Write interface |
| 407. | Parallel bus |
| 408. | Data input bus |
| 409. | Data output bus |
| 410. | Address bus |
| 411. | Exit direction field |
| 412. | Destination coordinates field |
| 413. | Bus destination response field |
| 414. | Packet builder |
| 415. | Exit direction switch |
| 416. | Write decode |
| 417. | Read decode |
| 418. | Read mux |
| 419. | Read control |
| 420. | Word builder |
| 421. | Destination response circuit |
| 422. | Write status |
| 423. | Read status |
| 424. | Read interrupt lines |
| 425. | Bus interface |
| 426. | Data processing subsystem |

DETAILED DESCRIPTION

Preferred Embodiment

Figure 1B:
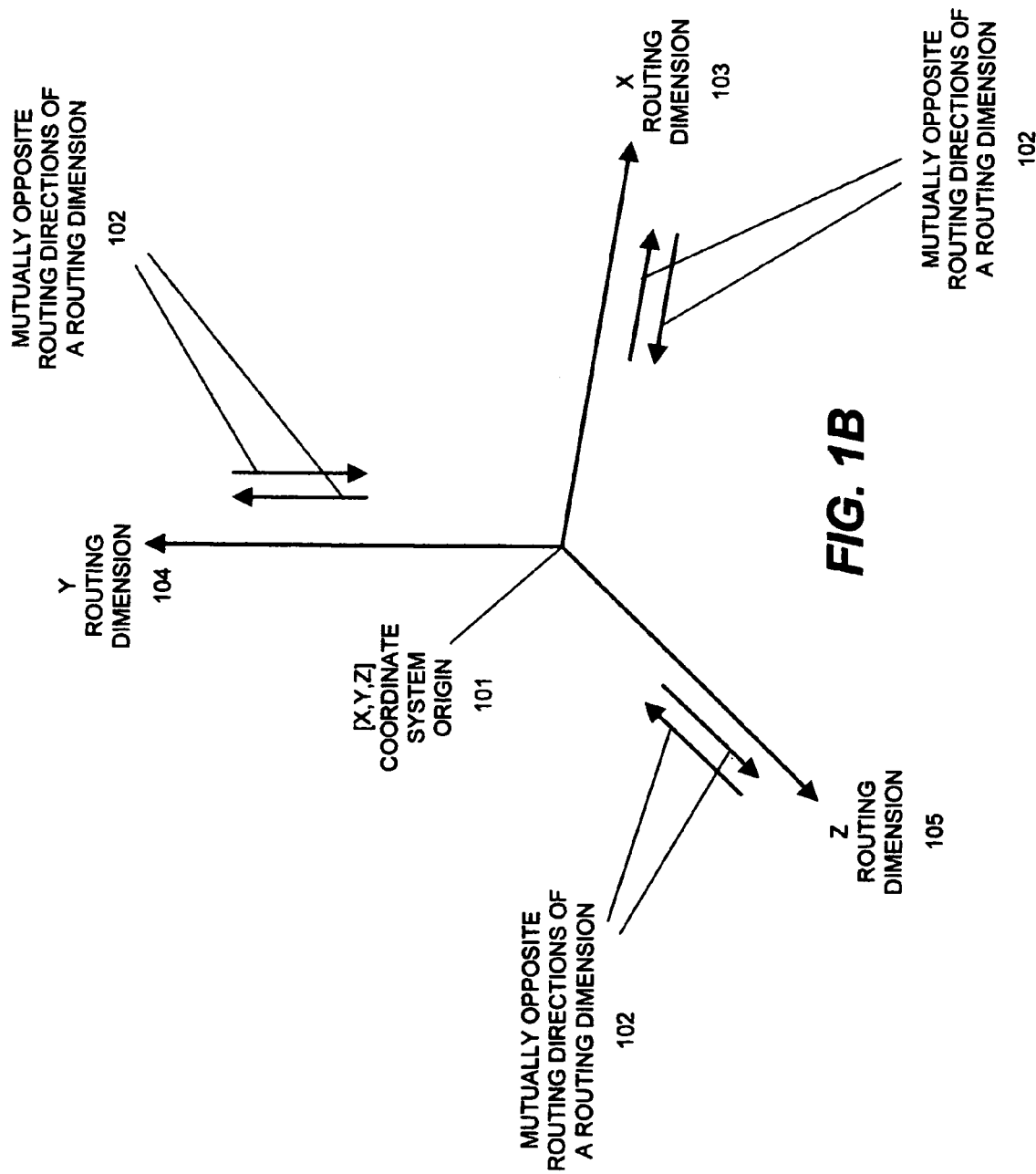
FIG. 1B shows an example of a 3-dimensional coordinate system.
Figure 1C:
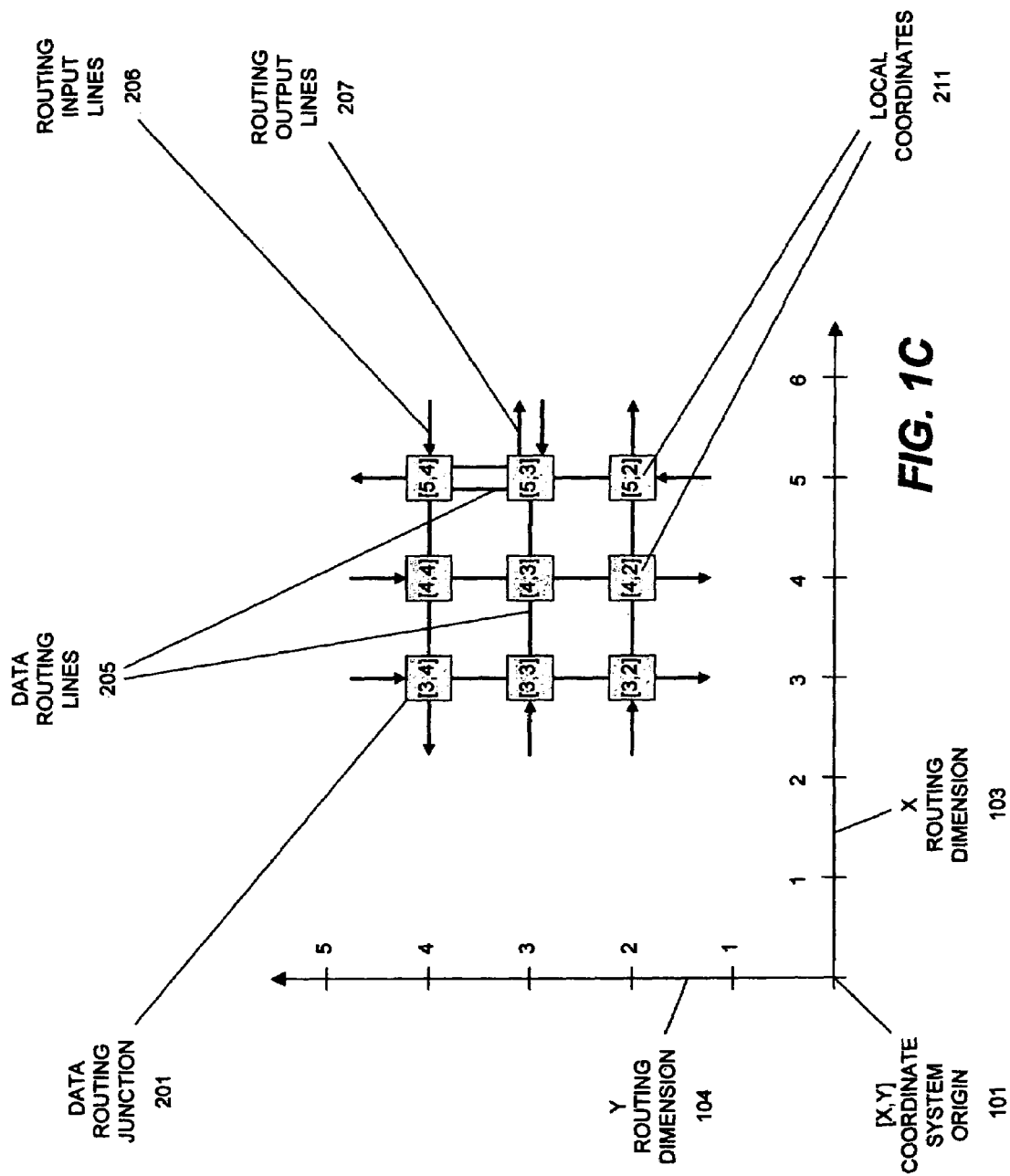
FIG. 1C shows an example of a 2-dimensional data routing fabric.
Figure 1D:
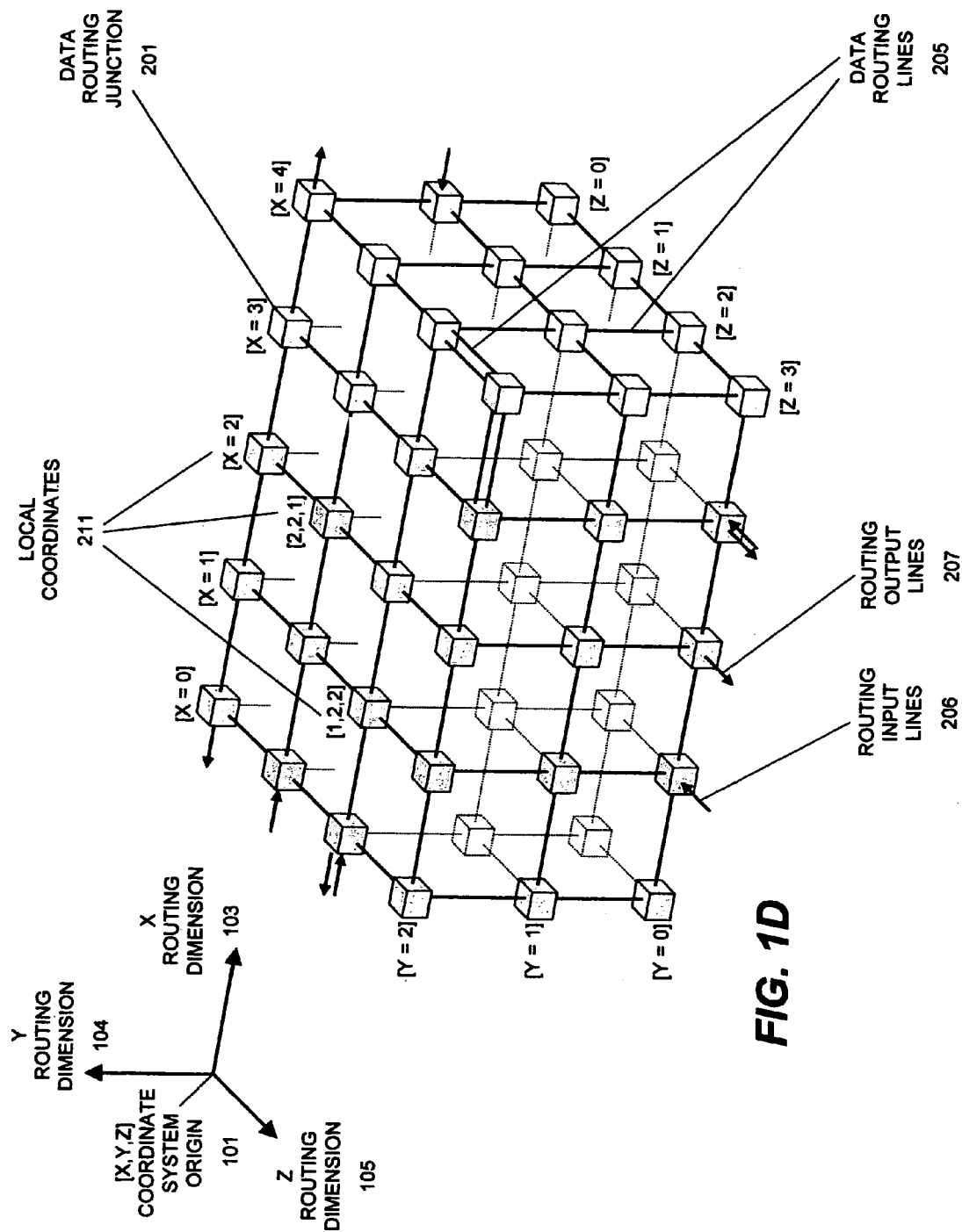
FIG. 1D shows an example of a 3-dimensional data routing fabric.
Figure 1E:
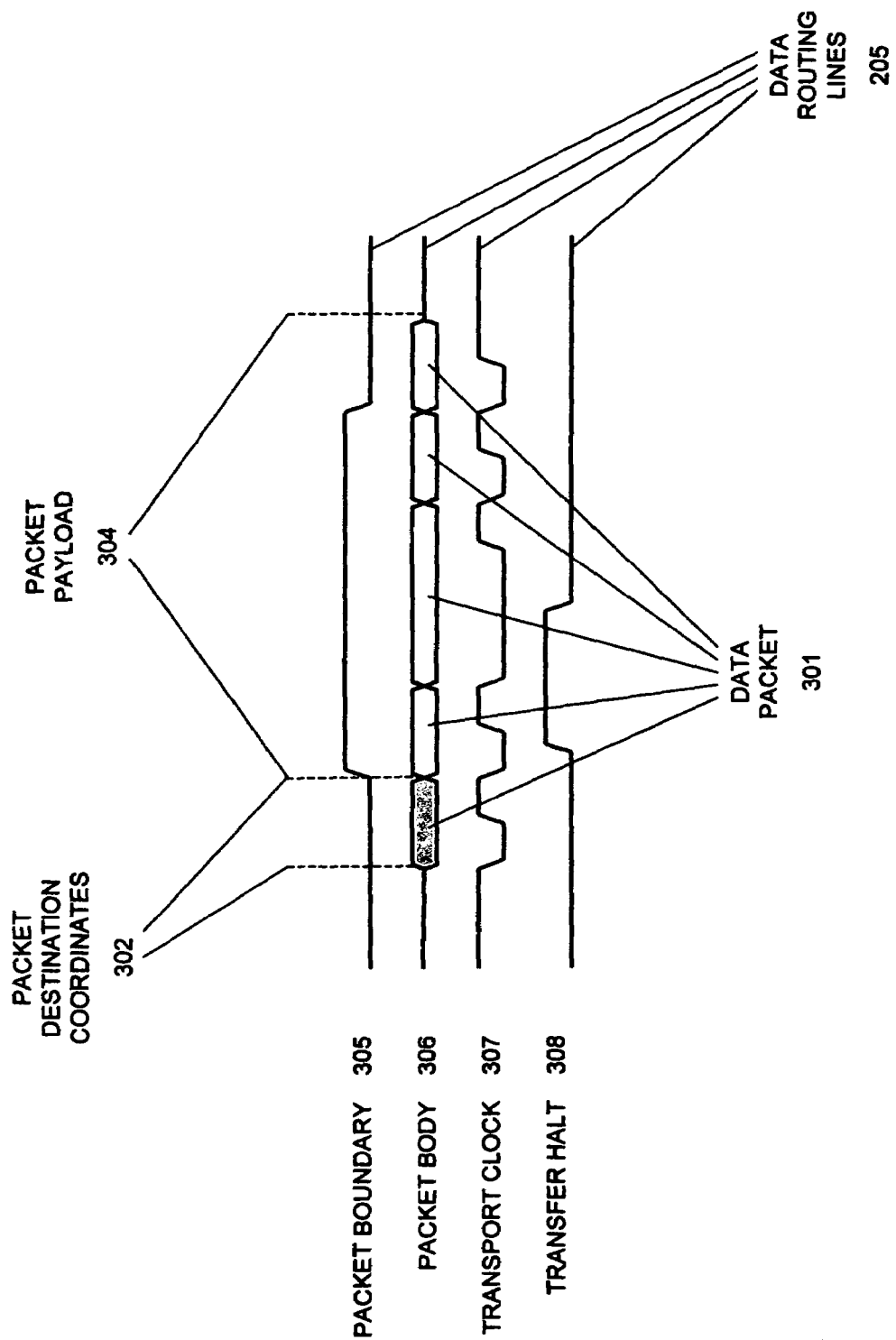
FIG. 1E shows timing waveforms of a short data packet passing through a set of data routing lines.
Figure 1F:
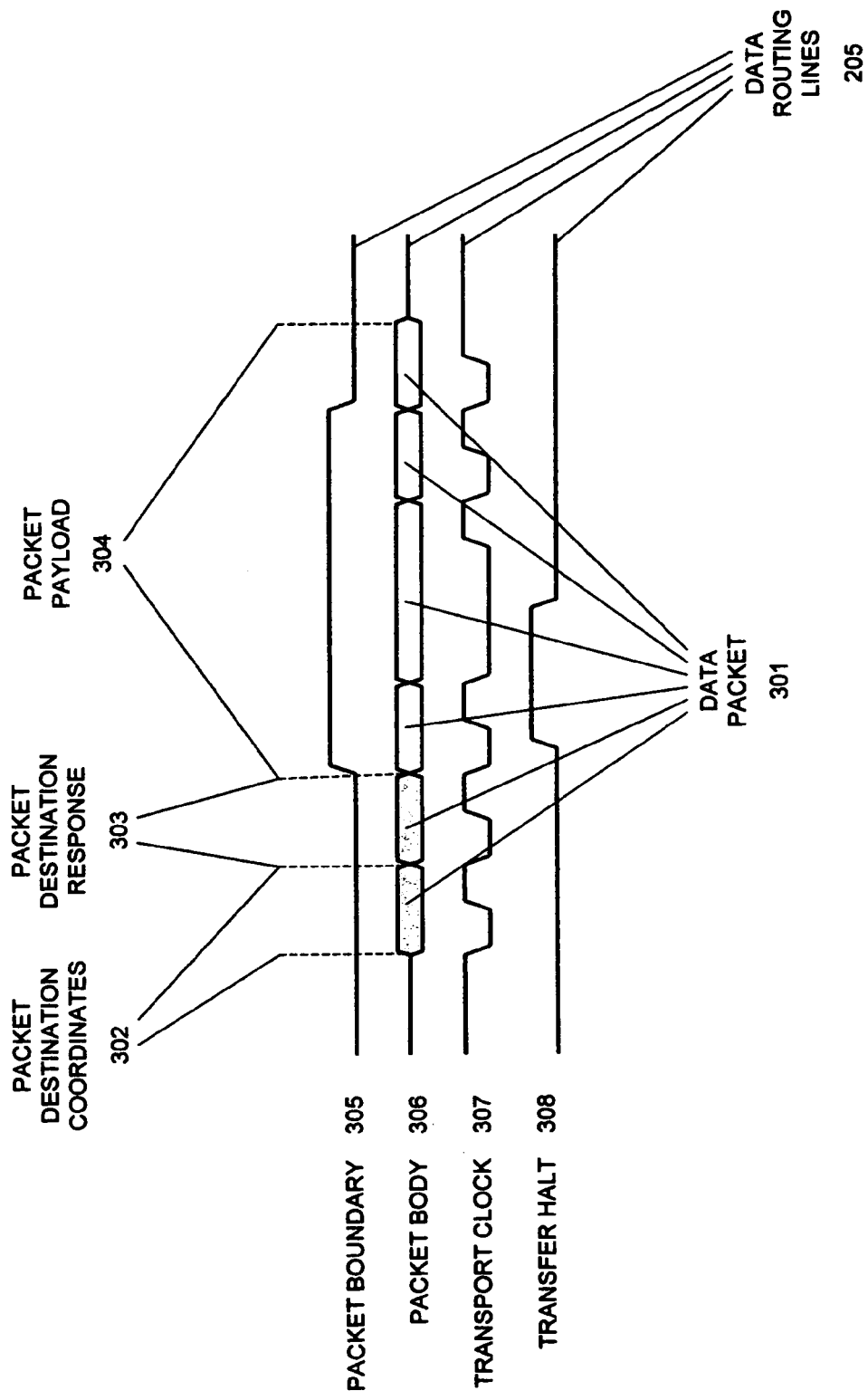
FIG. 1F shows timing waveforms of a long data packet passing through a set of data routing lines.
Figure 1H:
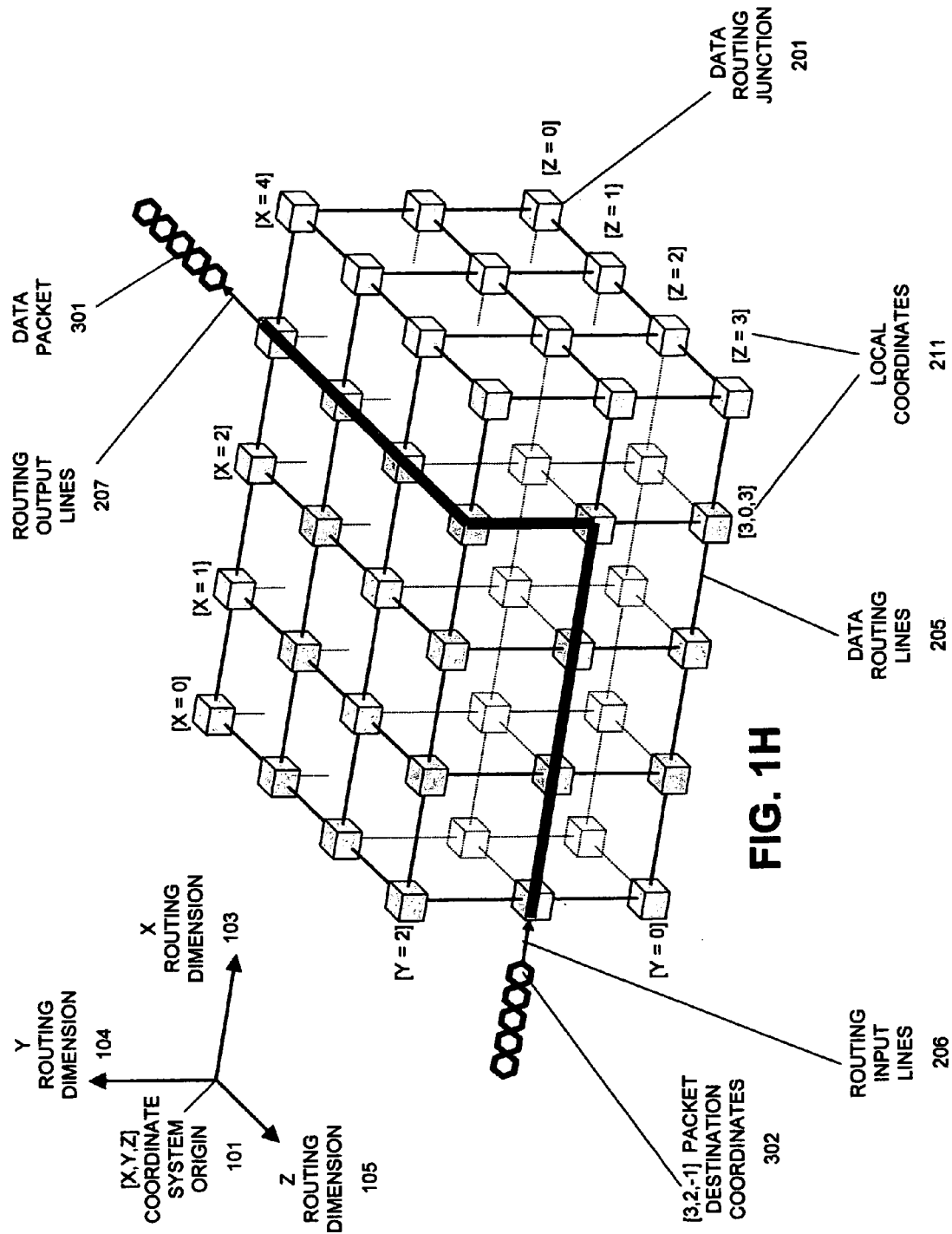
FIG. 1H shows a data packet being routed through a 3-dimensional data routing fabric.
Figure 1I:
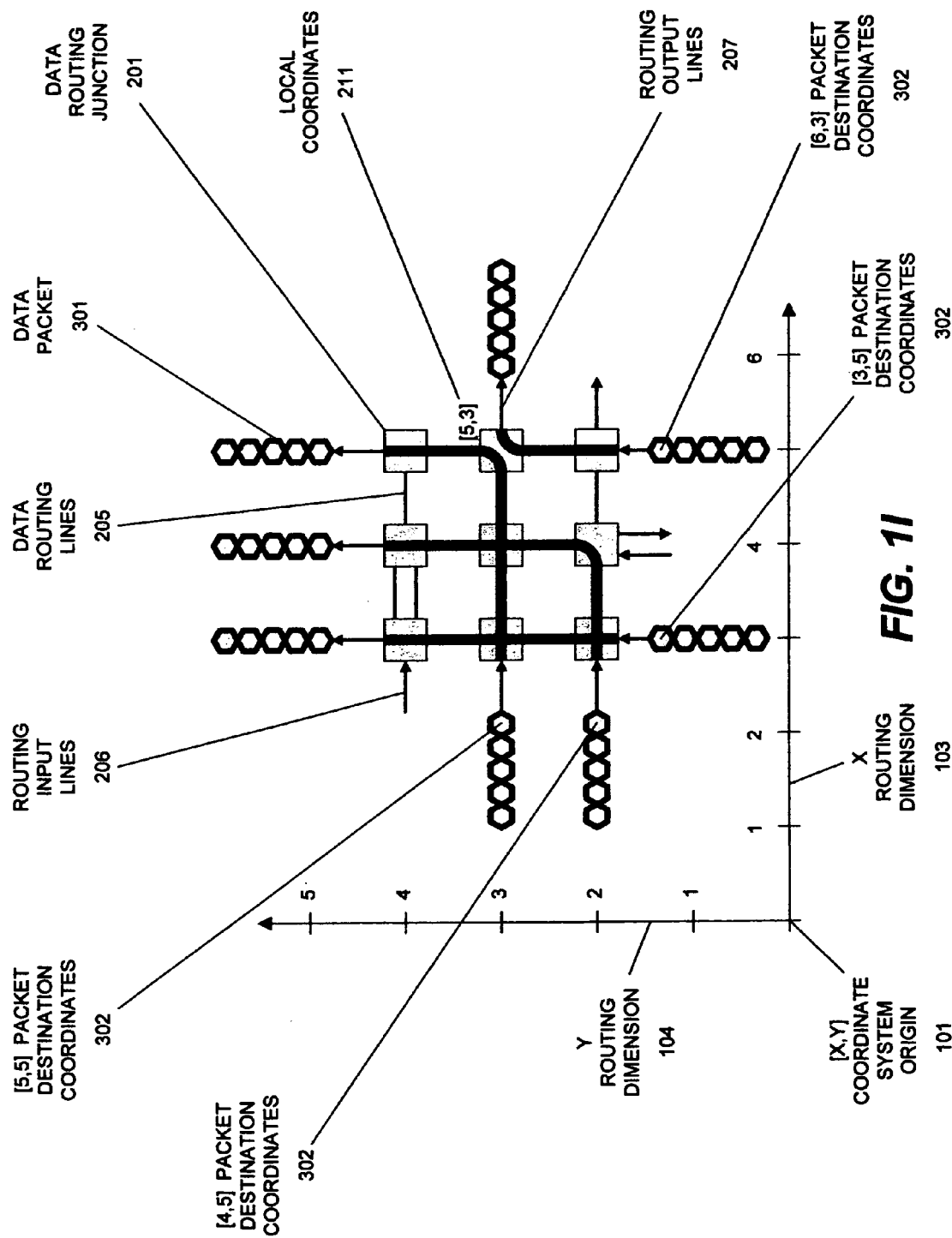
FIG. 1I shows four data packets being simultaneously routed through a 2-dimensional data routing fabric.
Figure 1J:
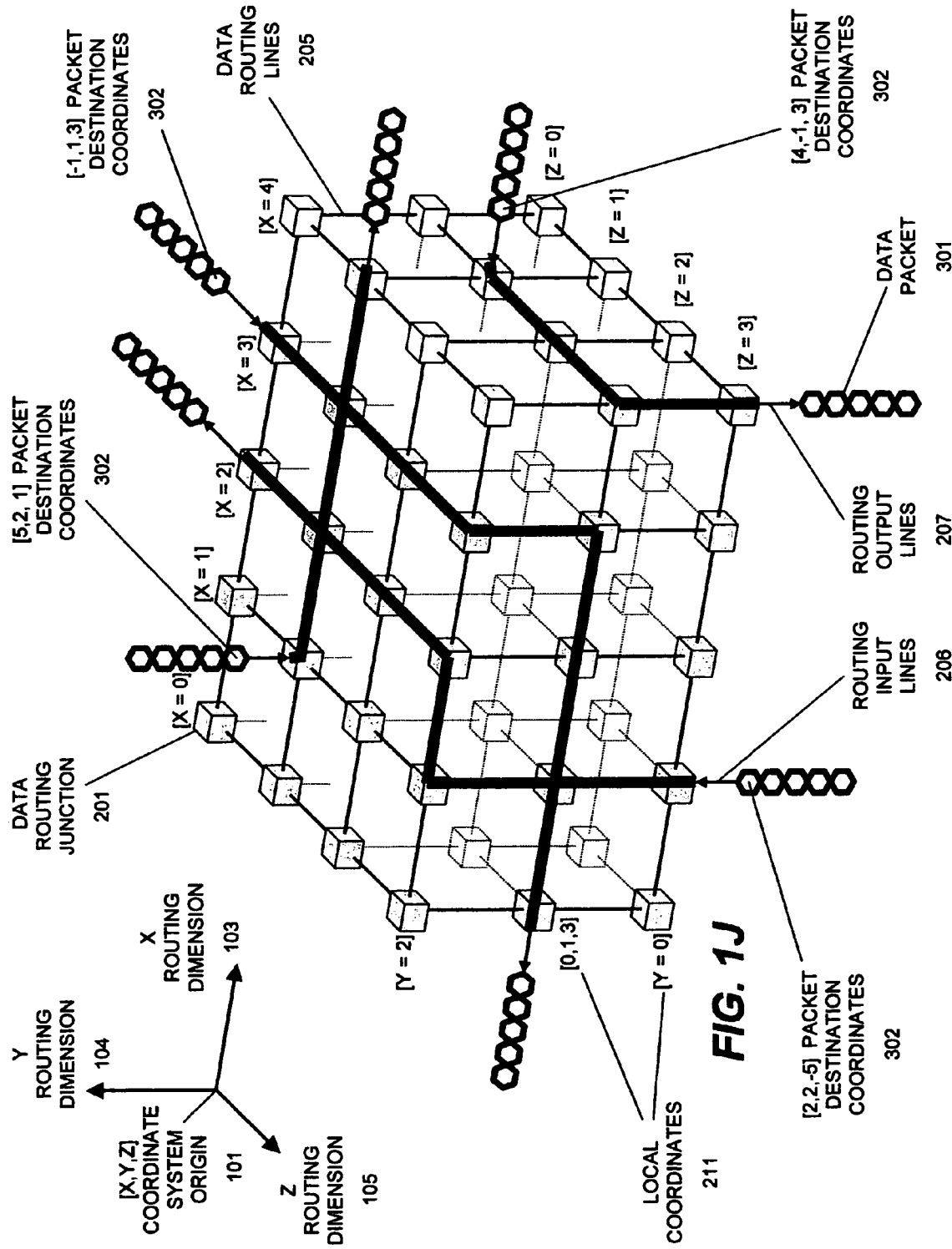
FIG. 1J shows four data packets being simultaneously routed through a 3-dimensional data routing fabric.
Figure 4A:
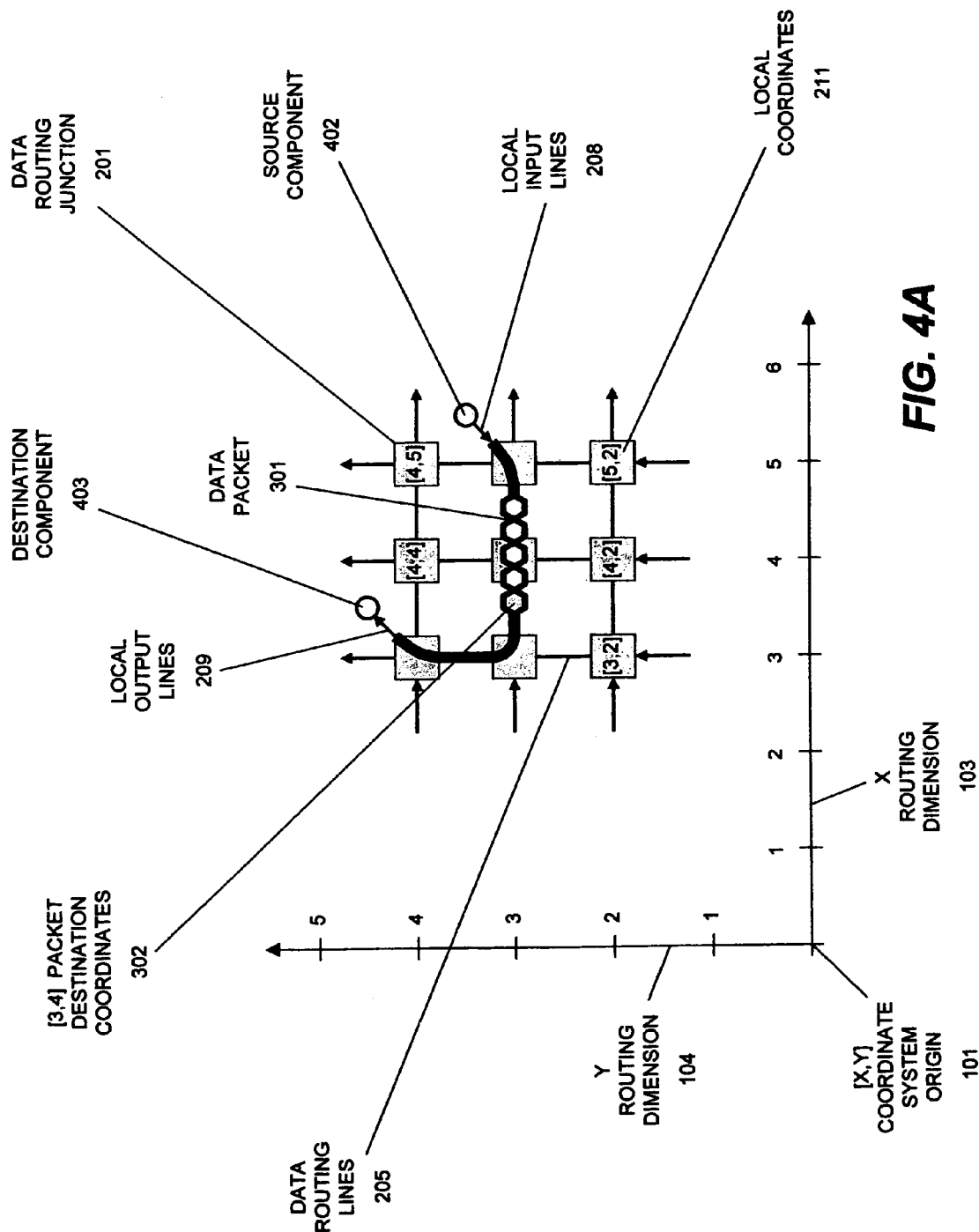
FIG. 4A shows a 2-dimensional data routing fabric transporting a data packet between two system components.
Figure 4B:
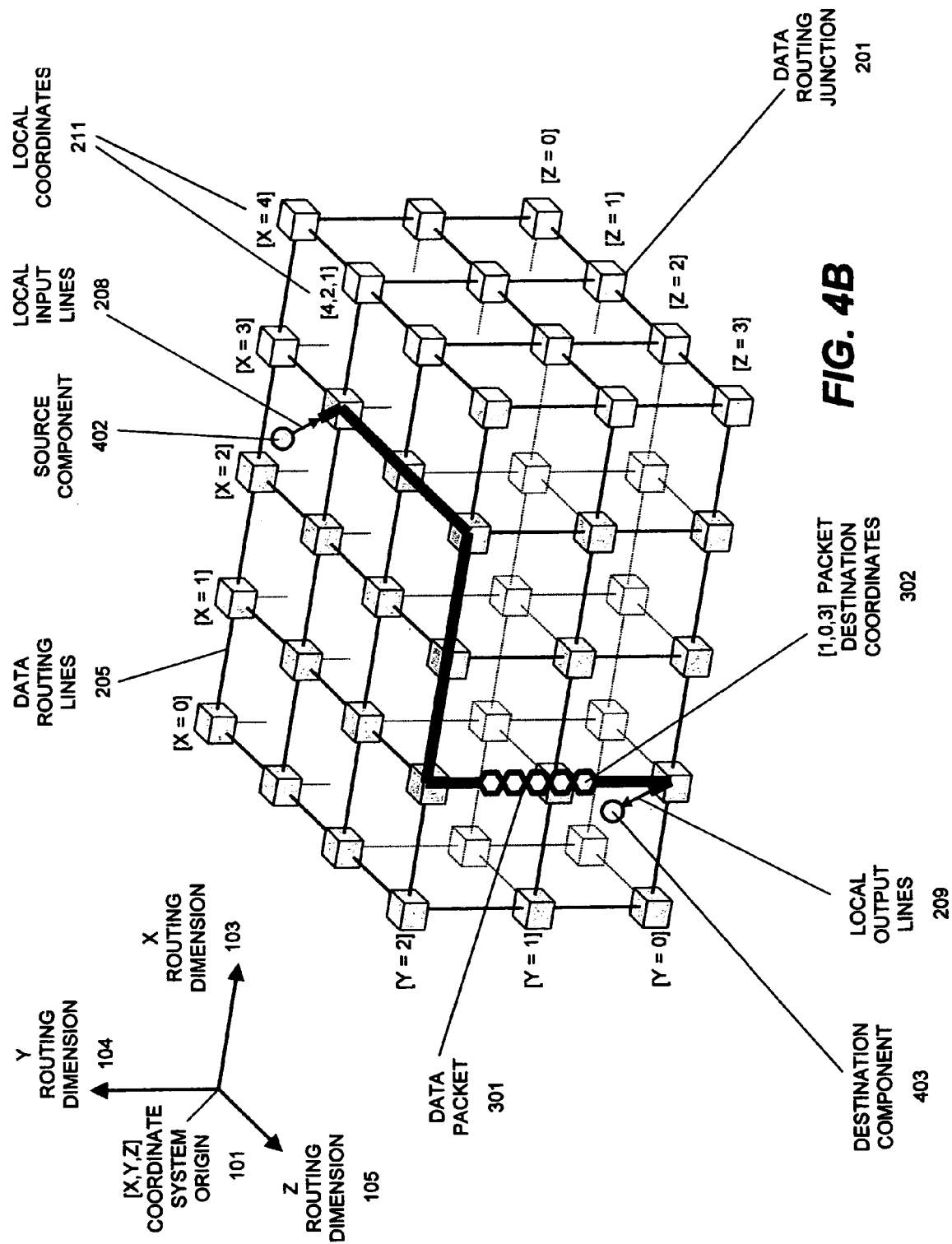
FIG. 4B shows a 3-dimensional data routing fabric transporting a data packet between two system components.
Figure 4D:
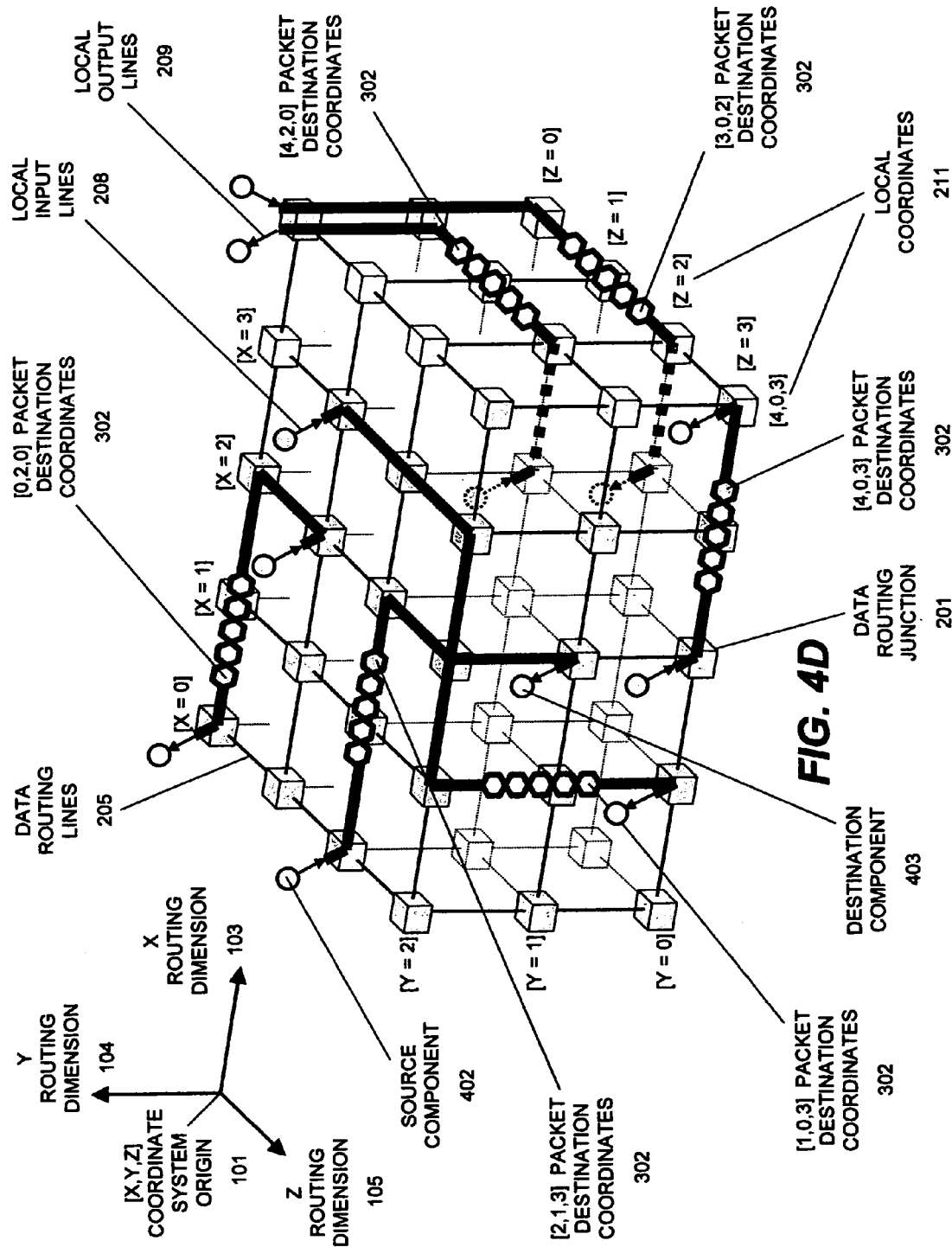
FIG. 4D shows a 3-dimensional data routing fabric simultaneously transporting six data packets between six component pairs.

A preferred system-level embodiment of the multi-dimensional data routing fabric is illustrated in FIG. 1J and FIG. 4D. An array of data routing junctions 201 is distributed along the routing dimensions of a multi-dimensional coordinate system 101. FIG. 1D shows a 3-dimensional distribution of 60 data routing junctions 201 along the X routing dimension 103, the Y routing dimension 104 and the Z routing dimension 105.

System components 401 can communicate with each other through sets of routing input lines 206 and routing output lines 207 located at the edge of the routing junction 201 array (FIG. 1J), or through sets of local input lines 208 and local output lines 209 connected to the data routing junctions 201 at the edge or inside the array (FIG. 4D).

As shown in FIG. 1D, each data routing junction 201 has a unique set of local coordinates 211 defining its location relative to coordinate system origin 101. A data routing junction 201 in a 3-dimensional coordinate system has local coordinates 211 composed of 3 numerals—one in each of the X, Y and Z routing dimensions used 103, 104 and 105.

The data routing junctions 201 are interconnected with sets of point-to-point data routing lines 205 for transporting data in the routing directions 102 (FIG. 1B) of the routing dimensions. FIG. 1B shows that each routing dimension in a multi-dimensional coordinate system 101 has two mutually opposite routing directions 102, the positive direction (aligned with the respective dimension) and the negative direction. The sets of data routing lines 205 in FIG. 1D connect the adjacent data routing junctions 201 in both directions of the X routing dimension 103, the Y routing dimension 104 and the Z routing dimension 105. Data routing lines 205 entering and exiting individual data routing junctions 201 are respectively referred to as routing input lines 206 and routing output lines 207.

Sets of data routing lines 205 (FIG. 5C) transport data packets 301 between adjacent data routing junctions 201. FIG. 1E shows a timing waveform of a single data packet 301 traveling across a set of data routing lines 205 between a source data routing junction 201 and a destination data routing junction 201. The data packet 301 comprises a packet destination coordinates field 302 used by the routing logic inside the data routing junctions 201 to steer the data packet 301 to its destination. In this embodiment, the data packets 301 also contain multiple packet payload fields 304 for transporting the payload portion of the data packet 301.

Some data routing lines 205 (FIG. 1E) are driven by the source data routing junctions 201, and some are driven by the destination data routing junctions 201. The data routing lines 205 driven by source data routing junctions 201 include the packet boundary signal 305 to identify the beginning and end of each data packet 301, packet body signals 306 for carrying the content of the packet segments, and transport clock 307 for delineating individual fields of each data packet 301. The packet data routing lines 205 driven by the destination data routing junctions 201 include the transfer halt signal 308 for slowing down the data packets 301 when the destination data routing junction 201 is not yet ready to receive them.

Figure 5A:
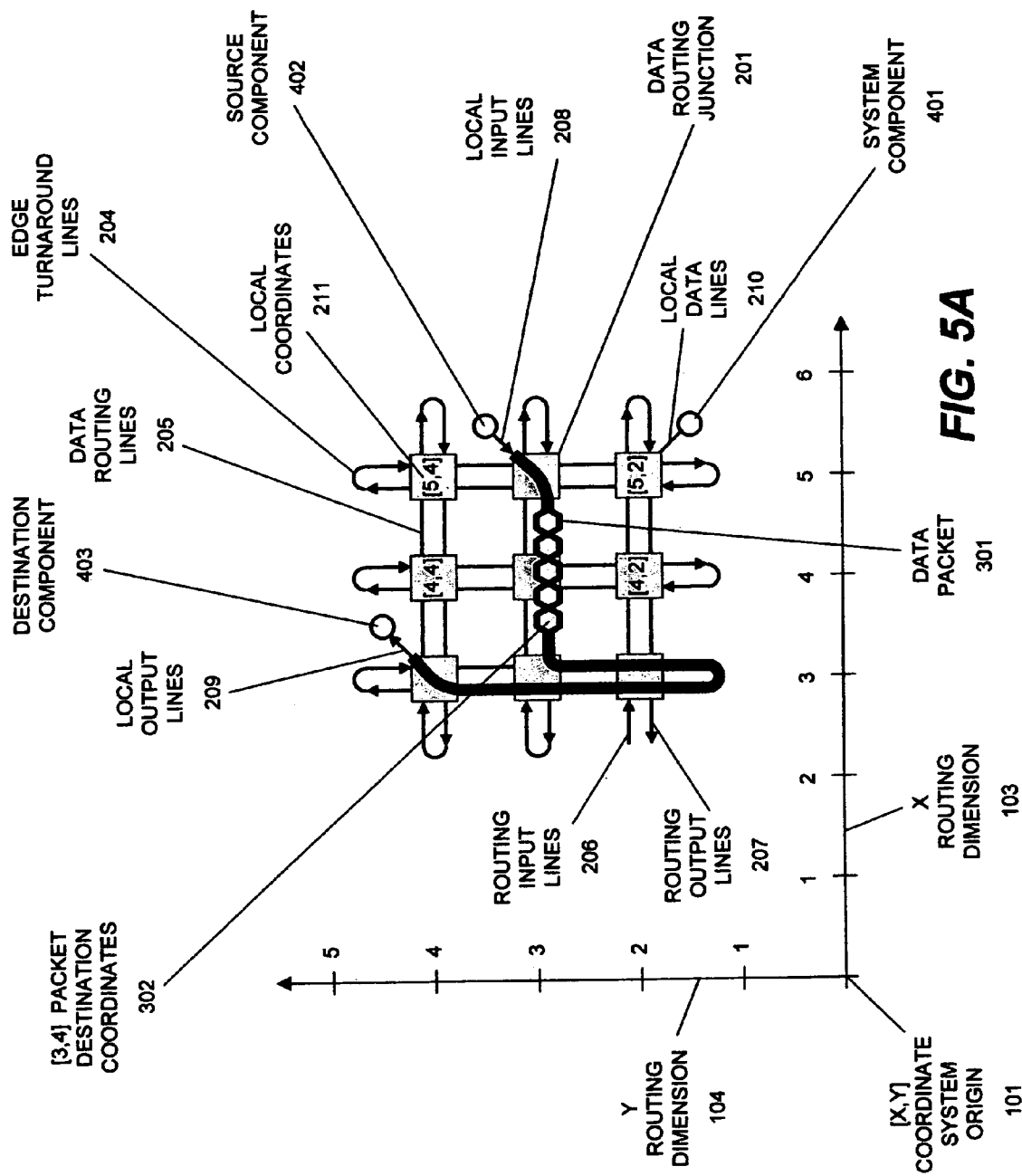
FIG. 5A shows a stray data packet being reflected back into a 2-dimensional data routing fabric by a set of edge turnaround lines.
Figure 5B:
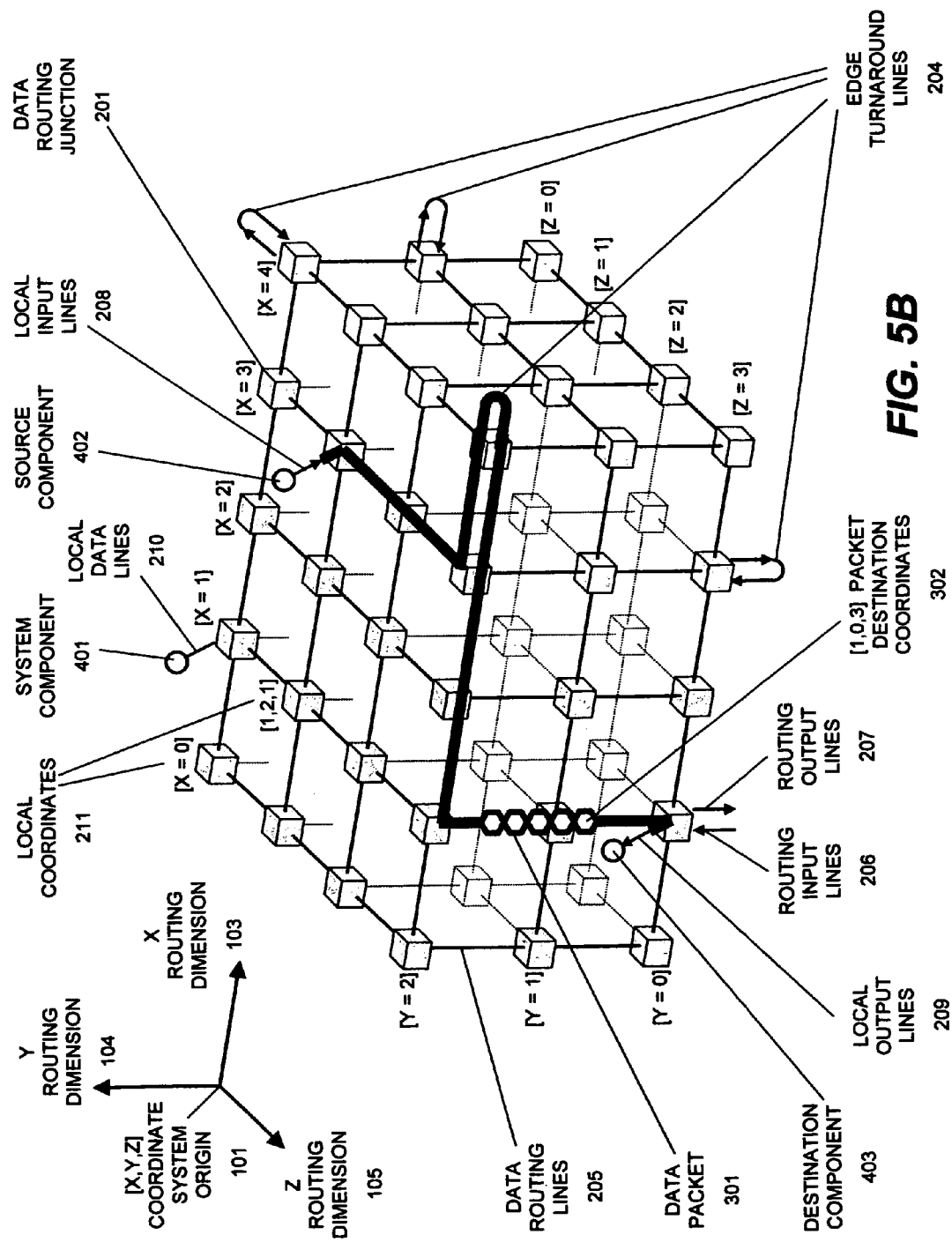
FIG. 5B shows a stray data packet being reflected back into a 3-dimensional data routing fabric by a set of edge turnaround lines.
Figure 5C:
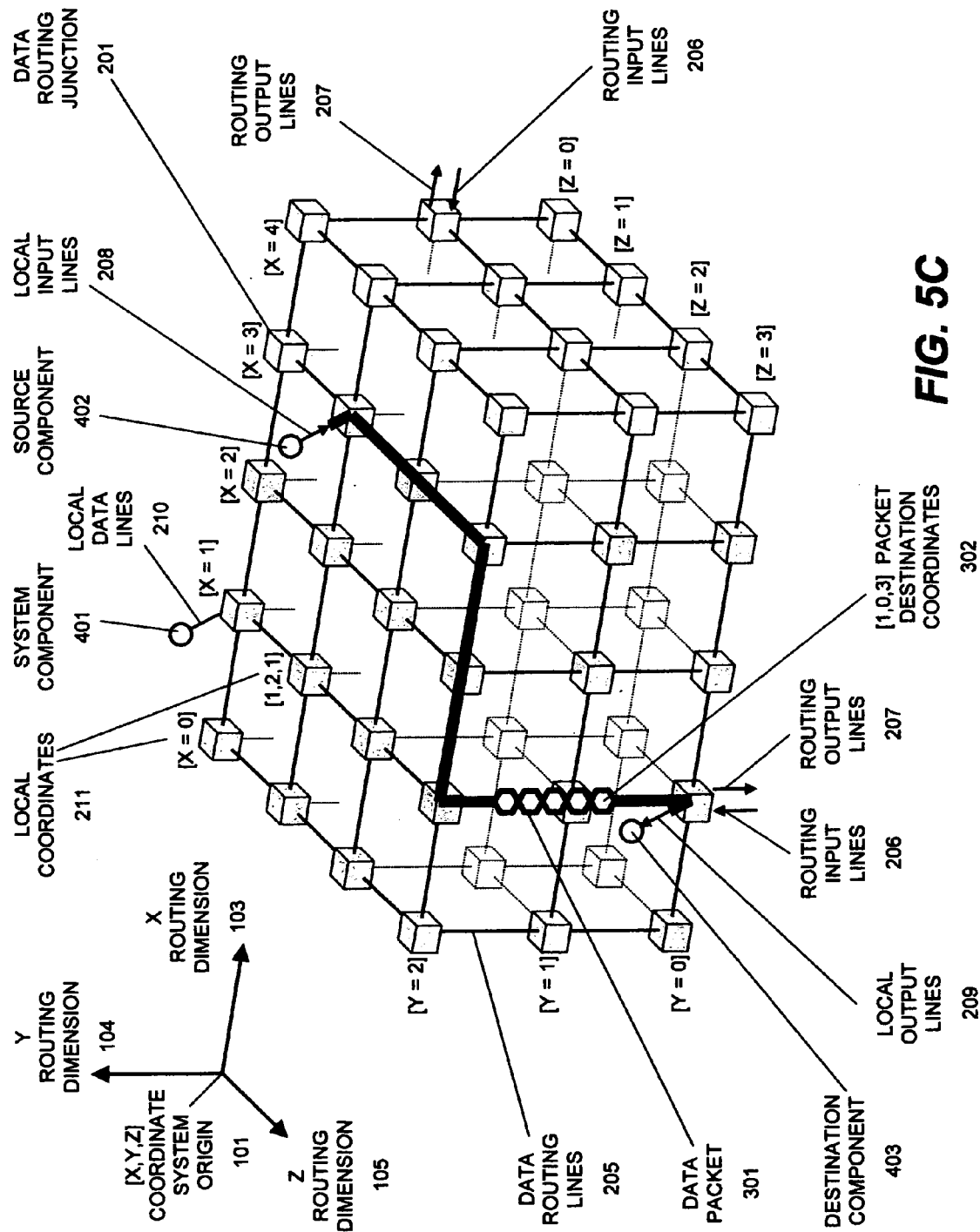
FIG. 5C shows a data packet being routed through a 3-dimensional data routing fabric between a source component and a destination component.

Individual data routing junctions 201 can be connected to system components 401 (FIG. 5C) with sets of local data lines 210 comprising local input lines 208 and local output lines 209. Source components 402 use sets of local input lines 208 to launch data transfers through the respective data routing junctions 201. Destination components 403 use sets of local output lines 209 to terminate data transfers at their respective data routing junctions 201. FIG. 5C shows a source component 402 launching a data packet 301 through a data routing junction 201 with [X,Y,Z] local coordinates 211 of [3,2,1] to a destination component 403 at data routing junction 201 with local coordinates 211 of [1,0,3]. FIG. 4D shows multiple data packets 301 being simultaneously routed from their source components 402 to their respective destination components 403.

Figure 9:
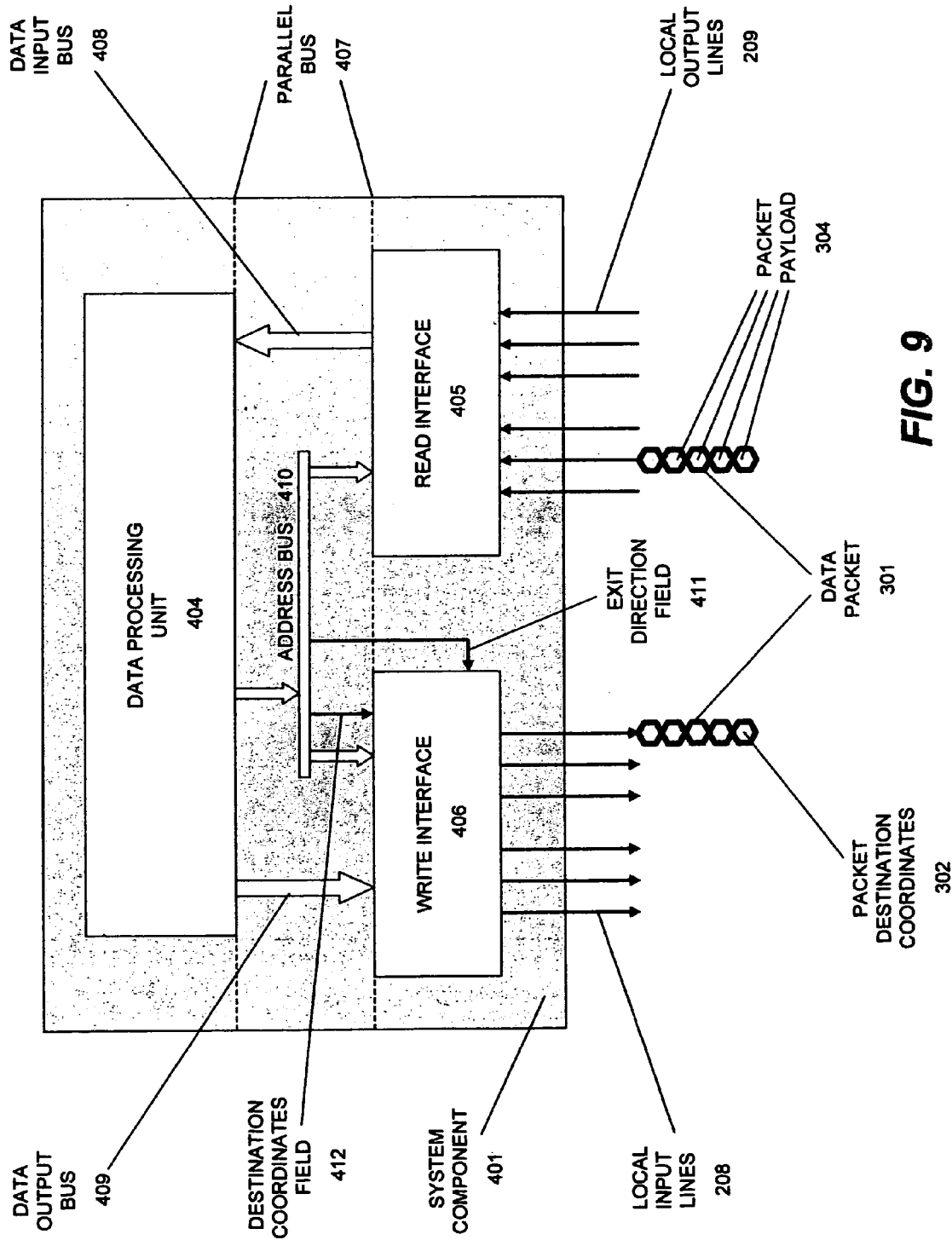
FIG. 9 shows a system component writing and reading data packets to and from a 3-dimensional data routing fabric.

All system components 401 in this embodiment can launch and receive data packets 301. As shown in FIG. 9 system components 401 of this embodiment comprise a data processing unit 404, a write interface 406 and a read interface 405. Each data processing unit 404 issues conventional write bus cycles to the write interface 406 to send data packets 301 to data processing units 404 of other system components 401. Each data processing unit 404 uses conventional read bus cycles to the read interface 405 to receive data packets 301 from data processing units 404 of other system components 401.

Figure 10A:
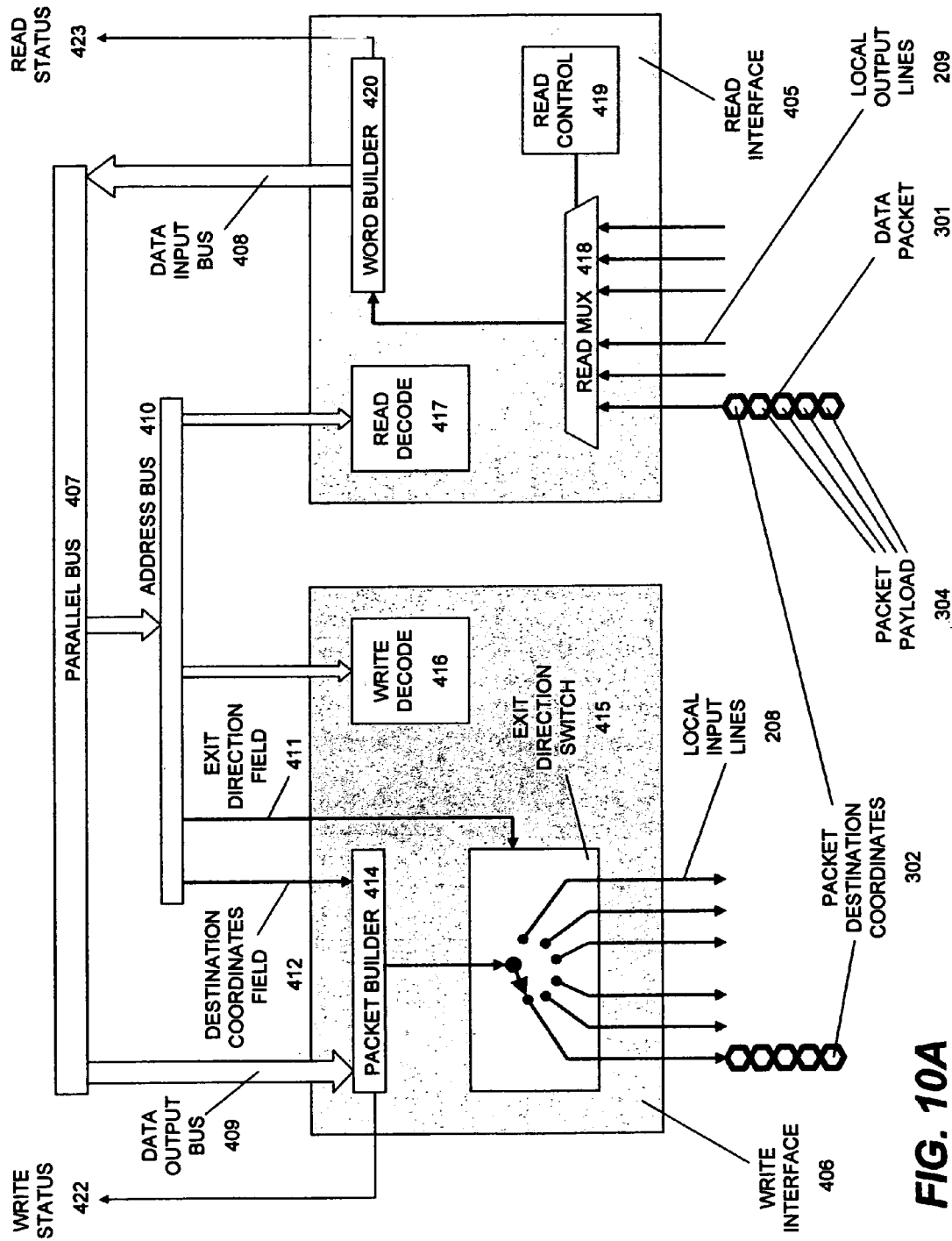
FIG. 10A shows the write interface circuit and the read interface circuit for writing and reading of short data packets.

FIG. 10A shows the parts of the write interface 406 and the read interface 405. The write interface 406 comprises the write decode circuit 416, the packet builder 414 and the exit direction switch 415. The write decode circuit 416 uses a portion of the address bus 410 to select the write interface 406 and de-select other peripherals on the bus. The packet builder 414 assembles data packets 301 from the destination coordinates field 412 of the address bus 410, and from the data content on the data output bus 409. The packet builder 414 uses the write status line 422 to inform the data processing unit 404 (FIG. 9) when it is ready for the next write cycle.

The exit direction field 411 (FIG. 10A) of the address bus 410 selects the set of local input lines 208 for the data packet 301 to enter the data routing junction 201 (FIG. 5C), thus establishing the initial direction of travel for the data packet 301. This 3-dimensional embodiment of the multi-dimensional data routing fabric uses 2 directions of 3 dimensions for the total of 6 possible routing directions 102 in which to launch the data packets 301.

As shown in FIG. 10A, the read interface 405 comprises the read decode circuit 417, the read mux 418, the read control circuit 419, and the word builder 420. Data packets 301 arrive at the read mux 418 through one of 6 sets of local output lines 209. The read control circuit 419 interleaves arriving data packets 301 to transfer them one at a time to the word builder 420. The word builder 420 assembles data words from packet payloads 304 and asserts the read status signal 423 to prompt the data processing unit 404 to read the data words through the data input bus 408. The packet destination coordinates 302 are discarded, as they are no longer needed.

Figure 15A:
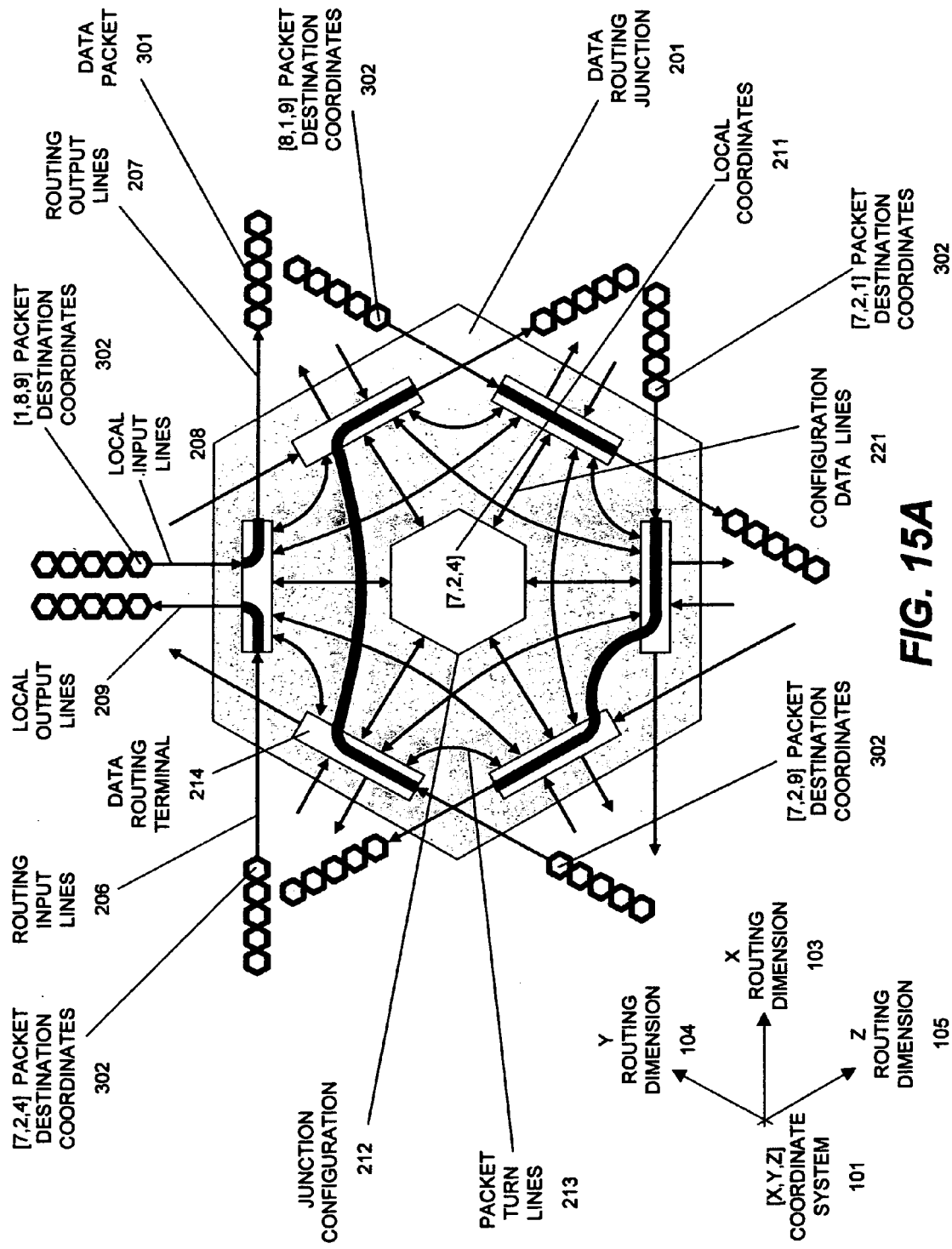
FIG. 15A shows a 3-dimensional data routing junction simultaneously routing five data packets.

FIG. 15A shows the parts of the data routing junction 201 used in this 3-dimensional embodiment of the multi-dimensional data routing fabric. Each data routing junction 201 has a junction configuration 212 circuit and multiple data routing terminals 214. Each data routing terminal 214 is aligned with one routing direction 102 (FIG. 1B) of one routing dimension (103, 104 or 105), thus this 3-dimensional embodiment with 2 routing directions 102 in each routing dimension uses the total of 6 data routing terminals 214.

For each routing direction 102, data packets 301 enter the data routing junction through a set of routing input lines 206, and leave the junction through a set of routing output lines 207 (FIG. 15A). The data routing terminals 214 are connected to the junction configuration 212 circuit with sets of configuration data lines 221 for storing and reading of junction configuration 212 data including local coordinates 211.

Based on the comparison of packet destination coordinates 302 with the local coordinates 211 (FIG. 15A), packets 301 can pass straight through a terminal 214 or be routed through a set of internal packet turn lines 213 to a terminal aligned with another routing direction 102.

For those data routing junctions 201 that are connected to system components 401, data packets 301 that have reached their destination can exit the routing junction (and thus the fabric) through a set of local output lines 209 (FIG. 15A) of the respective routing direction 102. Finally, new packets can be launched into any routing direction 102 of the routing fabric through the respective set of local input lines 208.

Figure 20:
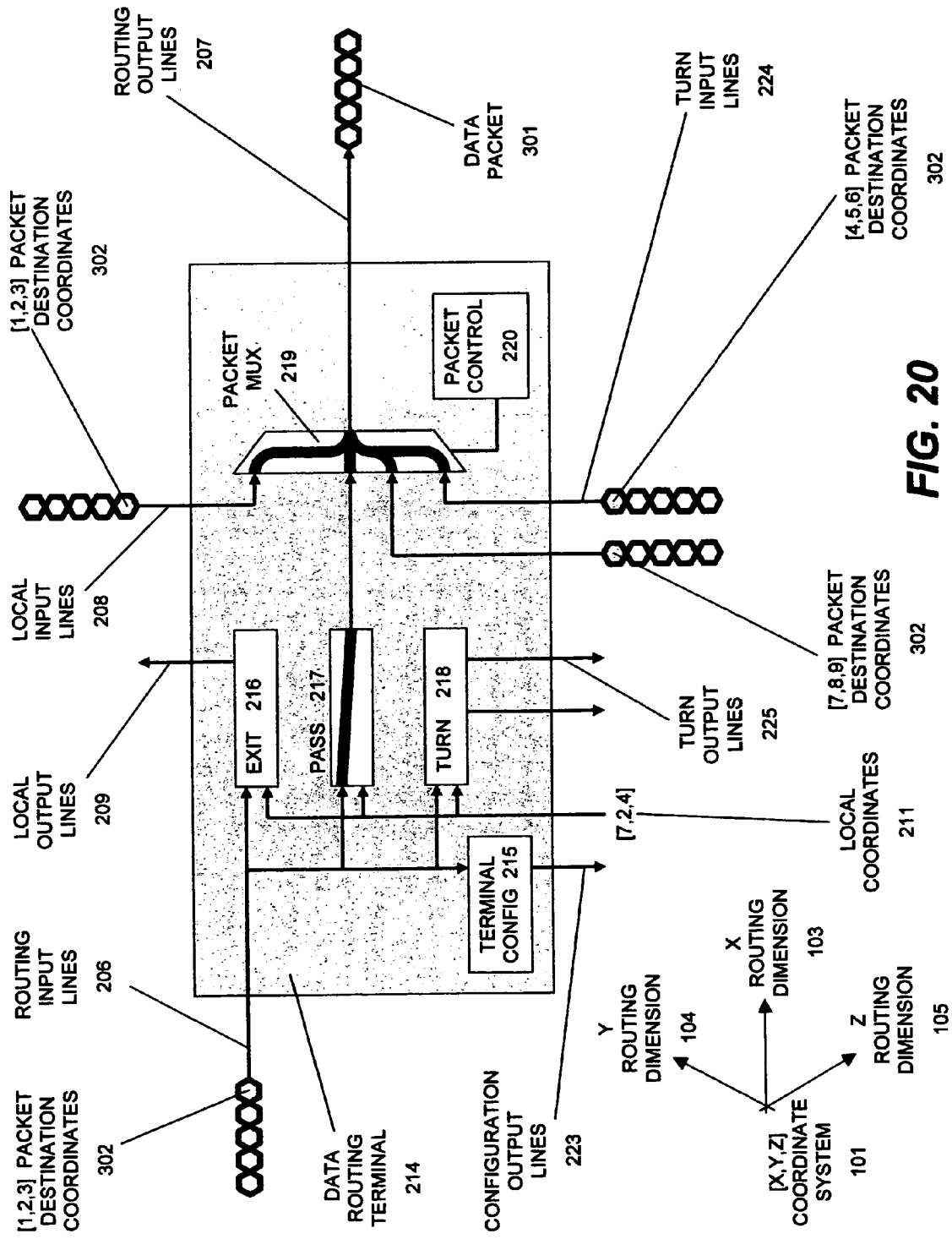
FIG. 20 shows a 3-dimensional data routing terminal routing four data packets through a common set of routing output lines.

FIG. 20 shows the parts of the data routing terminal 214. Each data routing terminal 214 routes data packets 301 in one routing direction 102 (FIG. 1B) of one routing dimension (103, 104 or 105). The data routing terminals 214 include the terminal turns the path of packets through a set of turn output lines 225 to another routing direction 102.

The packet mux 219 interleaves new local packets supplied through the local input lines 208 with the local pass-through packets and the turn packets from turn input lines 224 (from other data routing terminals 214). The resulting packet stream exits the data routing terminal 214 through the routing output lines 207. The packet control 220 circuit determines the order in which data packets 301 are supplied to the routing output lines 207.

Operation of Preferred Embodiment

FIG. 5C shows a 3-dimensional embodiment of the multi-dimensional data routing fabric transporting a single data packet 301 between two system components 401. In this 3-dimensional embodiment the data routing fabric is composed of a 3-dimensional array of data routing junctions 201 and a mesh of point-to-point sets of data routing lines 205 connecting the faces of adjacent data routing junctions in the X, Y and Z routing dimensions 103, 104 and 105. The source component 402 launches the data packet 301 through a set of local input lines 208 connected to its local data routing junction. The destination component 403 receives the data packet 301 through a set of local output lines 209 connected to its local data routing junction.

As shown in FIG. 5C, a data packet 301 launched through the routing junction of the source component 402 travels through a chain of adjacent intermediate routing junctions 201 before converging on the routing junction of the destination component 403. Each intermediate routing junction compares its local coordinates 211 to the packet's destination coordinates 302 to route the data packet 301 in the appropriate routing dimension, one step closer to the destination component 403. The routing choices available to each intermediate routing junction include routing the packet in a straight line along its current routing direction 102 (FIG. 1B), or turning the packet's path to a routing direction 102 of a different routing dimension 103, 104 or 105.

The sizes of junction local coordinates 211 fields (FIG. 5C) and packet destination coordinates 302 fields determine the maximum number of system components 401 that can be simultaneously interconnected. For example, a 12-bit local coordinates 211 inside data routing junctions 201 and 12-bit destination coordinates fields 302 inside data packets 301 enable up to 4069 components to be interconnected with the multi-dimensional data routing fabric. For this preferred 3-dimensional embodiment, the 12 coordinate bits could be equally divided between X, Y and Z routing dimensions 103, 104, 105 to support a cube-like computing structure with a 4-bit resolution per routing dimension. The resulting cube would have 16 components on each side for the total of 4096 components.

Looking at the packet routing protocol of this embodiment, a data packet 301 (FIG. 5C) is routed straight through an intermediate data routing junction 201 if the local coordinate 211 along the current routing dimension does not match the respective packet destination coordinate 302. If there is a coordinate match in the current routing direction 102, the packet exits the data routing junction through the local output lines 209, provided that all other coordinates also match. Otherwise, the packet's path is turned in a direction of one of the remaining non-matching routing dimensions 103, 104 or 105.

The multi-dimensional routing fabric supports multiple simultaneous data transfers. FIG. 4D shows six data packets 301 being simultaneously routed between six source components 402 and six destination components 403.

The data packets 301 that enter and exit through locations on the edge of the multi-dimensional fabric can access the fabric directly through the edge sets of data routing lines 205 (FIG. 5C). The data routing lines 205 are a part of the fabric routing highway and using them to enter and exit packets relieves the data routing junctions from having to support additional entry and exit ramps in the form of local input lines 208 and local output lines 209. Any components located inside the fabric structure that cannot directly access the data routing lines can use the local input lines 208 and the local output lines 209 to launch or receive data packets 301.

FIG. 1H shows a data packet 301 entering the 3-dimensional data routing fabric through a set of routing input lines 206 in the X routing dimension 103 to exit through a set of routing output lines 207 in the Z routing dimension 105. The data packet 301 is routed from the entry data routing junction with [X,Y,Z] local coordinates 211 of [0,1,3], through the 3-dimensional data routing fabric to the exit data routing junction [3,2,0]. The [X,Y,Z] packet destination coordinates 302 of [3,2,-1] were chosen to point to a non-existing location beyond the point of exit on the desired set of routing output lines 207.

The multi-dimensional data routing fabric can simultaneously route multiple edge transfers without using any local input lines 208 or local output lines 209. FIG. 1J shows four data packets 301 being simultaneously routed between pairs of routing input lines 206 and routing output lines 207 located at the edge faces of the 3-dimensional data routing fabric.

Figure 2B:
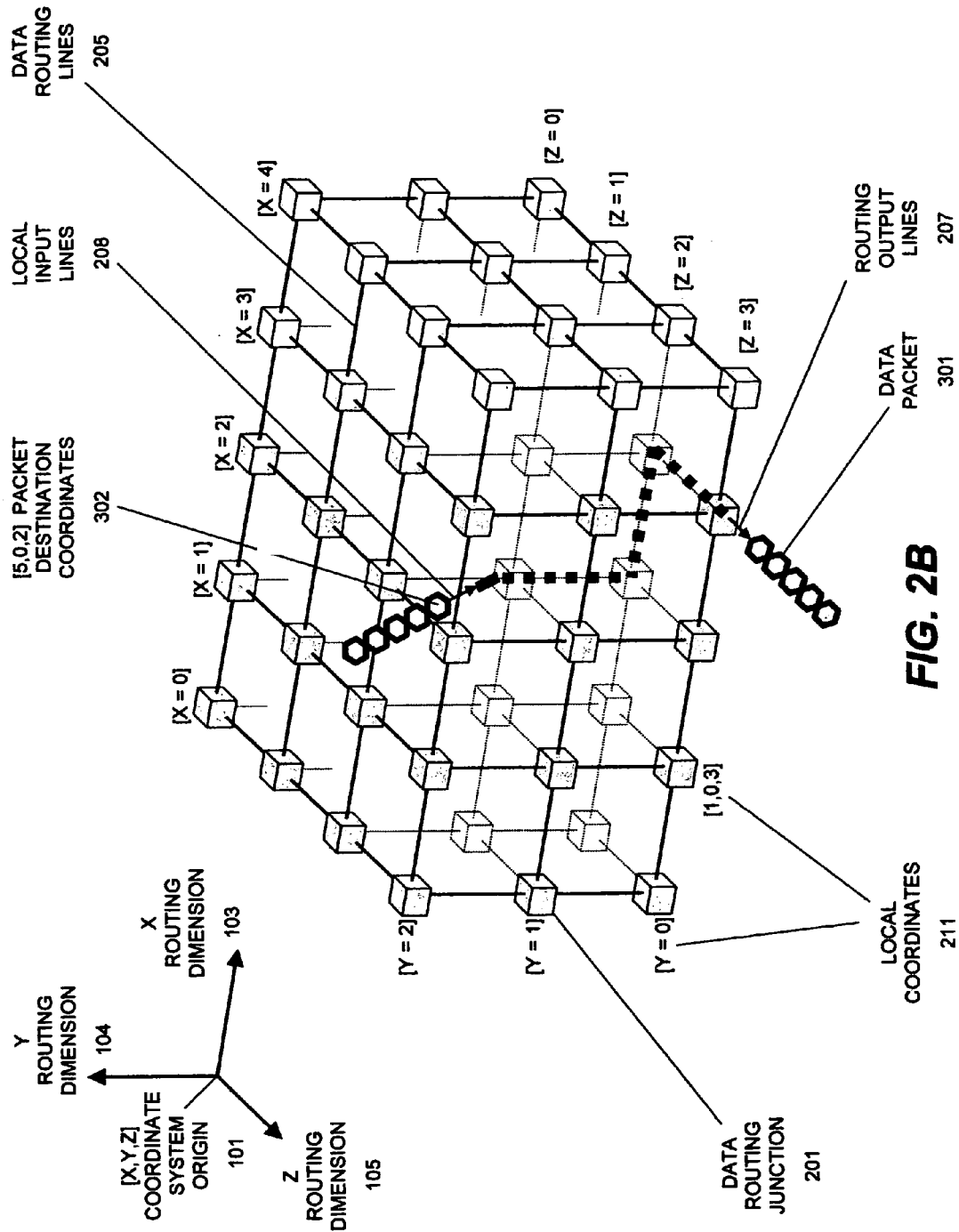
FIG. 2B shows a data packet entering a 3-dimensional data routing fabric through an internal location.
Figure 3A:
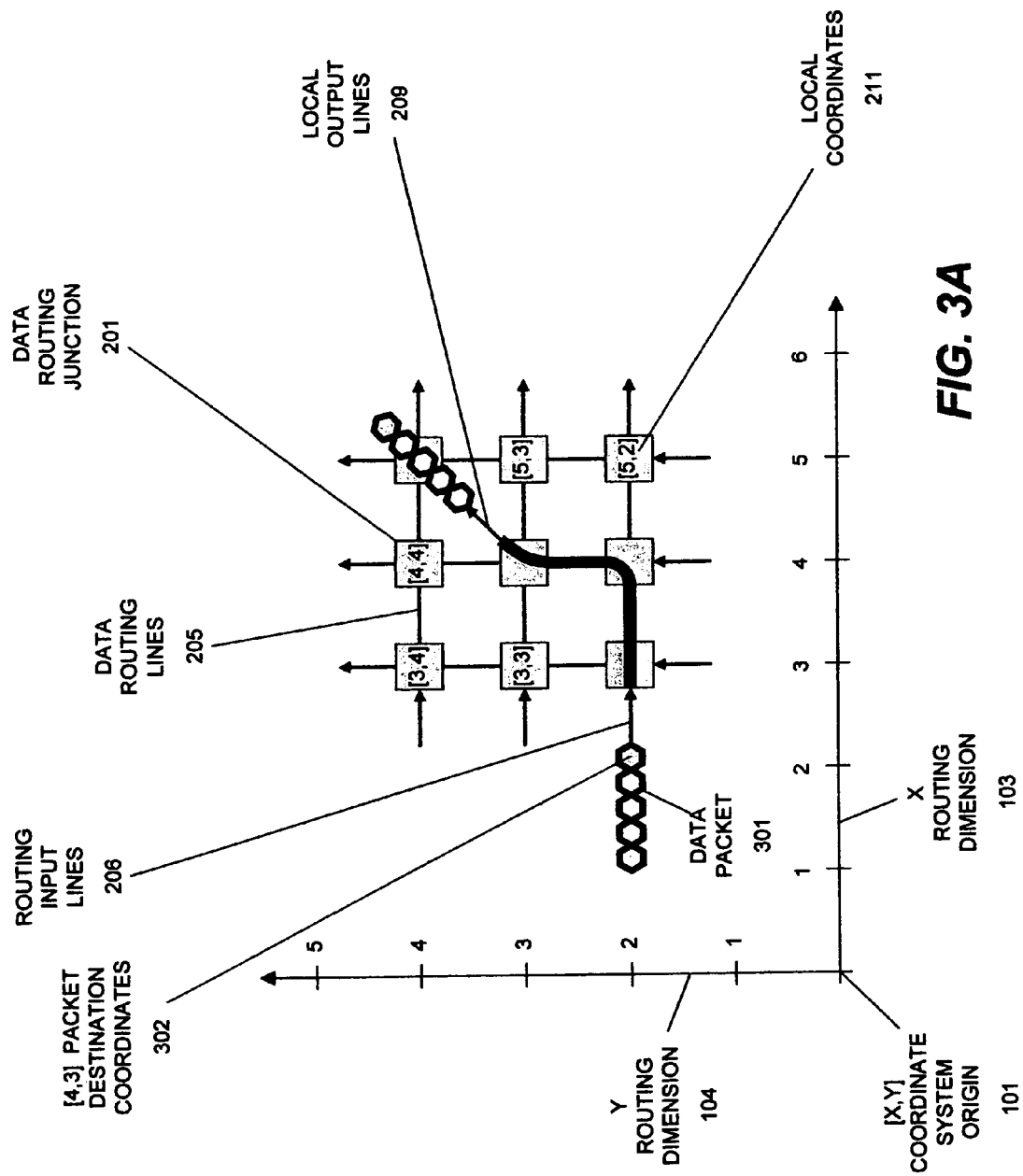
FIG. 3A shows a data packet exiting from an internal location of a 2-dimensional data routing fabric.

A method by which data packets 301 enter the multi-dimensional data routing fabric does not have to be the same as the method by which packets leave the fabric. FIG. 2B shows a data packet 301 entering the 3-dimensional data routing fabric through a set of local input lines 208 and exiting the fabric through a set of routing output lines 207. FIG. 3B shows a data packet 301 entering the 3-dimensional data routing fabric of this embodiment through a set of routing input lines 206 and exiting the fabric through a set of local output lines 209.

Even if both the source and the destination of a data transfer are located at the edge of the multi-dimensional data routing fabric, they can still use local input lines 208 and local output lines 209 to launch and receive data packets 301 (FIG. 4B).

The data packets 301 are routed through the data routing fabric based on the comparison of the packet destination coordinates 302 with the local coordinates 211 of the data routing junctions that the packets are passing through. Each of the data routing junctions has a unique set of local coordinates 211 identifying its location relative to the origin 101 of the routing dimensions 103, 104, 105 in which the packets are routed. Following system reset condition, the local coordinates 211 and data routing properties for each junction may be configured with a two-pass initialization process, forward and reverse, driven from one of the system components 401 referred to as the initialization host 400 (FIGS. 6C–D).

Figure 6A:
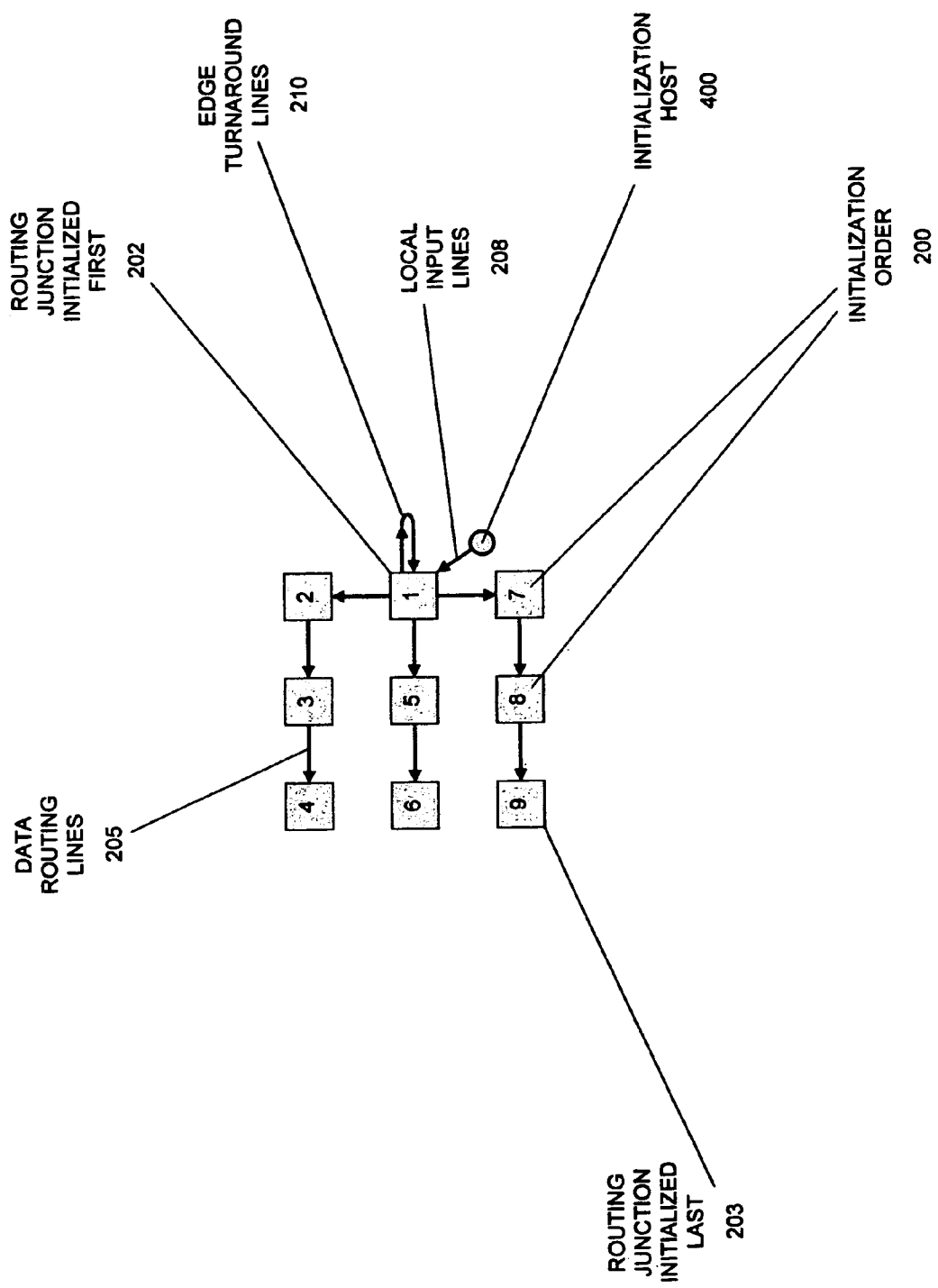
FIG. 6A shows the forward initialization pass for a 2-dimensional data routing fabric.
Figure 6B:
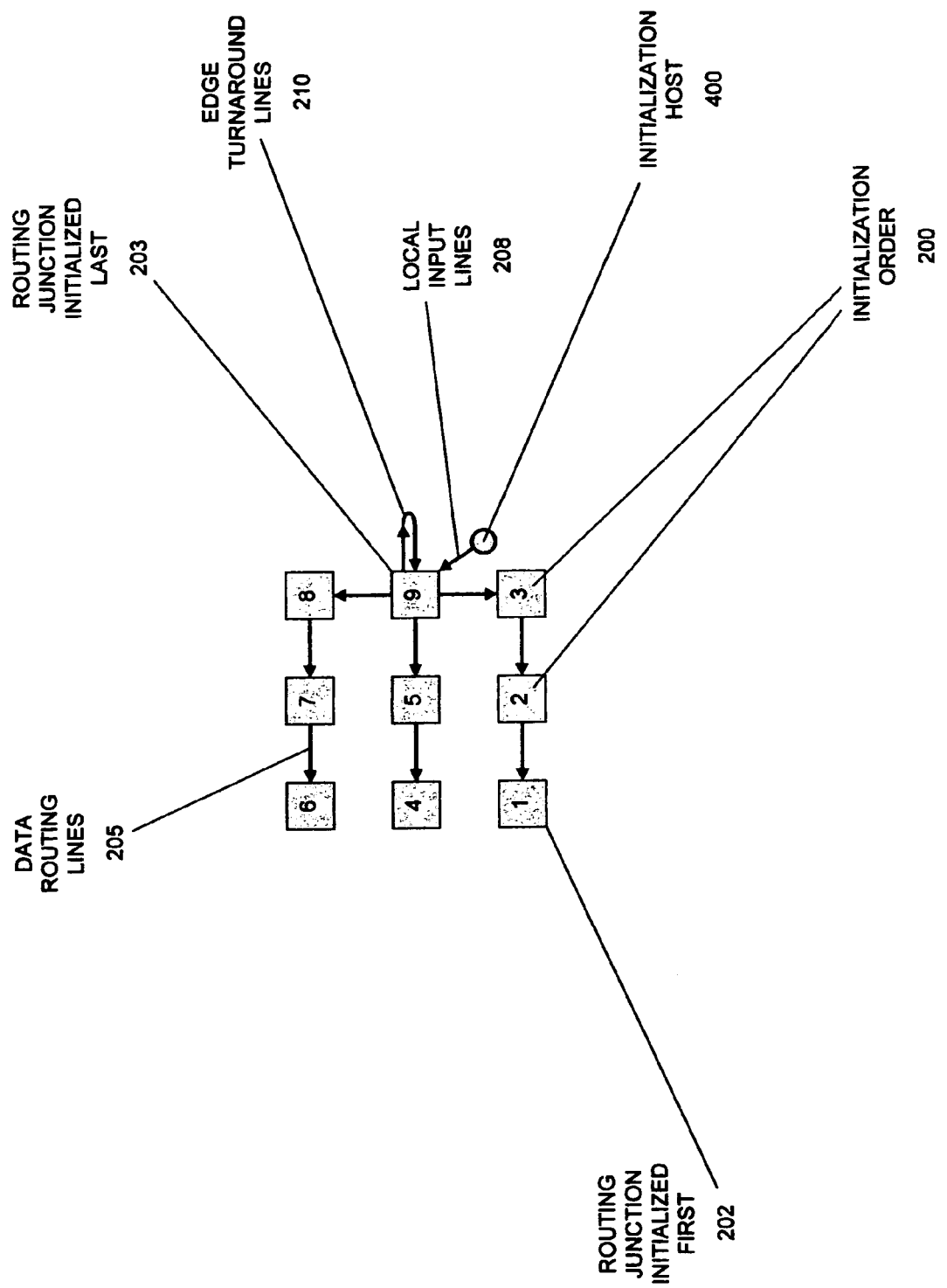
FIG. 6B shows the reverse initialization pass for a 2-dimensional data routing fabric.
Figure 6C:
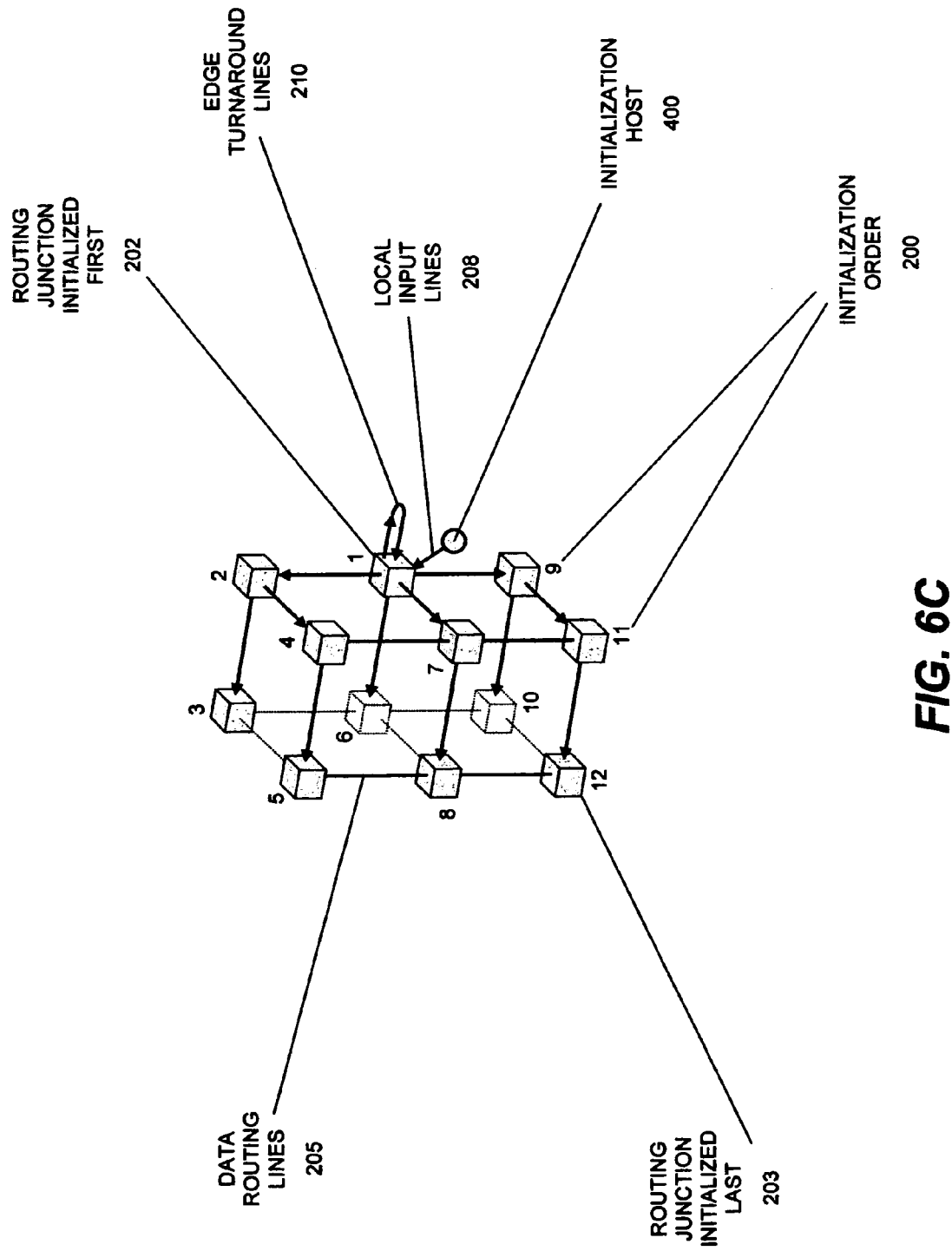
FIG. 6C shows the forward initialization pass for a 3-dimensional data routing fabric.

FIG. 6C shows the forward system initialization pass in which the initialization host component 400 configures the local coordinates 211 for each data routing junction in the system. The forward pass is needed as the otherwise identical local junctions have unique local coordinates 211. The initialization host 400 uses a set of local input lines 208 to launch initialization packets 309 into the fabric through its local routing junction. The data routing junctions of the fabric interpret the first predetermined set of data packets 301 arriving after reset as local coordinates 211.

Accordingly, the junctions have to be initialized starting from the locations closest to the initialization host 400 and then using the configured junctions as stepping stones to initialize the junctions located further out from the initialization host 400. The local coordinates 211 of the initialization host 400 junction 202 are initialized first through a set of edge turnaround lines 204. FIG. 6C shows the initialization order 200 for the remaining junctions of the forward pass with a sequence of initialization order 200 numerals. The forward initialization pass completes with the initialization of the last data routing junction 203.

Figure 6D:
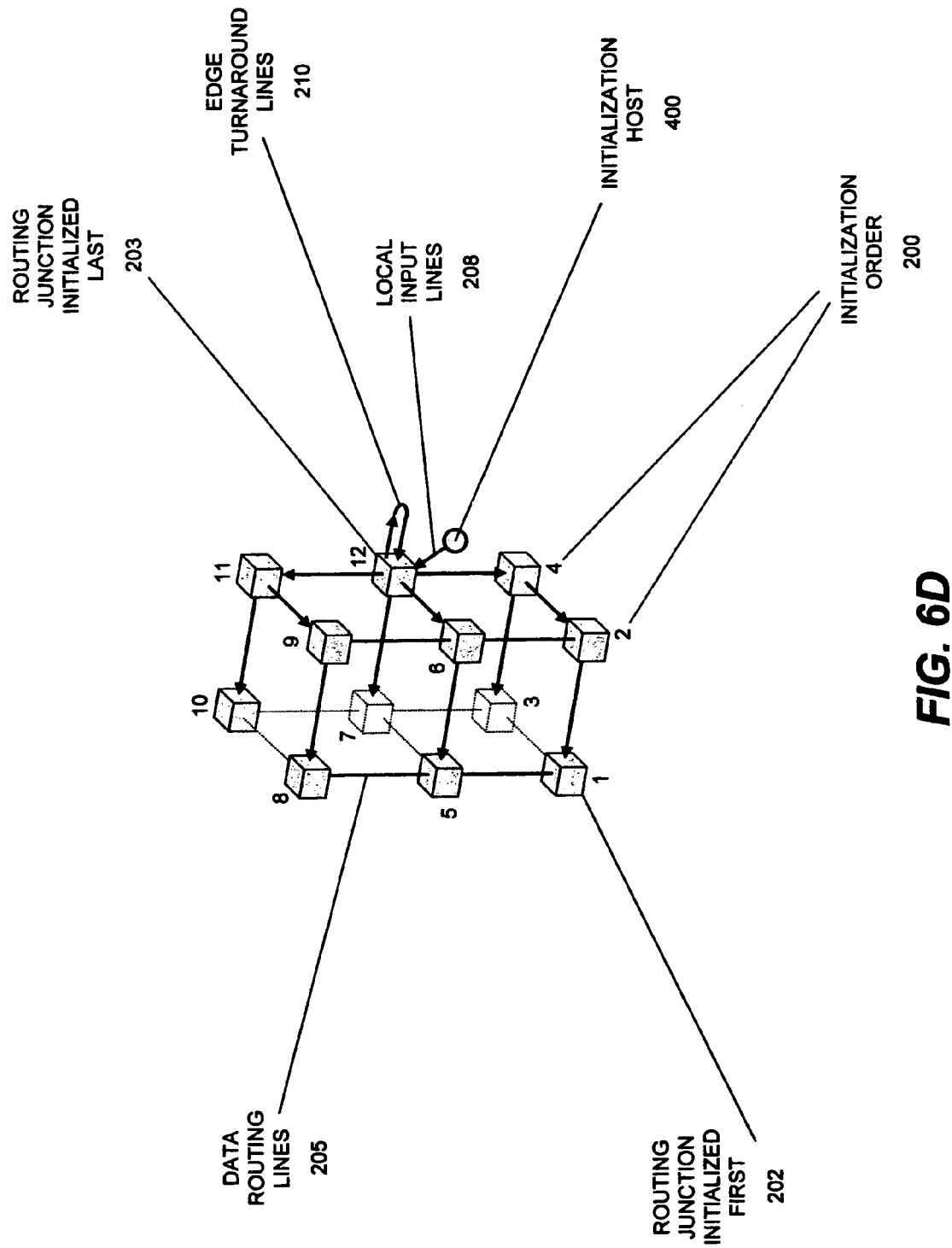
FIG. 6D shows the reverse initialization pass for a 3-dimensional data routing fabric.

FIG. 6D shows the reverse system initialization pass in which the initialization host 400 may configure the properties of data routing lines 205 such as data width and transfer frequency. The reverse initialization pass is not needed if all data routing lines 205 have the same properties, otherwise the reverse initialization pass may be necessary. The initialization host 400 uses a set of local input lines 208 to launch initialization packets 309 into the fabric. The data routing junctions interpret the second predetermined set of data packets 301 arriving after reset as data routing properties.

Because data routing properties affect the data routing lines 205 (FIG. 5C), the reverse initialization pass first initializes the junction 202 furthest out from the host to avoid using data routing lines 205 that have been configured on one end, but are not yet configured on the other. FIG. 6D shows the initialization order 200 for the remaining junctions of the reverse pass with a sequence of initialization order 200 numerals 200. The data routing properties of the host junction are initialized last through a set of its edge turnaround lines 204. The reverse initialization pass completes with the initialization of this lastly initialized data routing junction 203.

While run-time initialization of data routing junctions 201 provides maximum configuration flexibility, in applications where such flexibility is not important, the local coordinates 211 of data routing junctions 201 and other parameters can be easily pre-defined with constants, VHDL generics or other compile-time initialization methods.

Following initialization of its data routing junctions 201, the multi-dimensional data routing fabric is ready to transport data packets 301 between system components 401 (FIG. 5C). In cases where system components 401 use local data lines 210 to access the multi-dimensional data routing fabric, source components 402 use local input lines 208 to launch packets into the fabric, and destination components 403 use local output lines 209 to receive packets from the fabric. In addition, system components 401 located at the edge of the fabric can also use data routing lines 205 to launch and receive packets, provided that those edge routing data lines are not terminated with the edge turnaround lines 204.

The system components 401 of this embodiment may include data processing units 404, data storage units, data I/O unit and other units that operate on data. While the examples below describe the operation of system components 401 with data processing units 404, the same methods can be used to enable other types of units to send and receive data though the multi-dimensional data routing fabric.

There are many ways in which the data processing units 404 inside the system components 401 can access the multi-dimensional data routing fabric. Data processing units 404 of this embodiment use parallel bus 407 cycles to launch and receive data packets 301.

Figure 7:
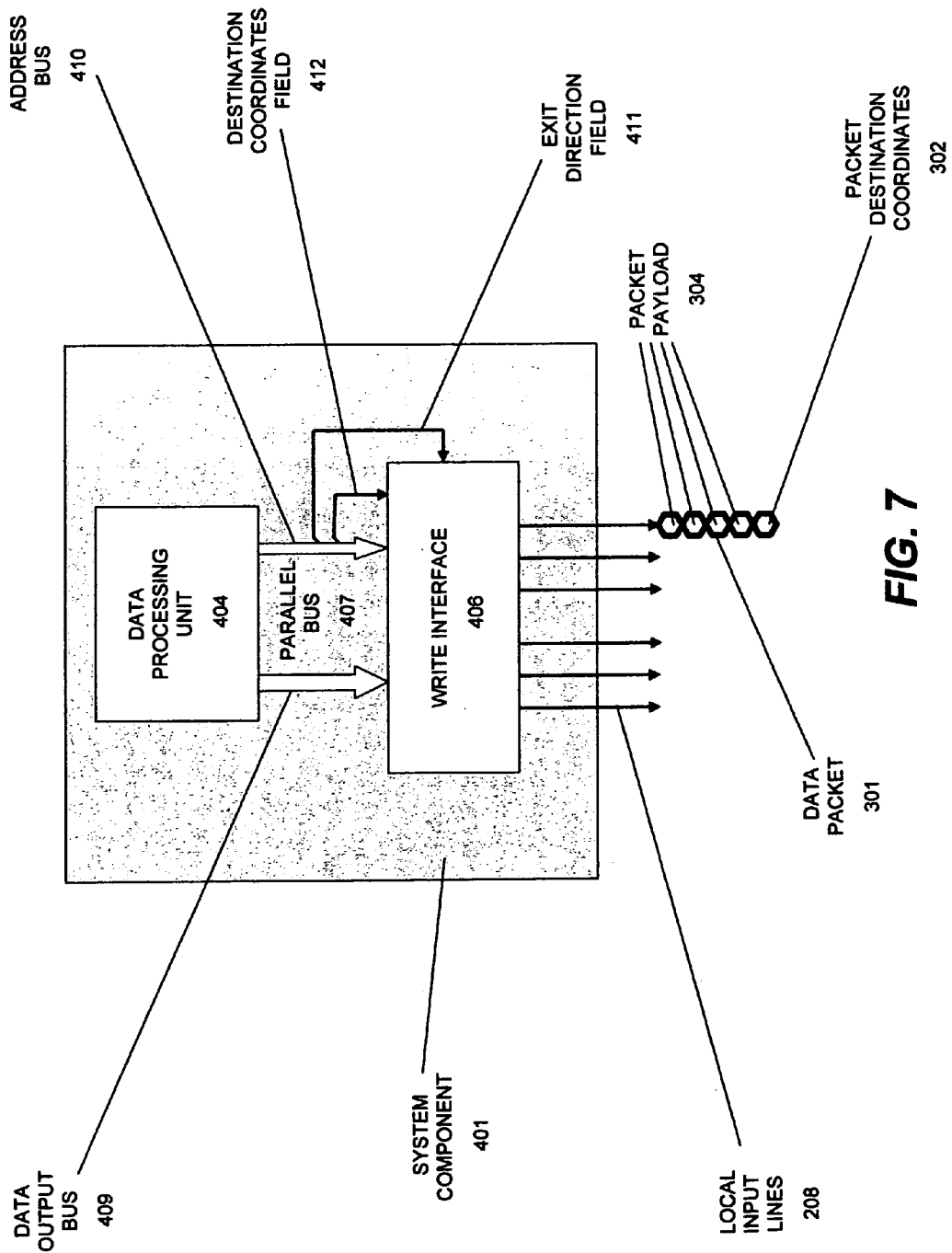
FIG. 7 shows a system component writing a data packet into a 3-dimensional data routing fabric.

FIG. 7 shows a system component 401 sending a data packet 301 to another component by launching it into the multi-dimensional data routing fabric through a set of local input lines 208. Inside the component, data packets 301 are launched by a data processing unit 404 issuing conventional write bus cycles to a write interface circuit 406. The write interface 406 converts the data output bus 409 portion of the write bus cycle to the packet payload 304. The destination coordinates field 412 of the address bus 410 becomes the packet destination coordinates 302. The exit direction field 411 of the address bus directs the outbound packets through one of several available sets of local input lines 208, each representing one routing direction 102 (FIG. 1B) of one routing dimension 103, 104 or 105. In this 3-dimensional embodiment of the multi-dimensional data routing fabric, system components 401 can thus launch packets in one of six routing directions 102.

Figure 8:
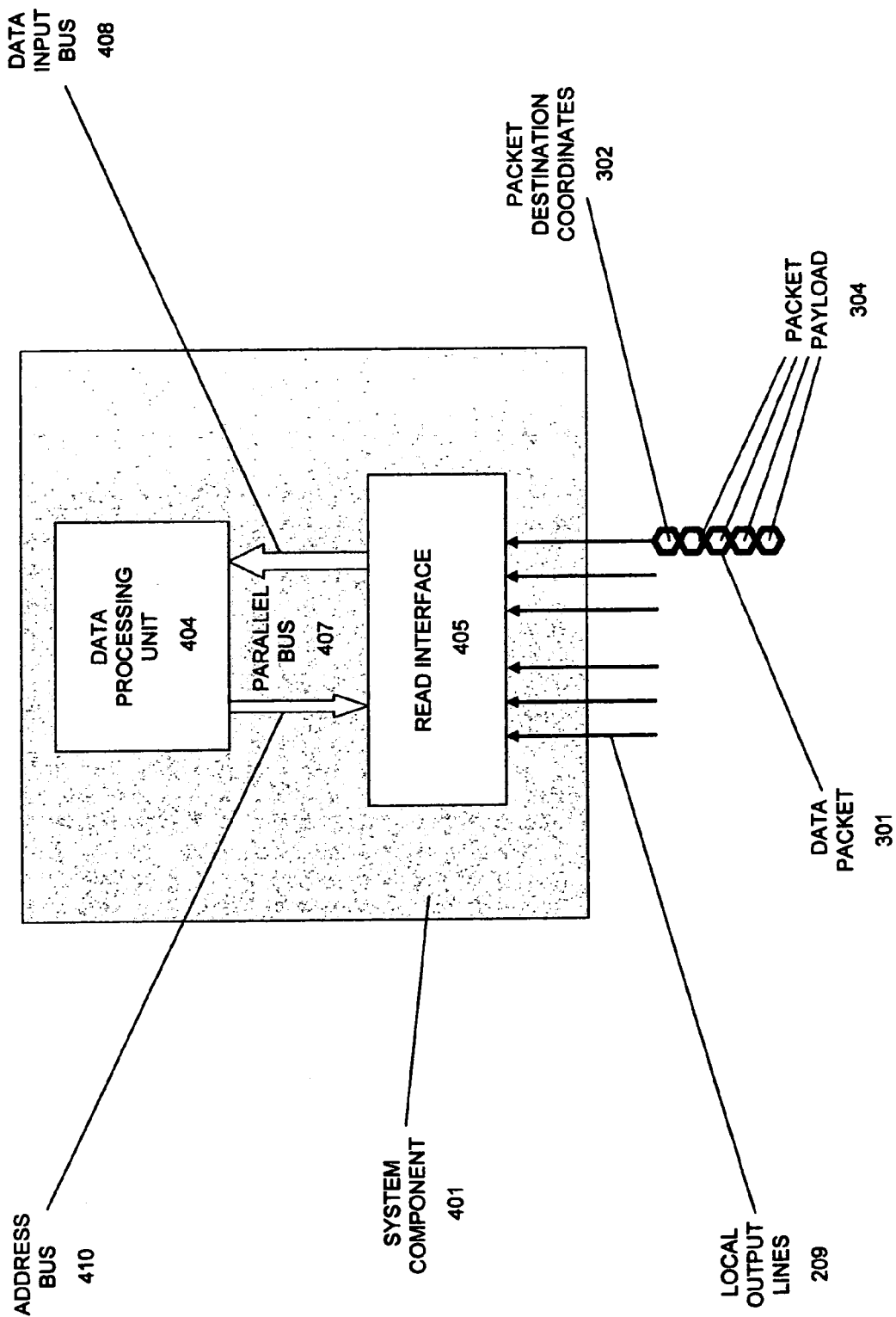
FIG. 8 shows a system component reading a data packet from a 3-dimensional data routing fabric.

FIG. 8 shows a system component 401 receiving a data packet 301 from another component of the fabric through a set of local output lines 209. Inside the component, data packets 301 are received by a data processing unit 404 issuing conventional read bus cycles to a read interface circuit 405. The read interface 405 receives packets from several sets of local output lines 209. There is one set of local output lines 209 for each of two routing directions 102 (FIG. 1B) of each routing dimension 103, 104 or 105 used. In this 3-dimensional embodiment of the multi-dimensional data routing fabric, system components 401 can thus receive packets from one of six routing directions 102. The read interface 405 circuit interleaves the arriving packets and places their payloads 304 on the data input bus 408 to be read by the data processing unit 404.

While some system components 401 may only be required to send or receive data, most system components 401 must be capable of both sending and receiving data. FIG. 9 shows a data processing unit 404 using parallel bus 407 cycles to launch data packets 301 through a write interface circuit 406 and to receive packets through a read interface circuit 405. FIG. 10A shows the parts of the write interface 406 and the read interface 405.

The packet builder circuit 414 (FIG. 10A) of the write interface 406 assembles outbound data packets 301 from the fields of the address bus 410 and the data output bus 409. Packet's destination coordinates 302 are formed from the destination coordinates field 412 of the address bus 410. The packet's payload 304 is formed from the fields inside the data output bus 409. The packet exit direction switch 415 uses the exit direction field 411 of the address bus 410 to launch the assembled packets through a set of local input lines 208 in the desired routing directions 102 (FIG. 1B) of specific X, Y or Z routing dimensions 103, 104 or 105. Since the destination coordinates 302 of each packet are encoded in the address, every write cycle issued can be sending data to a different destination component 403 (FIG. 5C). Packet builder 414 uses a write status signal 422 to trigger the packet forming write cycles. The write status signal 422 can be connected to the data processing unit 404 as an interrupt or a general purpose input line.

FIG. 10A also shows the parts of the read interface 405 that is used to process the incoming data packets 301. The packets arriving through multiple sets of local output lines 209 are first interleaved inside the read mux circuit 418 and then are transferred one at a time to the word builder 420. The read control circuit 419 prioritizes the packet traffic and buffers data to prevent overwrite conditions. The word builder 420 places the packet payloads 304 on the data input bus 408 and prompts the data processing unit 404 with the read status line 423 to receive them. The read status 423 can drive an interrupt or a general purpose input line to trigger read cycles from the data processing unit 404.

The data routing junction 201 (FIG. 5C) is a key building block of the multi-dimensional data routing fabric. Data routing junctions 201 interconnected with a mesh of data routing lines 205 route data packets 301 between system components 401. The routing functions performed by the junctions include turning the packet's direction of travel, passing packets straight through, exiting packets from the fabric to components and launching packets from components into the fabric. Additional function that may be performed by the junction is self-configuration from initialization packets 309 immediately following system reset.

Figure 11A:
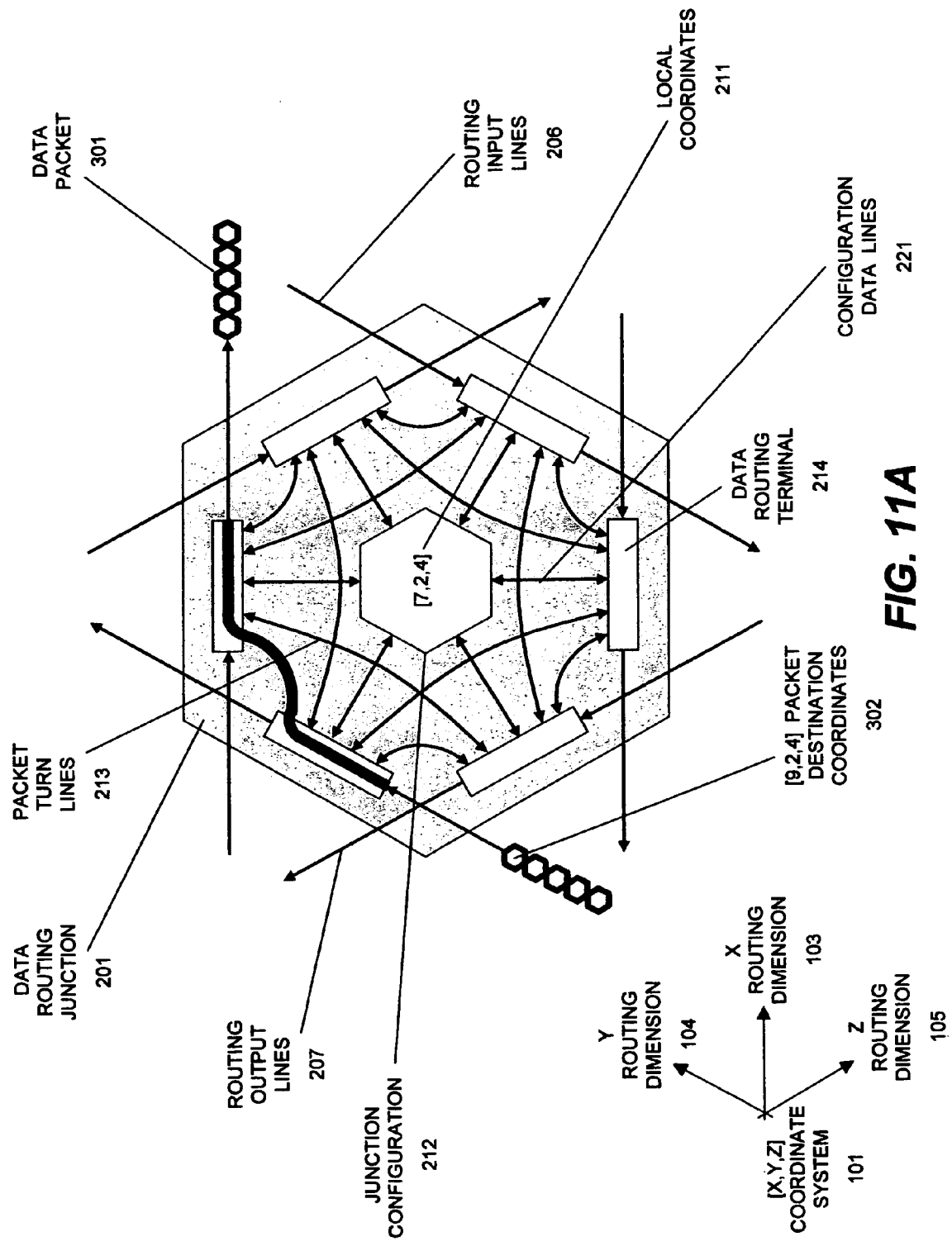
FIG. 11A shows a 3-dimensional data routing junction turning a data packet from the Y routing dimension to the X routing dimension.

FIG. 11A shows a data packet 301 traveling in the positive direction of the Y routing dimension 104 being turned by a 3-dimensional embodiment of the multi-dimensional data routing junction 201 to the positive direction of the X routing dimension 103. The packet enters the junction through the data routing terminal 214 assigned to the positive direction of the Y routing dimension 104. The terminal compares the packet [X,Y,Z] destination coordinates 302 [9,2,4] to the [X,Y,Z] junction local coordinates 211 of [7,2,4]. The routing logic of the terminal compares the individual destination coordinates 302 with the respective local coordinates 211. In this embodiment the terminal routing logic turns the packets if there is a coordinate match in the current routing dimension, and no match in at least one other dimension. With matching Y and Z coordinates and non-matching X coordinate, the packet is thus turned to the X routing dimension 103 through a set of packet turn lines 213 connecting the Y and X dimensions.

As shown in FIG. 11A the packet 301 is turned in the positive direction of the X routing dimension 103. In this embodiment, data packets 301 can be turned inside data routing junctions 201 in both the clockwise and counterclockwise directions. This type of turning provides maximum flexibility to follow a minimum-distance path from source components 402 to destination components 403. Turning data packets 301 in only one direction reduces the complexity and size of the data routing junctions 201. Size and complexity can be further reduced by limiting the number of turn connections between data routing terminals 214 to only the adjacent terminals (see the additional embodiments section).

Figure 11B:
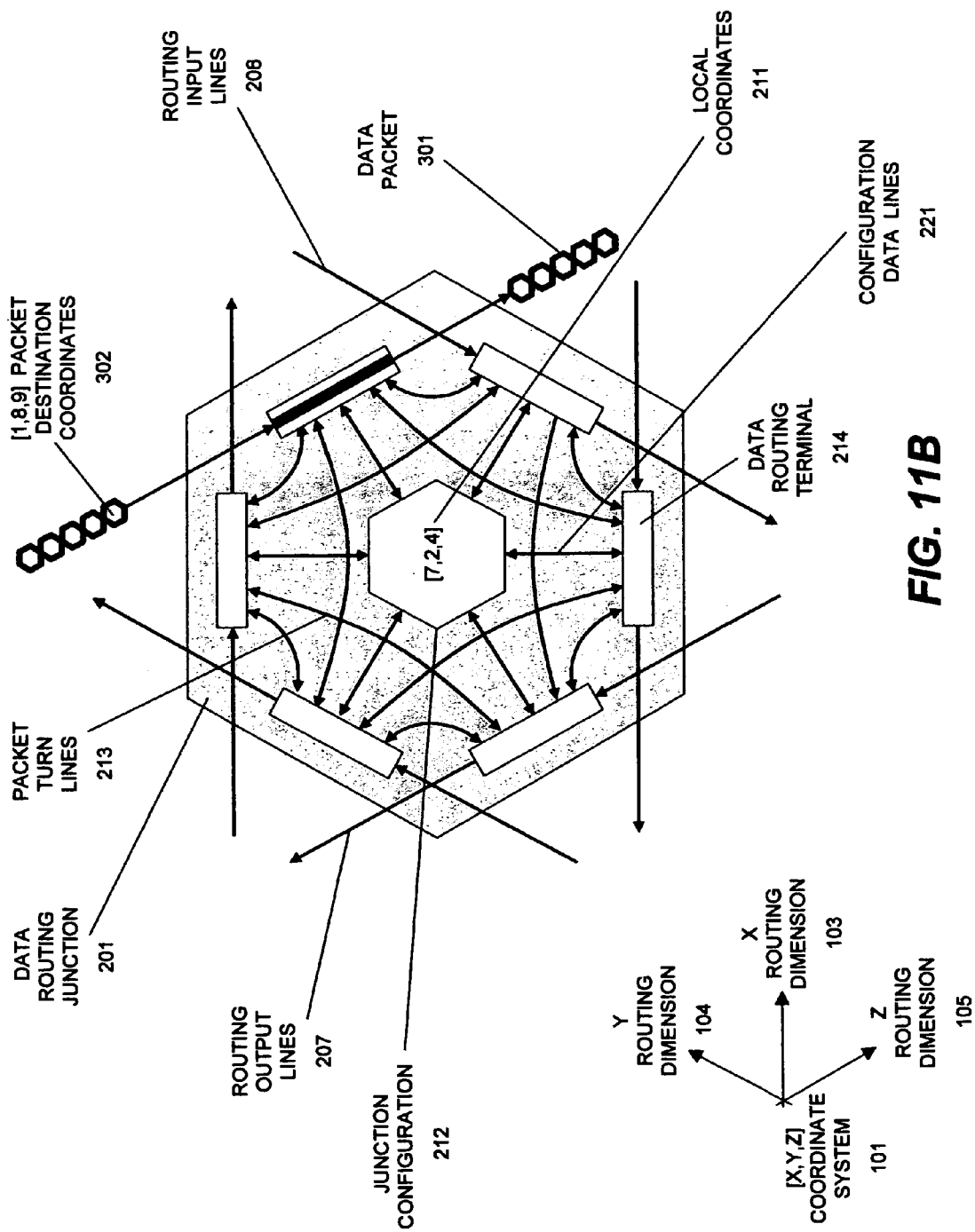
FIG. 11B shows a 3-dimensional data routing junction passing a data packet straight through in the Z routing dimension.

FIG. 11B shows a data packet 301 traveling in a positive direction of the Z routing dimension 105 being routed in a straight line by this 3-dimensional embodiment of the multi-dimensional data routing junction 201. The packet enters the routing junction 201 through a data routing terminal 214 that has been assigned to the positive direction of the Z routing dimension 105. The terminal compares the packet [X,Y,Z] destination coordinates 302 of [1,8,9] to the junction [X,Y,Z] local coordinates 211 of [7,2,4]. The routing logic of the terminal compares the individual packet destination coordinates 302 to their respective local coordinates 211. In this embodiment the terminal routing logic passes packets straight through if there is not a coordinate match in the current routing dimension. With the non-matching Z coordinate, the packet's direction of travel thus remains unchanged.

Figure 11C:
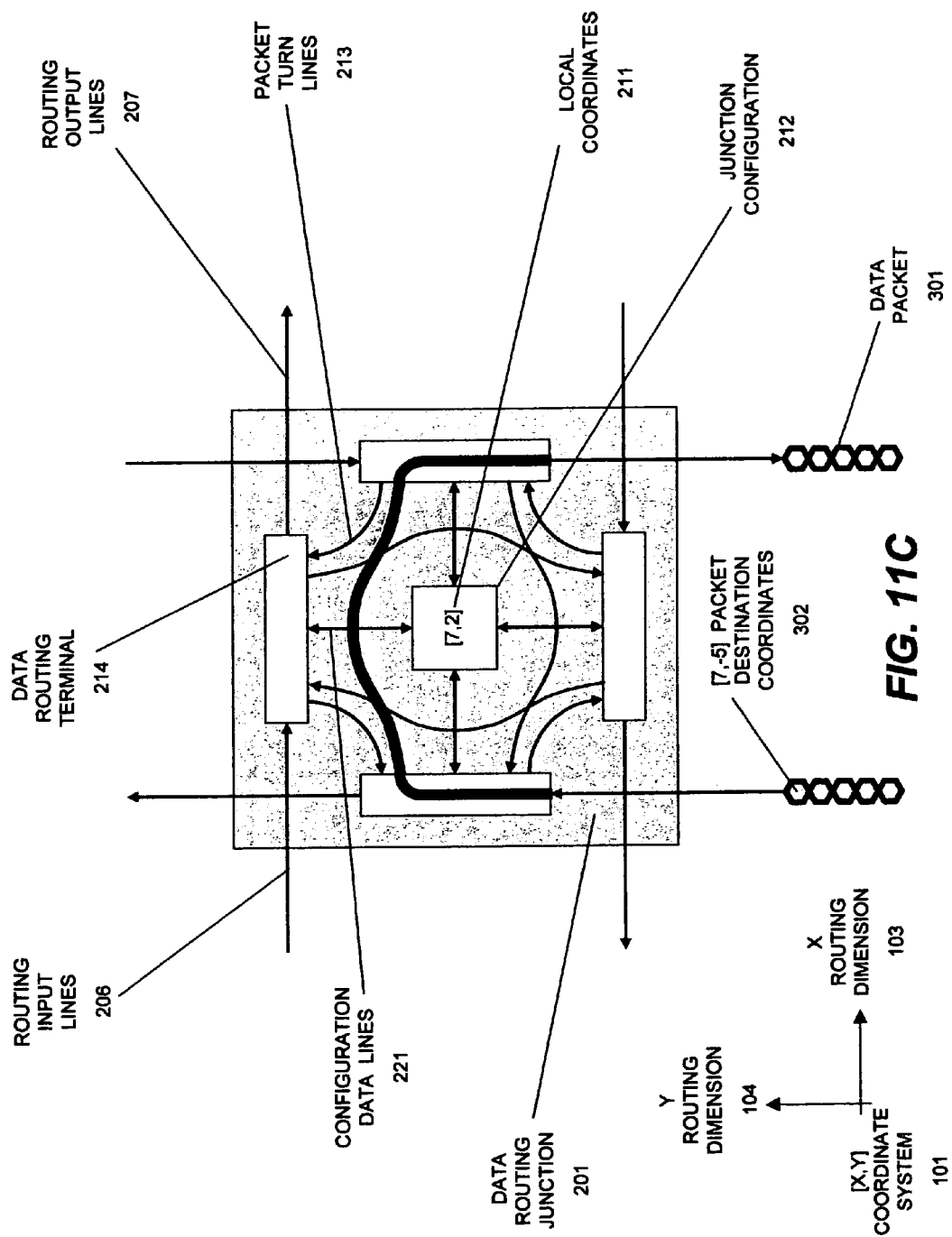
FIG. 11C shows a 2-dimensional data routing junction reversing the direction of a packet in the Y routing dimension.
Figure 11D:
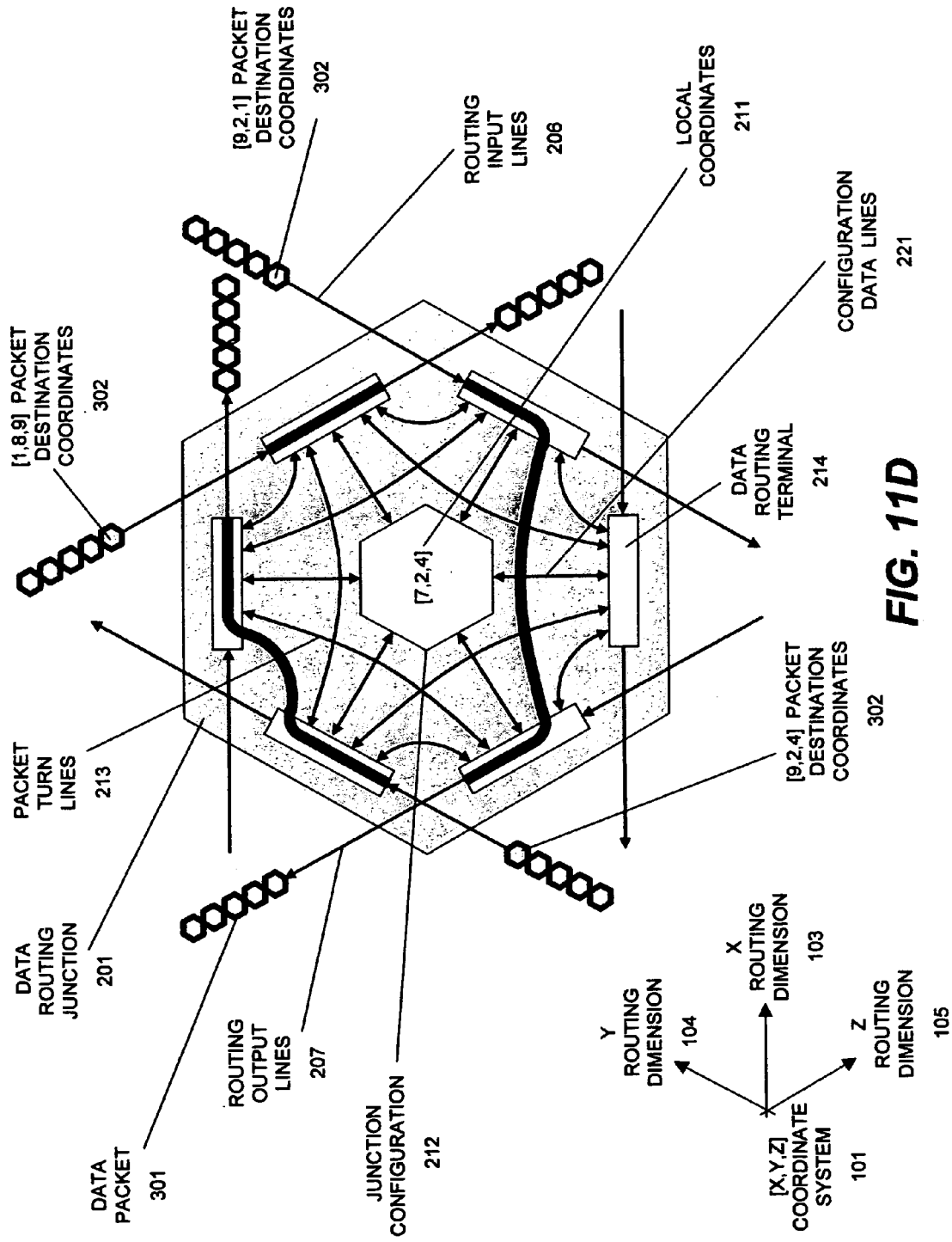

FIG. 11D shows multiple data packets 301 being simultaneously routed by this 3-dimensional embodiment of the multi-dimensional data routing junction 201. Two data packets 301 are turning their paths to change routing directions 102, and one is passing straight through without changing its routing direction 102.

Figure 12:
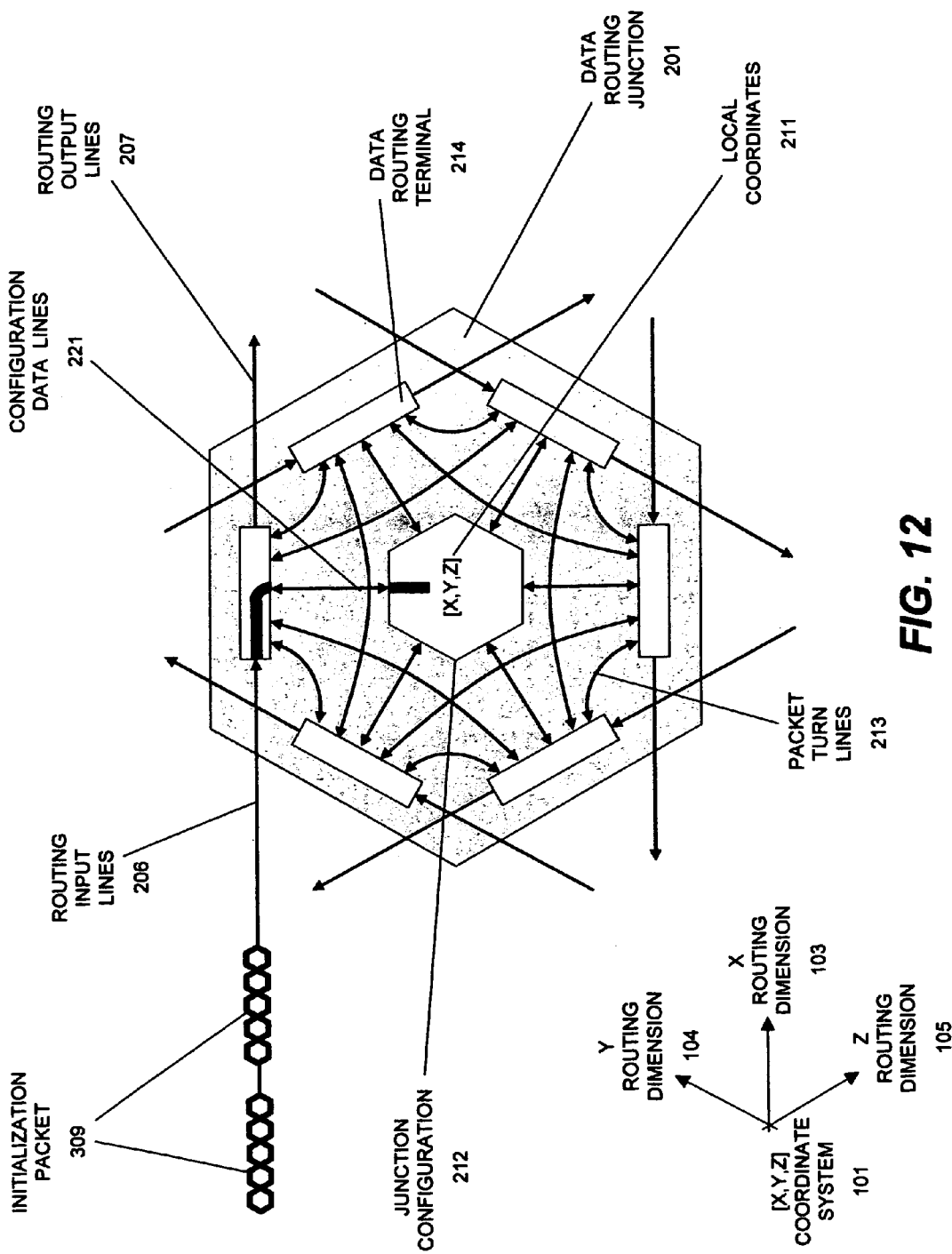
FIG. 12 shows two initialization data packets being loaded into the junction configuration circuit of a 3-dimensional data routing junction.

FIG. 12 shows initialization packets 309 traveling in the positive direction of the X routing dimension 103 and entering the data routing junction 201 into the respective data routing terminal 214. In this 3-dimensional embodiment of the multi-dimensional data routing junction 201 the first predetermined number of data packets 301, arriving through any of the six data routing terminals 214, are routed to a respective set of junction configuration data lines 221. Sets of configuration lines from the data routing terminals 214 store the initialization packets 309 in the junction configuration 212 circuit to configure junction properties, including local coordinates 211. Following the completion of the initialization sequence, the local coordinates 211 are used by the routing terminals 214 to route subsequent data packets 301 through the junction.

Figure 13:
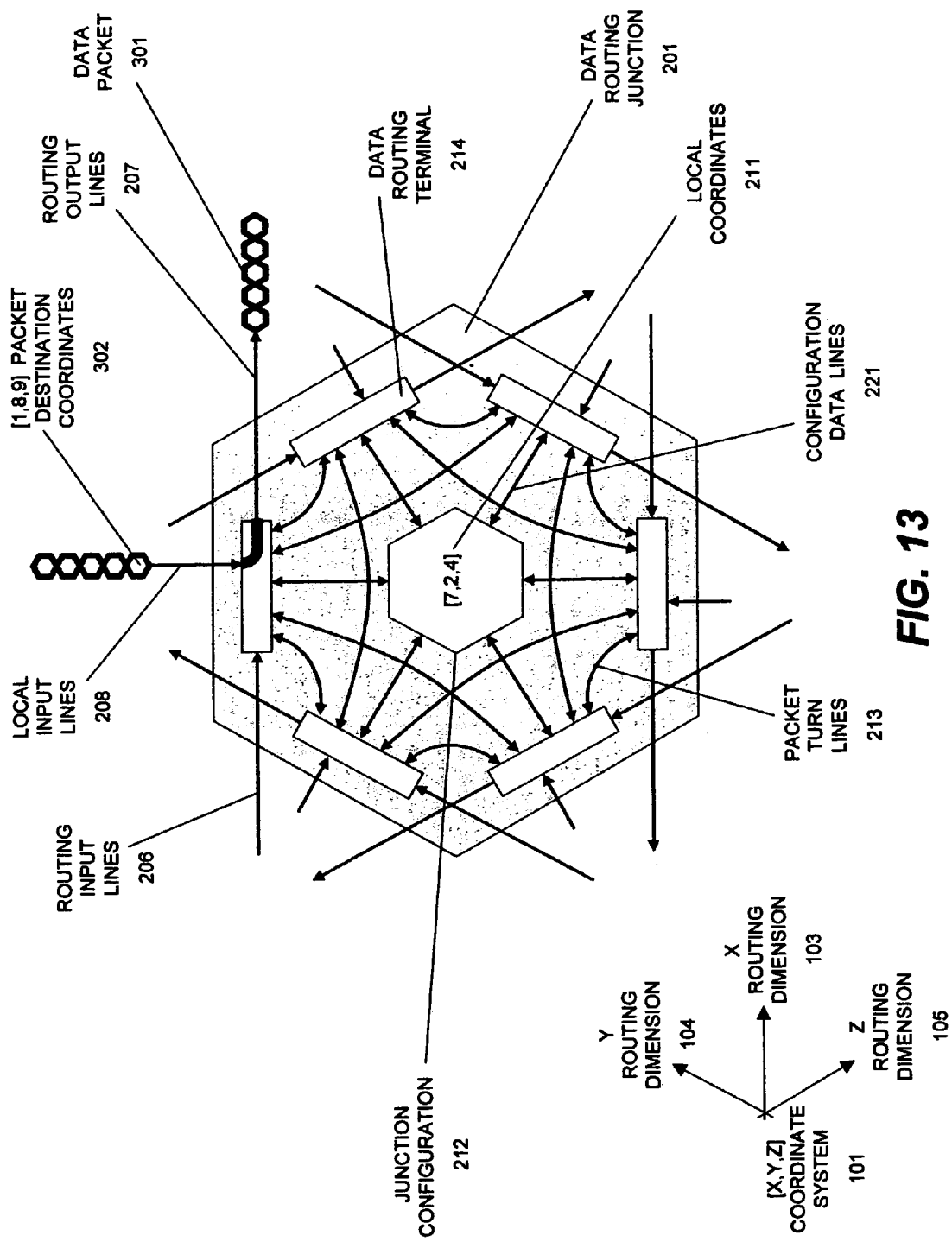
FIG. 13 shows a 3-dimensional data routing junction launching a data packet into the positive direction of the X routing dimension.

FIG. 13 shows a data packet 301 entering the multi-dimensional data routing fabric through a set of routing output lines 207 in the positive direction of the X routing dimension 103. In this 3-dimensional embodiment of the multi-dimensional data routing junction 201, each direction of each routing dimension has a dedicated data routing terminal 214 for routing packets in that direction. Accordingly, the packet entering the routing fabric in the positive direction of the X routing dimension 103 does so through a routing terminal 214 aligned with that direction. Each routing terminal 214 has a dedicated set of local input lines 208 for launching of data packets 301 in its assigned routing direction 102. A 3-dimensional embodiment of the routing junction 201 thus has 6 sets of local input lines 208 for launching data packets 301 in both directions of the 3 routing dimensions.

Figure 14:
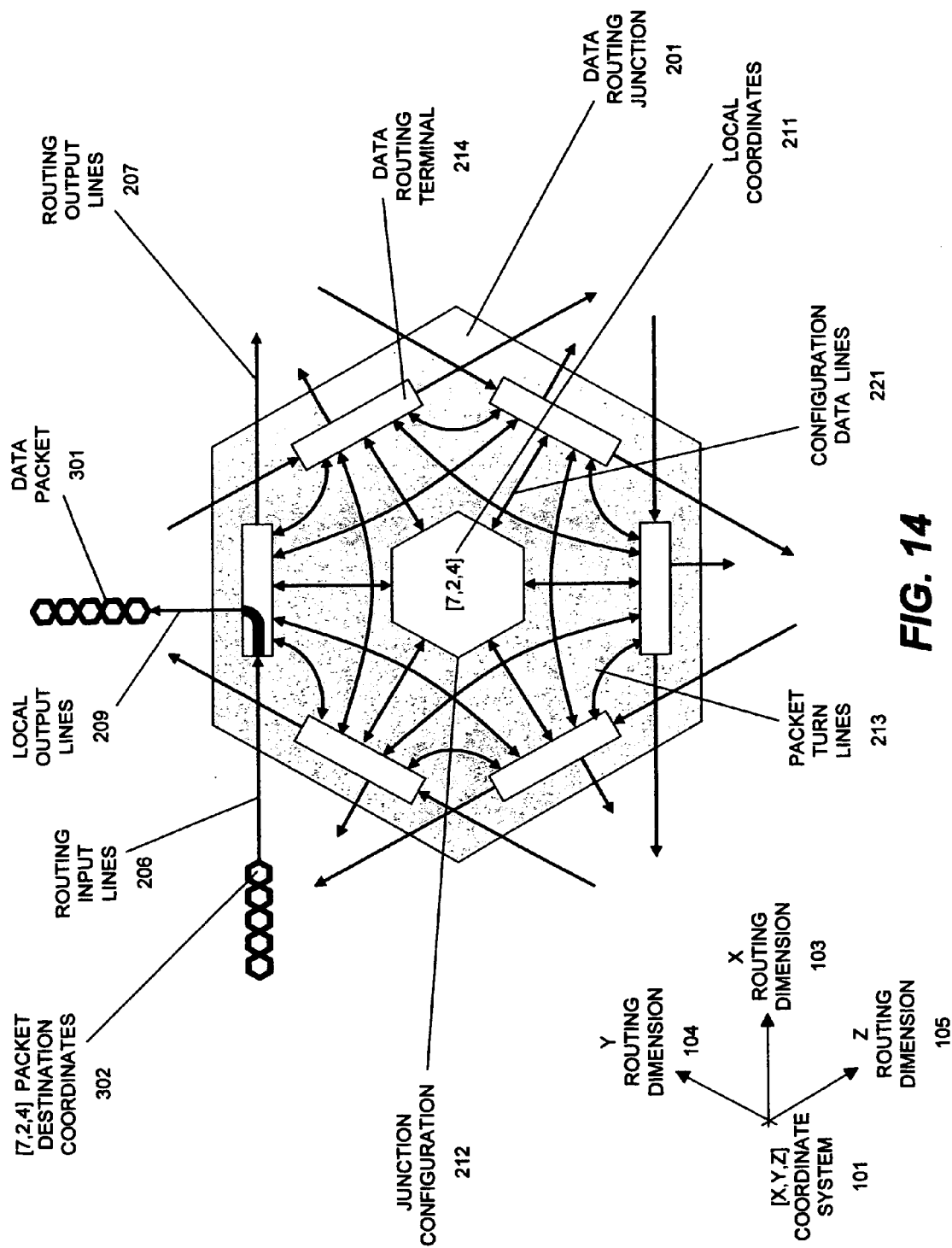
FIG. 14 shows a 3-dimensional data routing junction exiting a data packet arriving from the X routing dimension.

FIG. 14 shows a data packet 301 traveling in the positive direction of the X routing dimension 103. The packet enters the junction through a set of routing input lines 206 leading to a data routing terminal 214 that has been assigned to the positive direction of the X routing dimension 103. The terminal compares the packet [X,Y,Z] destination coordinates 302 of [7,2,4] to the junction [X,Y,Z] local coordinates 211 [7,2,4]. In this 3 dimensional embodiment of the multi-dimensional data routing fabric the terminal routing logic exits packets from the fabric if there is a coordinate match in all three routing dimensions. Matching X, Y and Z coordinates indicate that the packet has reached its destination and is ready to exit the junction through a corresponding set of data output lines 209. The exiting packets proceed to the destination component 403 attached at the other end of the local output lines 209. All 6 routing terminals 214 in FIG. 14 have a set of local output lines 209, thus packets can reach their destination components 403 from any routing direction 102 of any routing dimension.

Data processing components can simultaneously launch, receive and turn data packets 301. FIG. 15A shows one packet entering the multi-dimensional data routing fabric through local input lines 208, while a second packet is seen simultaneously exiting the fabric through local output lines 209. Data routing junctions 201 can thus simultaneously launch and receive packets in all routing directions 102.

As seen in FIG. 15A, data routing terminals 214 can be viewed as the key building blocks of data routing junctions 201, which in turn are the key building blocks of the multi-dimensional data routing fabric. The function of each terminal is to route data packets 301 in a specific routing direction 102 of an assigned routing dimension 103, 104 or 105. Depending on the comparison between the packet destination coordinates 302 and the junction local coordinates 211, packets can be routed to maintain their direction of travel, be turned to another direction or exit from the fabric to their destination component 403. Data routing terminals 214 can also absorb initialization packets 309 from the fabric and launch new packets into the fabric.

Figure 16A:
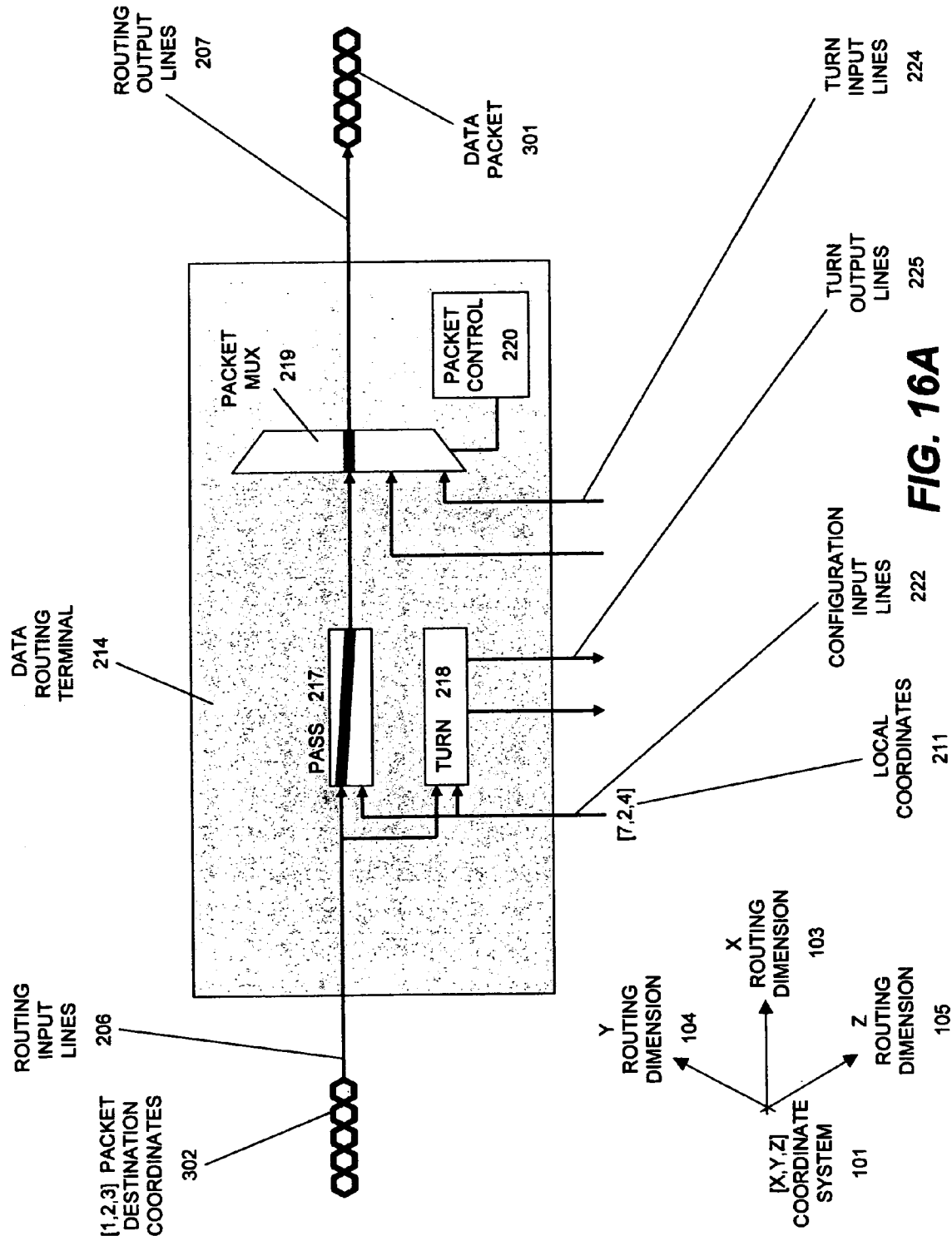
FIG. 16A shows a 3-dimensional data routing terminal passing a data packet straight through in the positive direction of X routing dimension.

FIG. 16A shows a data packet 301 entering a data routing terminal 214 through a set of routing input lines 206. Inside the terminal, the packet's destination coordinates 302 are compared to the terminal's local coordinates 211 provided by the coordinate input lines 222. The pass 217 and turn 218 circuits contain routing logic comparing individual destination coordinates 302 with their respective local coordinates 211 to determine how the packet should be routed through the terminal.

In FIG. 16A the data routing terminal 214 is aligned with the X routing dimension 103, thus the routing logic inside the pass circuit 217 is comparing the X coordinate of the packet [X,Y,Z] destination coordinates 302 of [1,2,3] with the X coordinate of the [X,Y,Z] local coordinates 211 of [7,2,4]. In this embodiment the routing logic of the pass circuit 217 passes data packets 301 straight through if there is not a coordinate match in the current routing dimension 103, 104 or 105. Since the two X coordinates 1 and 7 do not match, the pass circuit 217 passes the packet straight through the terminal across the packet mux 219 to the routing output lines 207 of the X dimension, maintaining the current routing direction 102.

Figure 16B:
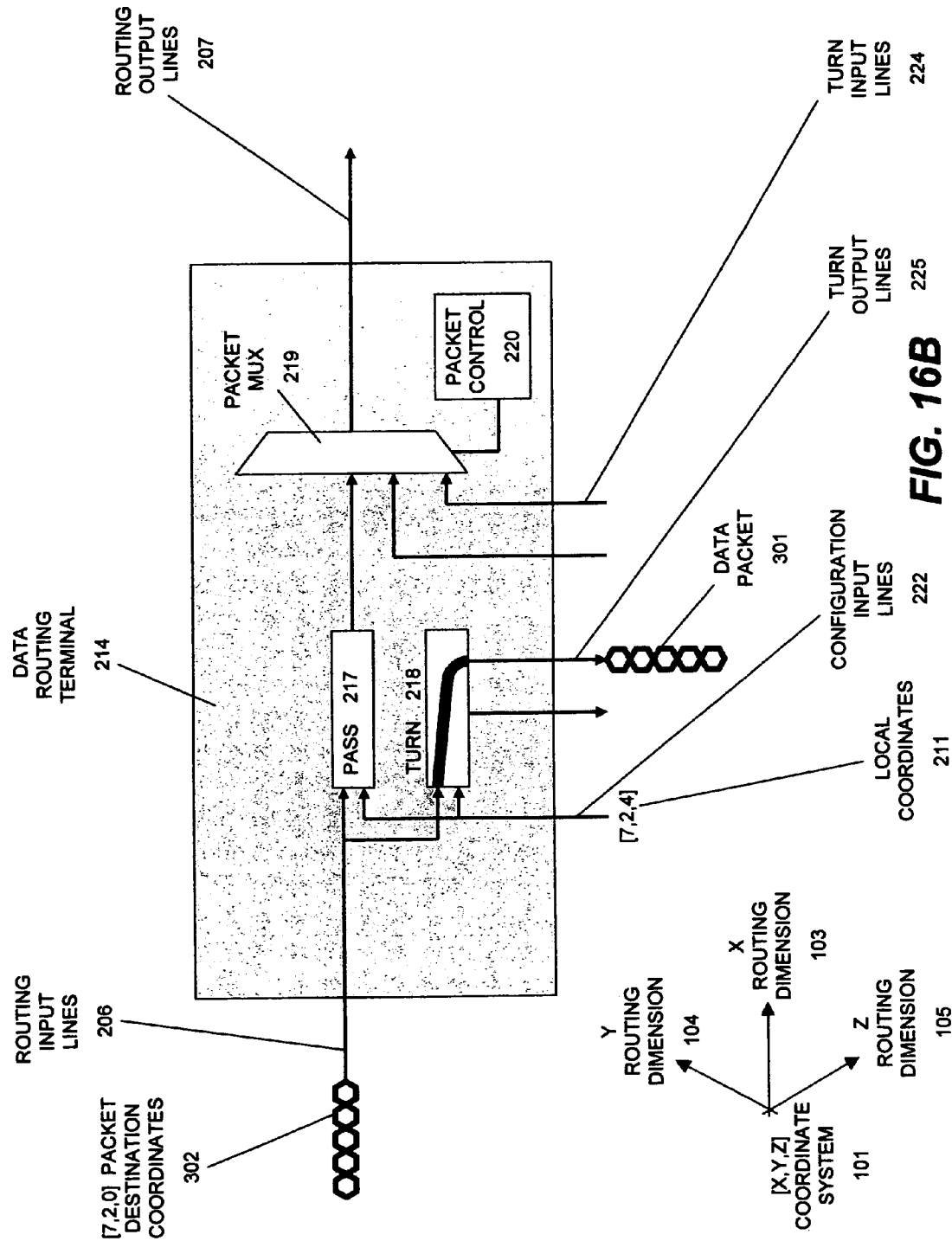
FIG. 16B shows a 3-dimensional data routing terminal turning a data packet from the positive direction of the X routing dimension to another routing direction.

In FIG. 16B the data routing terminal 214 is aligned with the X routing dimension 103 and the routing logic inside the turn circuit 218 is comparing the X coordinate of the packet [X,Y,Z] destination coordinates 302 of [7,2,0] with the X coordinate of the [X,Y,Z] local coordinates 211 of [7,2,4]. In this embodiment the routing logic of the turn circuit 218 turns data packets 301 if there is a coordinate match in the current routing dimension 103, 104 or 105, and no match in at least one other dimension. Since the two X coordinates 7 and 7 do match, and the two Z coordinates 0 and 4 do not match, the turn circuit 218 routes the packet out of the data routing terminal 214 to another routing terminal 214 through a respective set of turn output lines 225. The second data routing terminal 214 completes the turn by re-entering the turned data packet 301 into the new routing direction 102 of the data routing fabric, taking the packet one step further to convergence with its destination.

Figure 16C:
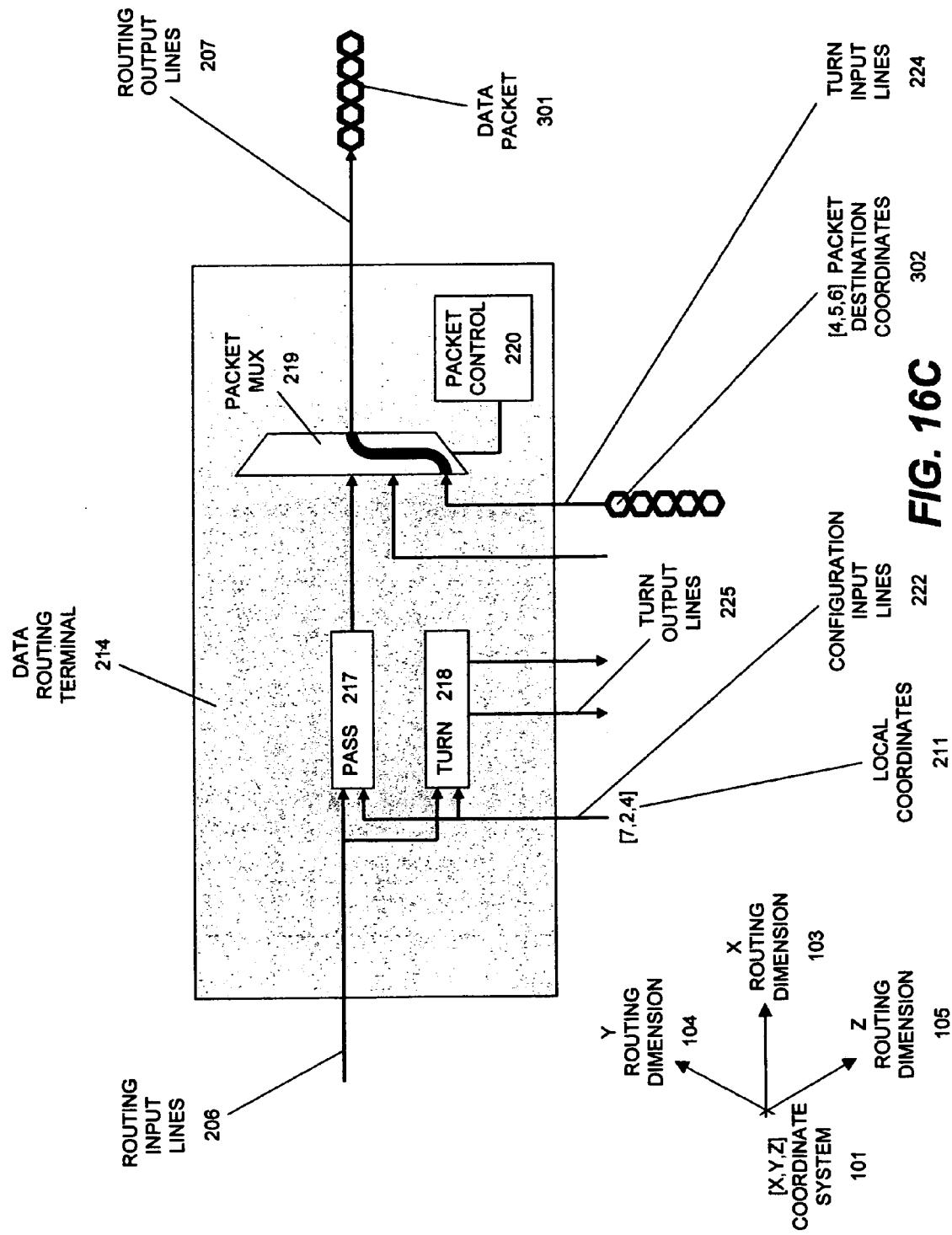
FIG. 16C shows a 3-dimensional data routing terminal turning a data packet from a present routing direction to the positive direction of the X routing direction.

FIG. 16C shows a data packet 301 arriving at the data routing terminal 214 from another data terminal through a set of turn input lines 224. Each data terminal is aligned with a specific routing dimension 103, 104 or 105, thus transfer of data packets 301 between two terminals represents turning of the packet's path from one routing direction 102 to another. The terminal in FIG. 16C represents the second terminal of this two-terminal packet turn. Inside this second terminal, the packet is transferred across the packet mux 219 circuit to re-enter the data routing fabric through a set of routing output lines 207 in a new direction. This action completes the packet turn started in another routing terminal 214.

Figure 17:
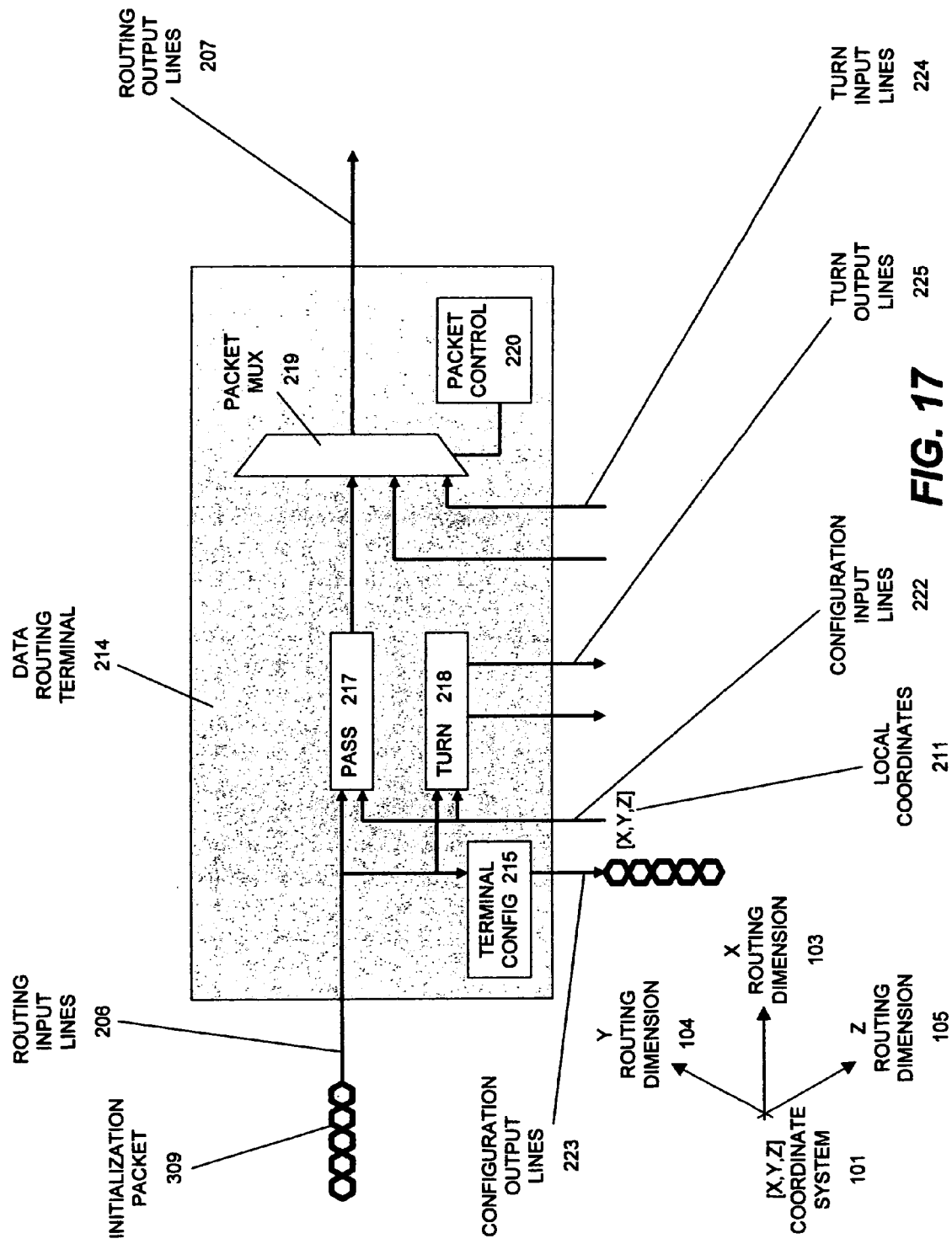
FIG. 17 shows a 3-dimensional data routing terminal passing an initialization data packet to a set of configuration output lines.

FIG. 17 shows an initialization packet 309 entering the data routing terminal 214 through a set of routing input lines 206. Inside the routing terminal 214 the initialization packet 309 is routed to the terminal configuration circuit 215. The terminal configuration circuit recognizes the first predetermined set of data packets 301 after reset as configuration packets and sends them through the configuration output lines 223 to be stored in the junction configuration 212 circuit (FIG. 12). A portion of the configuration data, the local coordinates 211, re-enters the data routing terminal 214 through a set of configuration input lines 222 to be used in routing of subsequent data packets 301 through the exit 216, pass 217 and turn 218 circuits.

Figure 18:
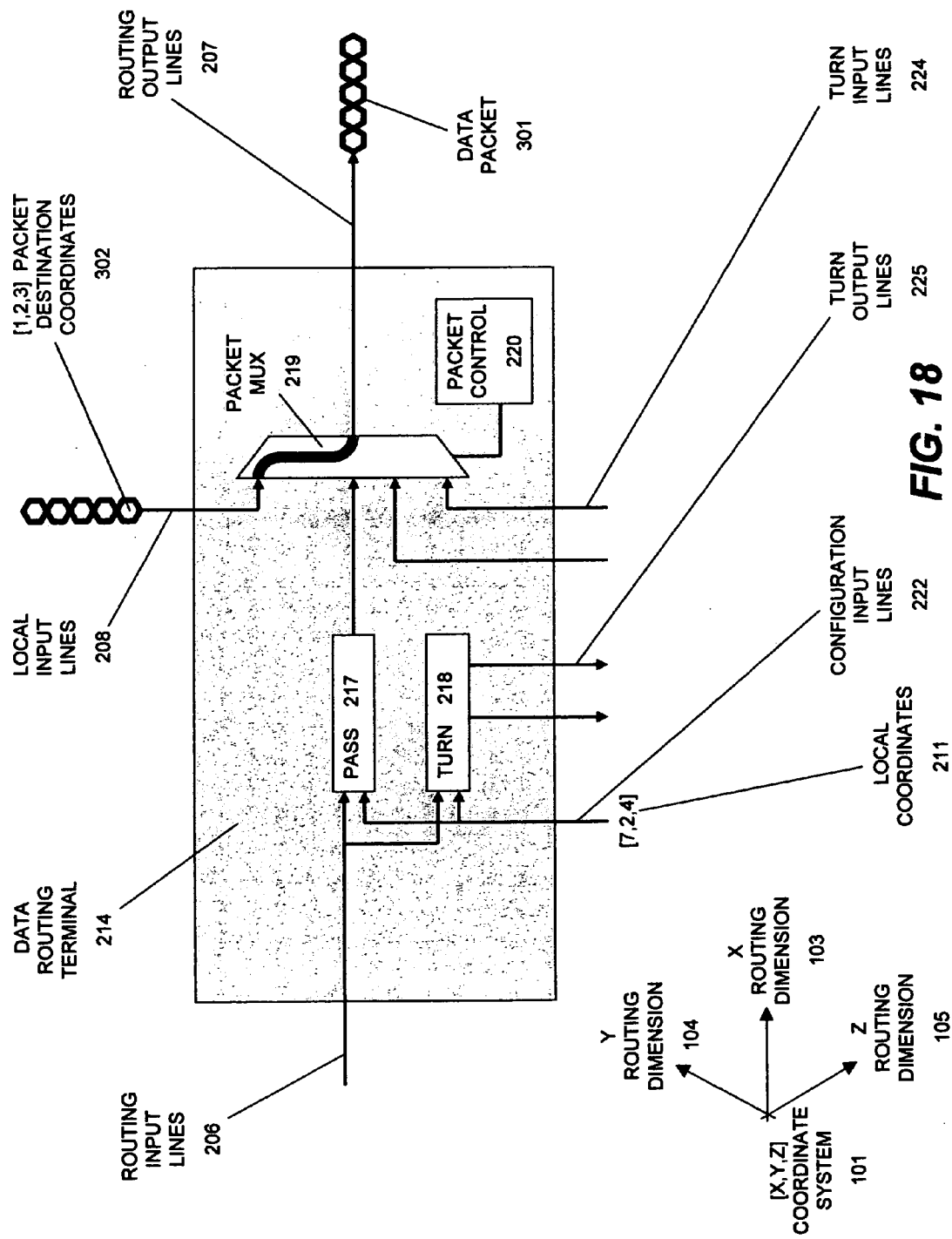
FIG. 18 shows a 3-dimensional data routing terminal launching a new data packet into the positive direction of the X routing dimension.

Data processing components can launch new data packets 301 into specific routing dimensions by sending them through data routing terminals 214 associated with the desired routing directions 102. The data routing terminal 214 in FIG. 18 is aligned with the positive direction of X routing dimension 103. A new data packet 301 is seen entering the data routing terminal 214 through a set of local input lines 208. Inside the data routing terminal 214, the packet passes through a packet mux 219 to exit the terminal through a set of routing output lines 207, thus entering the multi-dimensional routing fabric in the positive direction of the X routing dimension 103.

Figure 19:
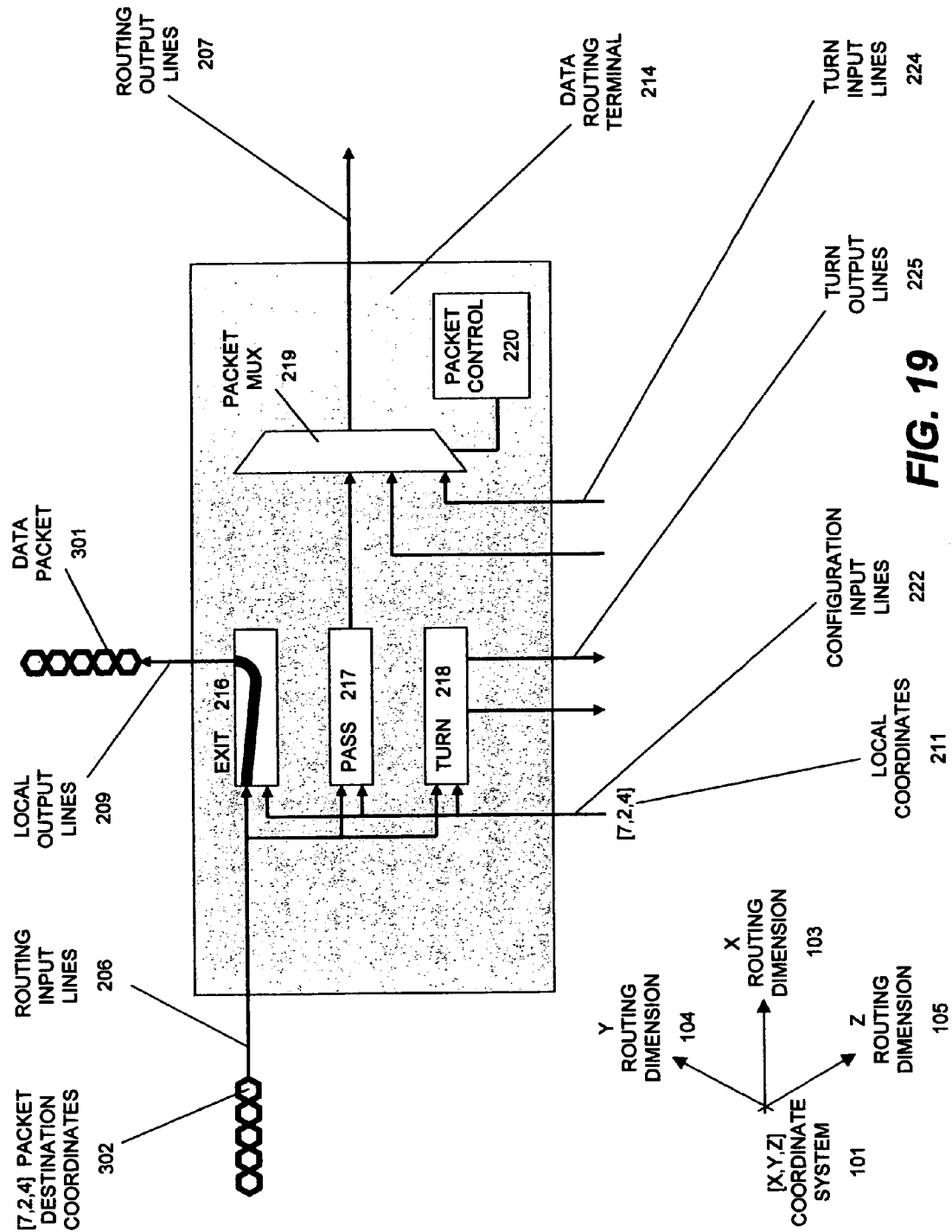
FIG. 19 shows a 3-dimensional data routing terminal exiting a data packet arriving from the X routing dimension.

FIG. 19 shows the data routing terminal 214 aligned with the positive direction of the X routing dimension 103. A data packet 301 is supplied to the terminal though a set of routing input lines 206. The routing logic inside the exit circuit 216 compares packet [X,Y,Z] destination coordinates 302 of [7,2,4] with the terminal's [X,Y,Z] local coordinates 211 of [7,2,4]. In this embodiment, matching coordinates in all routing dimensions indicate that that packet has reached its destination. FIG. 19 shows that X,Y and Z coordinates are identical for the routing and the local sets, thus the exit circuit 216 removes the packet from the data routing fabric through a set of local output lines 209 leading to the local component.

Data terminals 214 can simultaneously route multiple data packets 301. FIG. 20 shows four data packets 301 being routed through the terminal into the positive direction of the X routing dimension 103. The local component is using a set of local input lines 208 to launch a new packet into the fabric. Inside the terminal, the new packet passes across a packet mux 219 circuit to leave the terminal through a set of routing output lines 207. The mux circuit also receives packets from the pass circuit 217 (non-matching X, Y and Z coordinates), and turned packets arriving from other terminals through two sets of turn input lines 224.

A packet control 220 circuit interleaves the mux packets to form a single stream of packets leaving the terminal through the routing output lines 207, routing the packets one step closer to convergence with their destination components 403. The packet control circuit 220 of this 3-dimensional uses packet interleaving to minimize average waiting time for packet inside the packet mux 219. Other control methods can also be used to determine the order in which packets leave the packet mux 219 circuit.

Additional Embodiments

The mutually opposite sets of data routing lines 205 of data routing junctions 201 at the edge of the system, without adjacent data routing junctions 201 to connect to beyond the system edge, can be terminated with sets of edge turnaround lines 204. FIG. 5B shows 4 sets of edge turnaround lines terminating the edge sets of data routing lines 205 in the X routing dimension 103, the Y routing dimension 104 and the Z routing dimension 105. Additional sets of edge turnaround lines were not shown to preserve picture clarity.

In the preferred embodiment a data packet 301 can be turned in both directions 102 of each routing dimension (FIG. 1B). Data routing junctions 201 of other embodiments may be configured to use simpler single-turn protocols to reduce the overall system size. As shown in FIG. 5B, a single-turn protocol is repeated for each non-matching routing dimension until the data packet 301 converges on the data routing junction 201 of its destination component 403. If the data packet 301 reaches the edge of the system, before first exiting or turning, the system edge turnaround lines 204 return it back to the system in the opposite direction of the same routing dimension.

FIG. 5B shows a data packet 301 with [X,Y,Z] destination coordinates 302 of [1,0,3] launched through the data routing junction 201 with local [X,Y,Z] coordinates of [3,2,1]. The packet is launched in the positive Z direction, making a turn at the data routing junction 201 [3,2,3] (matching Z coordinate), then reversing its direction in the X routing dimension 103 through the edge turnaround lines of data routing junction 201 [4,2,3]. Finally, the packet makes a turn at the data routing junction 201 [1,2,3] (matching X and Z coordinates) to converge on the destination routing junction 201 [1,0,3].

The multi-dimensional data routing fabric can connect data processing components in any number of routing dimensions. While the preferred embodiment uses a 3-dimensional fabric, the multi-dimensional data routing fabrics can be used to route data in 2-, 4-, 5-, 6-, 7-dimensions or more.

In the preferred 3-dimensional embodiment the 0 (zero) values of the X, Y and Z routing dimensions 103, 104 and 105 coincide in a common point called the coordinate system origin 101 (FIG. 1B). The consecutive locations along the X, Y and Z coordinates 103, 104, 105 are incremented by 1 in the positive direction of each routing dimension and decremented by 1 in the negative direction of each dimension. In other embodiments the consecutive locations can be incremented or decremented by a value that is different than 1, and the origins 101 (value of 0) for all routing dimensions do not have to coincide at the same point.

FIGS. 1A, 1C, 1G, 1I, 2A, 3A, 4A, 4C, 5A, 6A, 6B, 11C and 15B show 2-dimensional implementations of the multi-dimensional data routing fabric. While the number of routing dimensions is different from the preferred 3-dimensional embodiment, the 2-dimensional routing fabric can use similar types of components, interconnects, terminations, initialization methods and data routing methods as the preferred 3-dimensional embodiment. What is different is the number of routing dimensions available for transporting data. The 2-dimensional routing fabrics use one fewer routing dimension then the preferred 3-dimensional embodiment.

Figure 15B:
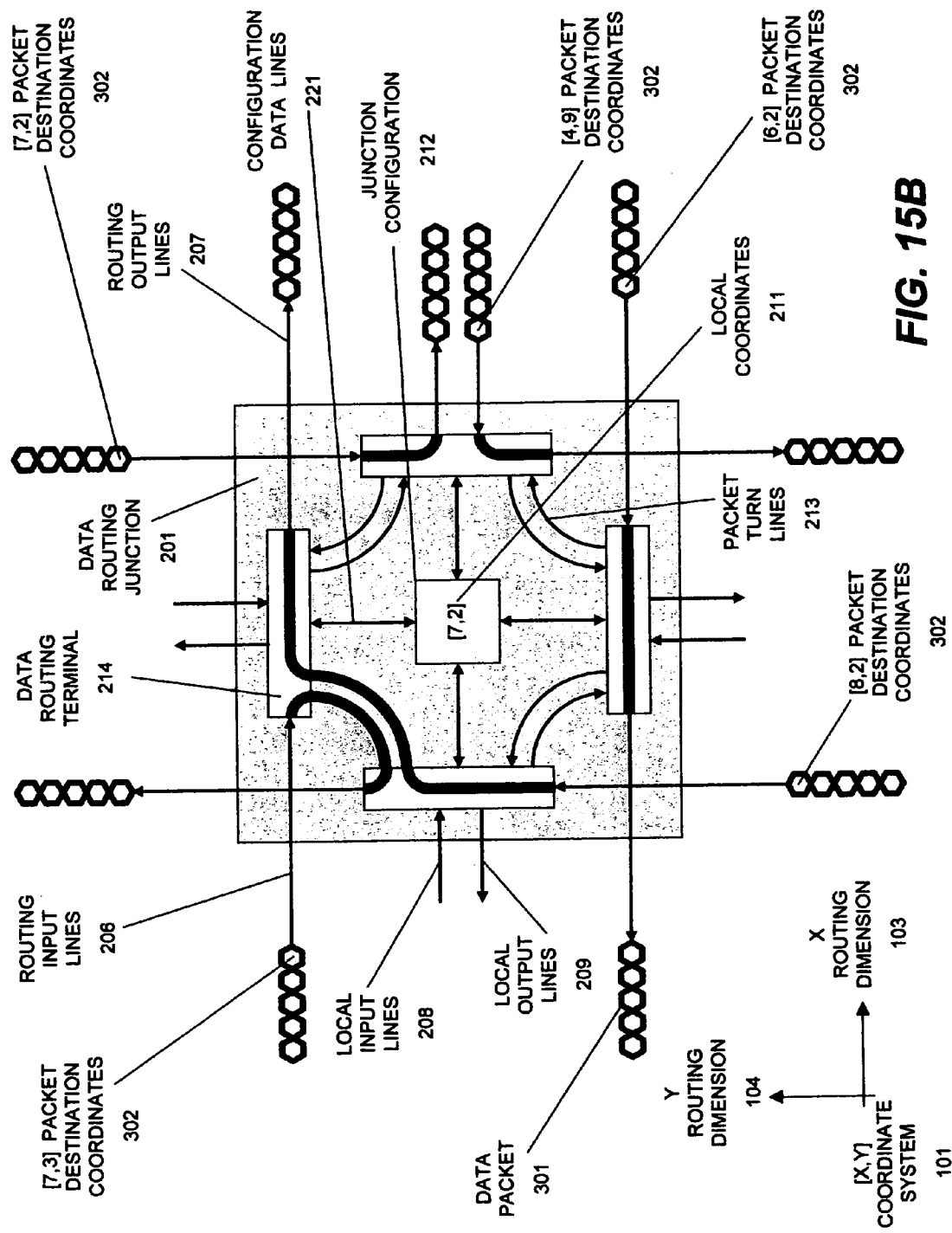
FIG. 15B shows a 2-dimensional data routing junction simultaneously routing five data packets.

In the preferred 3-dimensional embodiment, the data routing junctions 201 are arranged in a volume and data packets 301 can be transported in 2 directions of 3 dimensions for the total of 6 routing directions 102. In a 2-dimensional embodiment, the data routing junctions 201 are arranged on a surface, and data packets 301 can be transported in 2 directions of 2 dimensions for the total of 4 routing directions 102. FIG. 15B shows a data routing junction 201 of the 2-dimensional fabric routing data packets 301 in all 4 routing directions 102.

Figure 4E:
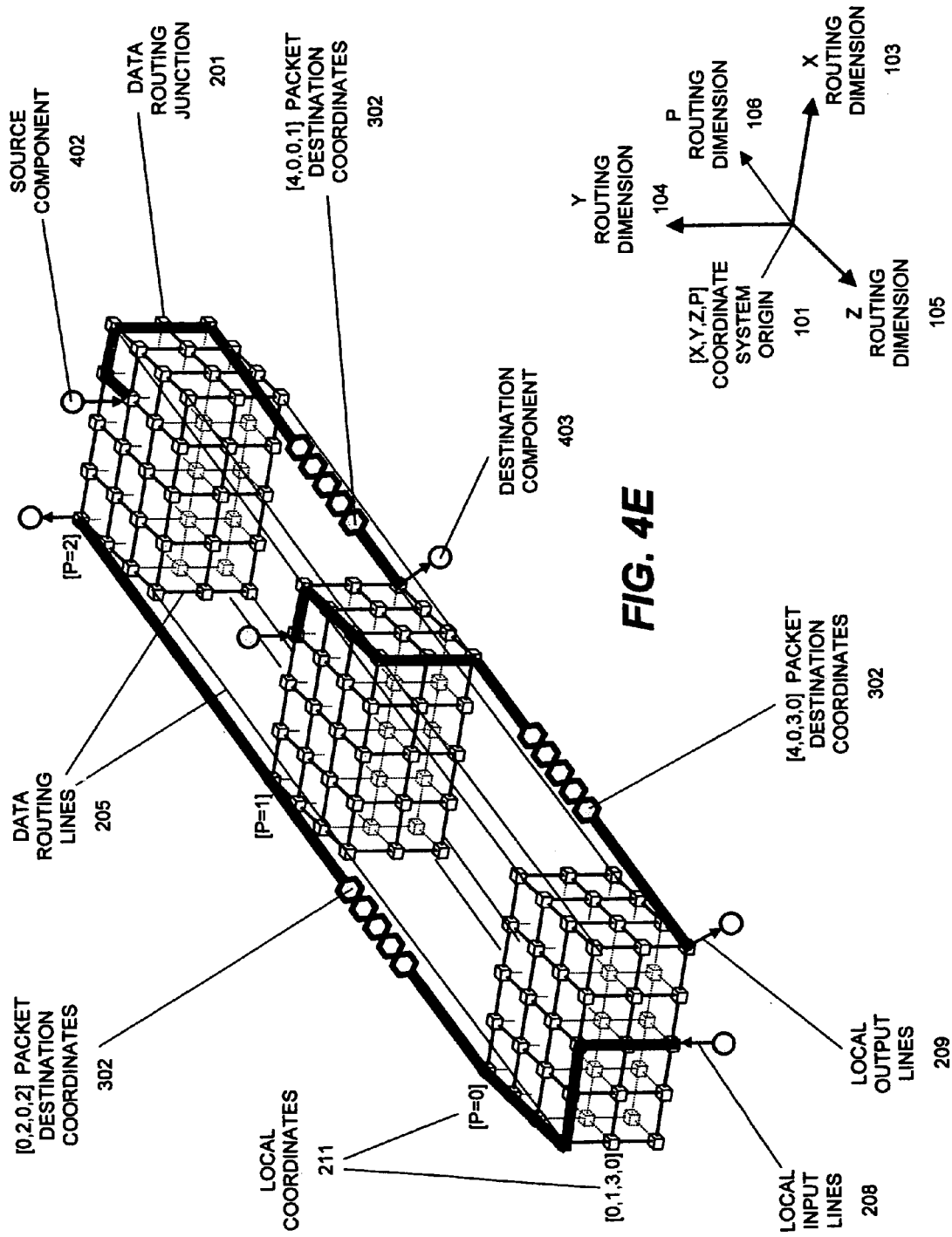
FIG. 4E shows a 4-dimensional data routing fabric simultaneously transporting three data packets between three component pairs.

FIG. 4E shows a 4-dimensional embodiment of the multi-dimensional data routing fabric, where the data routing junctions 201 are distributed in a set of orthogonal volumes arranged in a line. In this embodiment data processing components can send and receive data packets 301 in both directions of 4 routing dimensions for the total of 8 routing directions 102. FIG. 4E shows three data packets 301 in transit between three source components 402 and three destination components 403. Each transfer is composed of up to 4 routing segments parallel to the 4 routing dimensions X, Y, Z and P 103, 104, 105 and 106.

Source components 402 can launch packets in any one of the 8 routing directions 102. The 4-dimensional data routing fabric matches the 4-dimensional packet destination coordinates 302 with the 4-dimensional local coordinates 211 of data routing junctions 201 to route the three data packets 301 to their respective destinations, using the same routing methods as the preferred 3-dimensional embodiment. The reader should note that only some of corner data routing lines 205 are shown in the P routing dimension 106 to preserve picture clarity. It should also be noted that the data routing lines 205 for each dimension are shown parallel to their respective dimension arrows of FIG. 4E.

Figure 4F:
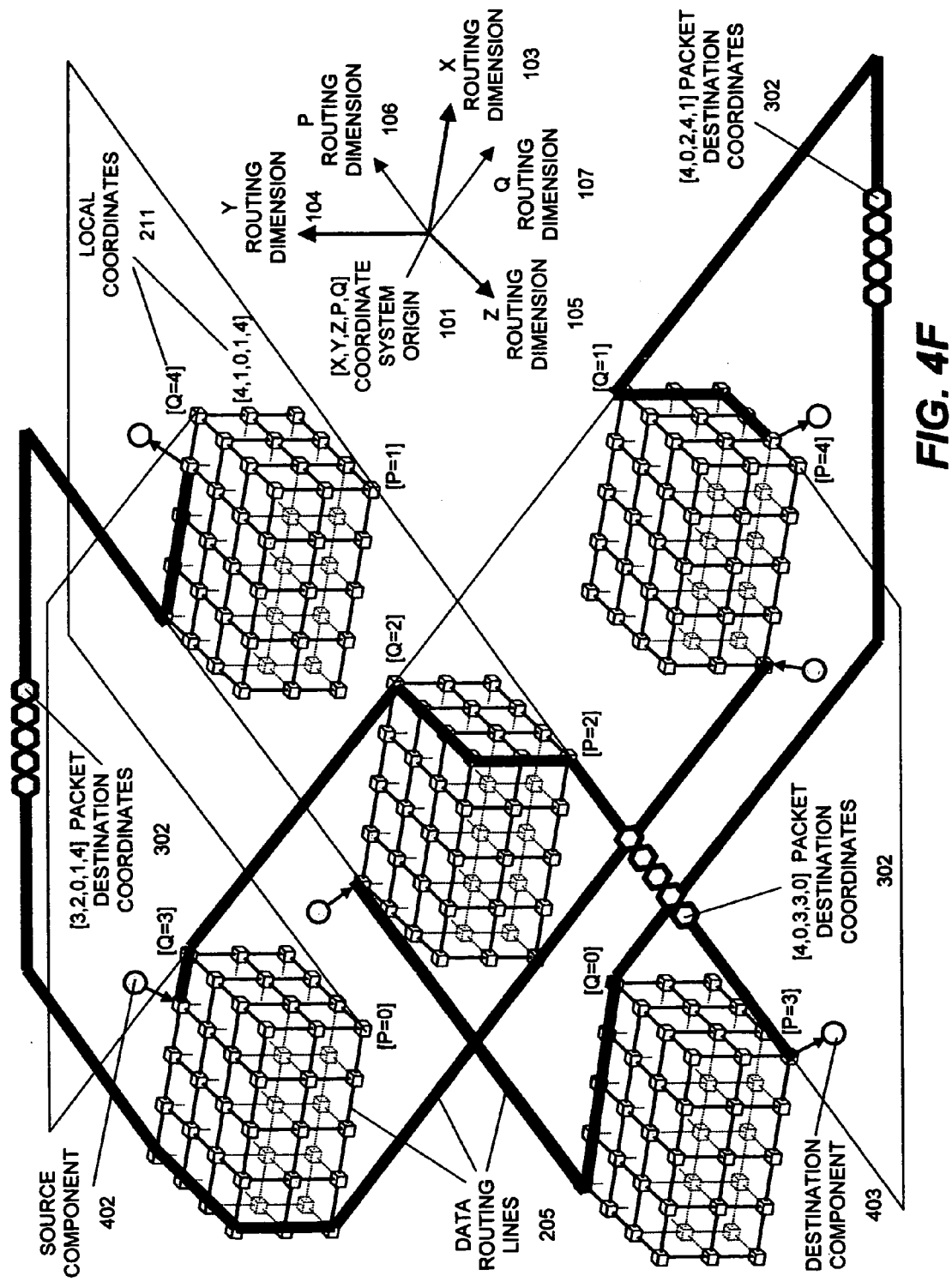
FIG. 4F shows a 5-dimensional data routing fabric simultaneously transporting three data packets between three component pairs.

FIG. 4F shows a 5-dimensional embodiment of the multi-dimensional data routing fabric, where the data routing junctions 201 are distributed in a set of orthogonal volumes arranged in on a surface. In this embodiment data processing components can send and receive data packets 301 in both directions of 5 routing dimensions for the total of 10 routing directions 102. FIG. 4F shows three data packets 301 in transit between three source components 402 and three destination components 403. Each transfer is composed of up to 5 routing segments parallel to the 5 routing dimensions X, Y, Z, P and Q 103, 104, 105, 106 and 107.

Source components 402 can launch packets in any one of the 10 routing directions 102. The 5-dimensional data routing fabric matches the 5-dimensional packet destination coordinates 302 with the 5-dimensional local coordinates 211 of data routing junctions 201 to route the three data packets 301 to their respective destinations, using the same routing methods as the preferred 3-dimensional embodiment. The reader should note that only some of corner data routing lines 205 are shown in the P and Q dimensions to preserve picture clarity. It also should be noted that the data routing lines 205 for each dimension are drawn parallel to their respective dimension arrows, except where they are reflected from the edges of FIG. 4F.

Figure 4G:
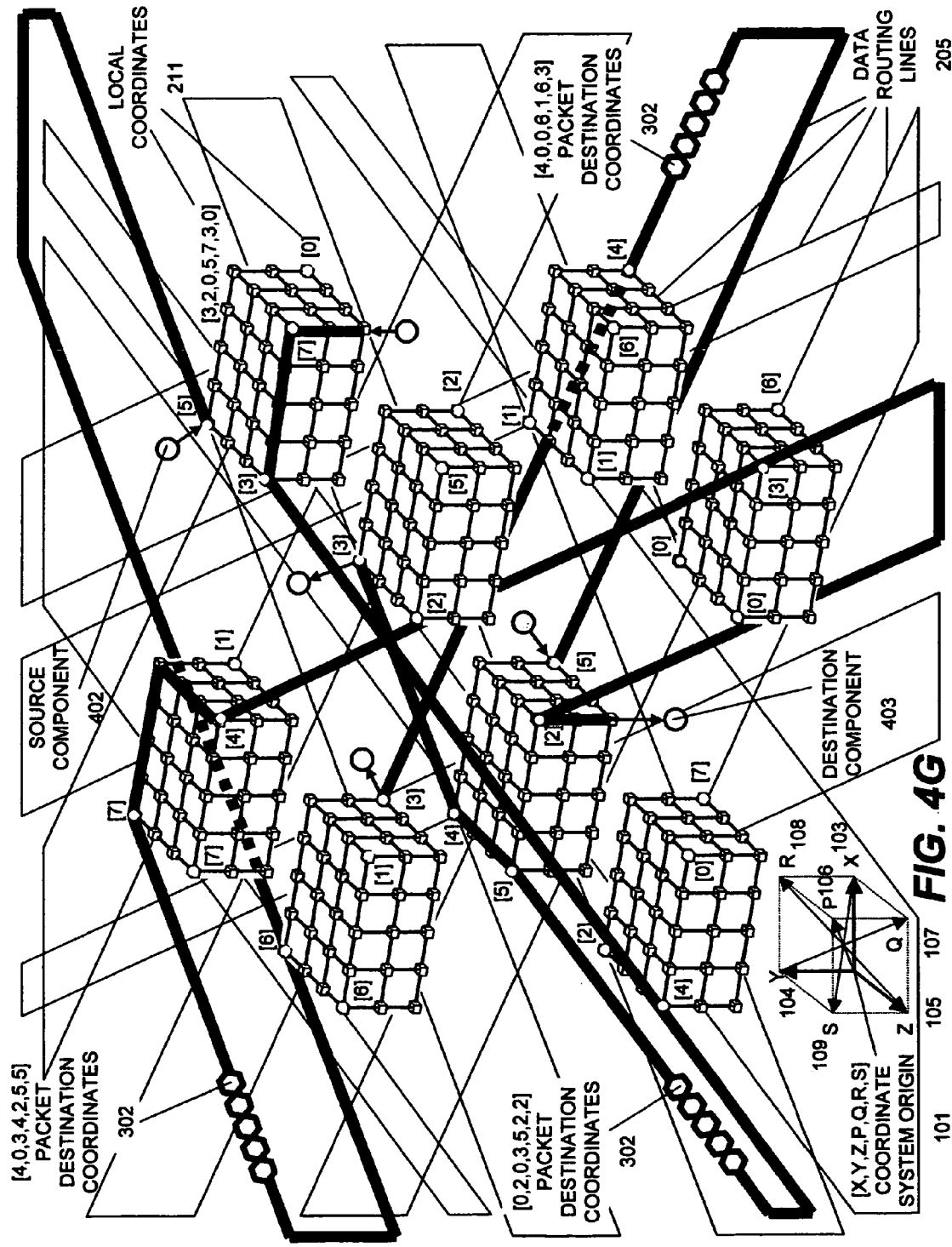
FIG. 4G shows a 7-dimensional data routing fabric simultaneously transporting three data packets between three component pairs.

FIG. 4G shows a 7-dimensional embodiment of the multi-dimensional data routing fabric, where the data routing junctions 201 are distributed in a set of orthogonal volumes arranged in a volume. In this embodiment data processing components can send and receive data packets 301 in both directions of 7 routing dimensions for the total of 14 routing directions 102. FIG. 4G shows three data packets 301 in transit between three source components 402 and three destination components 403. Each transfer is composed of up to 7 routing segments parallel to the 7 routing dimensions X, Y, Z, P, Q, R and S 103, 104, 105, 106, 107, 108 and 109.

Source components 402 can launch packets in any one of the 14 routing directions 102. The 7-dimensional data routing fabric matches the 7-dimensional packet destination coordinates 302 with the 7-dimensional local coordinates 211 of data routing junctions 201 to route the three data packets 301 to their respective destinations, using the same routing methods as the preferred 3-dimensional embodiment. The reader should note that only some of corner data routing lines 205 are shown in the P, Q, R and S routing dimensions 106, 107, 108 and 109 to preserve picture clarity. It also should be noted that the data routing lines 205 for each dimension are drawn parallel to their respective coordinate arrows, except where they are reflected from the edges of FIG. 4G. In an actual chip-level physical implementation, all system components 401 would be connected to their neighbors in all 7 dimensions, with the entire mesh of line segments eventually collapsing to a 2-dimensional place-and-route implementation.

The number of dimensions used to route data packets 301 through a data processing system may or may not reflect the number of physical of dimensions in which the components are placed. One embodiment of a 3-dimensional design may be implemented in a 2-dimensional array of chips on multiple boards stacked in an enclosure. Each chip on each board could be connected to 4 other chips on the same board and one chip on the boards above and below, for the total of 6 routing directions 102. Another embodiment of the same 3-dimensional design may be implemented in a single large chip, where the synthesis and implementation tools collapse the 3-dimensional data routing structure to a 2-dimensional place-and-route. Accordingly, a 7-dimensional routing fabric can be implemented in a 2-dimensional chip or board, as well as in a 3-dimensional stack of boards.

In addition, a multi-dimensional data routing fabric can be based on any type of dimensions including orthogonal, azimuth, elevation, cylindrical and radial.

Figure 4H:
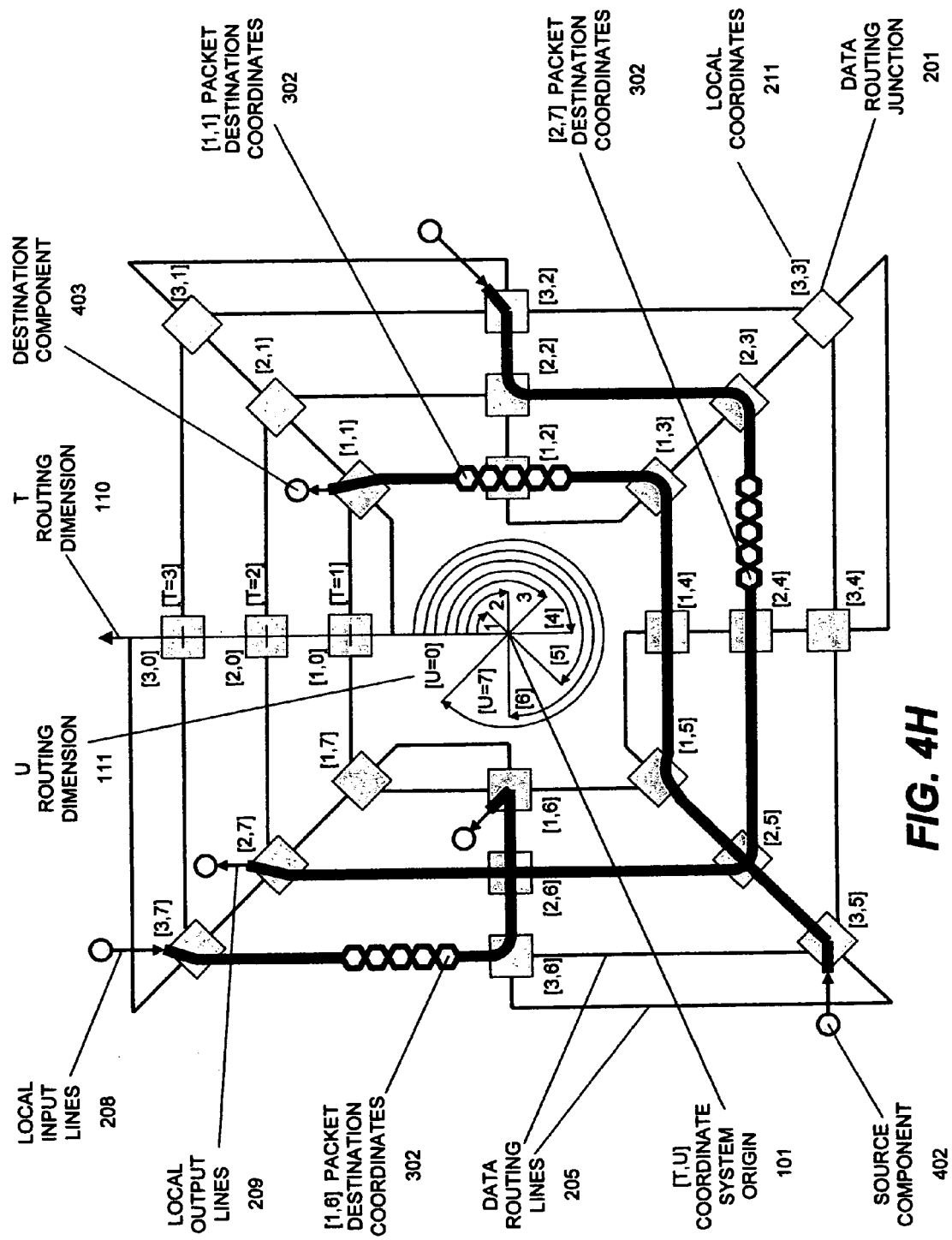
FIG. 4H shows a 2-dimensional radial data routing fabric simultaneously transporting three data packets between three component pairs.

FIG. 4H shows a 2-dimensional embodiment of the multi-dimensional data routing fabric where the T dimension 110 represents a radial distance from the center and the U dimension 111 represents an azimuth rotation from vertical. FIG. 4H shows three data packets 301 in transit between three pairs of components. Each packet transfer is composed of up to 2 routing segments aligned with the 2 routing dimensions U and T.

Using radial and azimuth dimensions (instead of orthogonal) changes the data routing topography from a 2-dimensional grid to a spider web-like structure. While the data routing topography is different, the data routing junctions 201 implementing both types of structures are identical, thus rendering the embodiments with radial and azimuth dimensions conceptually equivalent to the orthogonal embodiments with the same number of dimensions.

Figure 4I:
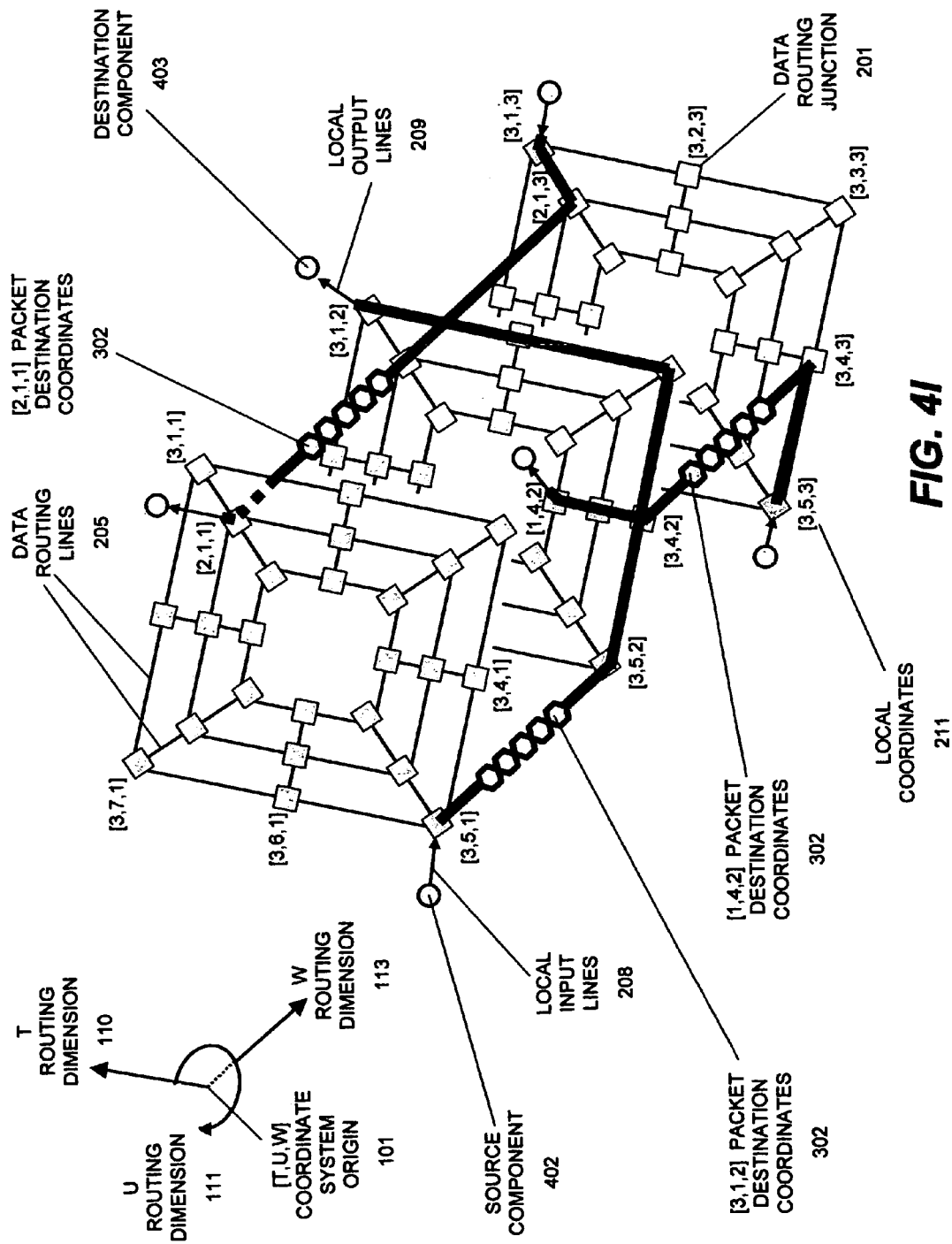
FIG. 4I shows a 3-dimensional cylindrical data routing fabric simultaneously transporting three data packets between three component pairs.

FIG. 4I shows a 3-dimensional embodiment of the multi-dimensional data routing fabric where the W dimension 113 represents a depth of a cylinder, the T dimension 110 represents a radial distance across the cylinder, and the U dimension 111 represents an azimuth rotation inside the cylinder. FIG. 4I shows three data packets 301 in transit between three pairs of components. Each packet transfer is composed of up to 3 routing segments aligned with the 3 routing dimensions U, T and W.

Using radial and azimuth dimensions (instead of othogonal) changes the data routing topography from a 3-dimensional box-like grid to a stack of spider web-like structures. While the data routing topography is different, the data routing junctions 201 implementing both types of structures are identical, thus rendering the embodiments with radial and azimuth dimensions conceptually equivalent to the orthogonal embodiments with the same number of dimensions.

Figure 4J:
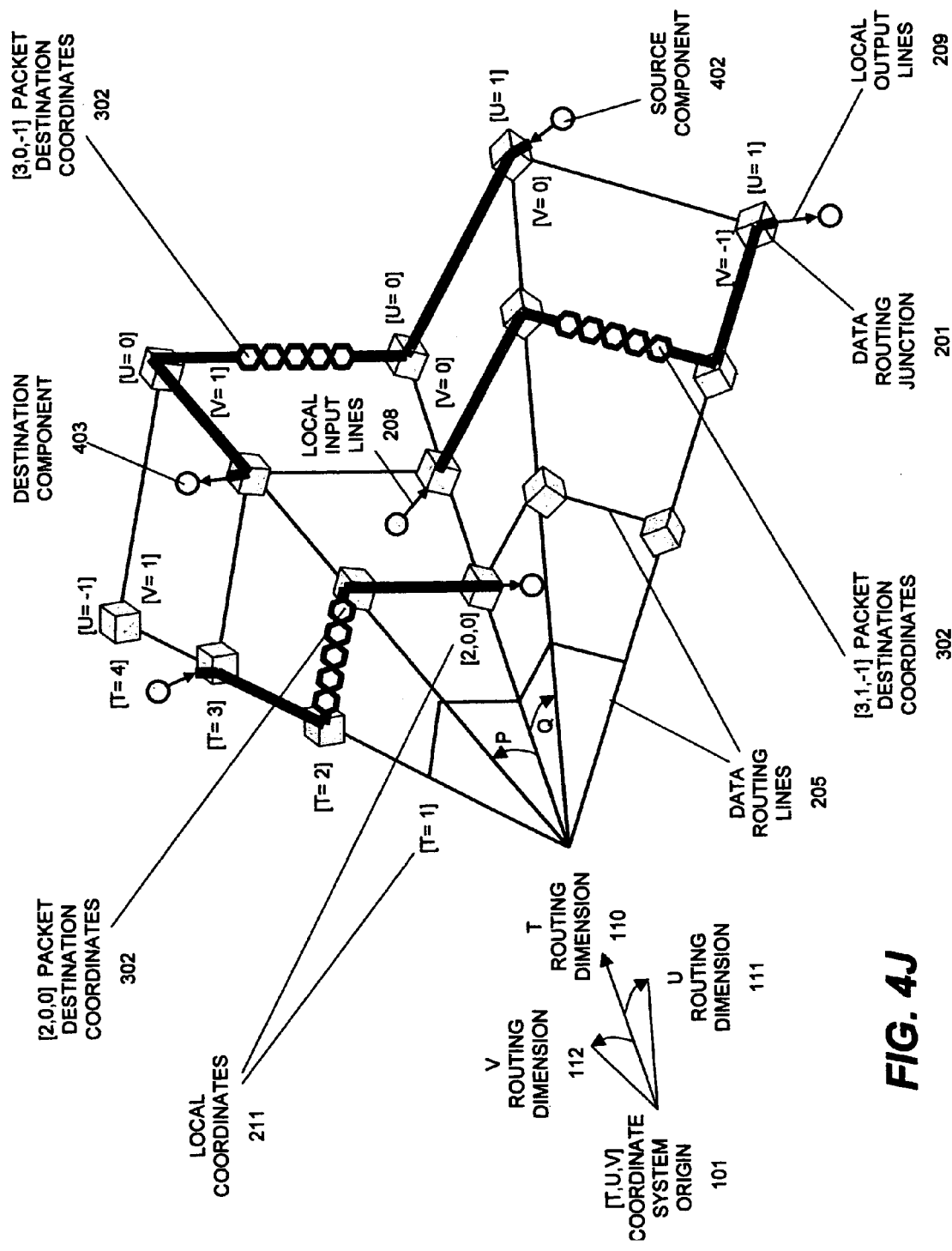
FIG. 4J shows a 3-dimensional spherical data routing fabric simultaneously transporting three data packets between three component pairs.

FIG. 4J shows a 3-dimensional embodiment of the multi-dimensional data routing fabric where the T dimension 110 represents a radial distance across a sphere, the V dimension 112 represents the elevation rotation within the sphere, and the U dimension 111 represents an azimuth rotation within the sphere. FIG. 4J shows three data packets 301 in transit between three pairs of components. Each packet transfer is composed of up to 3 routing segments aligned with the 3 routing dimensions T, V and U.

Using radial, elevation and azimuth dimensions (instead of orthogonal) changes the data routing topography from a 3-dimensional box-like grid to a 3-dimensional sphere with wedge-like primitives. While the data routing topography is different, the data routing junctions 201 implementing both types of structures can be identical, thus rendering the embodiments with radial, elevation and azimuth dimensions conceptually equivalent to the orthogonal embodiments with the same number of dimensions.

The multi-dimensional data routing fabric thus has the flexibility to re-use a common building block (data routing junctions 201) in constructing multi-dimensional data routing structures of different shapes. The ability of data processing structures to mirror the flow of application data allows for better mapping of computing hardware to applications, resulting in more efficient designs.

Figure 24:
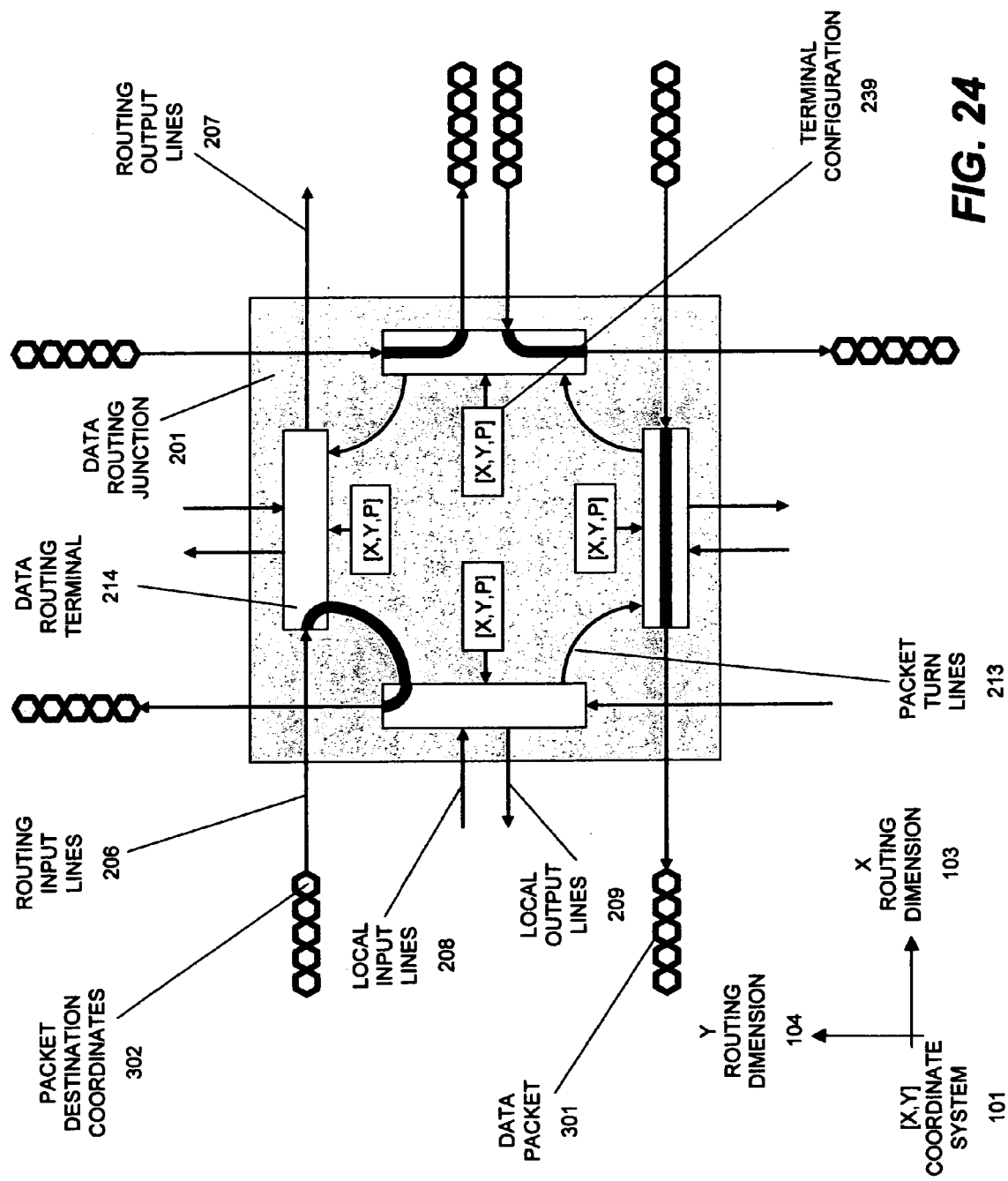
FIG. 24 shows a 2-dimensional, counter-clockwise data routing junction simultaneously transporting four data packets through edge-type data routing terminals, where each terminal has its own set of configuration data.

Inside the data routing junction 201 of the 3-dimensional embodiment (FIG. 15A), each data routing terminal 214 uses sets of packet turn lines 213 to connect in clockwise and counter-clockwise direction with data routing terminals 214 of two other dimensions. Other embodiments can connect fewer terminals or larger number of terminals in only clockwise or counter-clockwise direction (FIG. 24). In an extreme case, only adjacent data routing terminals 214 may be connected in either clockwise or counter-clockwise direction. In other extreme, every data routing terminal 214 may be connected to every other data routing terminal 214 in both clockwise and counter-clockwise directions. Any other combination of packet turn lines 213 is possible between the above extremes.

Embodiments using only clockwise or counter-clockwise turns can reduce the worst-case packet transfer latency across individual data routing terminals 214 by half, when compared to embodiments with both clockwise and counterclockwise turn routing. Worst-case latency is typically proportional to the number of sets of packet turn lines 213 entering the data routing terminals 214. Reducing this number by half, by using only the clockwise routing, improves the worst-case latency across a single terminal by a factor of 2. Worst-case latency can also be improved by reducing the number of clockwise or counter-clockwise connections between data routing terminals 214 inside data routing junctions 201.

A 2-dimensional embodiment in FIG. 15B shows in detail a set of counter-clockwise packet turn lines 213 in addition to the clockwise set of packet turn lines 213.

A different, 2-dimensional embodiment in FIG. 11C shows a set of packet turn lines 213 connecting opposite directions of the same Y routing dimension 104. This U-turn capability allows the routing logic in data routing terminals 214 to reverse the path of data packets 301 that are moving away from their destinations, thus providing an alternative solution to the turnaround lines 204 (FIG. 5B) that reflect packets at the edge of the system.

Figure 11E:
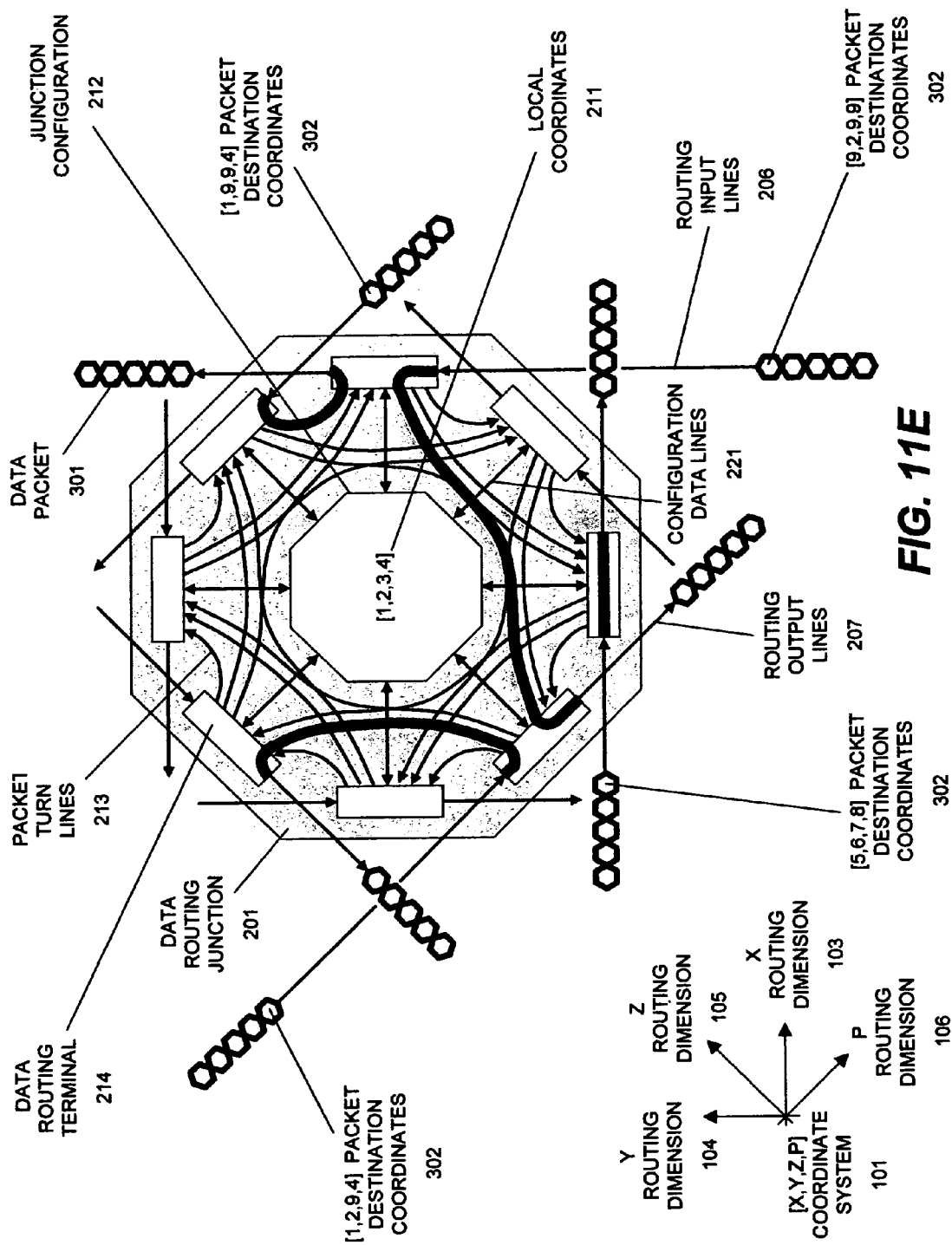

Using assorted combinations of packet turn lines 213 in data routing junctions 201 is not limited to just 2- or 3-dimensional embodiments, but can also be applied in 4-dimensional embodiments and embodiments of any number of dimensions. FIG. 11E shows a 4-dimensional embodiment of the data routing junction 201 connecting data routing terminals 214 in the clockwise direction, so that data packets 301 in each routing dimension can turn to any other dimension. In an another 4-dimensional embodiment, the terminals could be connected with one set of clockwise packet turn lines 213 and a second set of packet turn 213 lines in the counter-clockwise direction, thus enabling packets in each routing dimension to turn to any direction of any other dimension.

System components 401 in the preferred embodiment of the multi-dimensional data routing fabric are capable of sending and receiving data packets 301, as shown in FIG. 9. In other embodiments the routing fabric may be connecting components that only receive data packets 301, or components that only send data packets 301.

FIG. 7 shows a system component 401 that can send data packets 301 to other components, but which has no capability of receiving packets from other components. Inside the component, a data processing unit 404 launches new data packets 301 by issuing write bus cycles to the write interface 406. The contents of the data output bus 409 become the packet's payload 304, while the destination coordinates field 412 of the address bus 410 becomes the packet's destination coordinates 302. The write interface 406 uses the exit direction field 411 of the address bus 410 to launch the assembled data packets 301 through the desired set of local input lines 208.

FIG. 8 shows a system component 401 that can only receive data packets 301 from other components, but which has no capability of launching packets to other components. Inside the component, a data packet 301 arrives at the read interface 405 through a set of local output lines 209. The packet destination coordinates 302 are discarded, while the packet payload field 304 is placed by read interface 405 on the data input bus 408 of the local parallel bus 407. The data processing unit 404 on the parallel bus 407 issues a read cycle to receive the packet payload 304.

As seen in FIG. 10A, multiple packets arriving at the read interface 405 are first combined into a single packet stream inside the read mux 418 circuit. The read control 419 circuit of the 3-dimensional embodiment controls the output packet stream using an interleaving method to minimize average waiting time for packet inside the read mux 418. This type of packet interleave control, where multiple packets have equal priority to pass through multiplexing logic, may also be used to regulate the flow of packets through the packet mux 219 of the data routing terminal 214 (FIG. 20). Other control methods can also be used to determine the order in which packets leave the read mux 418 circuit.

FIG. 10A also shows short data packets 301 of the preferred embodiment having packet payload 304 and packet destination coordinates 302 for locating the destination component 403 in a multi-dimensional coordinate system. While the above two fields are sufficient for routing of packets through the multi-dimensional data routing fabric, other fields may be inserted into packets to further improve the packet transport performance.

Figure 10B:
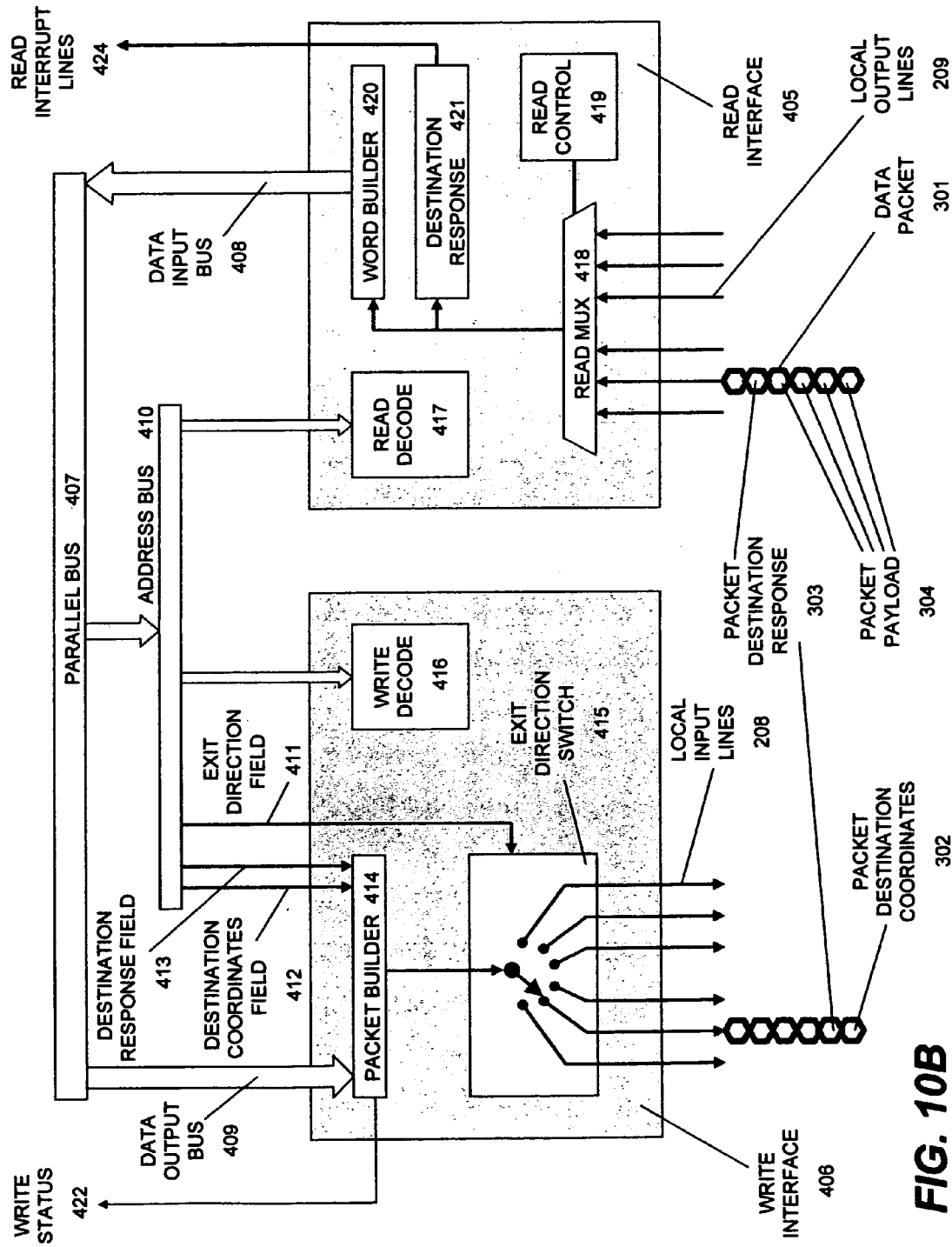
FIG. 10B shows the write interface circuit and the read interface circuit for writing and reading of long data packets.

FIG. 10B shows a write interface 406 and a read interface 405 circuits for respectively launching and receiving of long data packets 301 with an additional packet destination response field 303. The write interface 406 circuit generates the packet destination response 303 field from the destination response field 413 of the address bus 410. Upon arrival at the read interface circuit 405 of the destination component 403, the packet's destination response field 303 is routed to the destination response circuit 421 where it is converted to a set of read interrupt lines 424. The read interrupt lines 424 can be connected to interrupt inputs of the data processing unit 404 receiving the packet, thus triggering specific interrupt service routines for processing of arriving packets, based on packet classification encoded in the destination response field 303.

FIG. 1F shows a more detailed view of the long data packet 301 including the packet destination response 303 field.

Data processing units 404 can access the multi-dimensional data routing fabric through other means than a parallel bus 407. Read and write interfaces 406 can be easily modified to allow data processing units 404 with other interfaces (conventional on unconventional) to transmit and receive data to or from the multi-dimensional data routing fabric.

Figure 21:
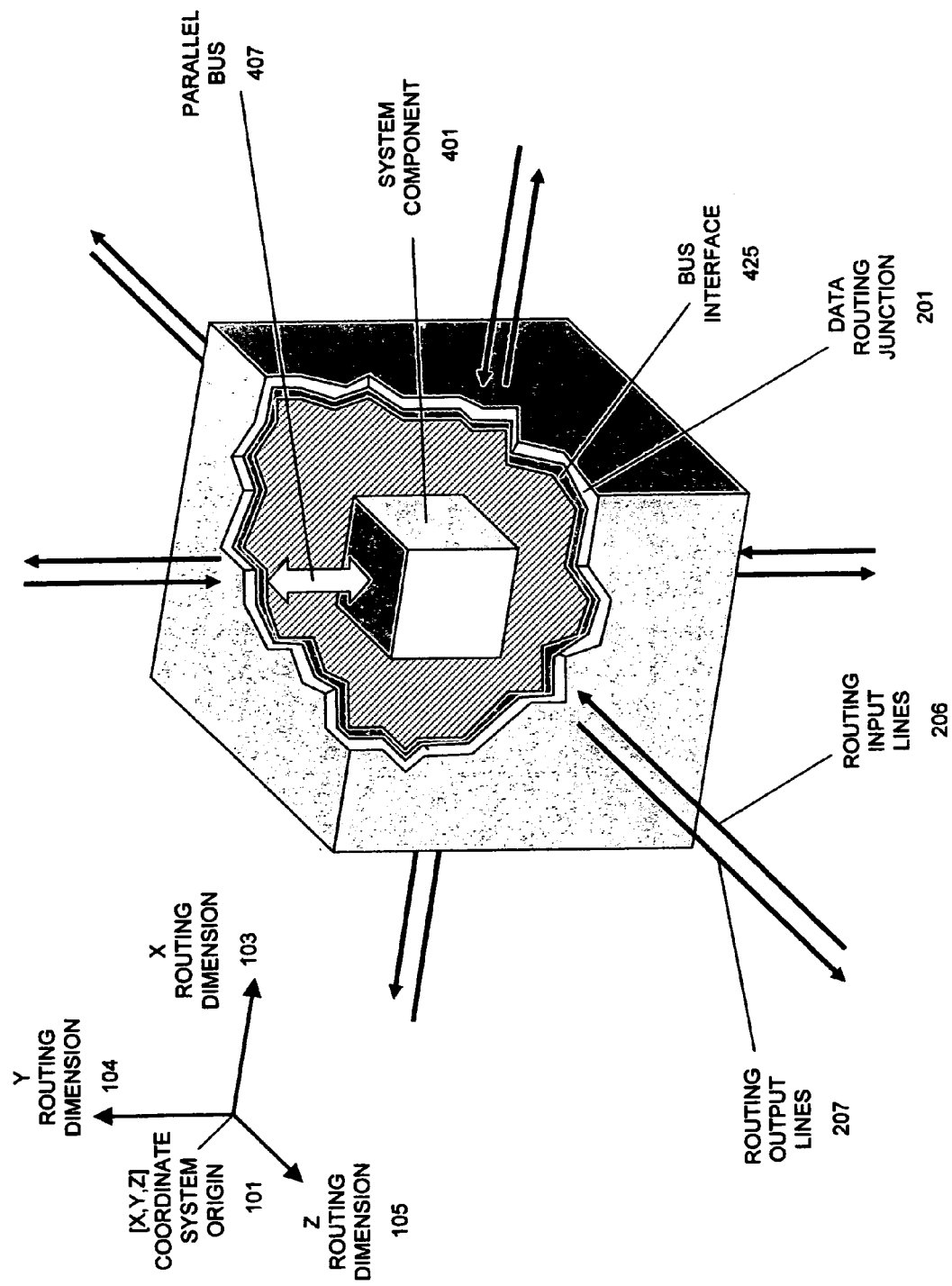
FIG. 21 shows a system component placed inside a 3-dimensional data routing junction, communicating with the data routing junction via a bus interface shell.

FIG. 5B shows system components 401 as attached to their respective data routing junctions 201 with both the components and junctions existing side by side on the same structural level. In addition to flat system representations, components and data routing junctions 201 can be arranged on different structural levels where, for example, the system components 401 are placed inside the data routing junctions 201. FIG. 21 shows a bus-based system component 401 surrounded by a bus interface 425 wrapper and a data routing junction 201 wrapper.

Figure 22:
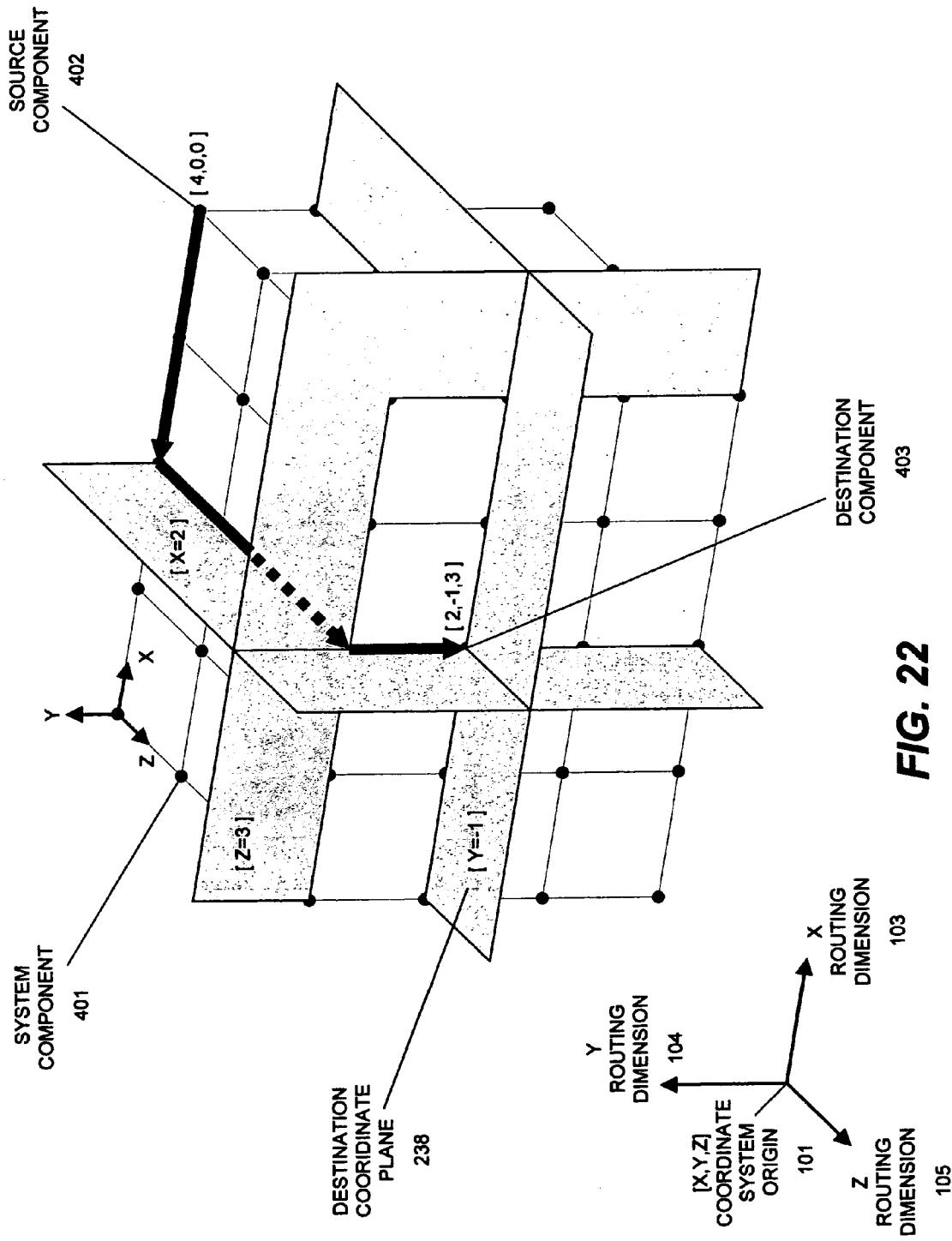
FIG. 22 shows three destination coordinate planes guiding a data packet through a 3-dimensional data routing fabric toward its destination component.

FIG. 22 shows a 3-dimensional array of system components 401, each surrounded by a dedicated data routing junction 201. A source component 402 with [X,Y,Z] local coordinates 211 of [4,0,0] launches a data packet 301 in the negative routing direction 102 of the X routing dimension 103. The [X,Y,Z] packet destination coordinates 302 encoded in the packet's header are [2,−1,3]. In this embodiment, the data routing junctions 201 along the packet's path turn the packet toward it's destination each time the packet hits one of the destination coordinate planes 238, where at least one coordinate of the destination component 403 is matched by the current location of the packet. Packet exits into the destination component 403 when the current packet location matches all destination coordinate planes 238.

A bus interface wrapper 425, like the one with read and write interfaces 406 in FIG. 9, is only necessary if the system 401 component uses a data bus to communicate with the outside world. Many fixed-function data processing components with multiple input and output ports can connect directly to local input lines 208 and local output lines 209 of data routing junctions 201, without the need a bus interface 425.

Multiple input ports to a data processing system component 401 require a destination port address 314 to be inserted inside packet headers for directing the data routing junctions 201 to exit the data packet 301 into the destination component 403 through a predetermined set of local output lines 209.

Data packet 301 headers can also include a packet type identifier 312 that can be used by data routing junctions 201 to modify the rest of the header when a data packet 301 emerges from a fixed-function data processing component that must be shared between multiple data flow threads, each with a different next-stop destination.

Figure 23:
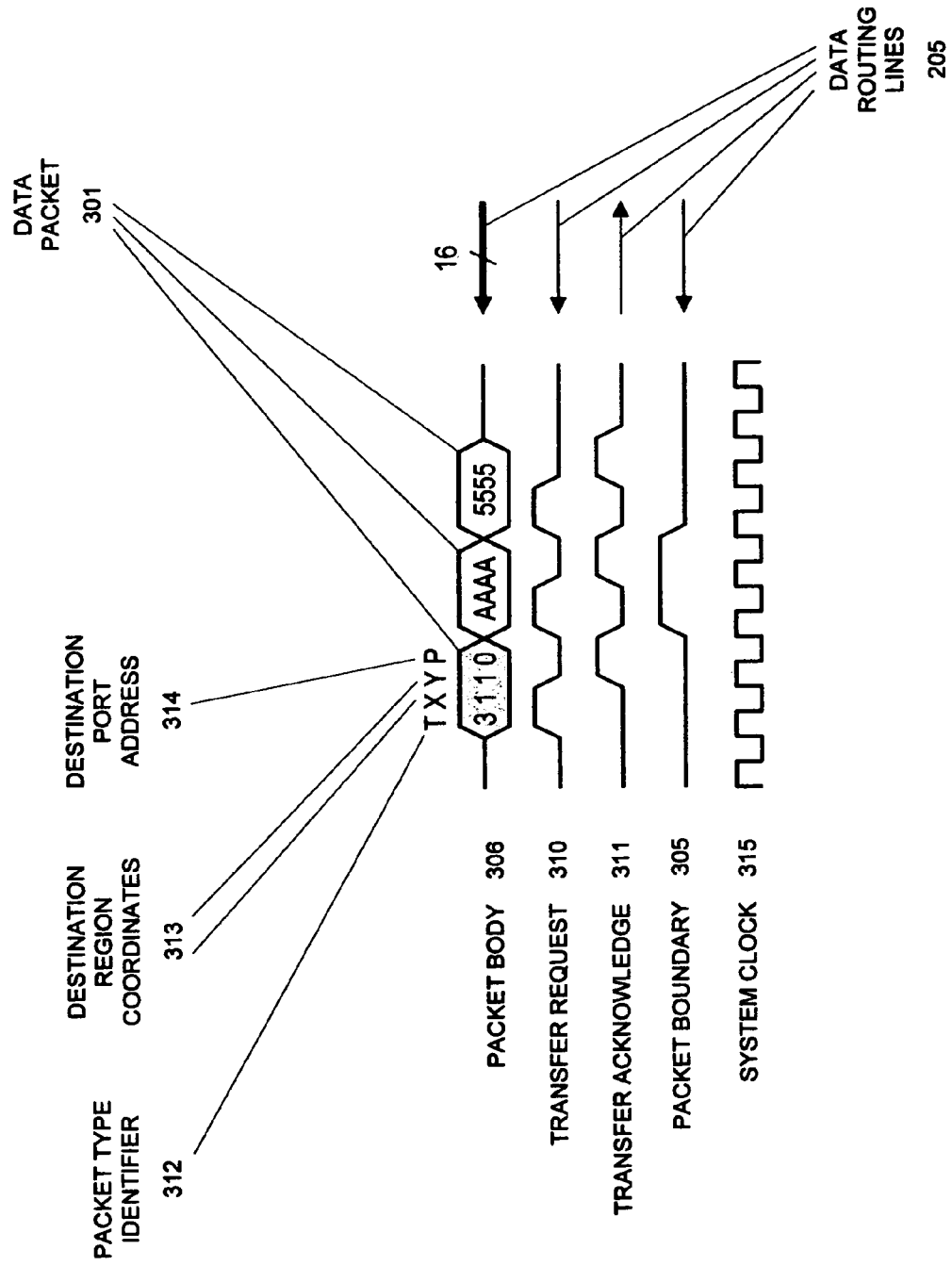
FIG. 23 shows a request/acknowledge signal pair controlling the flow of a packet through a set of data routing lines, to a destination port of a destination region.

FIG. 23 shows a data transfer waveform of a 2-dimensional embodiment where packet headers include the destination port address 314 and the packet type identifier 312, in addition to the [X,Y] destination region coordinates 313.

In addition to a set of packet body lines 306, some embodiments may also use a packet boundary control line 305 to distinguish between multiple packets in a stream of packets and to control the length of individual packets. Various embodiments may also use a set of transfer request 310 and transfer acknowledge 311 handshake lines to determine on which edges of the system clock 315 the individual data packet 301 segments are placed on the packet body 306 lines (FIG. 23).

While data routing junction 201 of the preferred embodiment uses a common set of junction configuration 212 data to control exit of data packets 301 through multiple sets of local output lines 209 (FIG. 15A), each set of local output lines 209 can be individually addressed with a dedicated set of terminal configuration 239 data.

FIG. 24 shows a 2-dimensional embodiment of a data routing junction 201 with 4 data routing terminals 214, each having a dedicated terminal configuration 239 unit containing a set of local coordinates 211 and a local port address 240. Each set of local coordinates 211 can lead to a different system component 401, and each local port address 240 can lead to a specific entry port within that component. This type of packet routing makes it possible for a single data routing junction 201 to deliver data through predetermined ports to 4 different destination components 403.

The arrangement of data routing terminals 214 within data routing junctions 201 can vary according to the connectivity needs of individual system applications.

In the 2-dimensional embodiment shown in FIG. 24, individual data routing terminals 214 are each aligned with a specific routing 102 direction of a specific routing dimension, with the local input lines 208 and the local output lines 209 attached to the data routing junction 201 vertically and horizontally. In this arrangement data packets 301 that change their direction of travel have to pass through two data routing terminals 214, while packets that don't, only pass through a single data routing terminal 214.

Figure 25:
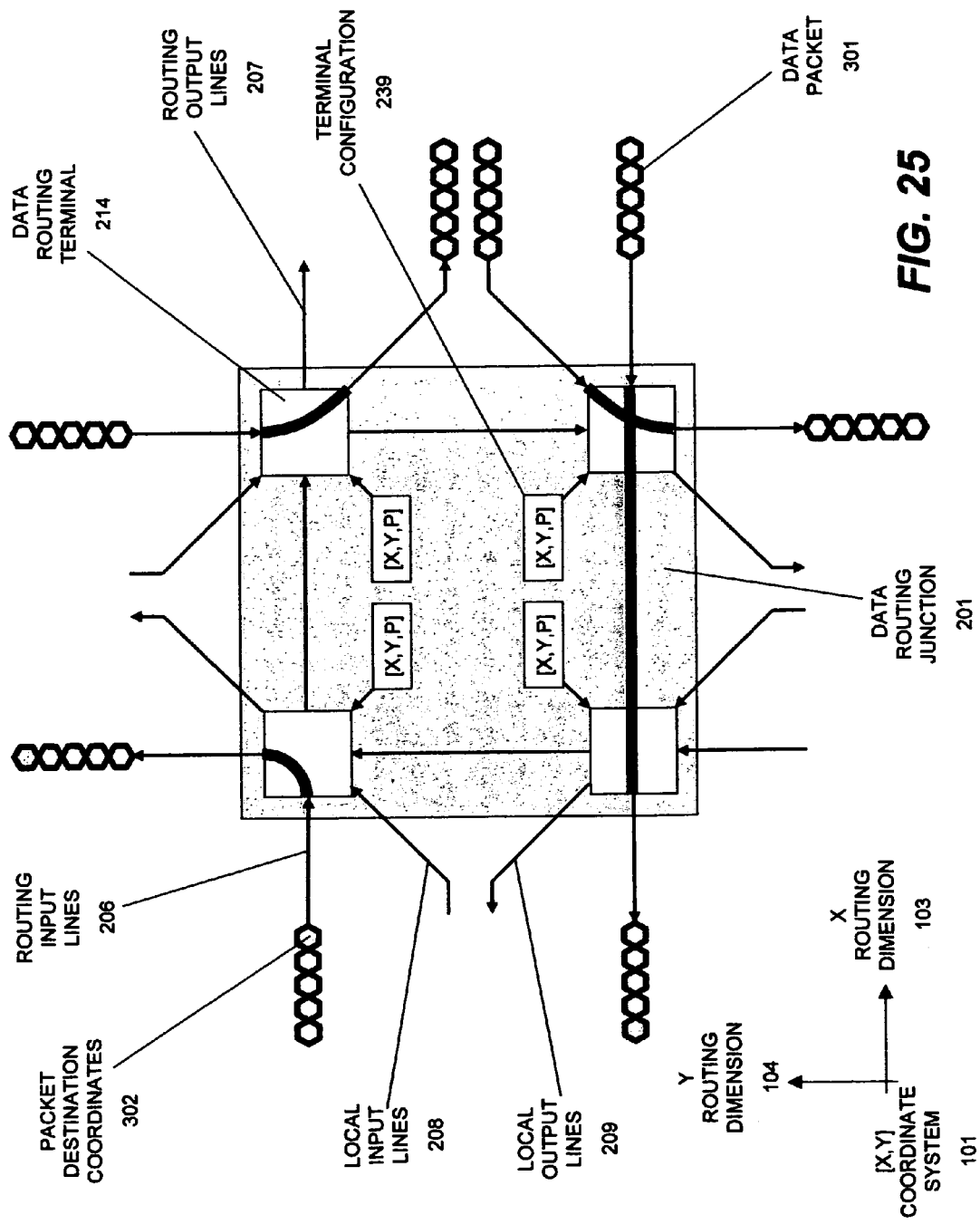
FIG. 25 shows a 2-dimensional data routing junction simultaneously transporting four data packets through corner-type data routing terminals, where each terminal has its own set of configuration data, and where local input lines and local output lines are attached to the edges of the data routing junction.

FIG. 25 shows a different arrangement of data routing terminals 214 within a data routing junction 201, where data packets 301 that change their direction of travel have to pass through one data routing terminal 214, and packets that do not change direction must pass through two data routing terminals 214.

Individual system applications may also dictate how the sets of local input lines 208 and local output lines 209 are attached to the data routing junctions 201.

FIGS. 24 and 25 show local input lines 208 and local output lines 209 attached to the top, bottom, left and right edges of the data routing junctions 201.

Figure 26:
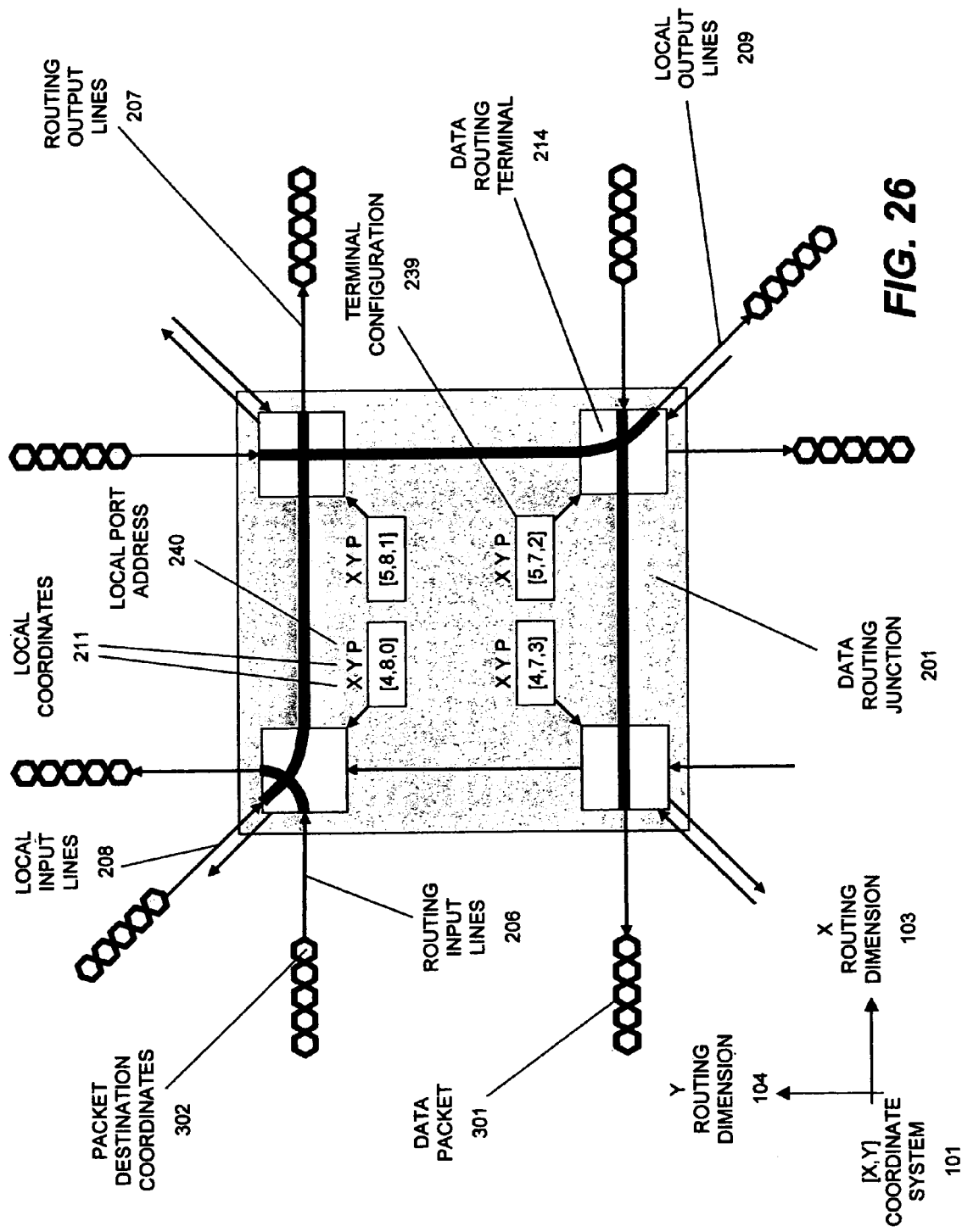
FIG. 26 shows a 2-dimensional data routing junction simultaneously transporting four data packets through corner-type data routing terminals, where each terminal has its own set of configuration data, and where local input lines and local output lines are attached to the outside corners of the data routing junction.

FIG. 26 shows diagonal local input lines 208 and local output lines 209 attached to the corners of the data routing junction 201. The diagonal placement of local input lines 208 enables positioning of system components 401 inside the square areas bounded by the data routing line 205 threads stretched between sets of four adjacent data routing junctions 201 of the multi-dimensional data routing fabric (FIGS. 28A–G). This type of positioning of system components 401 inside areas bounded by adjacent data routing junctions 201 enables efficient on-chip placement and routing.

The data routing junction 201 of FIG. 26 also includes a set of values inside each of the four terminal configuration 239 units for [X,Y] local coordinates 211 and for [P] local port addresses 240. These terminal configuration values determine that data packets 301 entering the data routing junction 201 can exit the multi-dimensional data routing fabric through local ports [0], [1], [2] or [3] into a respective one of four components with [X,Y] local coordinates 211 of [4,8], [5,8], [5,7] or [4,7].

Depending on the structural relationship existing between system components 401 and data routing junctions 201, the local input lines 208 and local output lines 209 can extend out from data routing junctions 201 or be contained on the inside of the data routing junctions 201 that may be wrapped around system components 401.

Figure 27:
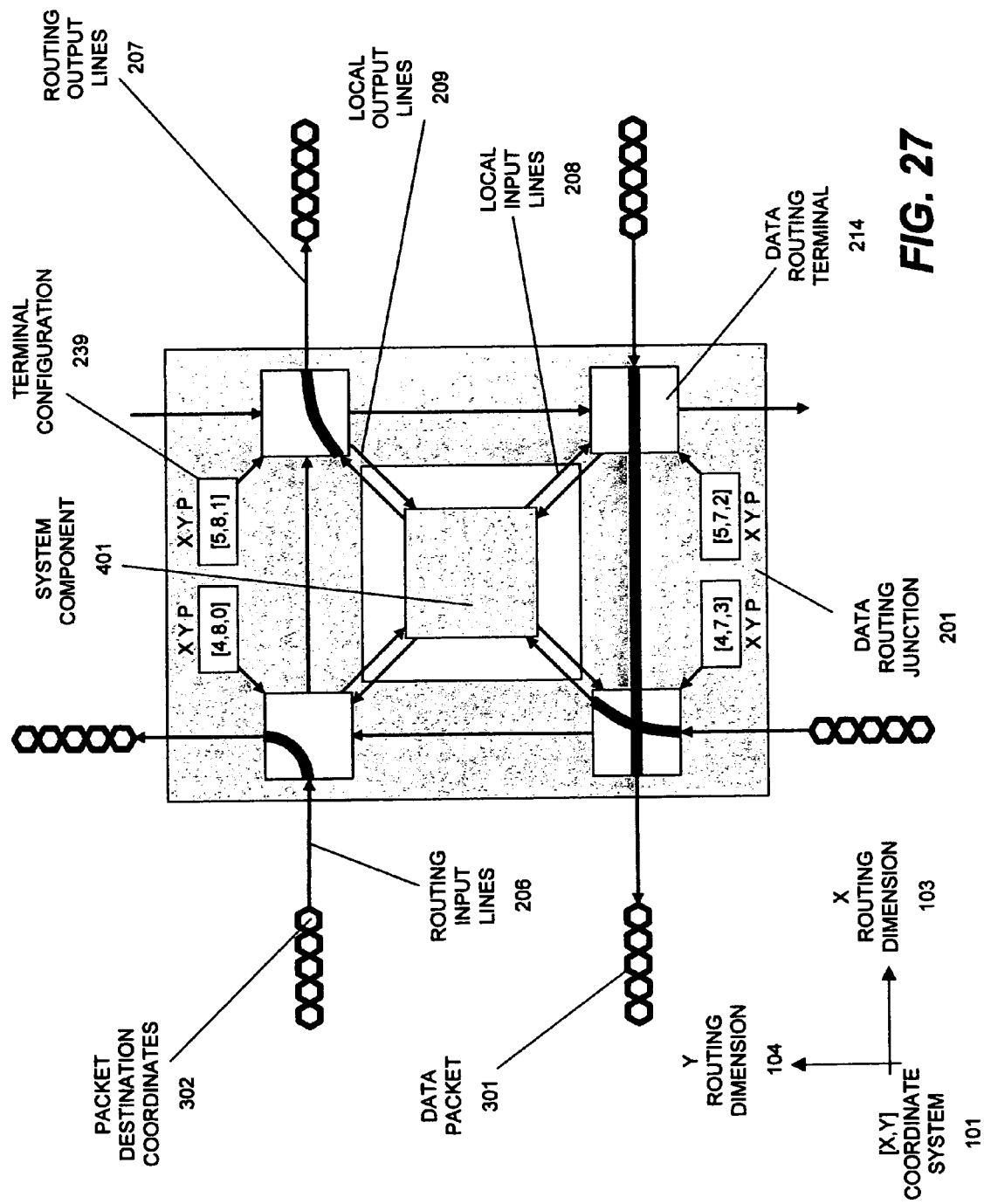
FIG. 27 shows a 2-dimensional data routing junction simultaneously transporting four data packets through corner-type data routing terminals, where each terminal has its own set of configuration data, and where local input lines and local output lines are attached to the inside corners of the data routing junction.

FIG. 27 shows a system component 401 residing inside a data routing junction 201, both interconnected with 4 diagonal sets of local input lines 208 and 4 diagonal sets of local output lines 209. Data packets 301 entering the data routing junction 201 through a set of routing input lines 206 can enter the system component 401 inside the data routing junction 201 through a predetermined set of local output lines 209. Conversely, data packets 301 that are leaving the system component 401 through one of the sets of local input lines 208, enter the multi-dimensional data routing fabric outside the data routing junction 201 through a predetermined set of routing output lines 207.

FIGS. 28A–G show a 2-dimensional embodiment of the multi-dimensional data routing fabric composed of a 4 by 4 array of data routing junctions 201 of the type shown in FIG. 26. System components 401 communicate through this embodiment of the multi-dimensional data routing fabric via data entry ports 235 and data exit ports 236 located at each data routing junction 201. Each data entry port 235 enables a source component 402 to launch data packets 301 into the fabric through a set of local input lines 208. Each data exit port 236 enables a destination component 403 to receive data packets 301 from the fabric through a set of local output lines 209.

After being launched into the data routing junction 201 with [X,Y] local coordinates 211 of [5,4], the data packet 301 in FIGS. 28A–G makes a series of turns and straight through passes through a contiguous chain of intermediate data routing junctions 201 to converge on its destination component 403 with [X,Y] local coordinates 211 of [8,9].

The data routing terminals 214 of the intermediate data routing junctions 201 along the path decide to turn the data packet 301 or pass it straight through by comparing its [X,Y] local coordinates 211 to the [X,Y] destination region coordinates 313 encoded in the packet header.

Figure 28A:
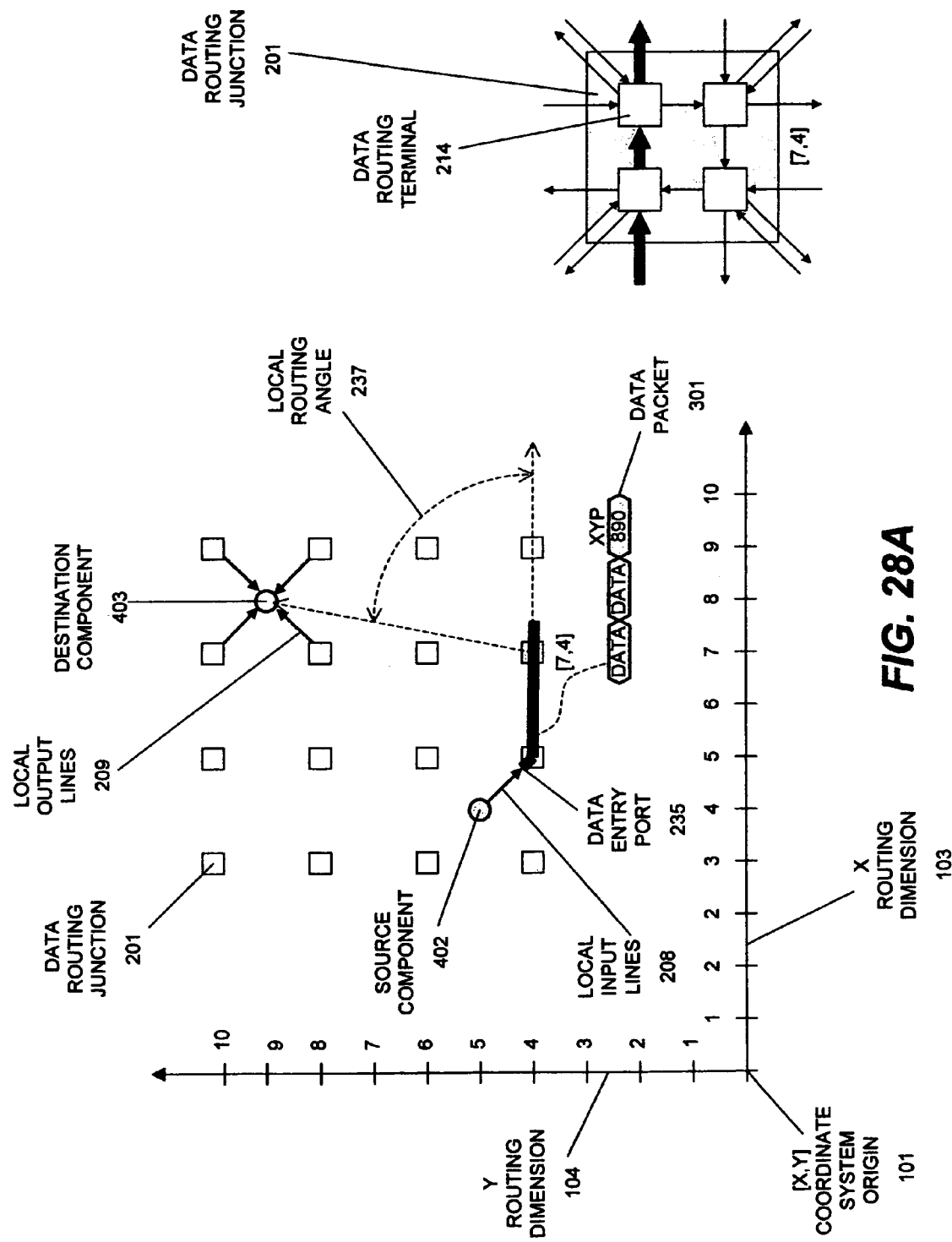
FIG. 28A shows a horizontal data packet passing straight through a data routing junction because its local routing angle is smaller then 90 degrees.

In this embodiment a data packet 301 is turned to the left if the local routing angle 237 between the direction of the current packet path and the line from the current packet location to the destination component 403 is smaller then 90 degrees. FIG. 28A shows the data packet 301 passing straight through the data routing junction 201 [7,4] since the local routing angle 237 is smaller then 90 degrees.

FIG. 28B shows the data packet 301 turning left at the [9,4] data routing junction 201 because the local routing angle 237 is now larger then 90 degrees.

Figure 28C:
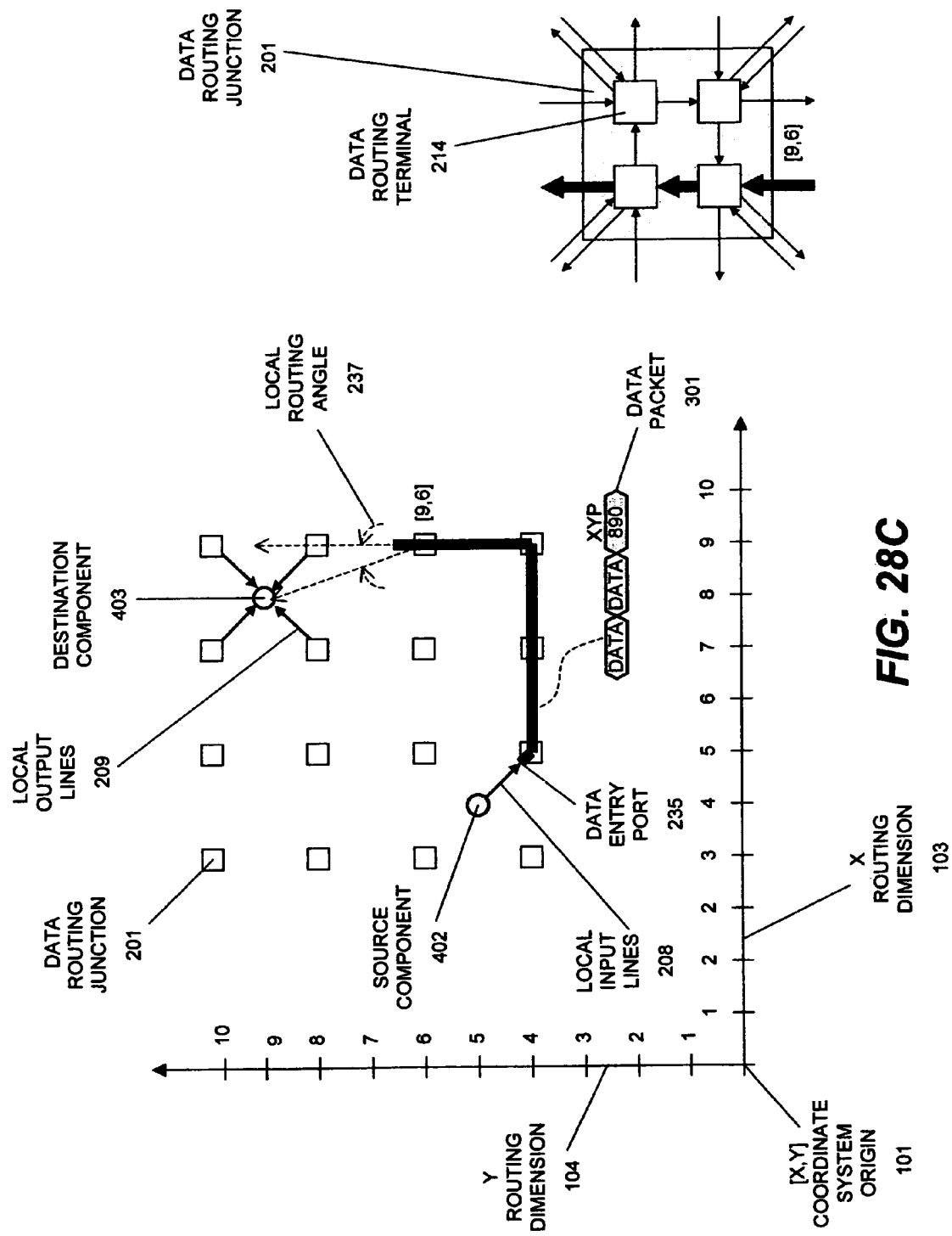
FIG. 28C shows a vertical data packet passing straight through a data routing junction because its local routing angle is smaller then 90 degrees.

In FIG. 28C, the data packet 301 is passing straight through the [9,6] data routing junction 201 since the local routing angle 237 is once again smaller then 90 degrees.

Figure 28D:
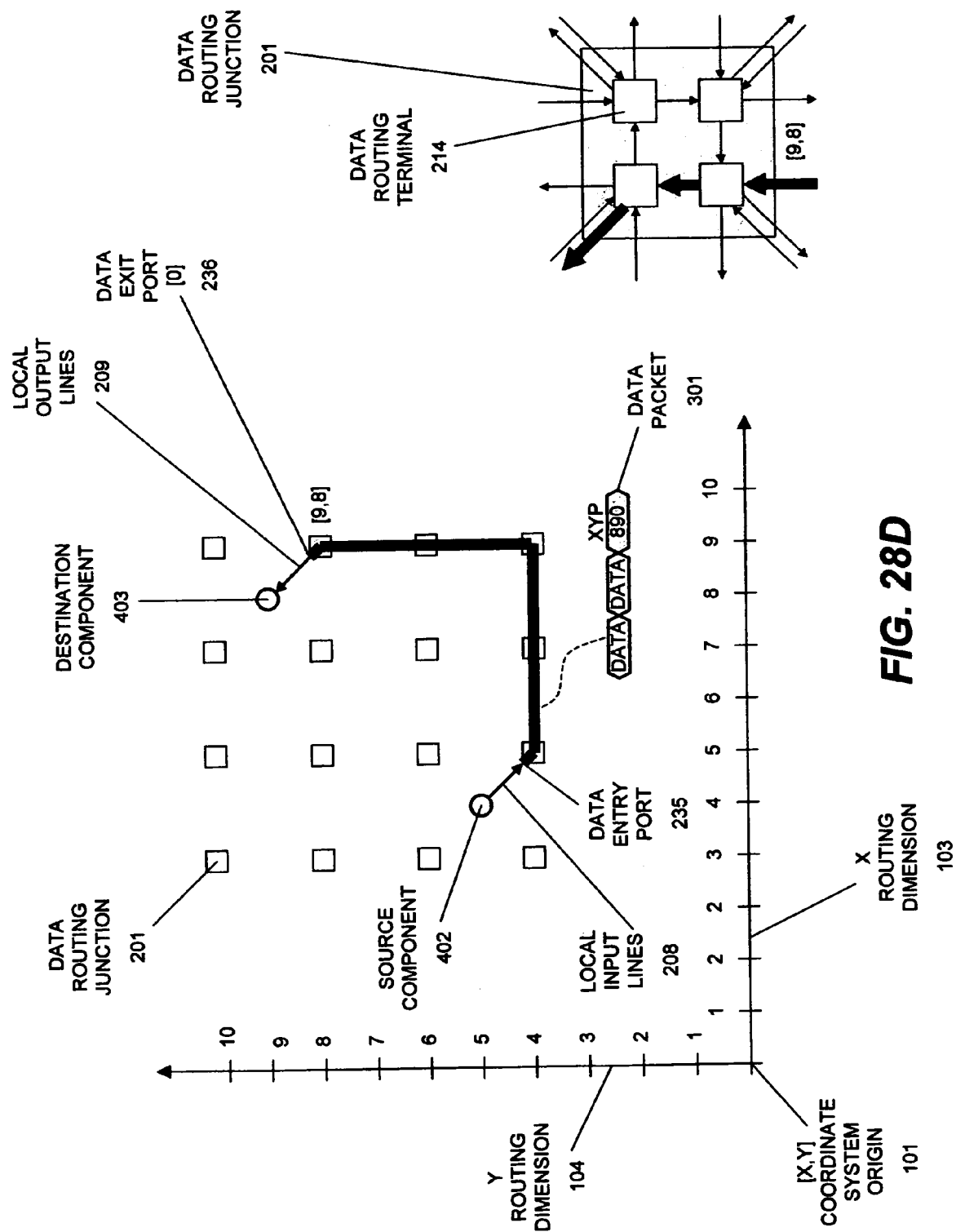
FIG. 28D shows a vertical data packet exiting to its destination component because its destination port address matches the current local port address, and its destination region coordinates are adjacent to the current local coordinates.

FIG. 28D shows the data packet 301 arriving at the [9,8] data routing junction 201, which is connected to the [8,9] destination component 403 through the [0] data exit port 236. At this point the data packet 301 exits the fabric into the destination component 403, since the destination region coordinates 313 and the destination port address 314 of the packet header now both match the local coordinates 211 and the local port address 240 that is stored in the terminal configuration 239 of the upper left data routing terminal 214 of the data routing junction 201 [9,8].

If the packet destination region coordinates 313 match the local coordinates 211, but the packet destination port address 314 does not match the local port address 240, the data routing terminal 214 once again uses the size of the local routing angle 237 to determine whether to turn or to go straight.

Figure 28E:
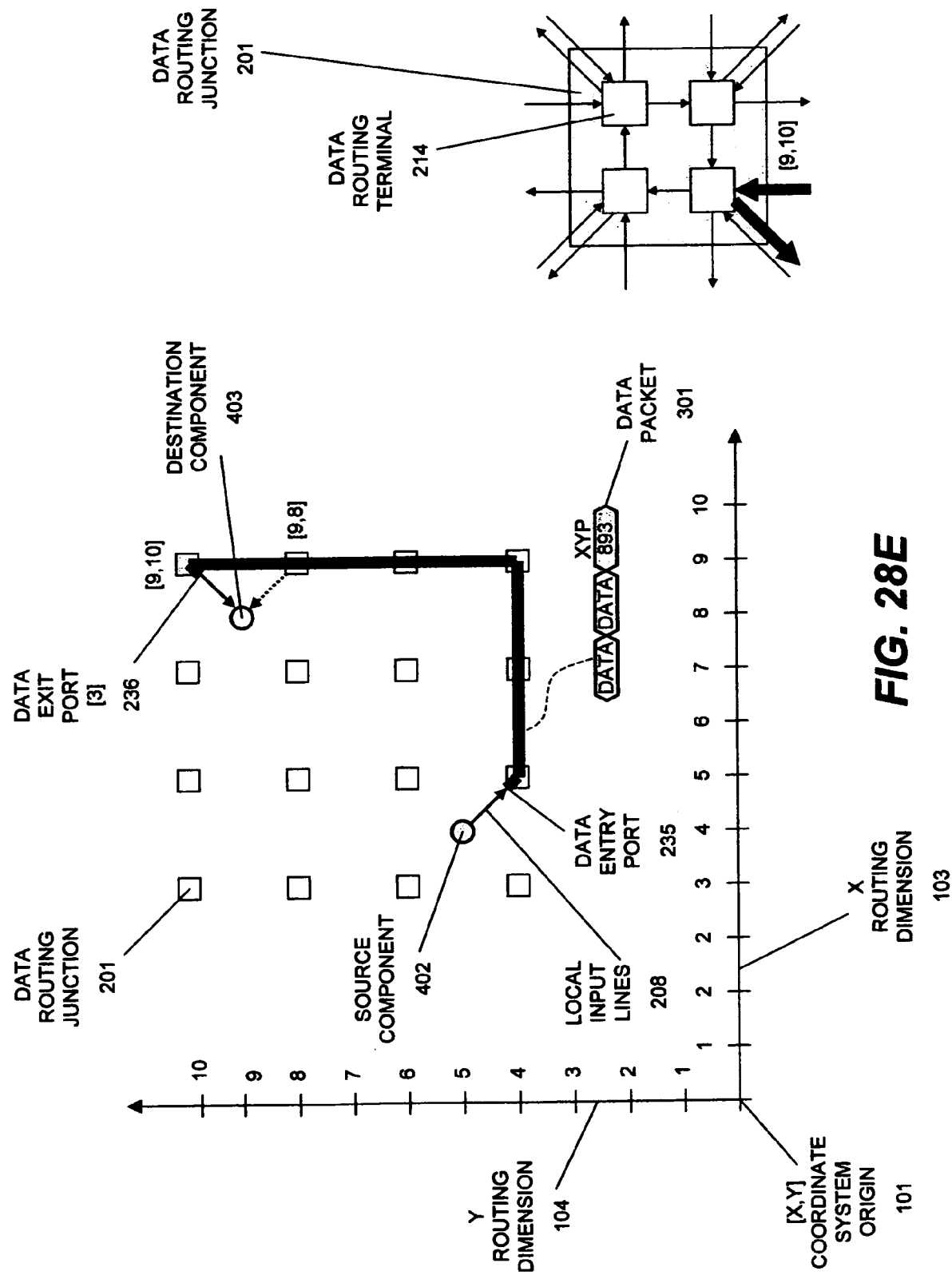
FIG. 28E shows a vertical data packet passing straight by one set of local output lines to exit through another set, because its destination port address does not match the current local port address, and its local routing angle is smaller then 90 degrees.

FIG. 28E shows the data packet 301 passing straight through the [9,8] local routing junction 201 because its [3] destination port address 314 does not match the [0] local port address 240, and the local routing angle 237 is smaller then 90 degrees. Finally, the packet exits through the local output lines 209 of the lower left data routing terminal 214 of the data routing junction 201 [9,10] as the data packet's 301 destination port address 314 [3] now matches the local port address 240 [3] that is stored in the terminal configuration unit 239 of the lower left data routing terminal.

Figure 28F:
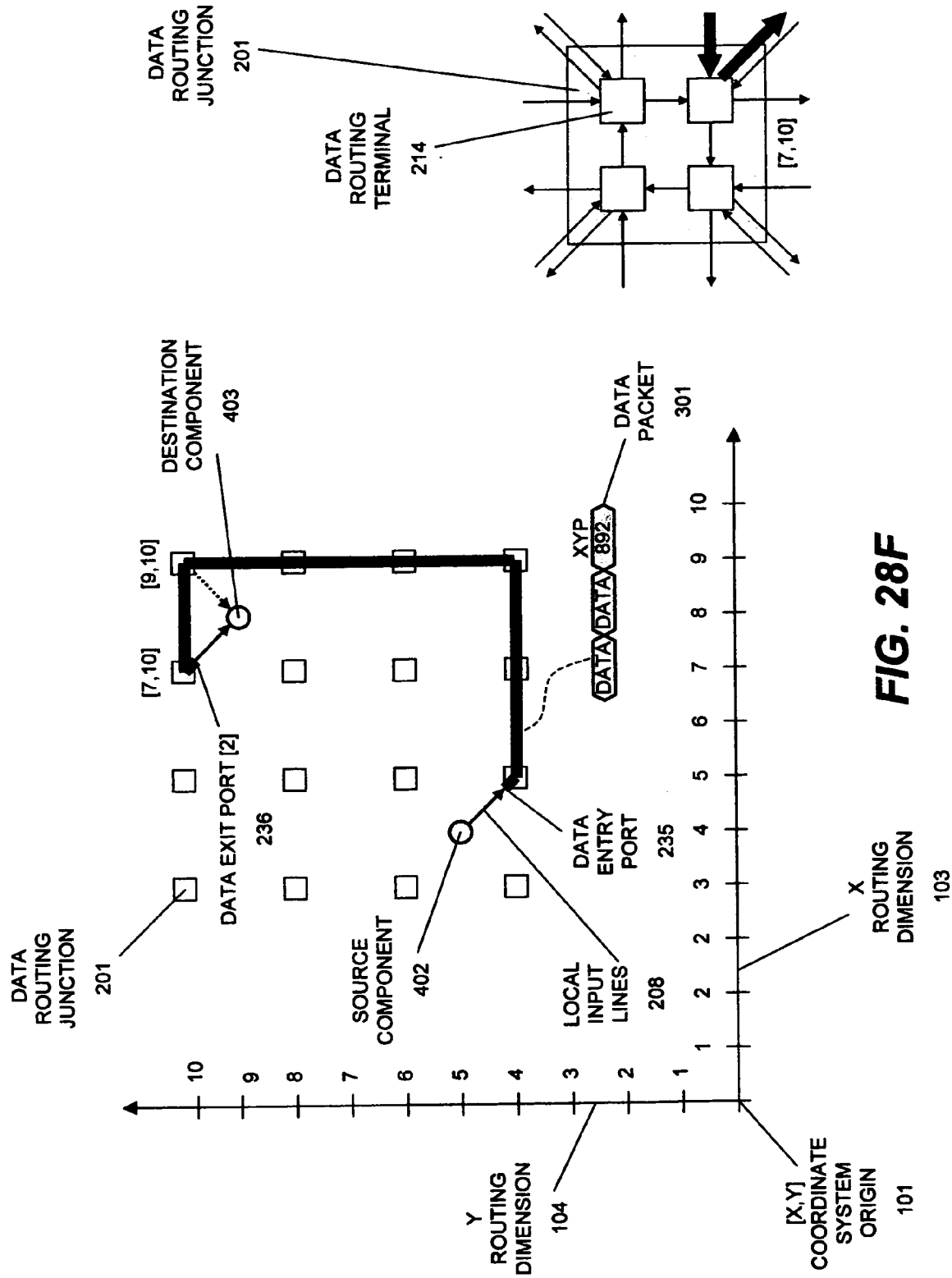
FIG. 28F shows a vertical data packet making a left turn by one set of local output lines to exit through another set, because its destination port address does not match the current local port address, and its local routing angle is larger then 90 degrees.

FIG. 28F shows the data packet 301 making a left turn at the [9,10] local routing junction 201 because its [2] destination port address 314 does not match the [3] local port address 240, and the local routing angle 237 is larger then 90 degrees. Finally, the packet exits through the local output lines 209 of the lower right data routing terminal 214 of the data routing junction 201 [7,10] as the data packet's 301 destination port address 314 [2] now matches the local port address 240 [2] that is stored in the terminal configuration unit 239 of the lower right data routing terminal 214.

Figure 28G:
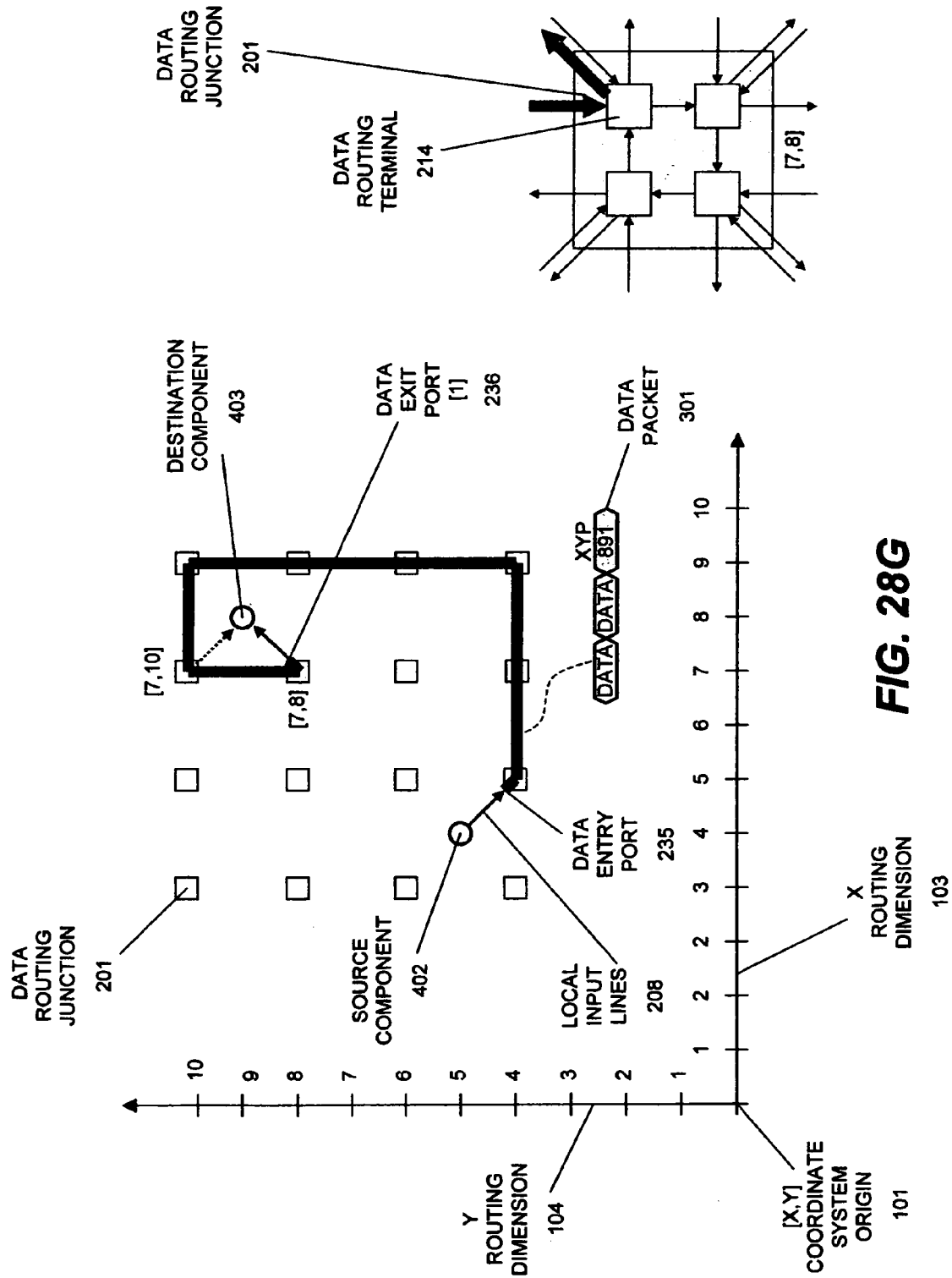
FIG. 28G shows a horizontal data packet making a left turn by one set of local output lines to exit through another set, because its destination port address does not match the current local port address, and its local routing angle is larger then 90 degrees.

FIG. 28G shows the data packet 301 making a left turn at the [7,10] local routing junction 201 because its [1] destination port address 314 does not match the [2] local port address 240, and the local routing angle 237 is larger then 90 degrees. Finally, the packet exits through the local output lines 209 of the upper right data routing terminal 214 of the data routing junction 201 [7,8] as the data packet's 301 destination port address 314 [1] now matches the local port address 240 [1] that is stored in the terminal configuration unit 239 of the upper right data routing terminal 214.

While both the data processing system components 401 and the data routing junctions 201 of FIGS. 28A–G are placed at uniquely addressable [X,Y] coordinates (odd values for the routing junctions 201 and even values for the components), the addressing range for a given size of the destination region coordinates 313 field inside a header of a data packet 301 can be doubled, if only the system components 401 are addressed directly.

Figure 29:
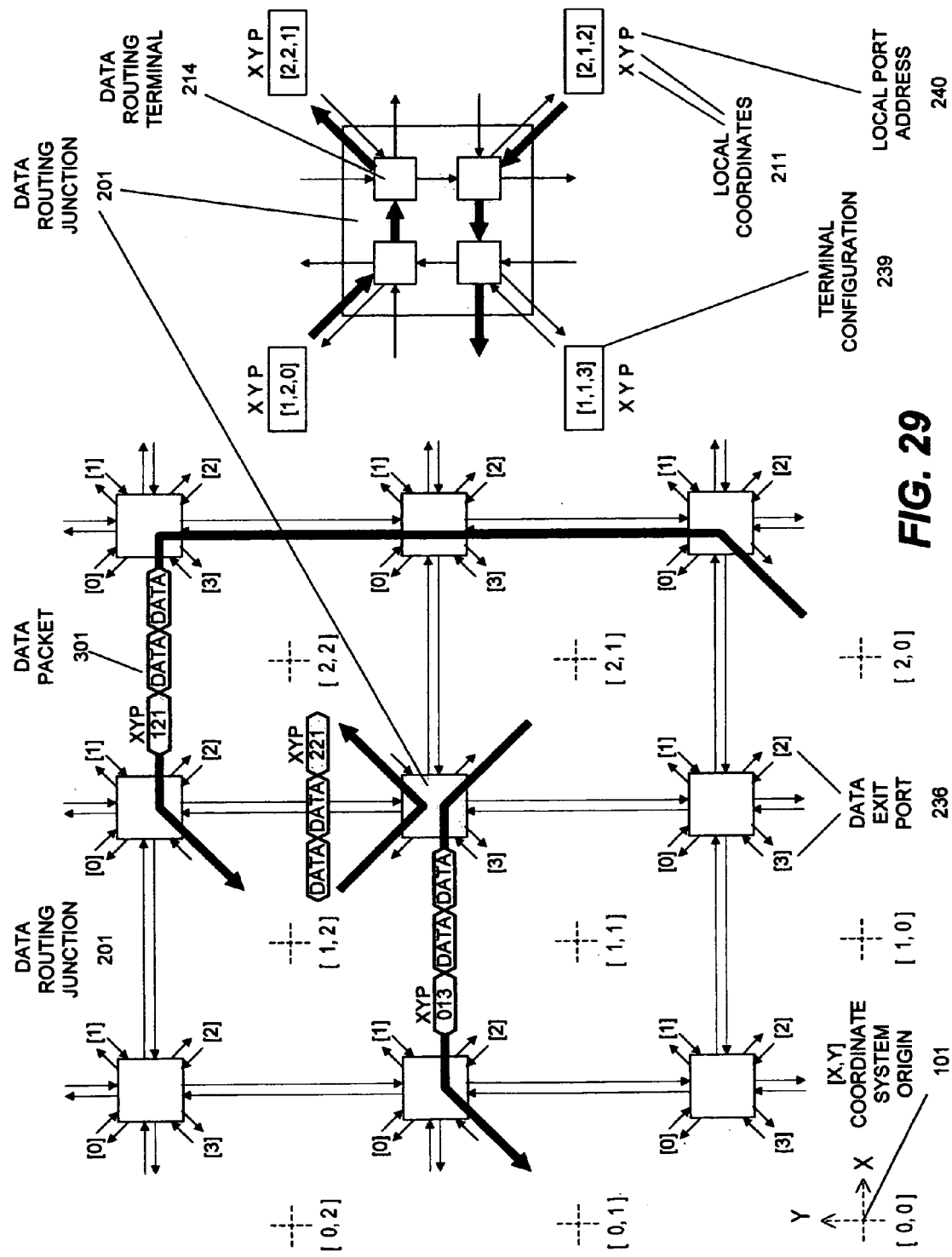
FIG. 29 show three data packets simultaneously converging on the destination port addresses of their respective destination regions, along contiguous chains of 2-dimensional data routing junctions.

FIG. 29 shows three simultaneously occurring data transfers through a 2-dimensional embodiment of the multi-dimensional data routing fabric, where only the system components 401 are addressed directly (with both odd and even values), and where the locations of the data routing junctions 201 are implied to exist in-between the adjacent system components 401.

As shown in FIG. 29, the [X,Y] locations of the data routing junctions 201 can be implied, because the local coordinates 211 inside terminal configuration units 239 of each data routing junction 201 must only be aware of the specific [X,Y] locations of the adjacent system components 401, while relying on the implied [X,Y] locations of the routing junctions 201 to perform packet routing calculations.

Alternative Embodiments

There are various possibilities with regard to how the packet pass, turn, entry and exit functions are implemented when routing data packets 301 through multi-dimensional data routing fabrics. FIGS. 16A and 16B show separate pass 217 and turn 218 circuits respectively passing data packets 301 straight through in the same routing dimension, and turning packets to another routing dimension. In alternative embodiments of the multi-dimensional data routing fabric, the pass and turn routing functions can be implemented inside a single data routing switch 226 (FIGS. 30A and 30B).

Figure 30A:
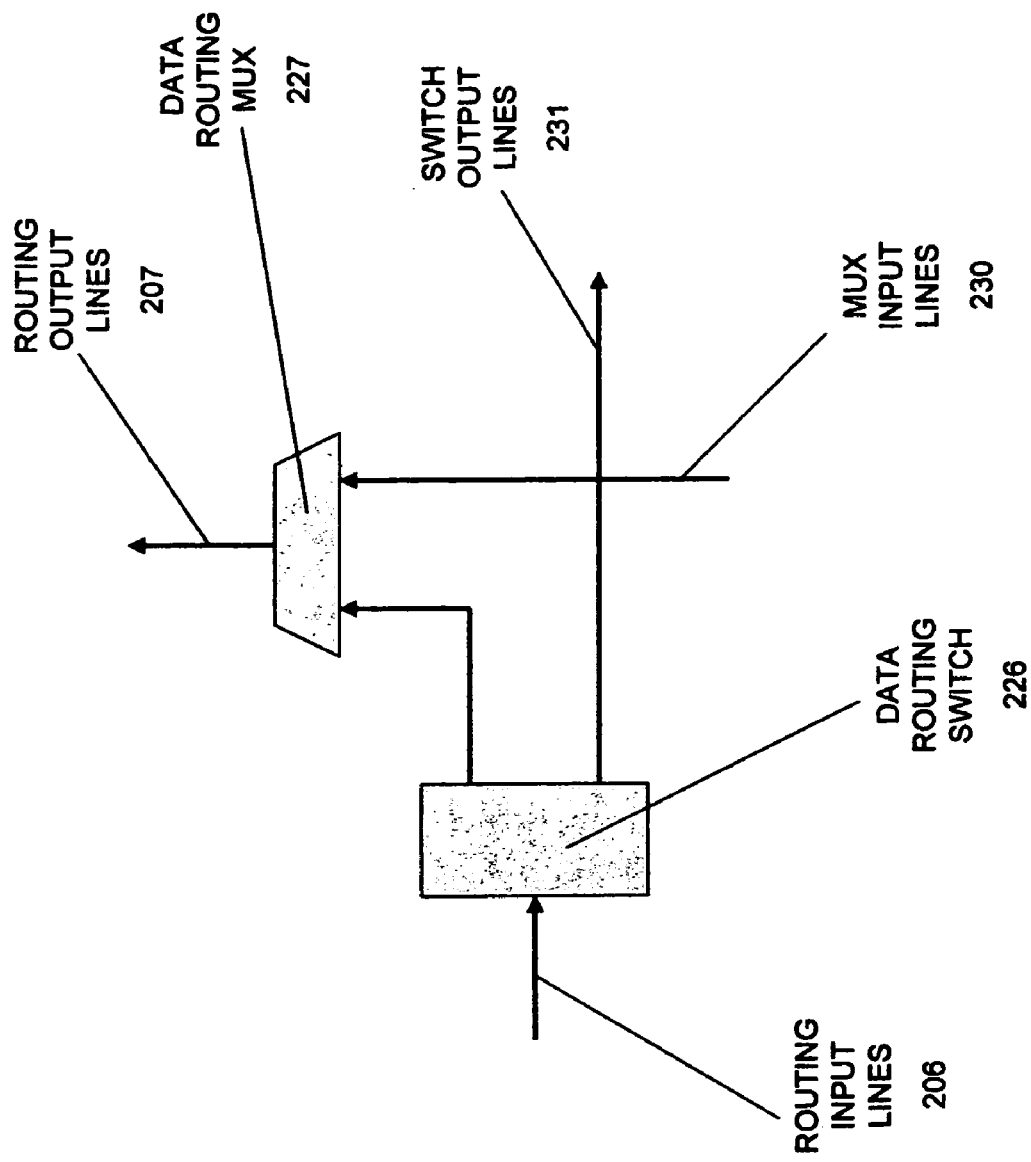
FIG. 30A shows a horizontal data routing switch and a vertical data routing mux forming a data routing terminal for routing data packets in two routing direction along two routing dimensions.
Figure 30B:
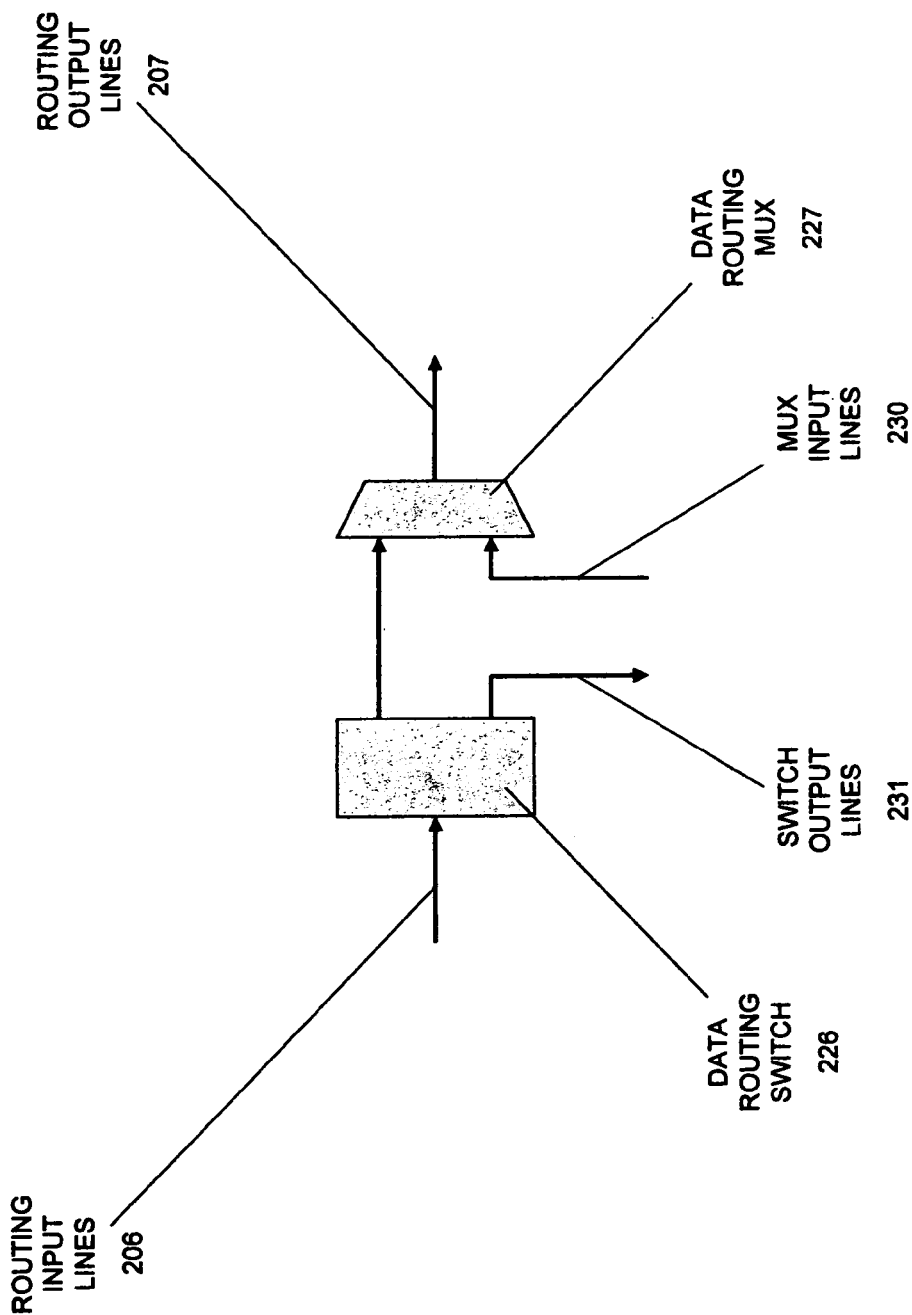
FIG. 30B shows a horizontal data routing switch and a horizontal data routing mux forming a data routing terminal for routing data packets in two routing directions along two routing dimensions.

While the packet mux 219 of FIGS. 16A and 16B can directly receive new data packets 301 launched by a source component 402 through local input lines 208, a data routing mux 227 of FIGS. 30A and 30B does not have to support the packet entry function. Alternative embodiments of the multi-dimensional data routing fabric may use alternative routing structures for entering data from source components 402 into the fabric, and for exiting data from the fabric to destination components 403 (see data entry ramps 228 and data exit ramps 229 of FIG. 36).

FIG. 30A shows a data routing switch 226 routing data packets 301 from a horizontal set of routing input lines 206 to a horizontal set of switch output lines 231, or to a vertical set of routing output lines 207. The data routing mux 227 combines the turned data packets 301 from the routing input lines 206 with those arriving through a vertical set of mux input lines 230. This combination of a horizontal data routing switch 226 with a vertical data routing mux 227 forms a data routing terminal 214 building block for routing of data packets 301 in alternative embodiments of the multi-dimensional data routing fabric.

FIG. 30B shows a data routing switch 226 routing data packets 301 from a horizontal set of routing input lines 206 to a vertical set of switch output lines 231, or to a horizontal set of routing output lines 207. The data routing mux 227 combines the horizontal data packets 301 from the routing input lines 206 with those arriving through a vertical set of mux input lines 230. This combination of a horizontal data routing switch 226 with a horizontal data routing mux 227 forms an alternative data routing terminal 214 building block for routing of data packets 301 in various alternative embodiments of the multi-dimensional data routing fabric.

Figure 31:
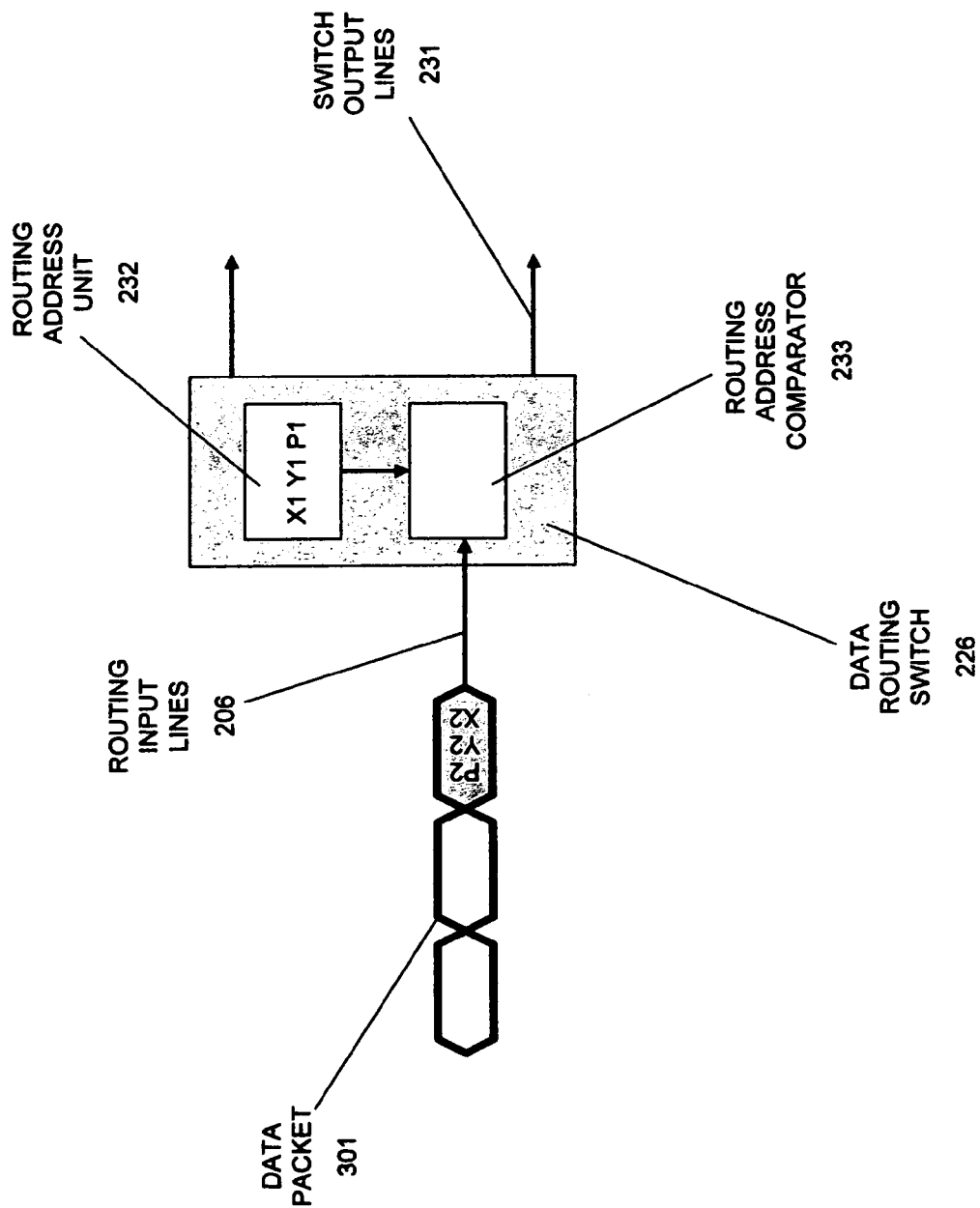
FIG. 31 shows the internal parts of a data routing switch and the header contents of a data packet that enters it.

FIG. 31 shows the internal parts of the data routing switch 226. The routing address unit 232 stores a set of local coordinates 211 and a local port address 240. The header of a data packet 301 entering the data routing switch 226 contains a set of packet destination region coordinates 313 and a destination port address 314. The routing address comparator 233 compares the local coordinates 211 with the destination region coordinates 313, and the local port address 240 with the destination port address 314 to switch the data packet 301 from the routing input lines 206 to the top set or the bottom set of switch output lines 231.

The data packet 301 is placed on the top set of switch output lines 231 when it has to make a turn in order to converge on its destination. The packet is placed on the bottom set of switch output lines 231 when it does not have to turn to reach its destination. In some special cases, such as broadcast operations, the packet may be driven onto both sets of switch output lines 231.

Figure 32:
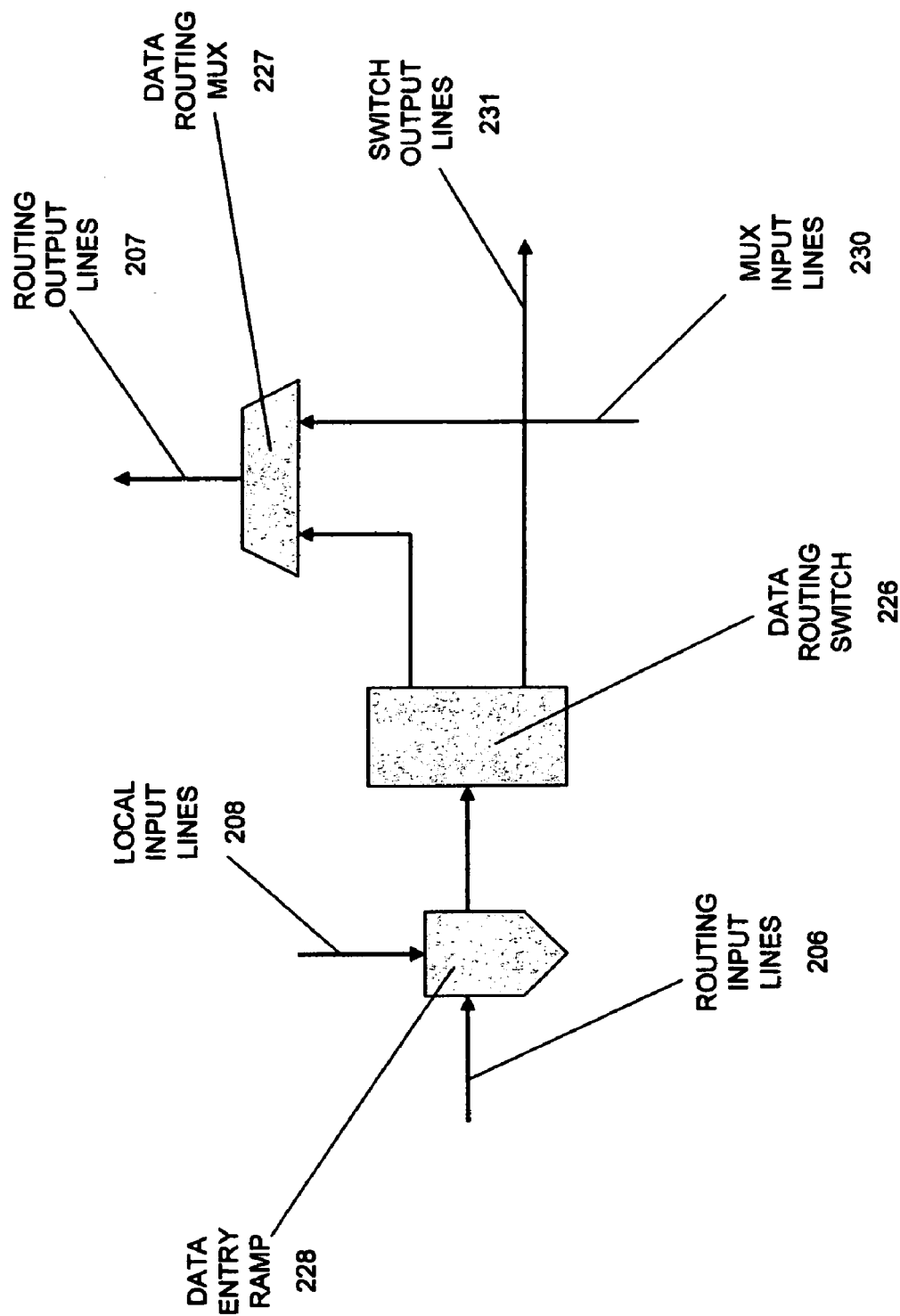
FIG. 32 shows a data entry ramp connected to a data routing switch and a data routing mux for launching new data packets in up to two routing directions.

FIG. 32 shows the data routing terminal 214 of FIG. 30A with an added part for launching new packets 301 into the multi-dimensional data routing fabric. The data entry ramp 228 has been inserted between the set of routing input lines 206 and the data routing switch 226. New data packets 301 enter the data entry ramp 228 through a set of local input lines 208. The data entry ramp 228 multiplexes the data packets 301 arriving through the local input lines 208 with those arriving from the routing input lines 206 to form a single packet stream into the data routing switch 226.

Figure 33:
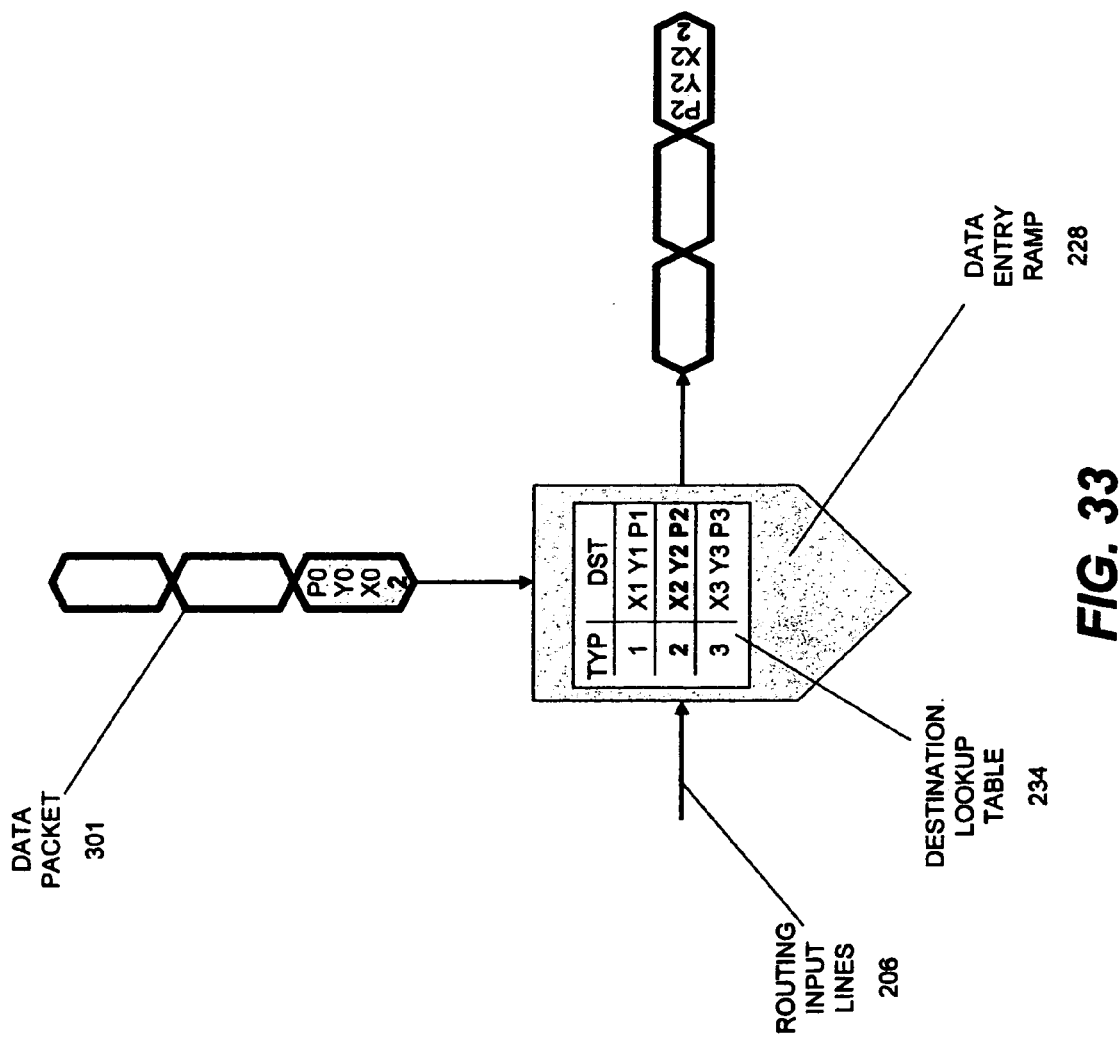
FIG. 33 shows the internal parts of a routing data entry ramp and how it manipulates the header of a data packet passing through it.

FIG. 33 shows a routing version of the data entry ramp 228 which, in addition to multiplexing two streams of data packets 301 into one, also performs an additional function of replacing the current destination information in the packet's header with a replacement destination. The replacement destination can be chosen according to the packet type identifier 312 of the packet's header (FIG. 23).

The destination lookup table 234 of the data entry ramp 228 in FIG. 33 contains 3 sets of replacement destinations—one for each of 3 supported packet types (1, 2 and 3). Each replacement destination field consists of a set of destination region coordinates 313 and a destination port address 314. The header of the data packet 301 entering the data entry ramp 228 in FIG. 33 may contain a set of current destination region coordinates 313 [X0,Y0], a destination port address 314 [P0] and a packet type [2]. The data entry ramp 228 inserts the new destination information [2,X2,Y2,P2] from the destination lookup table 234 (based on the value of the packet type [2]) into the packet's header, replacing the old [2,X0,Y0,P0] destination (if present).

The destination replacement feature can be used when fixed-function data processing components, like hardwired arithmetic functions, have to be shared among multiple data flow threads. By using this type of data entry ramp 228, a fixed-function component can selectively deliver its results to a specific next component in a given data flow, according to the value of the packet type identifier field 312 (see FIGS. 46B–C).

Figure 34:
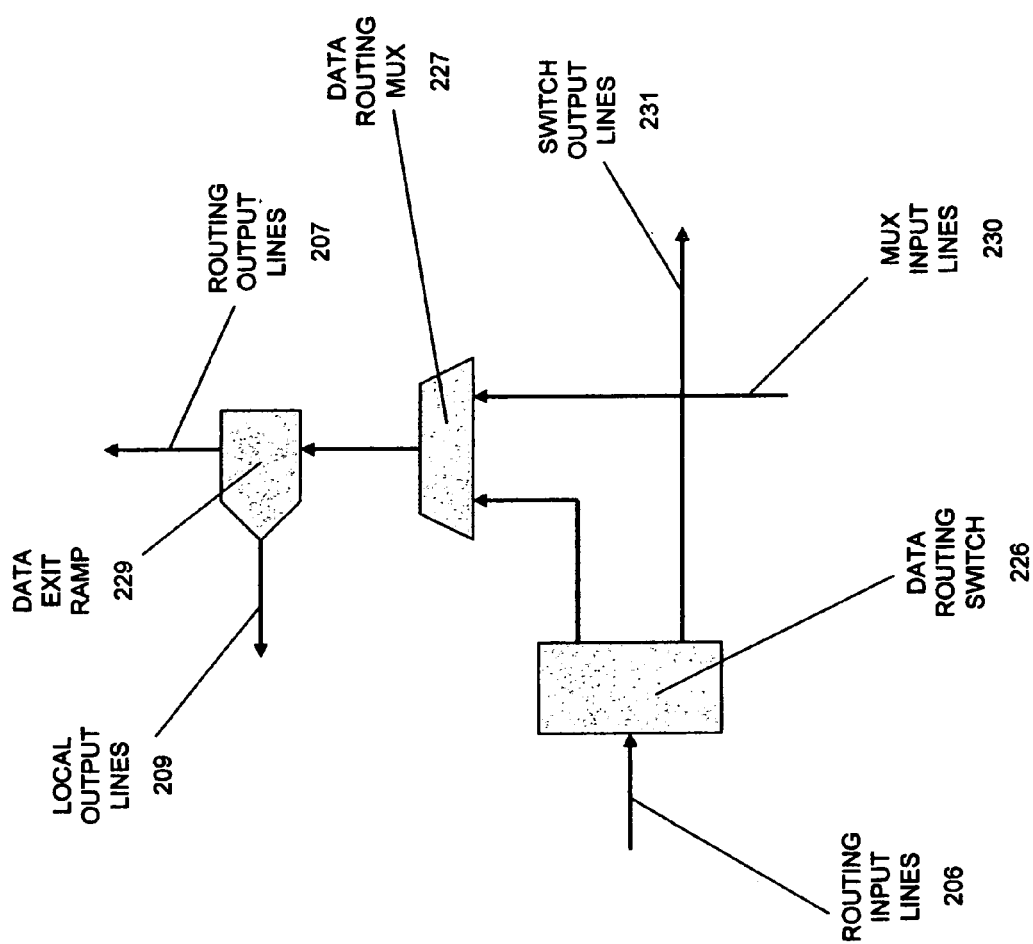
FIG. 34 shows a data exit ramp connected to a data routing mux and a data routing switch for exiting data packets that have reached their destination components.

FIG. 34 shows the data routing terminal 214 from FIG. 30A with an added part for extracting data packets 301 from the multi-dimensional data routing fabric, when they have reached their destinations. The data exit ramp 229 has been inserted between the data routing mux 227 and the set of routing output lines 207. The data exit ramp 229 switches the data packets 301 from the data routing mux 227 to a set of routing output lines 207 or to a set of local output lines 209, dependent on how close the packet is to its destination.

Figure 35:
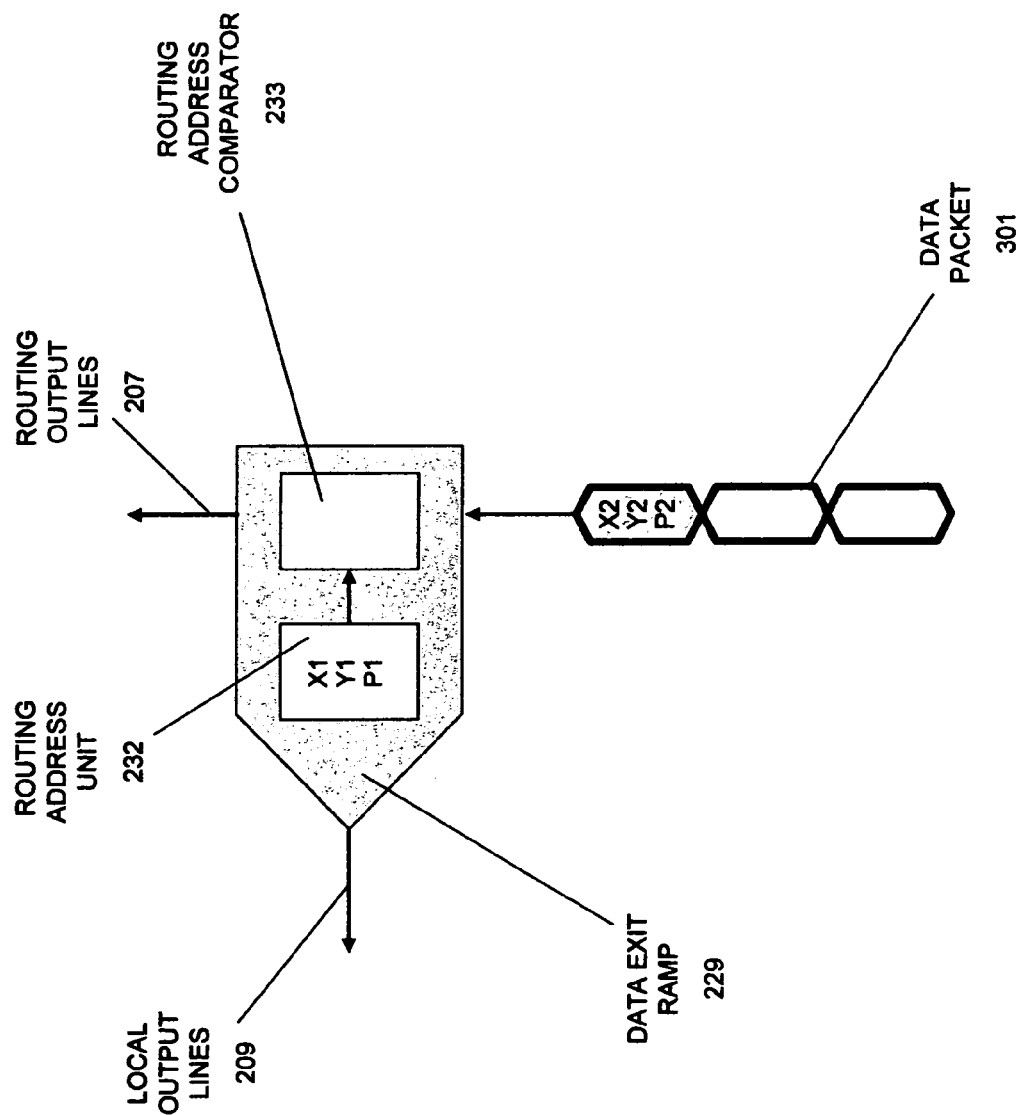
FIG. 35 shows the internal parts of a data exit ramp and the header contents of a data packet that enters it.

FIG. 35 shows internal parts of the data exit ramp 229. The routing address unit 232 stores a set of local coordinates 211 and a local port address 240. The header of a data packet 301 entering the data exit ramp 229 contains packet destination region coordinates 313 and a destination port address 314. The routing address comparator 233 compares the local coordinates 211 with the destination region coordinates 313 and the local port address 240 with the destination port address to switch the data packet 301 to the routing output lines 207 when the destination is not within reach, or to the local output lines 209 when the destination is within reach. In some special cases, such as broadcast operations, the packet may be driven onto both the routing and the local sets of output lines.

Figure 36:
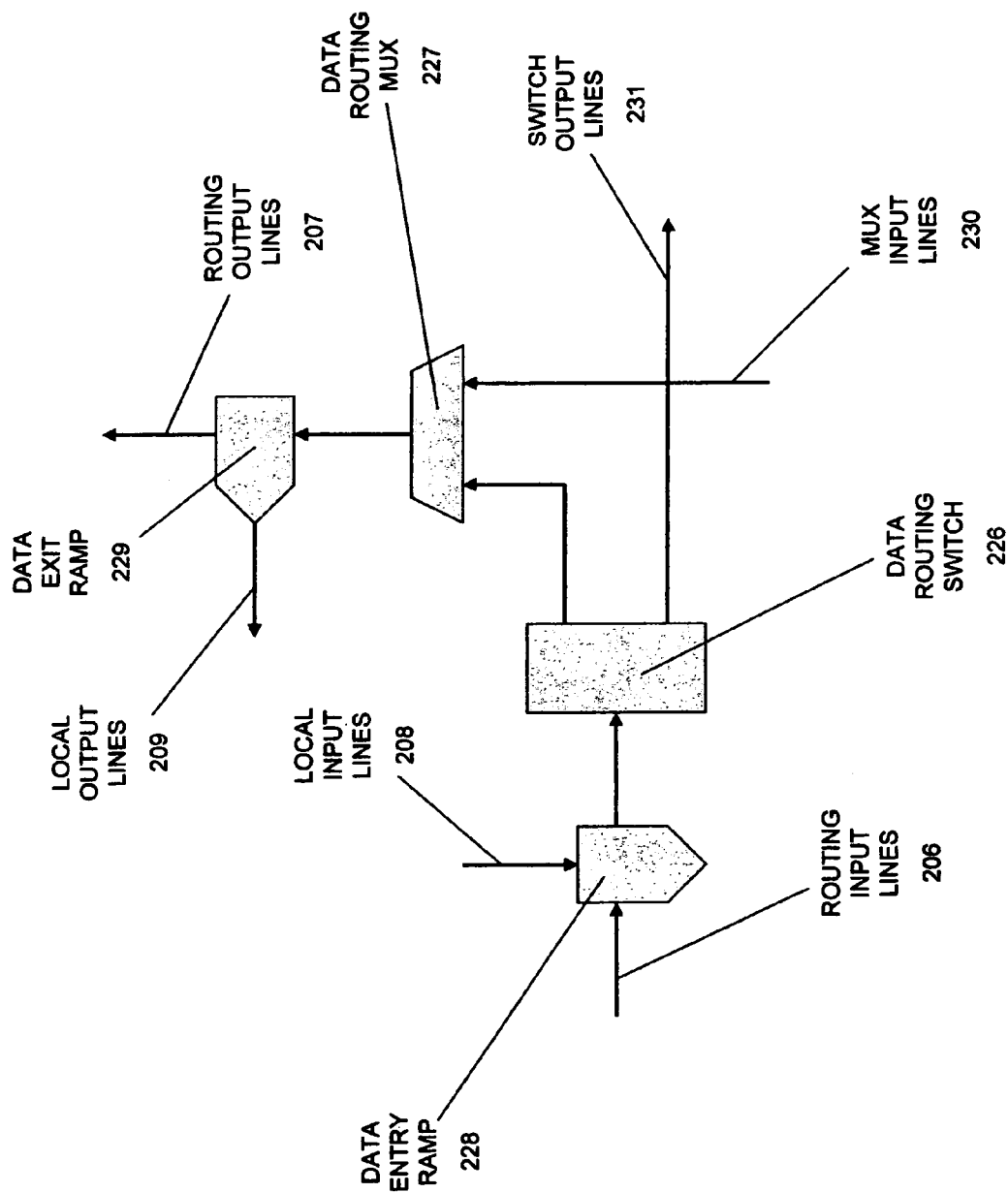
FIG. 36 shows a data routing terminal with a data entry ramp connected to a data routing switch along one routing direction, and a data exit ramp connected to a data routing mux along another routing direction.

FIG. 36 shows a data routing terminal 214 containing both the data entry ramp 228 for launching new packets from a source component 402 into the multi-dimensional data routing fabric, and the data exit ramp 229 for exiting data packets 301 from the fabric into a destination component 403. In this embodiment, the data entry ramp 228 is placed between the routing input lines 206 and the data routing switch 226, and the data exit ramp 229 is placed between the data routing mux 227 and the routing output lines 207.

Figure 37:
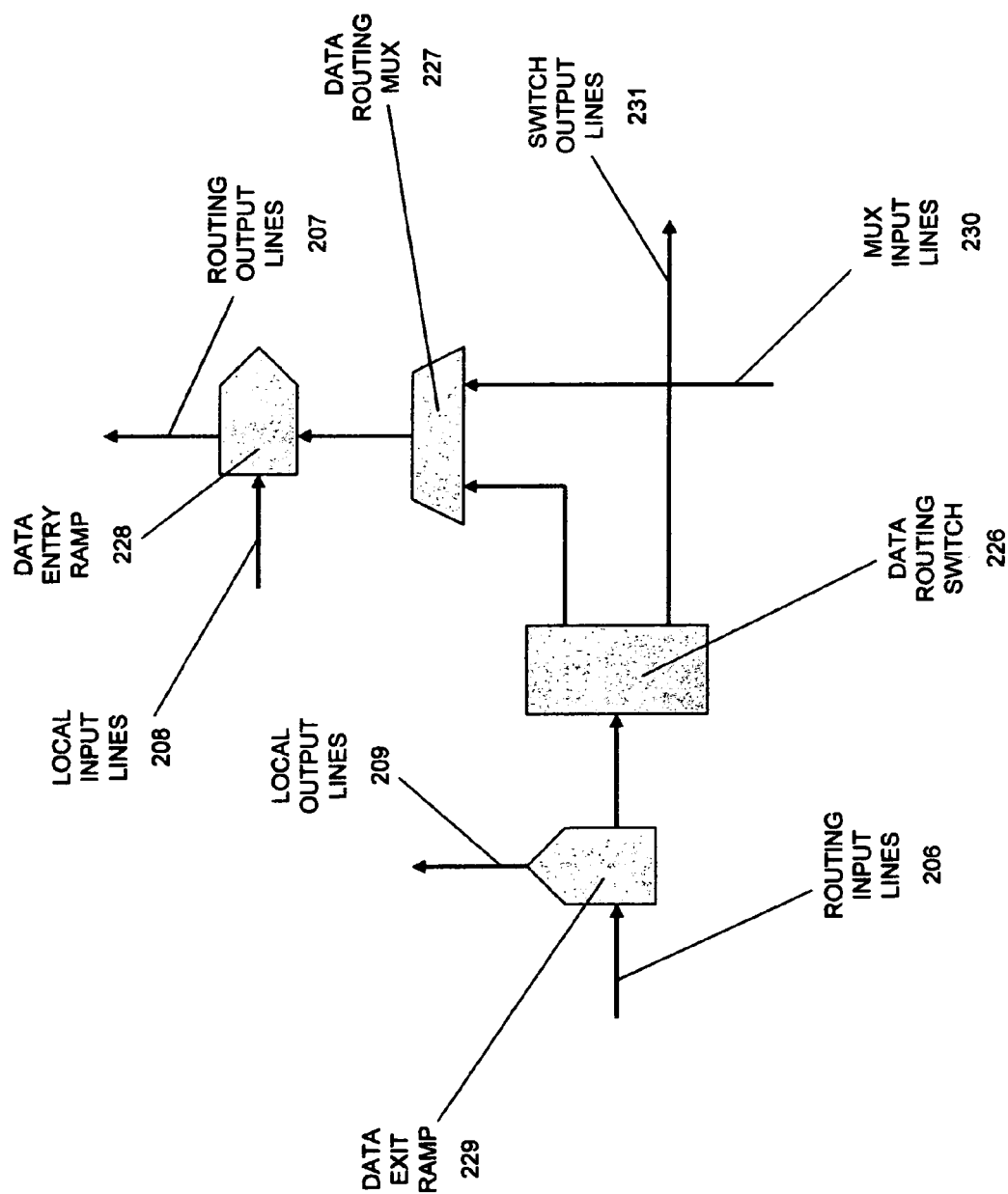
FIG. 37 shows a data routing terminal with a data exit ramp connected to a data routing switch along one routing direction, and a data exit ramp connected to a data routing mux along another routing direction.

FIG. 37 shows a data routing terminal 214 containing both the data entry ramp 228 for launching new packets from a source component 402 into the multi-dimensional data routing fabric, and the data exit ramp 229 for exiting data packets 301 from the fabric into a destination component 403. In this embodiment, the data exit ramp 229 is placed between the routing input lines 206 and the data routing switch 226, and the data entry ramp 228 is placed between the data routing mux 227 and the routing output lines 207.

In various alternative embodiments of the multi-dimensional data routing fabric, routing input lines 206 and routing output lines 207 of data routing terminals 214 may be individually aligned along unique routing dimensions, or may be collectively aligned along a common routing dimension.

Figure 38:
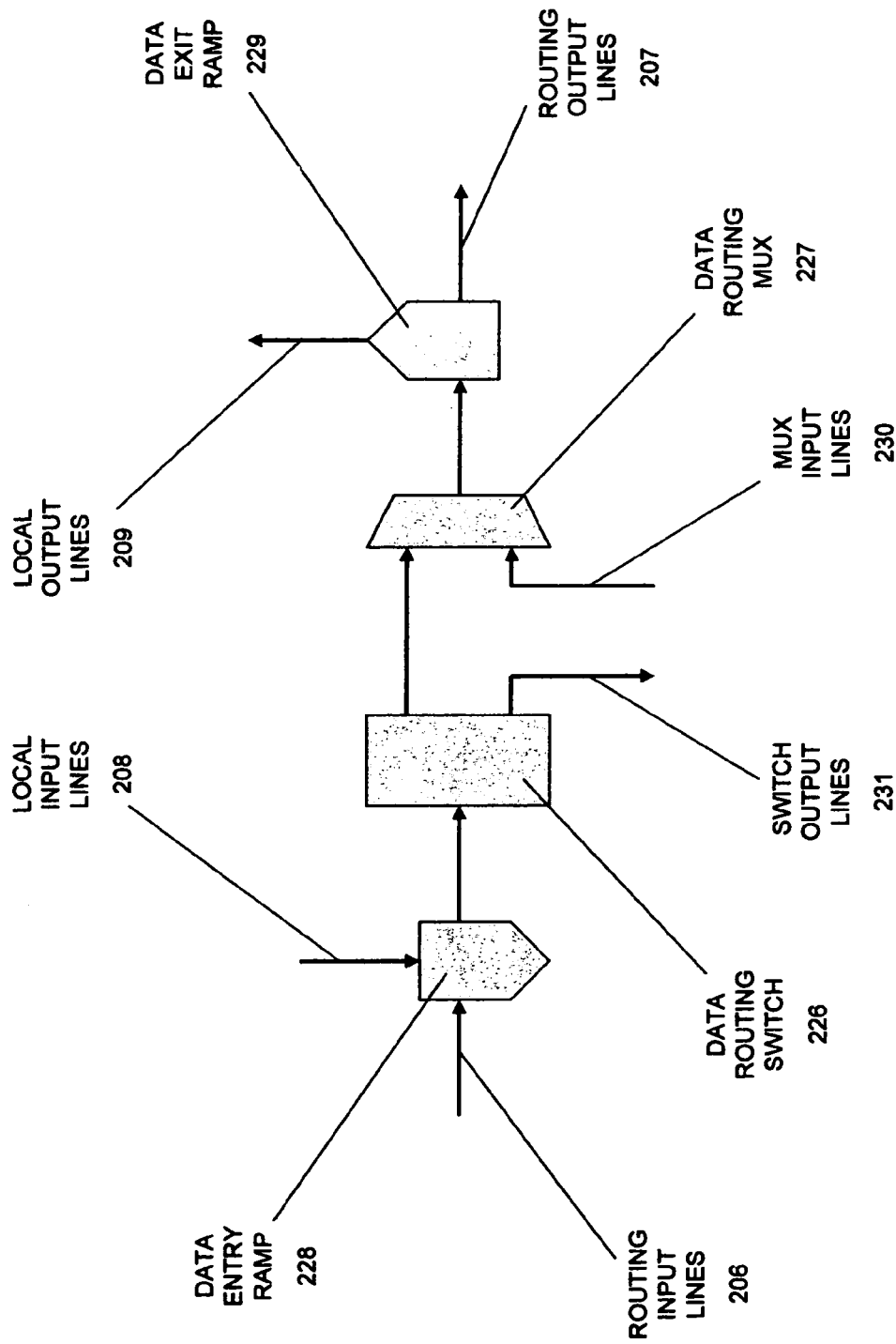
FIG. 38 shows a data routing terminal with a data entry ramp connected to a data routing switch along one routing direction, and a data exit ramp connected to a data routing mux along the same routing direction.

FIG. 38 shows a data routing terminal 214 structurally similar to that of FIG. 36, except that in this case the sets of routing input lines 206 and routing output lines 207 are both aligned with the horizontal dimension, instead of being respectively aligned with the horizontal and the vertical dimensions.

Figure 39:
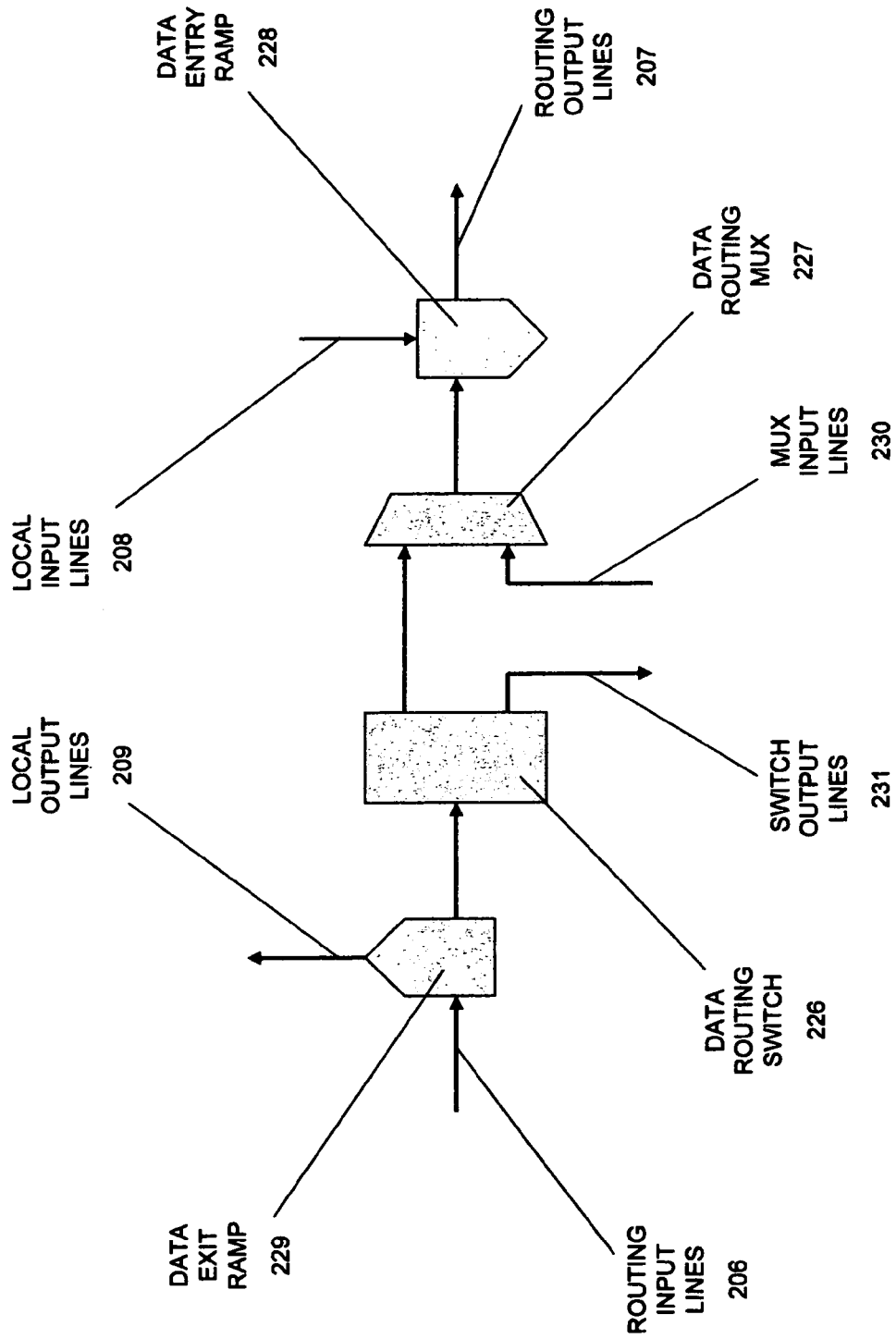
FIG. 39 shows a data routing terminal with a data exit ramp connected to a data routing switch along one routing direction, and a data entry ramp connected to a data routing mux along the same routing direction.

FIG. 39 shows a data routing terminal 214 structurally similar to that of FIG. 37, except that in this case the sets of routing input lines 206 and routing output lines 207 are both aligned with the horizontal dimension, instead of being respectively aligned with the horizontal and the vertical dimensions.

FIGS. 40A–G show various paths that data packets 301 can take when passing through the data routing terminal 214 of FIG. 36, based upon the point of entry (routing input lines 206 or mux input lines 230), and routing decisions made inside the data routing switch 226 and the data exit ramp 229.

Figure 40A:
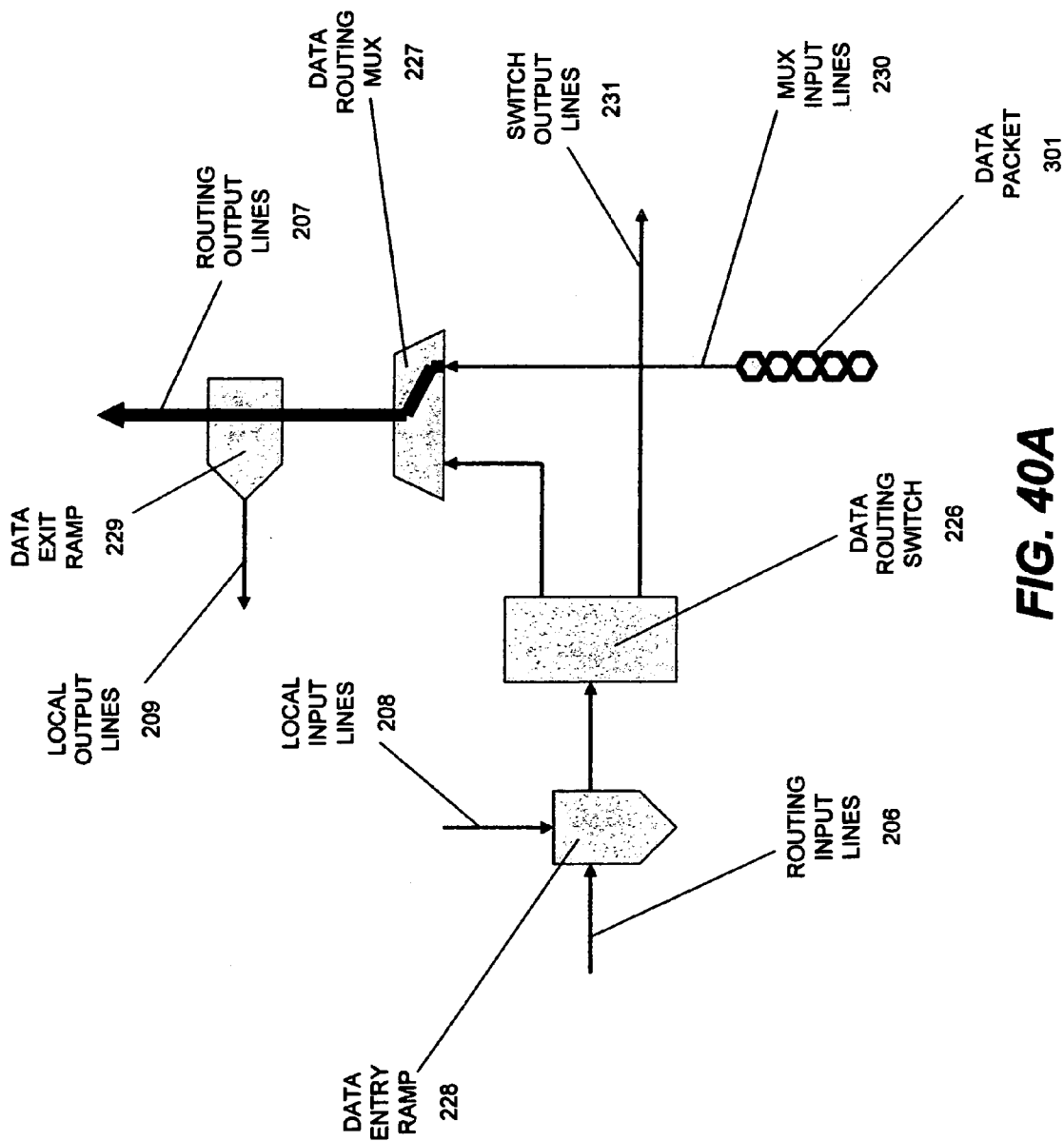
FIG. 40A shows a vertical data packet being routed straight through a data routing terminal in a vertical routing direction.

FIG. 40A shows a data packet 301 entering the data routing mux 227 through a set of mux input lines 230. The data routing mux 227 sends the packet to the data exit ramp 229, without delay or after inserting it into a possibly ongoing stream of packets from the data routing switch 226. Comparing the packet's destination region coordinates 313 with the local coordinates 211 and the destination port address 314 with the local port address 240, the data exit ramp 229 decides that the packet's destination is out of reach of this data exit ramp 229 and sends it back out through the set of routing output lines 207, without turning or exiting.

This type of straight through routing can be triggered by either the local coordinates 211 not matching the destination region 313 coordinates or by local port address 240 not matching the destination port address 314.

Figure 40B:
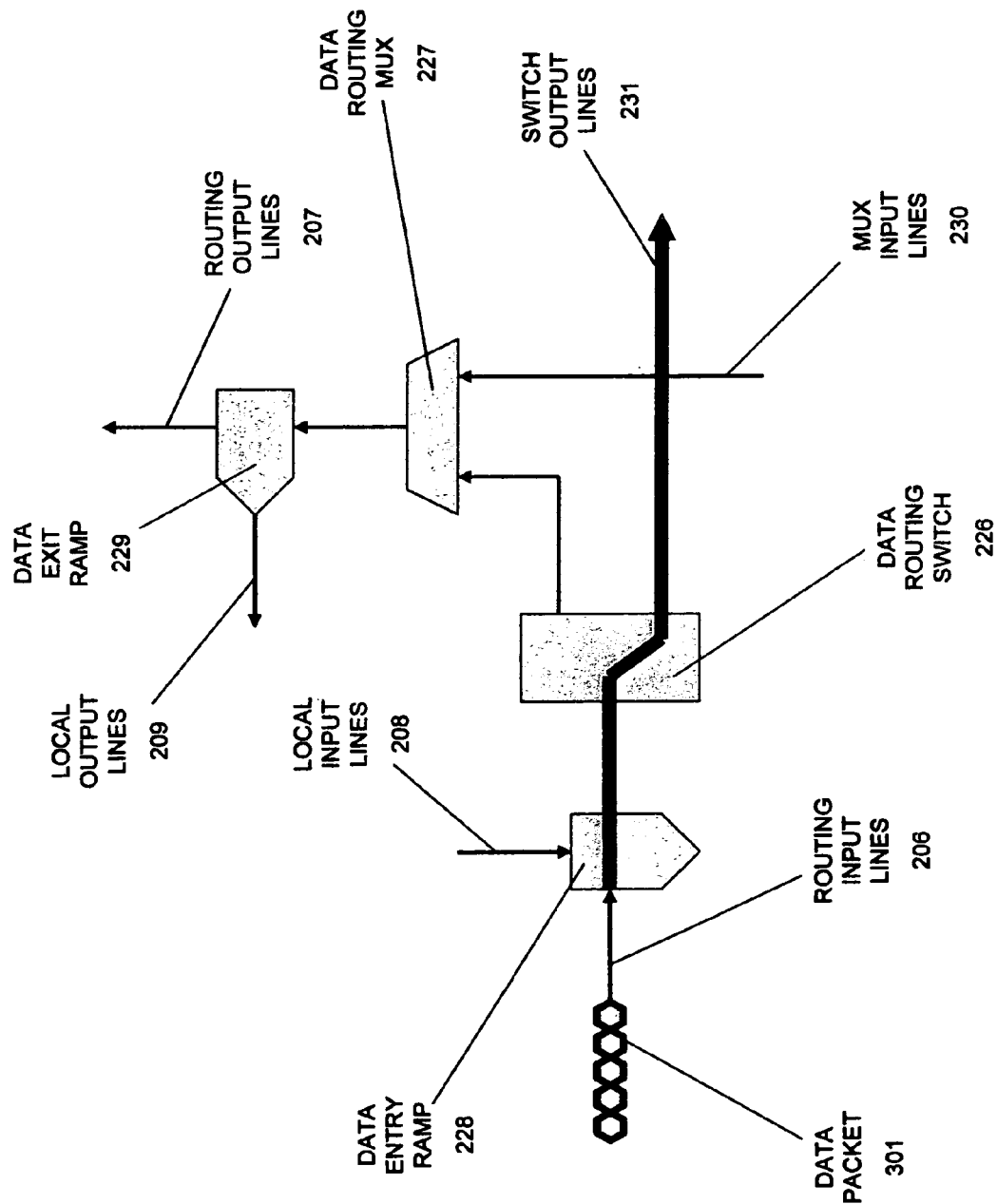
FIG. 40B shows a horizontal data packet being routed straight through a data routing terminal in a horizontal routing direction.

FIG. 40B shows a data packet 301 entering the data entry ramp 228 through a set of routing input lines 206. The data entry ramp 228 sends the packet to the data routing switch 226, without delay or after inserting it into a possibly ongoing stream of packets from the local input lines 208. Comparing the packet's destination region coordinates 313 with the local coordinates 211 and the destination port address 314 with the local port address 240, the data routing switch 226 decides that the packet has to continue along its current path (without turning) to reach its destination. This is accomplished by sending the packet back out through the set of switch output lines 231.

This type of straight through routing can be triggered by the local coordinates 211 not matching the destination region coordinates 313, when the destination is ahead and to a selected side (left side, for example) of the current position of the packet.

Figure 40C:
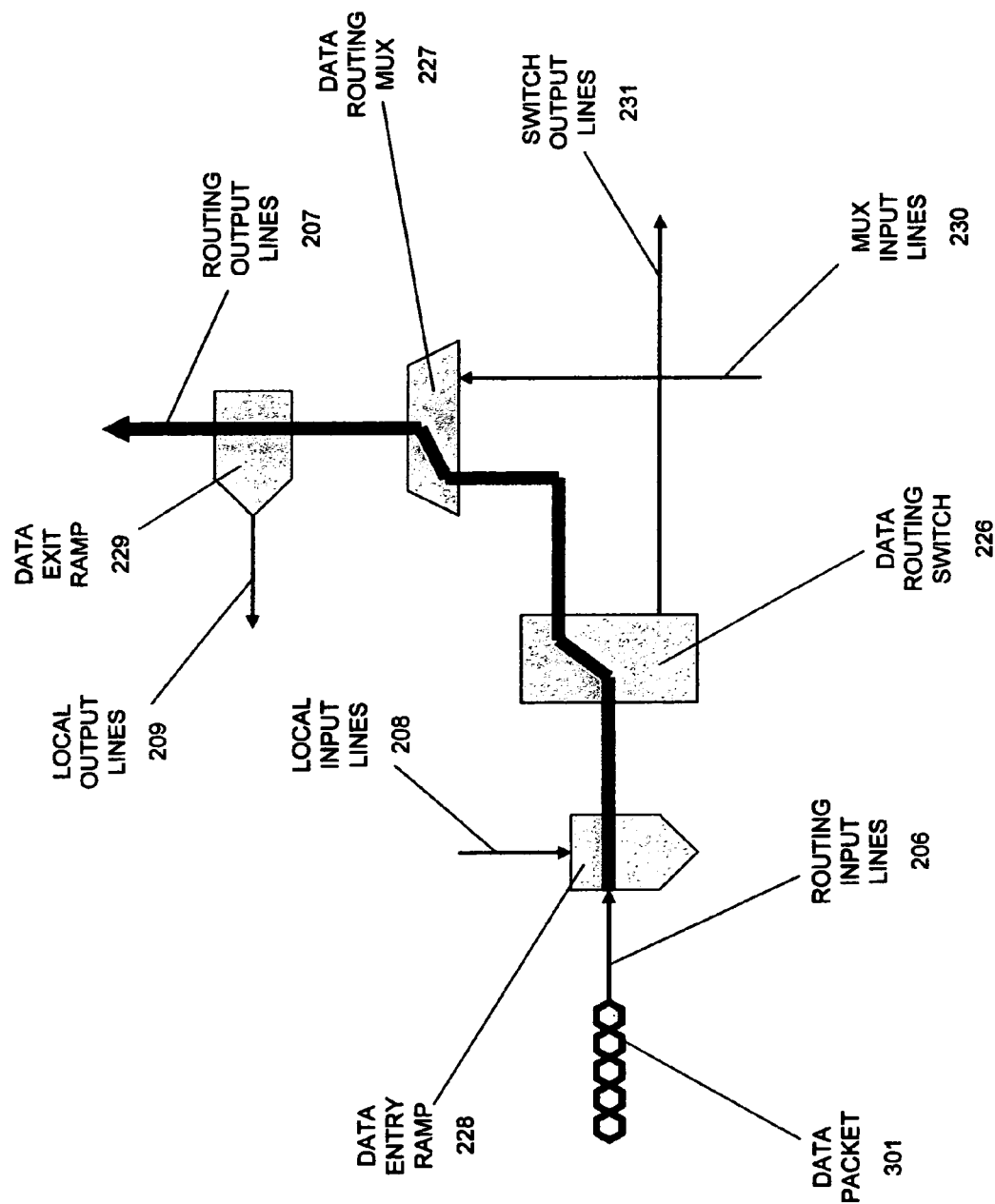
FIG. 40C shows a horizontal data packet making a left turn inside a data routing terminal to emerge in the vertical routing direction.

FIG. 40C shows a data packet 301 entering the data entry ramp 228 through a set of routing input lines 206. The data entry ramp 228 sends the packet to the data routing switch 226, without delay or after inserting it into a possibly ongoing stream of packets from the local input lines 208. Comparing the packet's destination region coordinates 313 with the local coordinates 211 and the destination port address 314 with the local port address 240, the data routing switch 226 decides that the packet has to make a left turn in order to converge on its destination.

The left turn is accomplished by first sending the data packet 301 to the data routing mux 227 and then to the data exit ramp 229. Comparing the packet's destination region coordinates 313 with the local coordinates 211 and the destination port address 314 with the local port address 240, the data exit ramp 229 decides that the packet's destination is out of reach of this data exit ramp 229 and sends it back out through the set of routing output lines 207, without exiting.

This type of turn routing can be triggered by either the local coordinates 211 matching the destination region coordinates 313 (without the port match) or when the destination is behind, or ahead and to a selected side (right side for example), of the current position of the packet.

Figure 40D:
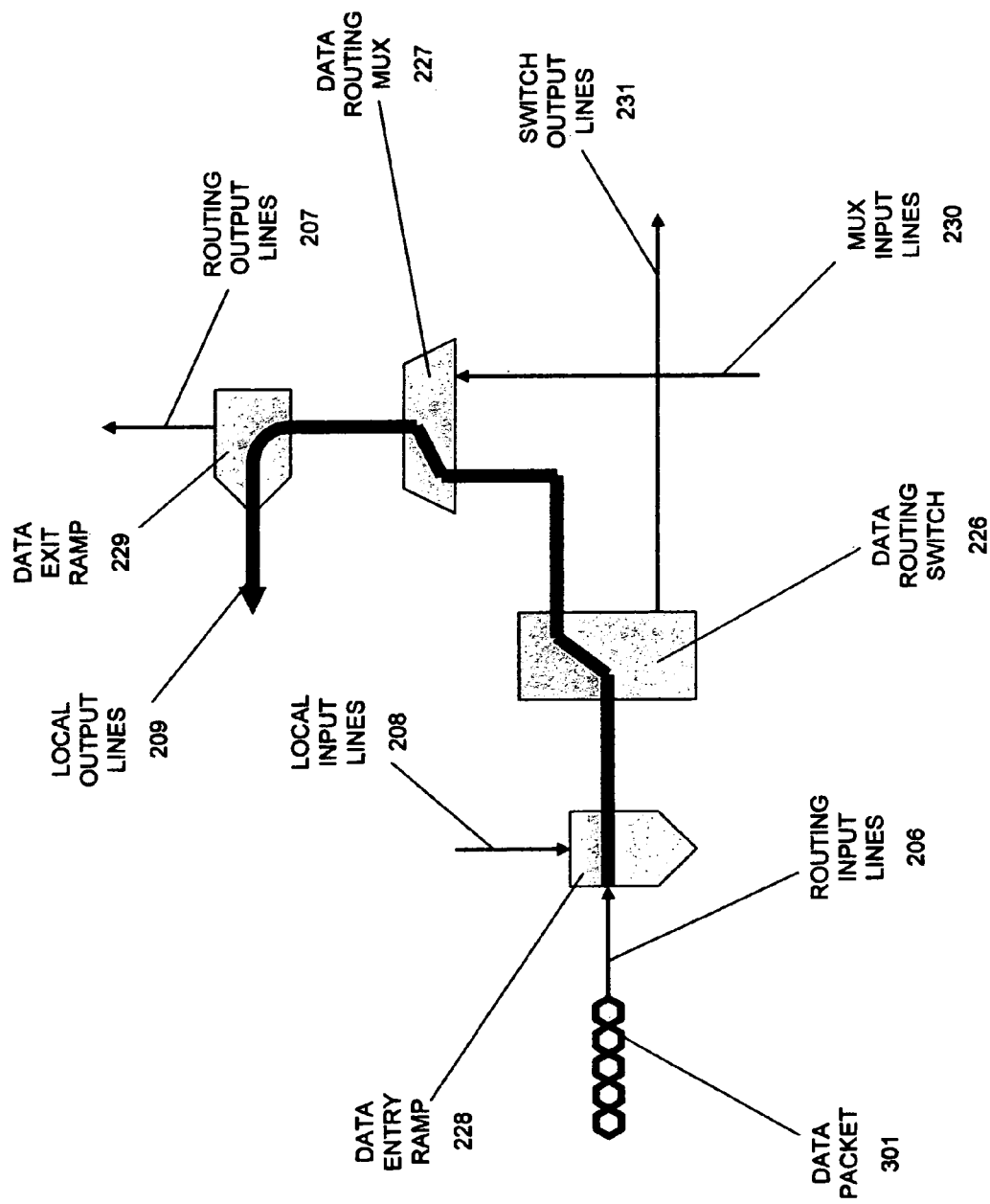
FIG. 40D shows a horizontal data packet making a left turn inside a data routing terminal before exiting through a data exit ramp towards its destination component.

FIG. 40D shows a data packet 301 entering the data entry ramp 228 through a set of routing input lines 206. The data entry ramp 228 sends the packet to the data routing switch 226, without delay or after inserting it into a possibly ongoing stream of packets from the local input lines 208. Comparing the packet's destination region coordinates 313 with the local coordinates 211 and the destination port address 314 with the local port address 240, the data routing switch 226 decides that the packet has to first make a left turn in order to converge on its destination.

The left turn is accomplished by first sending the data packet 301 to the data routing mux 227 and then to the data exit ramp 229. Comparing the packet's destination region coordinates 313 with the local coordinates 211 and the destination port address 314 with the local port address 240, the data exit ramp 229 decides that the packet's destination is within reach of this data routing terminal 214 and delivers it through the set of local output lines 209.

This type of exit routing can be triggered by both the local coordinates 211 matching the destination region coordinates 313, and by local port address 240 matching the destination port address 314.

Figure 40E:
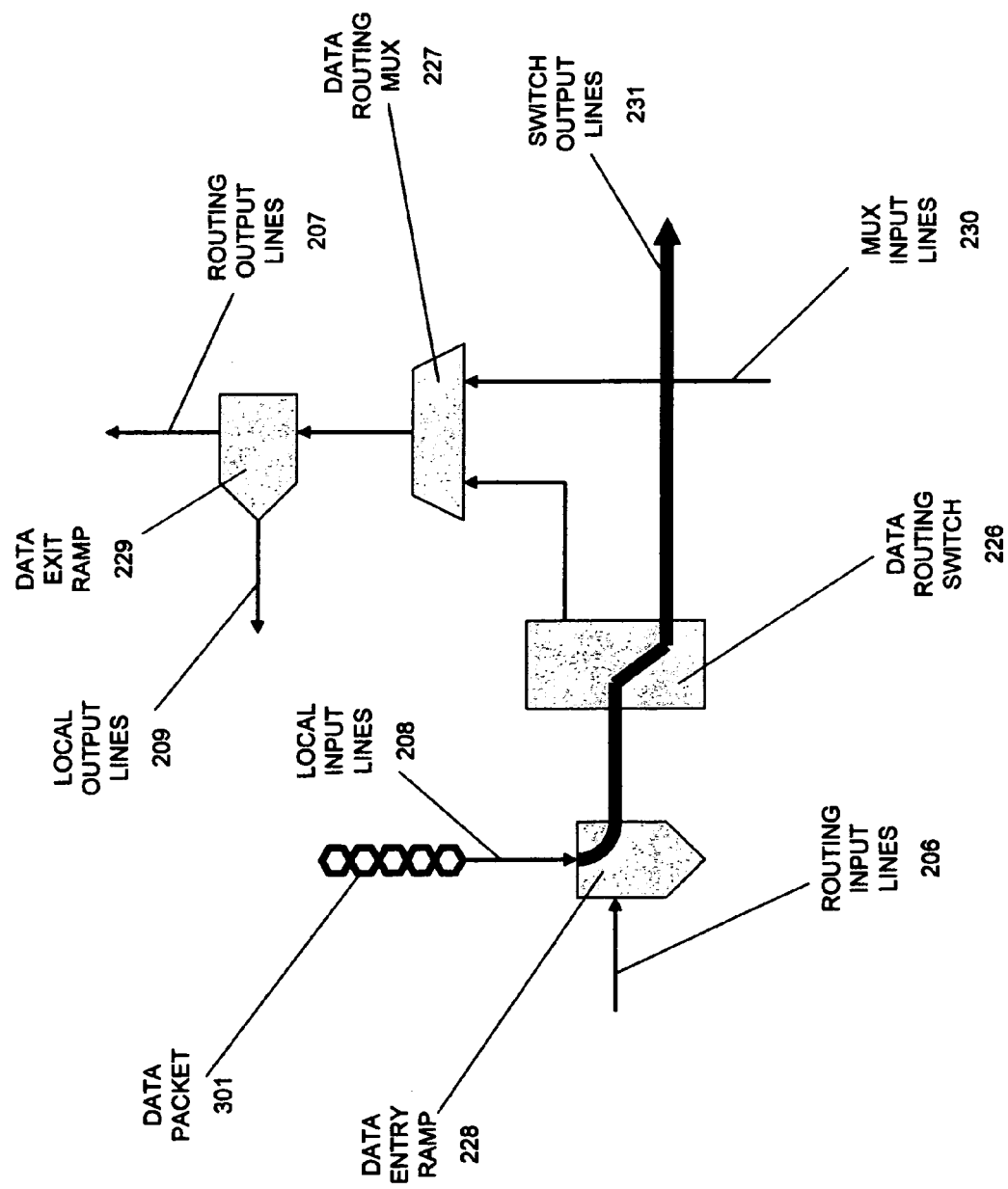
FIG. 40E shows a new data packet, launched from a source component via a data entry ramp, being routed straight through a data routing terminal in a horizontal routing direction.

FIG. 40E shows a data packet 301 entering the data entry ramp 228 through a set of local input lines 208. The data entry ramp 228 sends the packet to the data routing switch 226, without delay or after inserting it into a possibly ongoing stream of packets from the routing input lines 206. Comparing the packet's destination region coordinates 313 with the local coordinates 211 and the destination port address 314 with the local port address 240, the data routing switch 226 decides that the packet has to continue along its current path (without turning) to reach its destination. This is accomplished by sending the packet back out through the set of switch output lines 231.

This type of straight through routing can be triggered by the local coordinates 211 not matching the destination region coordinates 313, when the destination is ahead and to a selected side (left side, for example) of the current position of the packet.

Figure 40F:
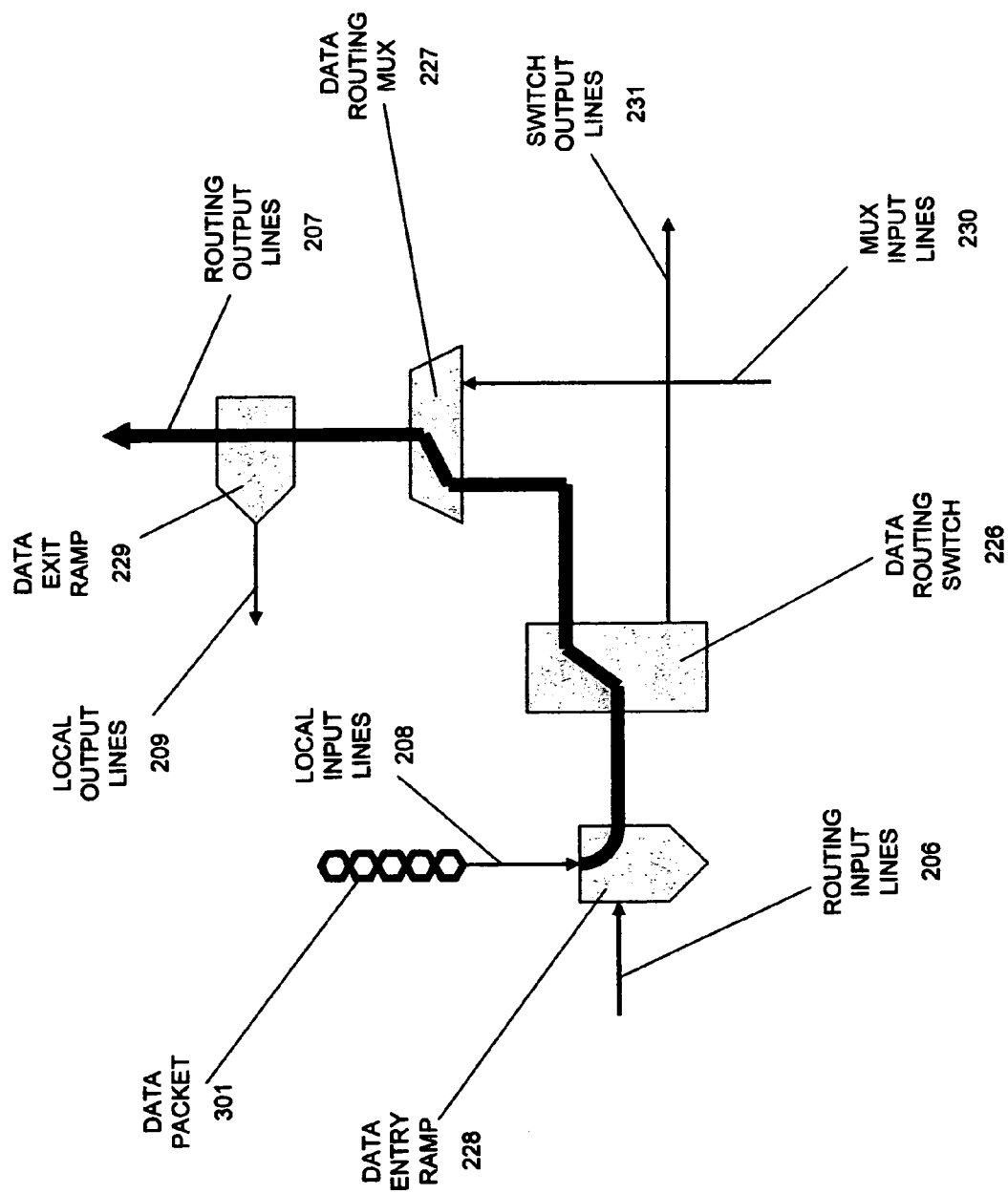
FIG. 40F shows a new data packet, launched from a source component via a data entry ramp, making a left turn inside a data routing terminal to emerge in the vertical routing direction.

FIG. 40F shows a data packet 301 entering the data entry ramp 228 through a set of local input lines 208. The data entry ramp 228 sends the packet to the data routing switch 226, without delay or after inserting it into a possibly ongoing stream of packets from the routing input lines 206. Comparing the packet's destination region coordinates 313 with the local coordinates 211 and the destination port address 314 with the local port address 240, the data routing switch 226 decides that the packet has to make a left turn in order to converge on its destination.

The left turn is accomplished by first sending the data packet 301 to the data routing mux 227 and then to the data exit ramp 229. Comparing the packet's destination region coordinates 313 with the local coordinates 211 and the destination port address 314 with the local port address 240, the data exit ramp 229 decides that the packet's destination is out of reach of this data routing terminal 214 and sends it back out through the set of routing output lines 207, without exiting.

This type of turn routing can be triggered by either the local coordinates 211 matching the destination region coordinates 313 (without the port match) or when the destination is behind, or ahead and to a selected side (right side for example), of the current position of the packet.

Figure 40G:
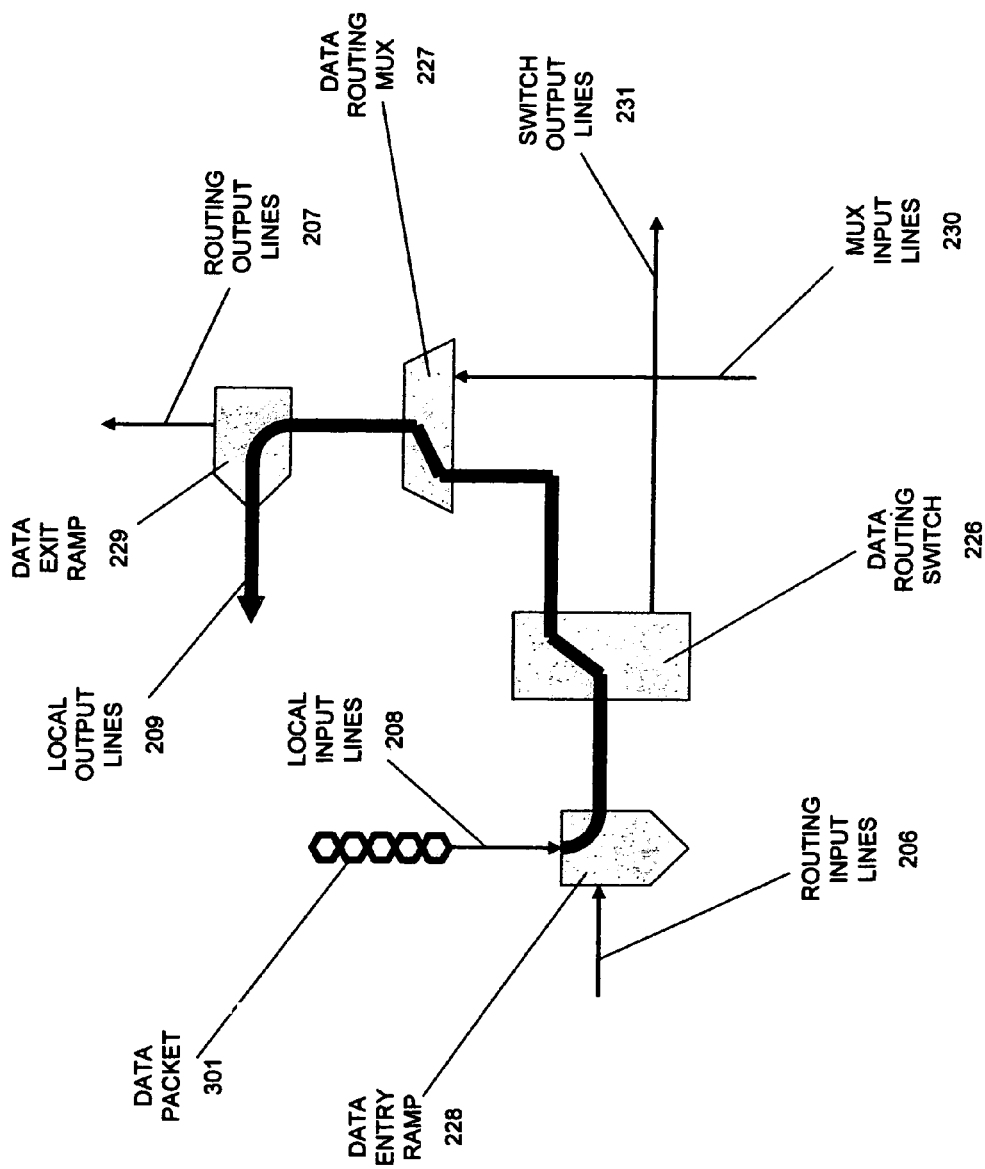
FIG. 40G shows a new data packet, launched from a source component via a data entry ramp, making a left turn inside a data routing terminal before exiting through a data exit ramp towards its destination component.

FIG. 40G shows a data packet 301 entering the data entry ramp 228 through a set of local input lines 208. The data entry ramp 228 sends the packet to the data routing switch 226, without delay or after inserting it into a possibly ongoing stream of packets from the routing input lines 206. Comparing the packet's destination region coordinates 313 with the local coordinates 211 and the destination port address 314 with the local port address 240, the data routing switch 226 decides that the packet has to first make a left turn in order to converge on its destination.

The left turn is accomplished by first sending the data packet 301 to the data routing mux 227 and then to the data exit ramp 229. Comparing the packet's destination region coordinates 313 with the local coordinates 211 and the destination port address 314 with the local port address 240, the data exit ramp 229 decides that the packet's destination is within reach of this data routing terminal 214 and delivers it through the set of local output lines 209.

This type of exit routing can be triggered by both the local coordinates 211 matching the destination region coordinates 313, and by local port address 240 matching the destination port address 314.

The data routing terminal 214 of FIGS. 30A–B can switch data packets 301 between one routing direction 102 of one routing dimension to one routing direction 102 of another routing dimension. To enable packet switching between more than two routing directions 102, multiple instances of data routing terminals 214 can be used.

Figure 41:
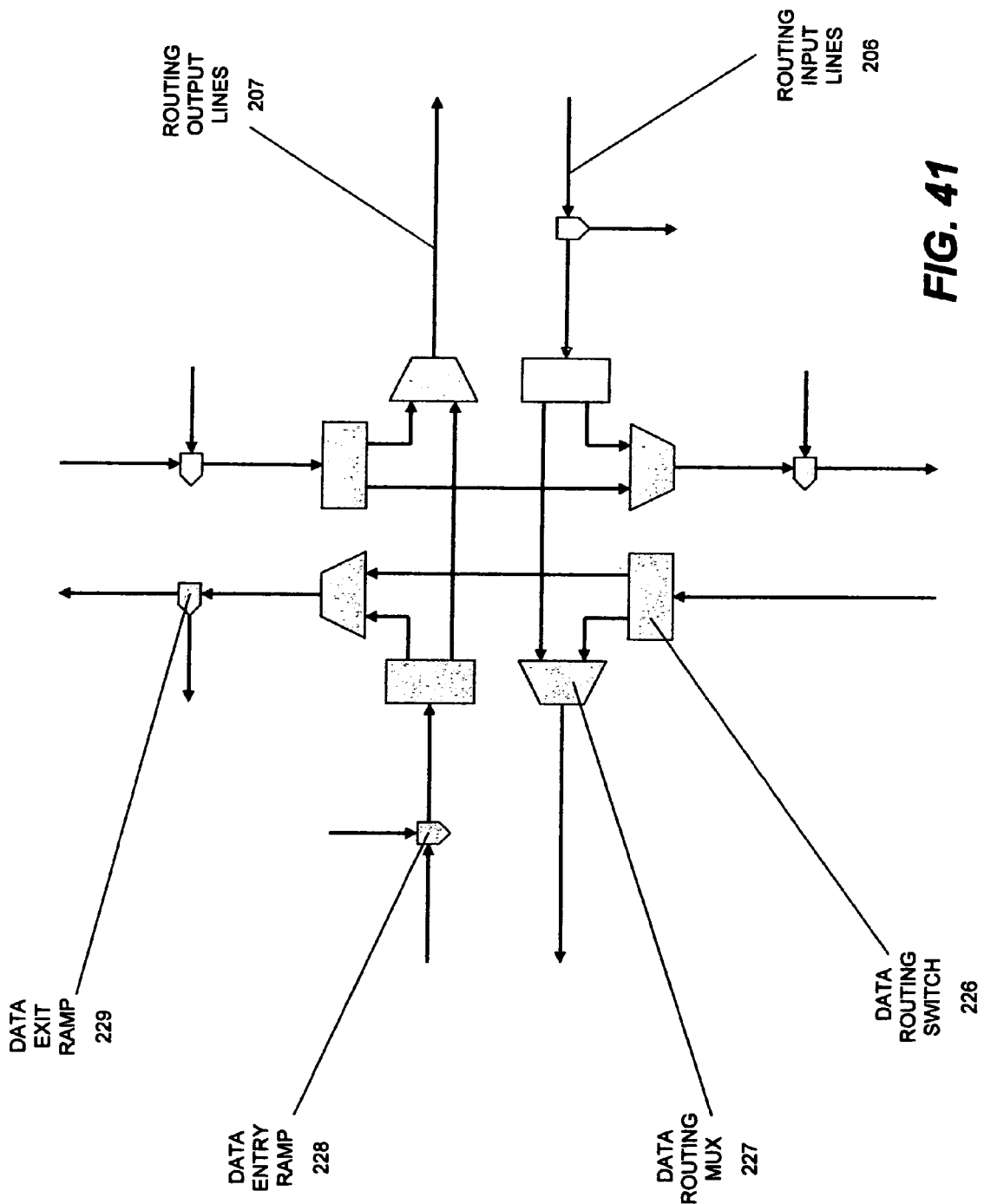
FIG. 41 shows a cross-like arrangement of four data routing switches and four data routing muxes forming a data routing junction for routing data packets in up to four routing directions along two routing dimensions.

FIG. 41 shows four sets of data routing terminals 214 of FIG. 30A, arranged in an alternative embodiment of a data routing junction 201, for switching of data packet 301 between the total of four routing directions 102 of two routing dimensions.

Figure 42:
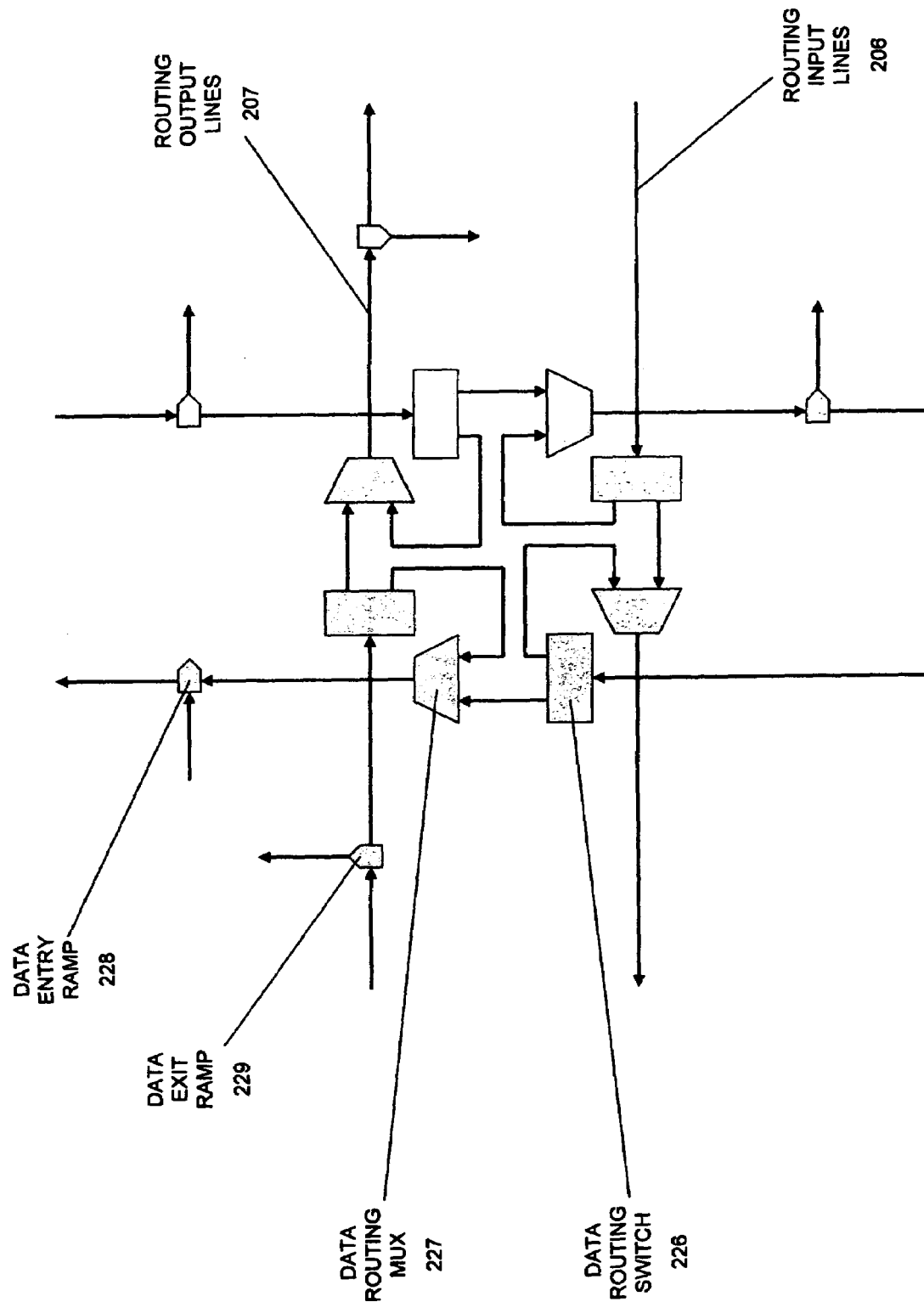
FIG. 42 shows a vortex-like arrangement of four data routing switches and four data routing muxes forming a data routing junction for routing data packets in up to four routing directions along two routing dimensions.

FIG. 42 shows four sets of data routing terminals 214 of FIG. 30B, arranged in another alternative embodiment of a data routing junction 201, for switching of data packet 301 between the total of four routing directions 102 of two routing dimensions.

Connecting data entry ramps 228 to any of the four sets of routing input lines 206, or to any of the four sets of the routing output lines 207 of FIGS. 41 and 42, enables insertion of new data packets 301 from source components 402 into a 2-dimensional embodiment of the multi-dimensional data routing fabric.

Connecting data exit ramps 229 to any of the four sets of routing input lines 206, or to any of the four sets of the routing output lines 207 of FIGS. 41 and 42, enables extraction of data packets 301 from a 2-dimensional embodiment of the multi-dimensional data routing fabric when they have reached their respective destination components 403.

Figure 43:
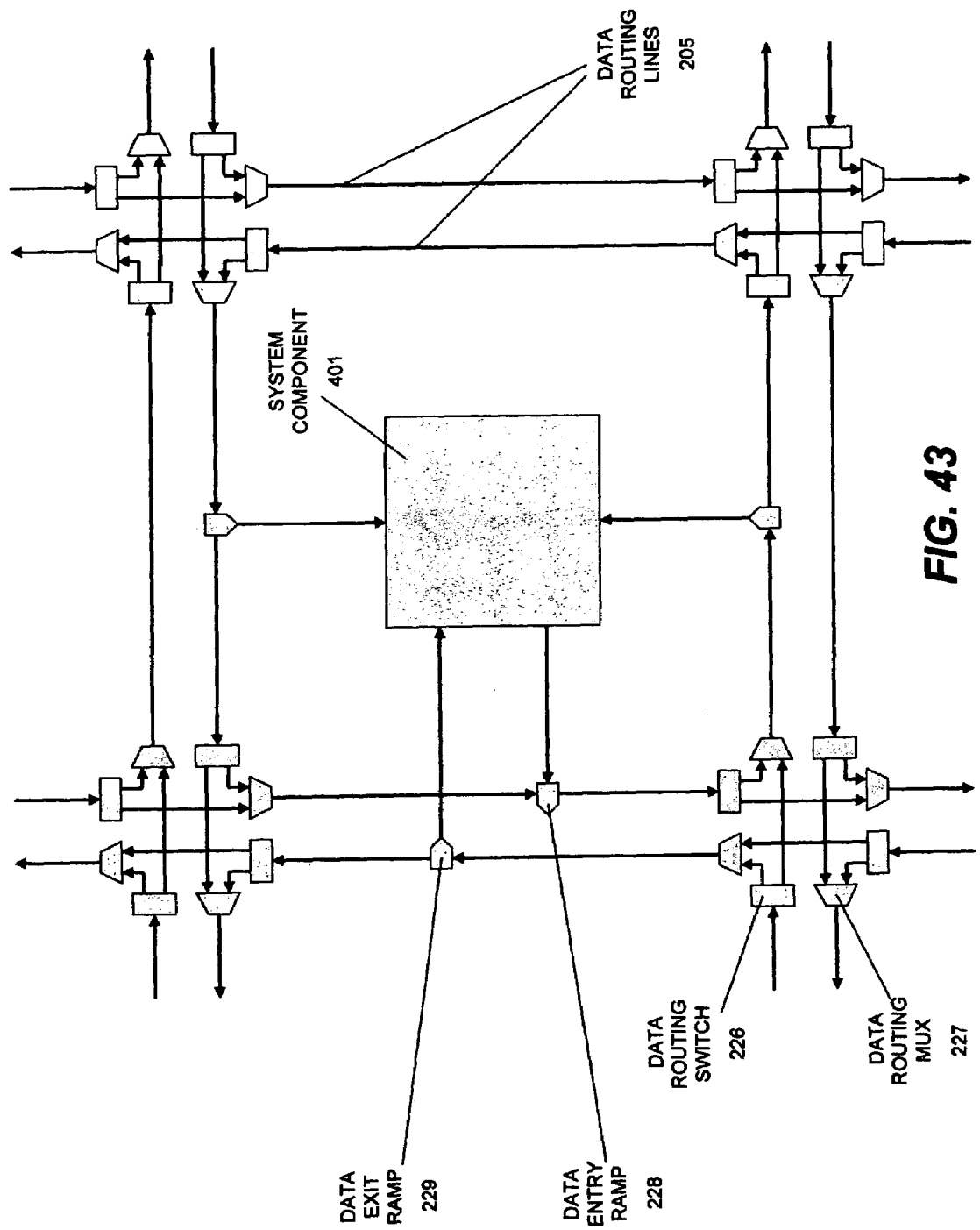
FIG. 43 shows a system component connected to a four-junction section (cross-like junctions) of a 2-dimensional data routing fabric through three data exit ramps and one data entry ramp.

FIG. 43 shows a portion of a 2-dimensional embodiment of the multi-dimensional data routing fabric that has been implemented with data routing terminals 214 of FIG. 30A. Four clusters of data routing terminals 214, with four data routing terminals 214 in each cluster, are placed at the intersections of four sets of data routing lines 205 representing the four routing directions 102 of two routing dimensions.

Figure 44:
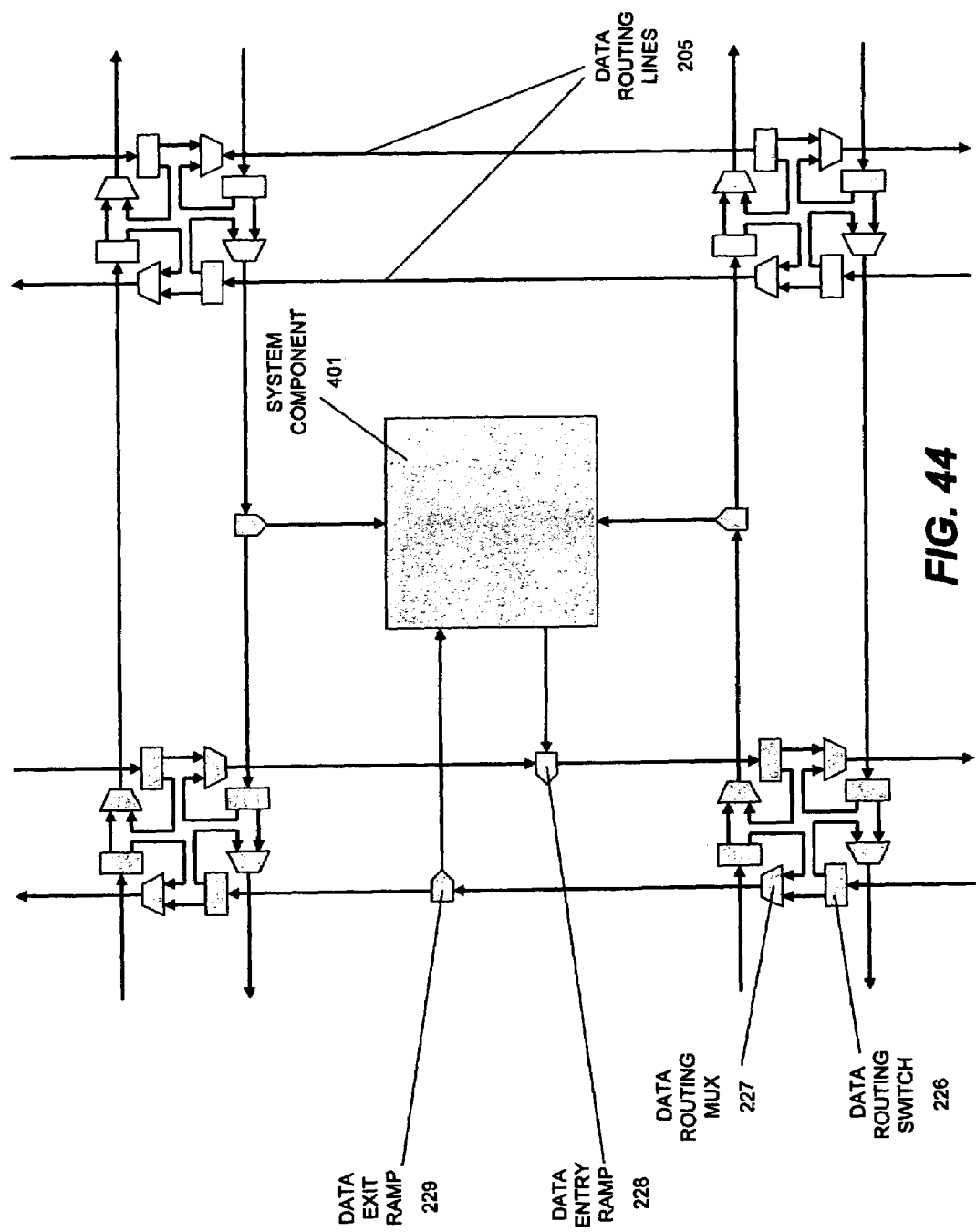
FIG. 44 shows a system component connected to a four-junction section (vortex-like junctions) of a 2-dimensional data routing fabric through three data exit ramps and one data entry ramp.

FIG. 44 shows a portion of a 2-dimensional embodiment of the multi-dimensional data routing fabric that has been implemented with data routing terminals 214 of FIG. 30B. Four clusters of data routing terminals 214, with four data routing terminals 214 in each cluster, are placed at the intersections of four sets of data routing lines 205 representing the four routing directions 102 of two routing dimensions.

A data processing system component 401, placed between the four data routing terminals 214 in FIGS. 43 and 44, is connected to selected data routing lines 205 with three data exit ramps 229 and one data entry ramp 228. The data exit ramp 229 supplies data processing operands from the fabric to the system component 401. The data entry ramps 228 send the data processing result from the system component 401 to the fabric for delivery to the next data processing component of the current data flow.

A multi-dimensional data routing fabric can be assembled from arrays of data routing terminal 214 clusters, each cluster serving a function of a data routing junction 201, being capable of routing system data in all routing directions 102 of a given multi-dimensional data routing fabric. FIG.

45A shows a 2-dimensional embodiment of the multi-dimensional data routing fabric containing 16 data routing junctions 201.

Figure 45A:
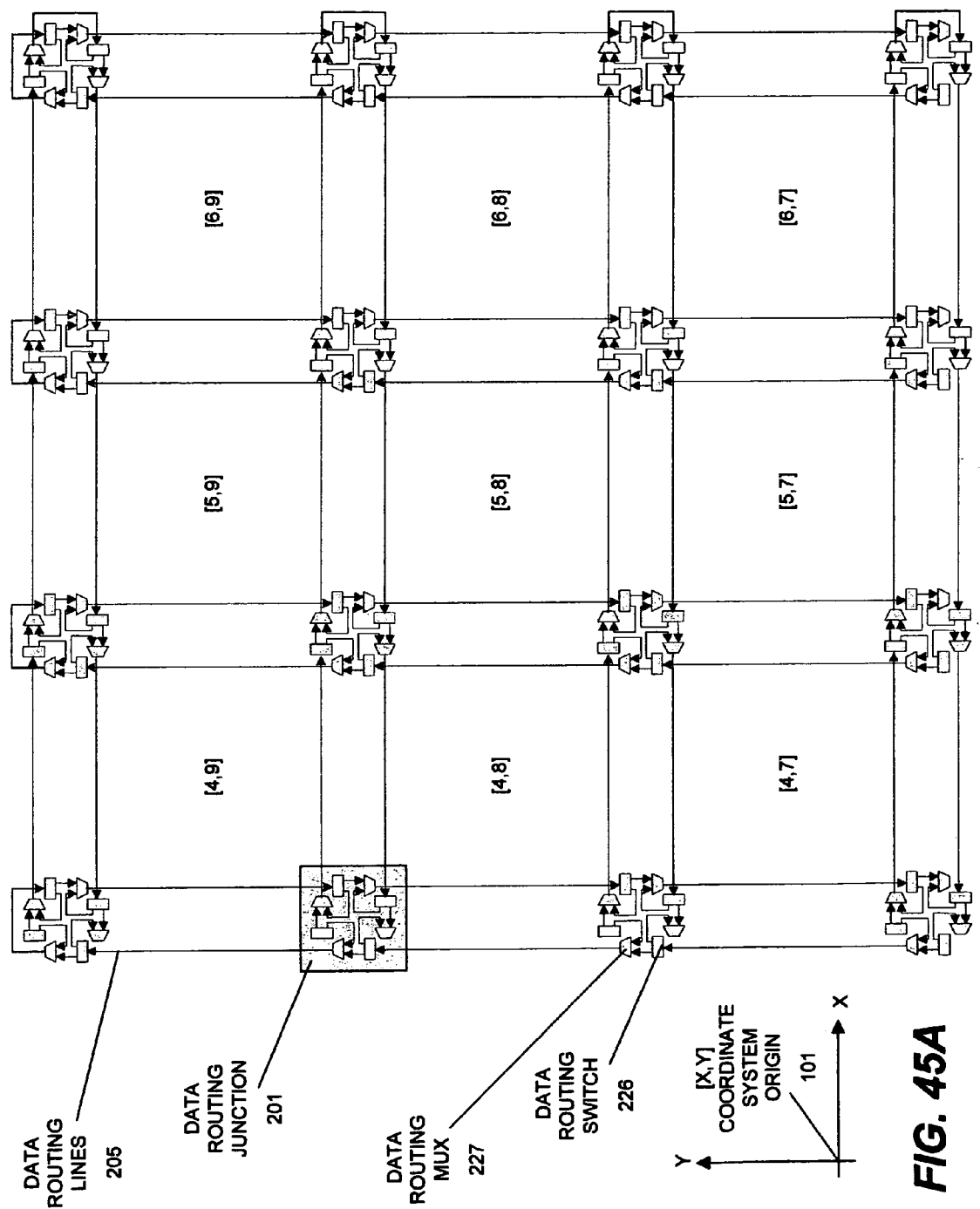
FIG. 45A shows a 16-junction section of a 2-dimensional data routing fabric with nine unique [X,Y] coordinate regions available for connecting to system components.
Figure 45B:
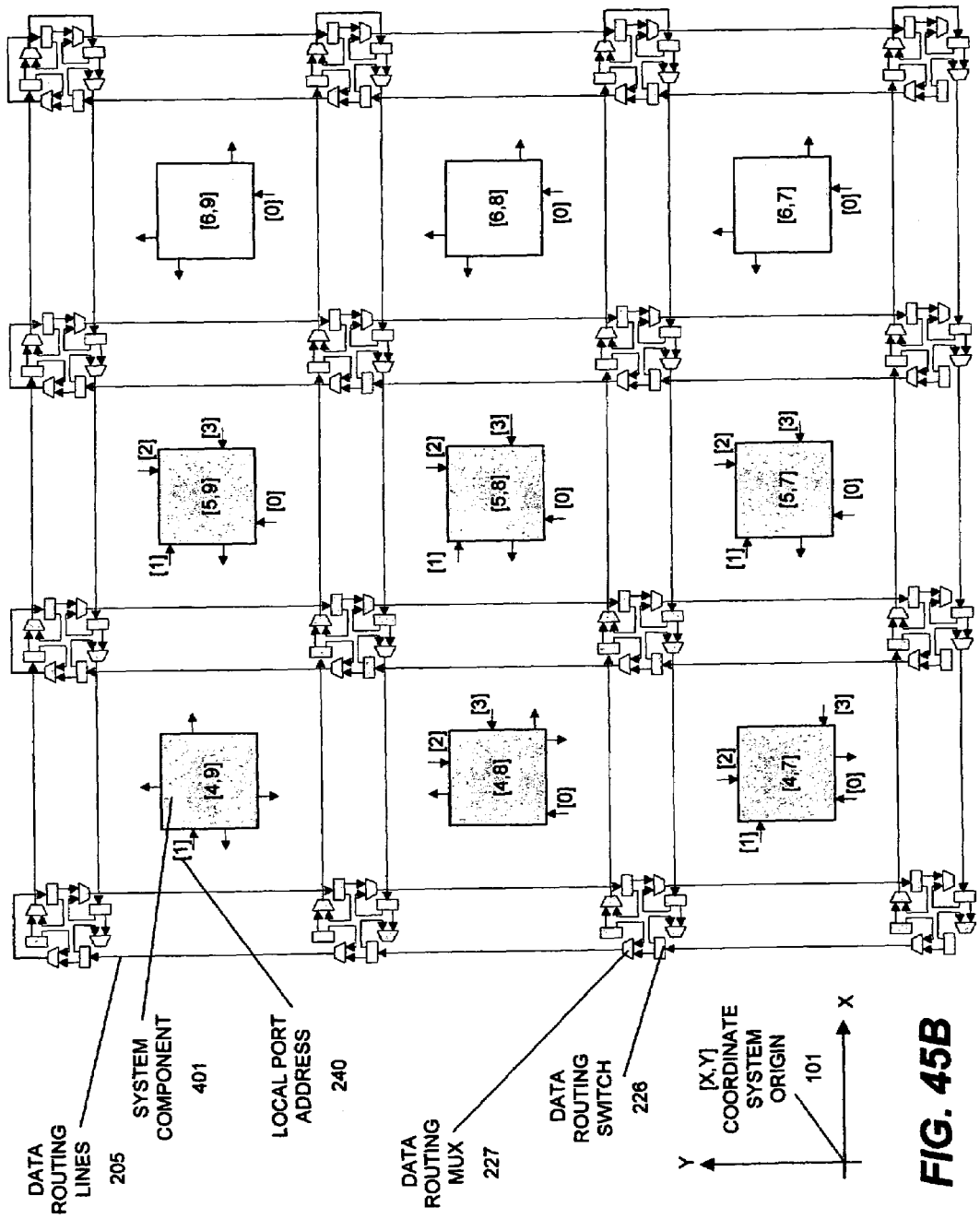
FIG. 45B shows a 16-junction section of a 2-dimensional data routing fabric with nine system components populating nine unique [X,Y] coordinate regions.

Data processing system components 401 can be conveniently placed in rectangular voids between fabric threads formed by pairs of mutually opposite data routing lines 205. FIG. 45B shows 9 system components 401, each with uniquely assigned [X,Y] local coordinates 211, relative to an [X,Y] coordinate system origin 101.

The system components 401 in FIG. 45B receive data processing operands through one or more read ports, and output data processing results through one or more write ports. Each read port is uniquely addressable from within the fabric by a combination of the [X,Y] local coordinates 211 of its component, and by a unique [P] local port address 240 within that component.

Figure 45C:
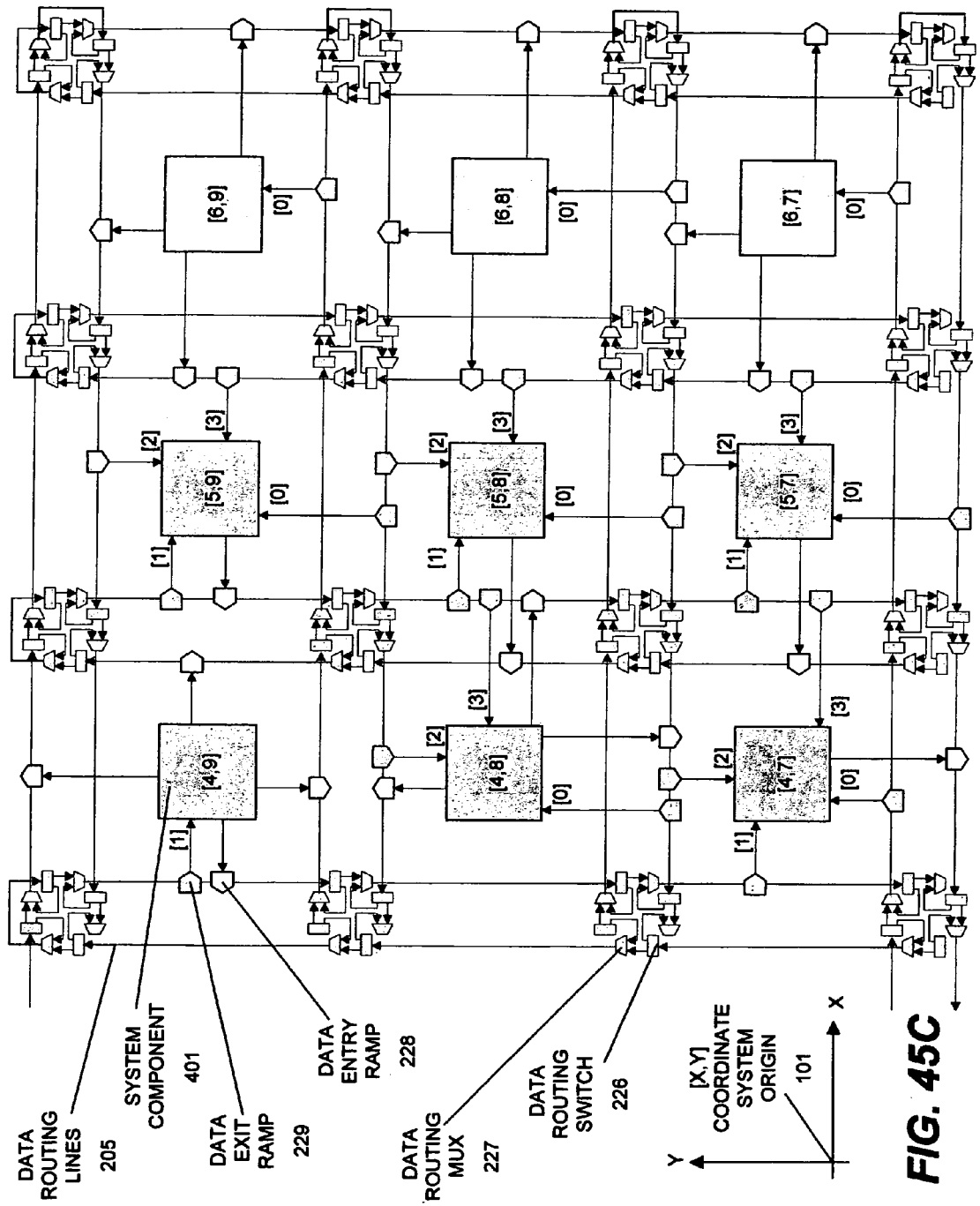
FIG. 45C shows nine system components using multiple data exit ramps and data entry ramps to connect to a section of a 2-dimensional data routing fabric.

Data processing operands arrive at system components 401 through individual data exit ramps 229, each connecting a selected data routing line 205 with a component read port. Data processing results leave system components 401 through individual data entry ramps 228, each connecting a component write port with a selected data routing line of the fabric. FIG. 45C shows 9 data processing components interconnected through multiple data entry ramps 228 and data exit ramps 229 in a 2-dimensional embodiment of the multi-dimensional data routing fabric.

Figure 45D:
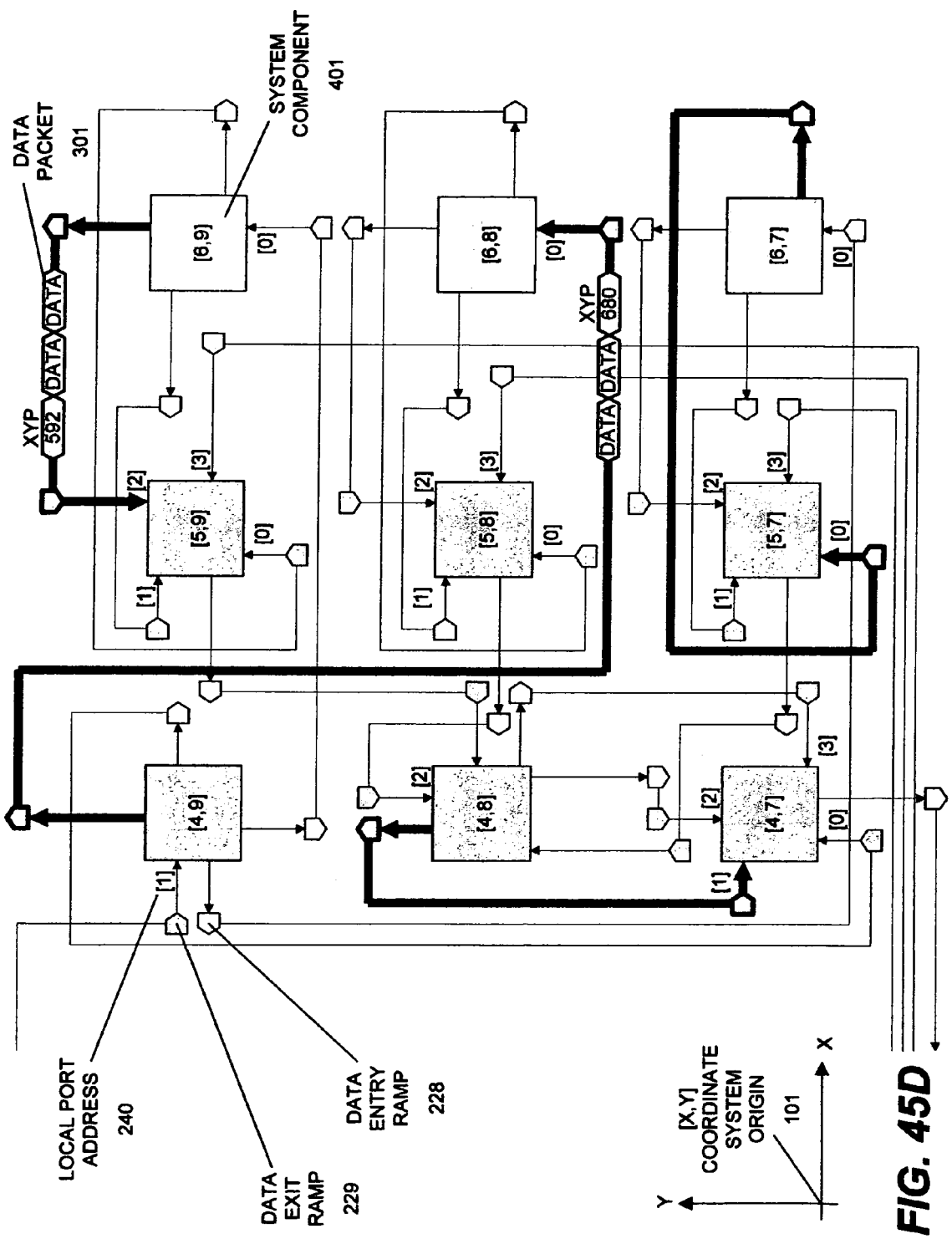
FIG. 45D shows a schematic representation of multiple data transfers through a 2-dimensional data routing fabric.

FIG. 45D shows a schematic representation of 9 data processing system components 401 interconnected to collectively perform a data processing function. Crossing the boundary of the system are 5 sets of data lines representing 4 input operands and one output result. Internally, the system components 401 are wired together with data lines carrying intermediate data processing results from component to component. Some of the lines of FIG. 45D have superimposed data packets 301 with headers showing the [X,Y] destination region coordinates 313 and the [P] destination port addresses 314.

Figure 45E:
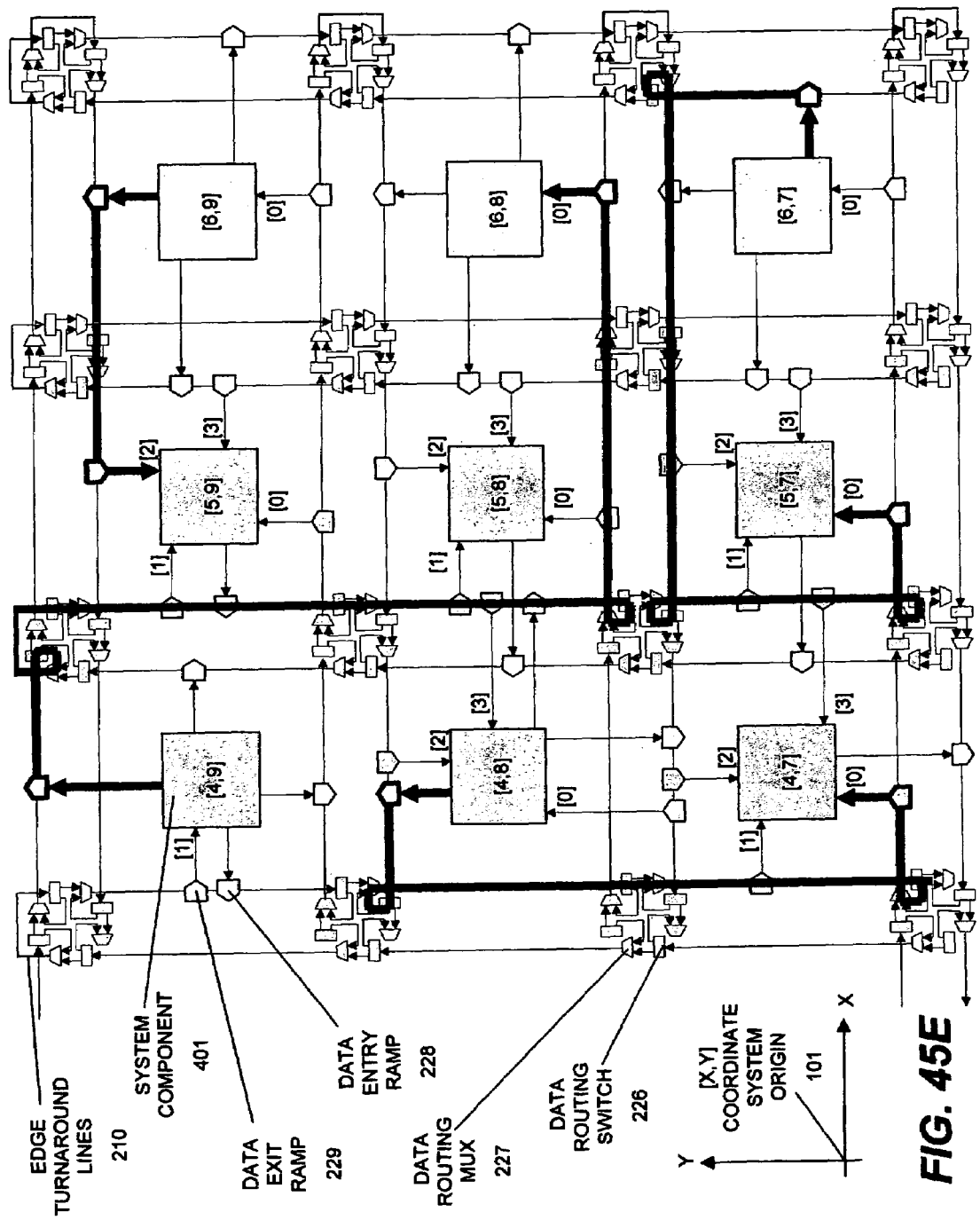
FIG. 45E shows the physical paths of multiple data transfers through a 2-dimensional data routing fabric.

FIG. 45E represents the physical implementation of the system schematic of FIG. 45D, showing the actual paths that data packets 301 take through the fabric building blocks to arrive at their destinations. The packet paths highlighted in bold match the corresponding bold paths of FIG. 45D.

The data routing terminals 214 of this embodiment are configured to deliver data packets 301 from source data routing terminals to destination data routing terminals 214 along paths resembling left-turn spirals. The packets pass straight through each data routing terminal 214 if the destination is to the left and in front of the current packet location. The routing terminals 214 are configured to turn a packet to the left if its destination is behind or to the right of the current location (FIG. 45E).

Data packets 301 that attempt to cross the system boundary are reflected back into the system by sets of edge turnaround lines 210 connecting the mutually opposite data routing lines 205 of edge data routing terminals 214 (FIG. 45E).

Fixed-function system components 401 are typically configured to receive data processing operands and to output function results through dedicated read and write ports (as opposed to traditional bus-based software programmable components). The data entry ramp 228 of FIG. 33 can be used to selectively channel the results of one function to a selected next function of a data flow that may be different for each data flow. Data packets 301 can use a packet type identifier 312 field (FIG. 23) encoded in their headers to identify the type of the packet and a particular data flow that it belongs to.

Figure 46A:
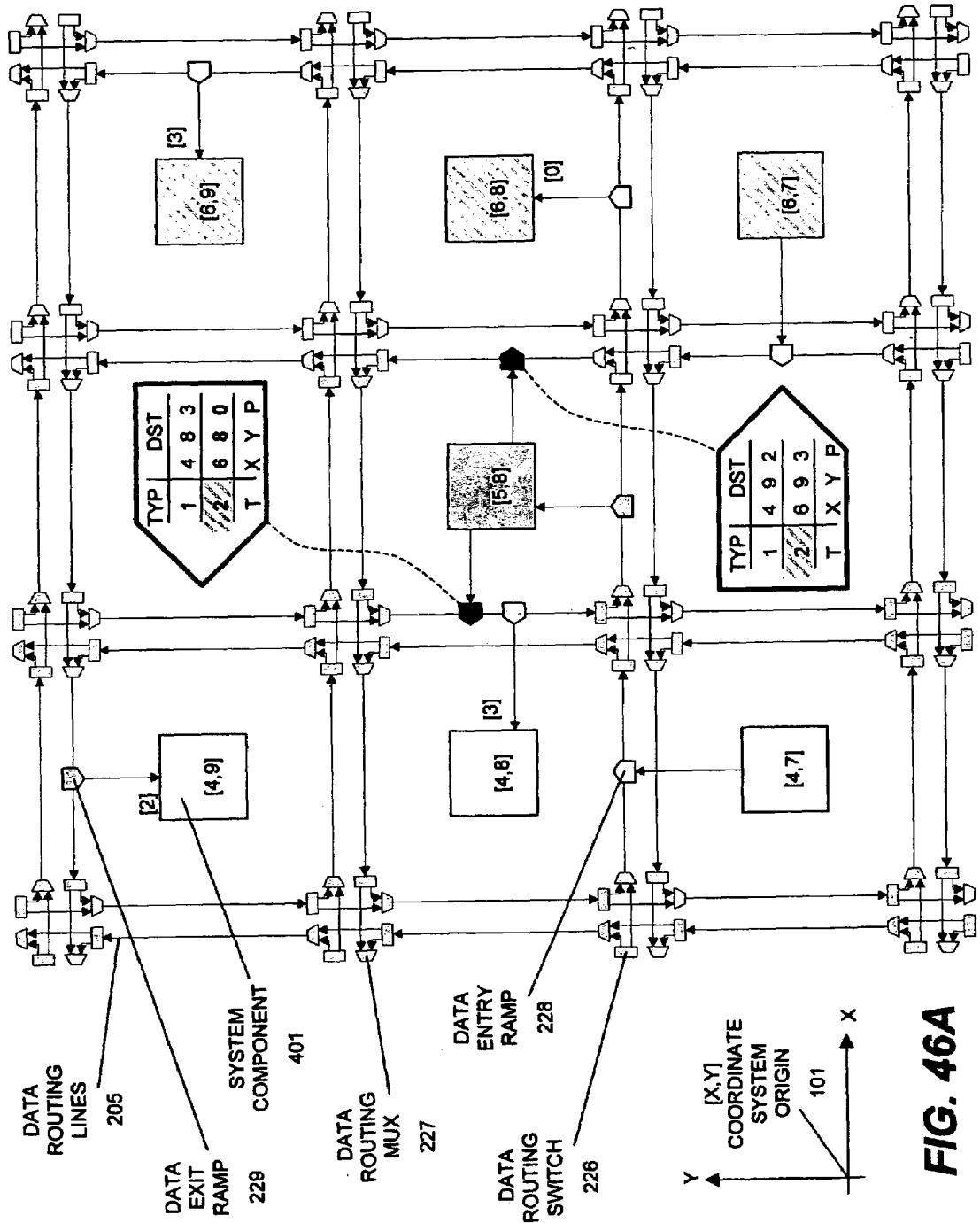
FIG. 46A show a shared component (gray filled) connected through one data exit ramp and two routing data entry ramps to two types of components—a left set of 3 white components and a right set of 3 striped components.

FIG. 46A shows a data processing system containing three components 401 of a white data flow (left column), and three components of a striped data flow (right column). The center component with [X,Y] local coordinates 211 of [5,8] can be shared by the white data flow or the striped data flow, based on where it sends its results. These results enter a 2-dimensional embodiment of the multi-dimensional data routing fabric through left and right routing data entry ramps 228 that are shown in FIG. 46A as two black-filled symbols.

The left and right routing data entry ramps 228 of FIG. 46A are responsive to the packet type identifier 312 field encoded in the header of data packets 301 leaving the shared system component 401 [5,8]. FIG. 46A shows the lookup tables of the left and right routing data entry ramps 228, each storing replacement destination region coordinates 313 and destination port address 314 for two types of packets emerging from the shared component—type 1 and type 2.

By being able to select packet destinations in response to packet type classification, the routing data entry ramps 228 enable one system component 401 (in this case component [5,8]) to be shared among multiple data flows, in this case the white flow and the striped flow (FIG. 46A).

Figure 46B:
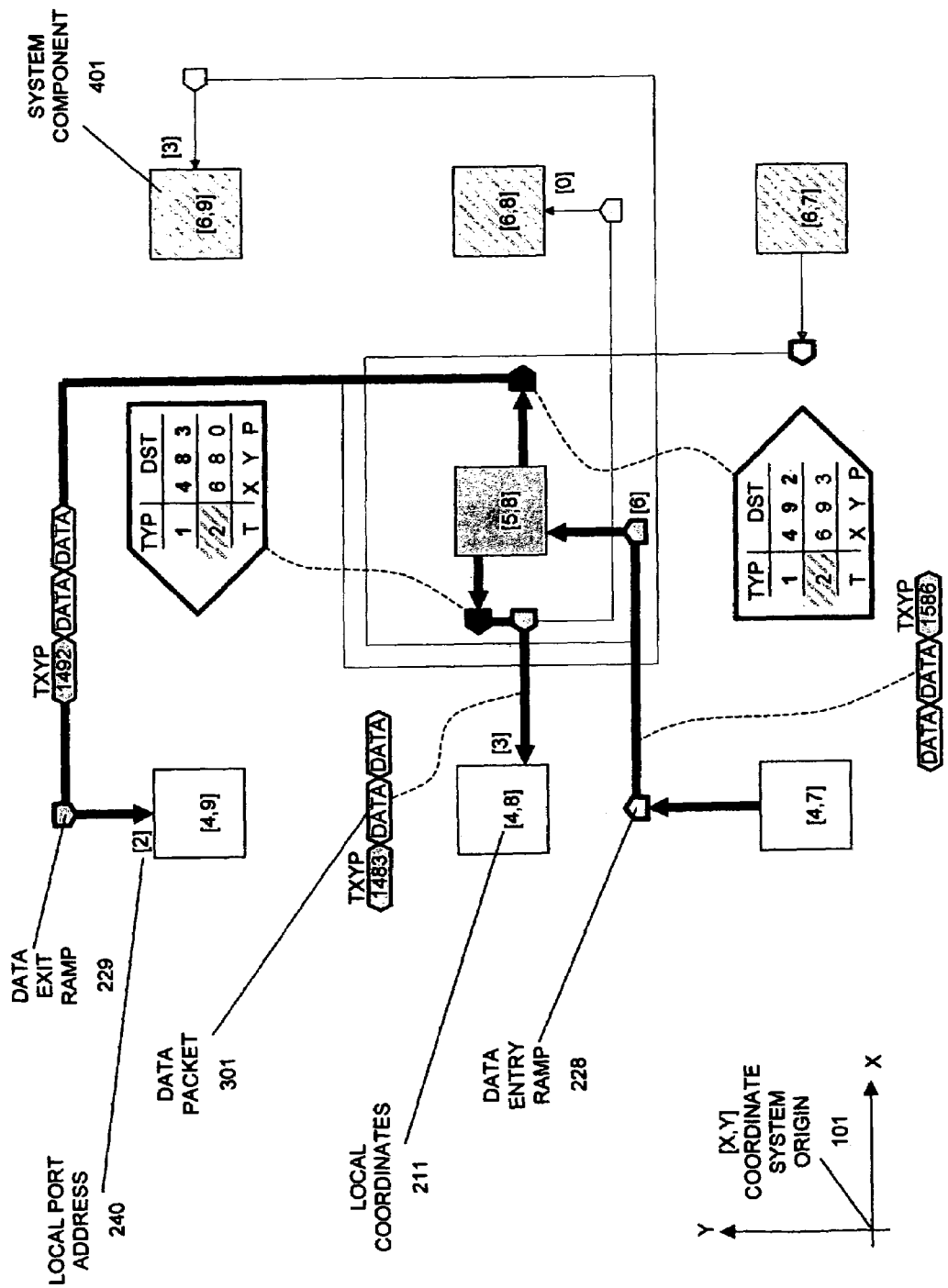
FIG. 46B shows a schematic view of the bottom white component sending an operand to the shared (gray) component, and the shared component using the type 1 table selection in the routing data entry ramps to send its results to the middle and top white components.

FIG. 46B shows a schematic representation of the shared component 401 [5,8] participating in the white data flow (type 1). First, a white system component 401 [4,7] sends one operand in the form of type 1 packet ([T] packet type identifier 312 value of [1] in the packet's header) to the shared component [5,8]. Next, the shared component [5,8] generates two results and sends them to the 2-dimensional embodiment of the data routing fabric through left and right routing data entry ramps 228 (black-filled symbols, FIG. 46B).

The left routing data entry ramp 228 selects the [X,Y] destination region coordinates 313 and the [P] destination port address 314 to be [4,8] and [3], in response to the packet's type 1 classification (FIG. 46B).

The right routing data entry ramp 228 selects the [X,Y] destination region coordinates 313 and the [P] destination port address 314 to be [4,9] and [2], in response to the packet's type 1 classification (FIG. 46B).

Finally, the fabric delivers the results of system component 401 [5,8] to the next processing steps of the type 1 data flow—destination port address 314 [3] of destination region coordinates 313 [4,8] and destination port [2] of destination region coordinates 313 [4,9] (FIG. 46B).

Figure 46C:
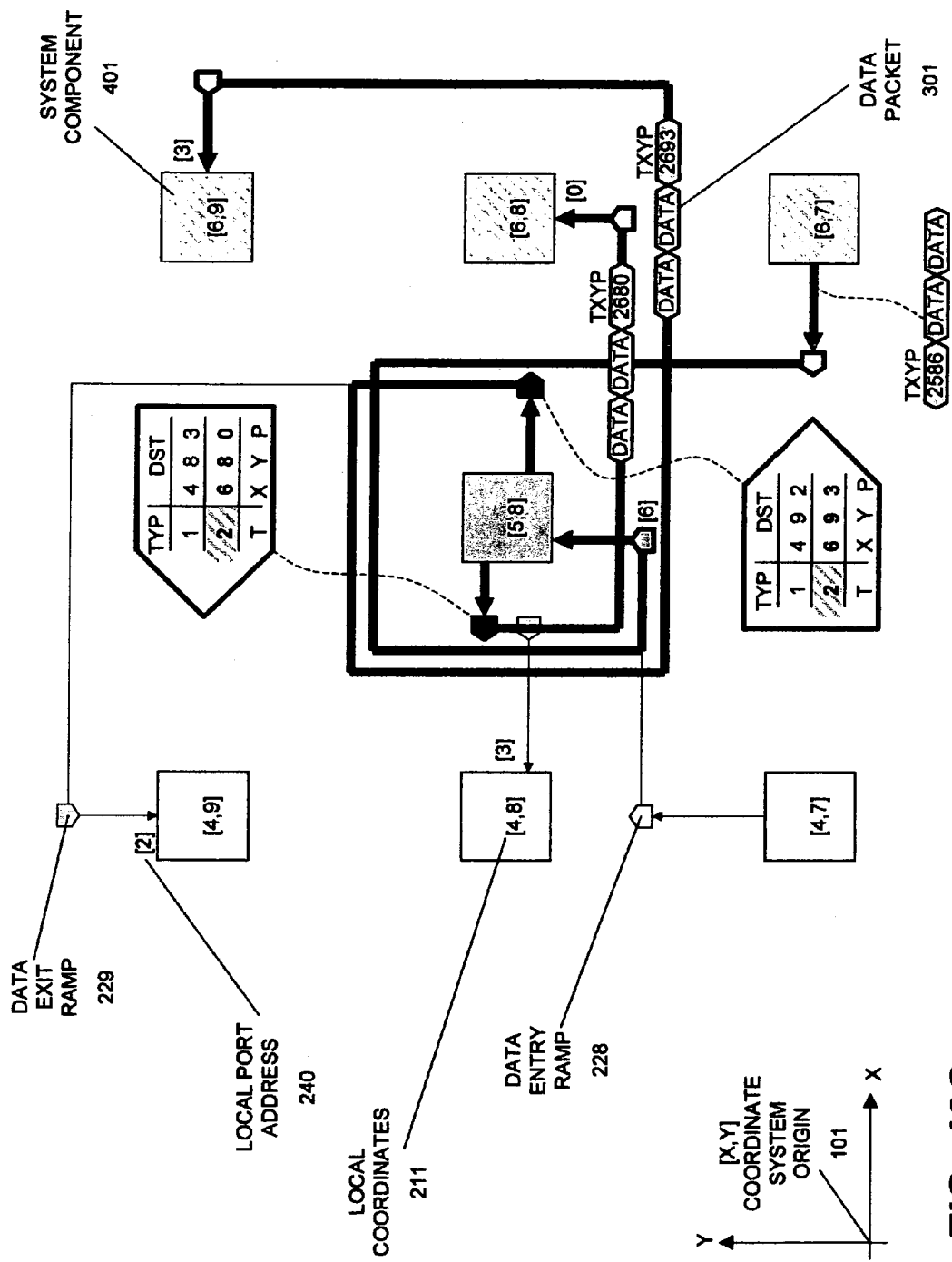
FIG. 46C shows a schematic view of the bottom striped component sending an operand to the shared (gray) component, and the shared component using the type 2 table selection in the routing data entry ramps to send its results to the middle and top striped components.

FIG. 46C shows a schematic representation of the shared component 401 [5,8] participating in the striped data flow (type 2). First, a striped system component 401 [6,7] sends one operand in the form of type 2 packet ([T] packet type identifier 312 value of [2] in the packet's header) to the shared component [5,8]. Next, the shared component [5,8] generates two results and sends them to the 2-dimensional embodiment of the data routing fabric through left and right routing data entry ramps 228 (black-filled symbols, FIG. 46C).

The left routing data entry ramp 228 selects the [X,Y] destination region coordinates 313 and the [P] destination port address 314 to be [6,8] and [0], in response to the packet's type 2 classification (FIG. 46C).

The right routing data entry ramp 228 selects the [X,Y] destination region coordinates 313 and the [P] destination port address 314 to be [6,9] and [3], in response to the packet's type 2 classification (FIG. 46C).

Finally, the fabric delivers the results of system component 401 [5,8] to the next processing steps of the type 2 data flow—destination port address 314 [0] of destination region coordinates 313 [6,8] and destination port [3] of destination region coordinates 313 [6,9] (FIG. 46C).

Figure 46D:
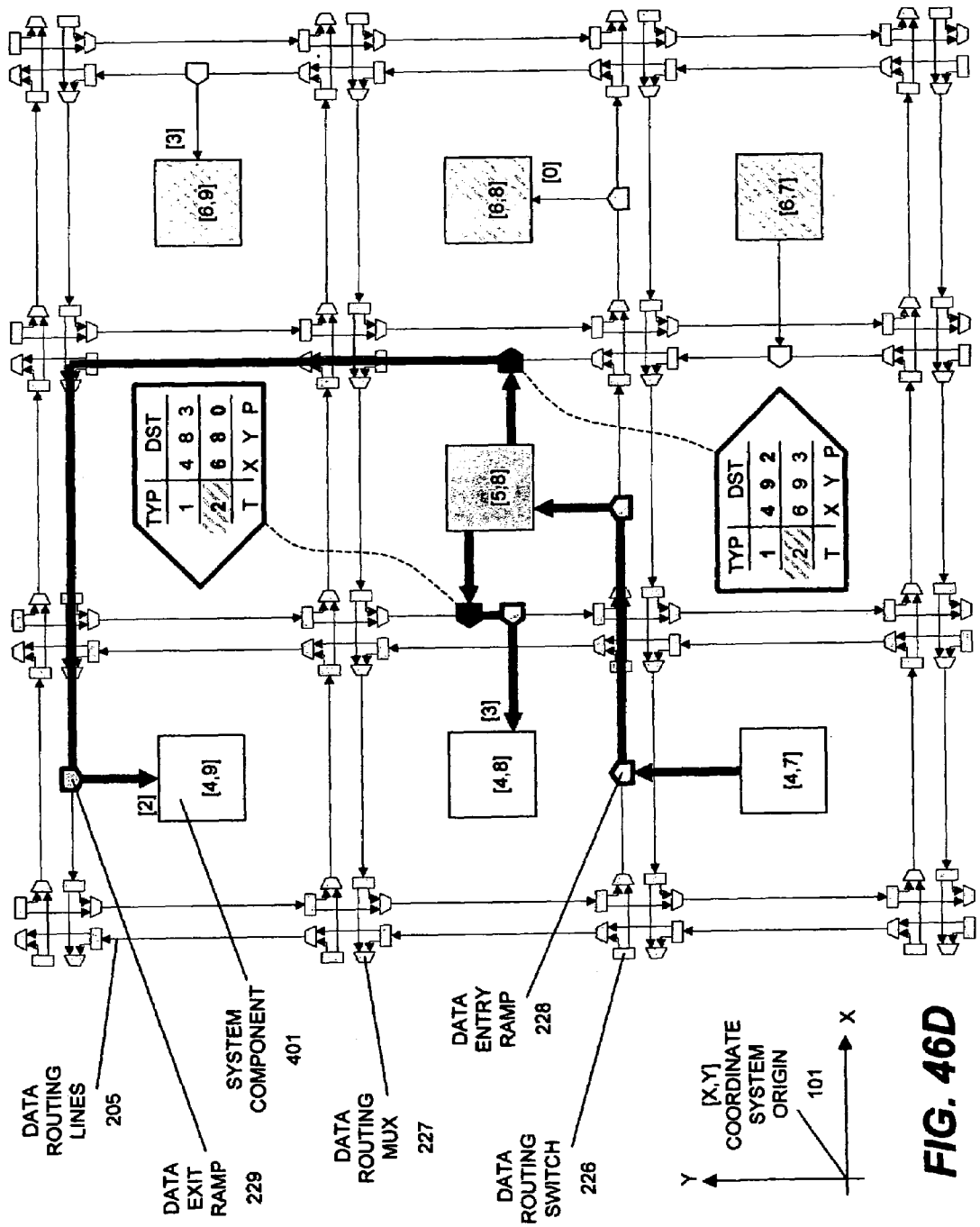
FIG. 46D shows the physical path view of the bottom white component sending an operand to the shared (gray) component, and the shared component using the type 1 table selection in the routing data entry ramps to send its results to the middle and top white components.
Figure 46E:
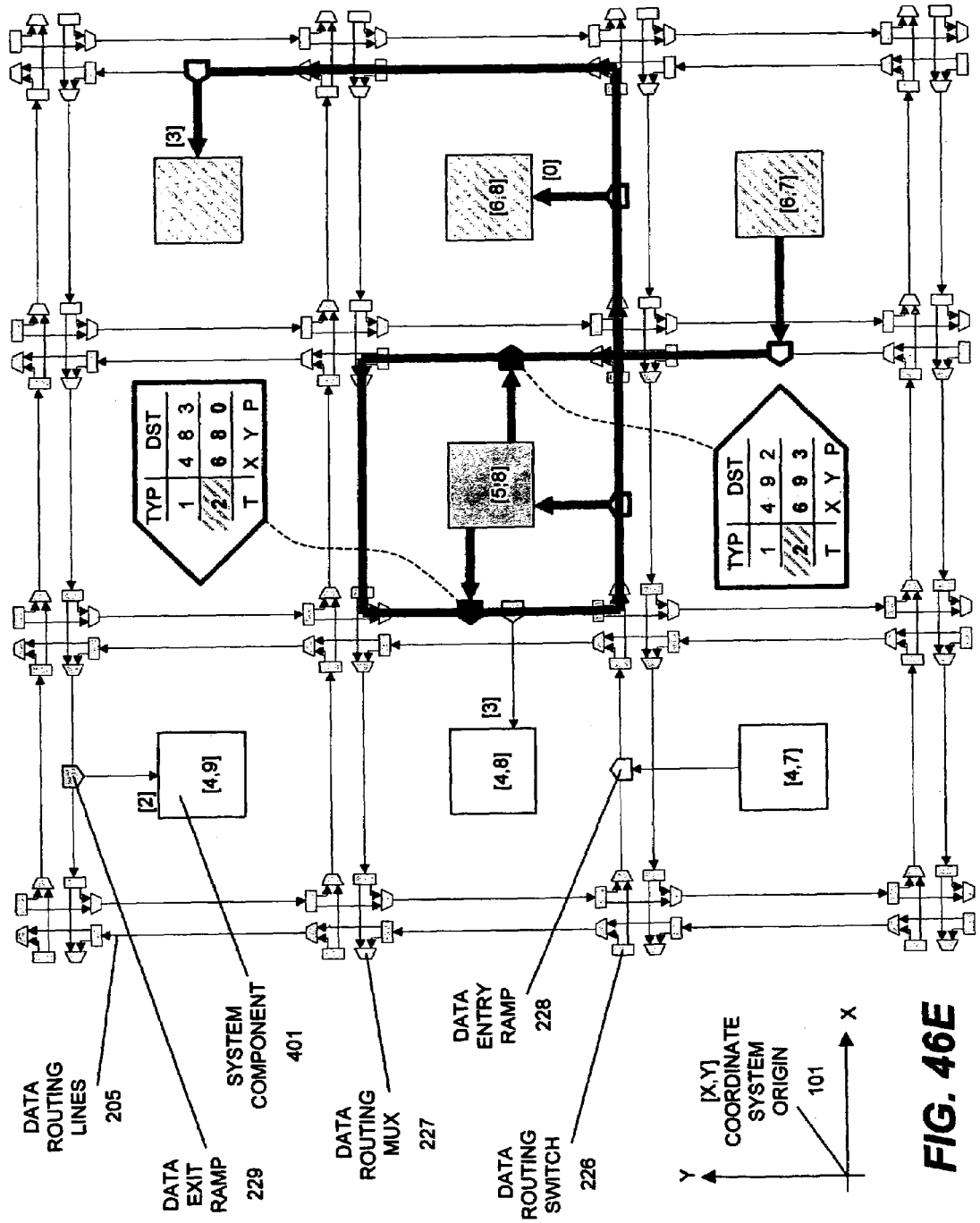
FIG. 46E shows the physical path view of the bottom striped component sending an operand to the shared (gray) component, and the shared component using the type 2 table selection in the routing data entry ramps to send its results to the middle and top striped components.

FIGS. 46D–E represent physical implementations of the system schematics of FIGS. 46B–C, showing the actual paths that data packets 301 take through the fabric building blocks to arrive at their destinations. The packet physical paths highlighted in bold match the corresponding schematic bold paths of FIGS. 46B–C.

The data routing terminals 214 of this embodiment are configured to deliver data packets 301 from source data routing terminals 214 to destination data routing terminals 214 along paths resembling left-turn spirals. The packets pass straight through each data routing terminal 214 if the destination is to the left and in front of the current packet location. The data routing terminals 214 are configured to turn a packet to the left if its destination is behind or to the right of the current location (FIGS. 46B–E).

FIGS. 47A–E show a 3-dimensional embodiment of the multi-dimensional data routing fabric composed of a 3-dimensional array of data routing junctions 201. At system level, the data routing junctions 201 of this embodiment can be visualized as a set of cubes, with the six faces of each cube connected to the neighboring faces of adjacent cubes through orthogonal sets of data routing lines 205.

Data processing system components 401 can be conveniently placed in voids formed within any set of 4 adjacent data routing junction 201 cubes. Source components 402 launch data packets 301 into selected neighboring sets of data routing lines 205 through data entry ramps 228. Destination components 403 receive data packets 301 from selected neighboring sets of data routing lines 205 through data exit ramps 229 (FIGS. 47A–E).

Internally, each of the data routing junctions 201 is composed of six data routing switches 226 and six data routing muxes 227 interleaved in a daisy chain pattern. The first set of switch output lines 231 of each data routing switch 226 is connected to the first set of the mux input lines 230 of an adjacent data routing mux 227 in the clockwise direction. The second set of switch output lines 231 of each data routing switch 226 is connected to the second set of the mux input lines 230 of an adjacent data routing mux 227 in the counter-clockwise direction. The resulting routing structure forms six pairs of data routing terminals 214, each pair aligned with a unique data routing direction 102 of the three data routing dimensions 103, 104 and 105 (FIGS. 47A–E).

After being launched from the source component 402 (at [X,Y,Z] local coordinates 211 of [3,3,–1]) into the source data routing junction 201 with [X,Y,Z] local coordinates 211 of [2,4,0], the data packet 301 in FIGS. 47A–E makes a series of turns and straight through passes through a contiguous chain of intermediate data routing junctions 201 to converge on its destination component 403 with [X,Y,Z] local coordinates 211 of [5,3,1].

The data packet 301 in FIGS. 47A–E is launched from the source component 402 to the source data routing junction 201 through data entry ramp 228, and is received by the destination component 403 through data exit ramp 229.

The data routing terminals 214 of the intermediate data routing junctions 201 along the packet's path decide to turn the data packet 301 or pass it straight through by comparing its [X,Y,Z] local coordinates 211 to the [X,Y,Z] destination region coordinates 313 encoded in the packet header.

Figure 47A:
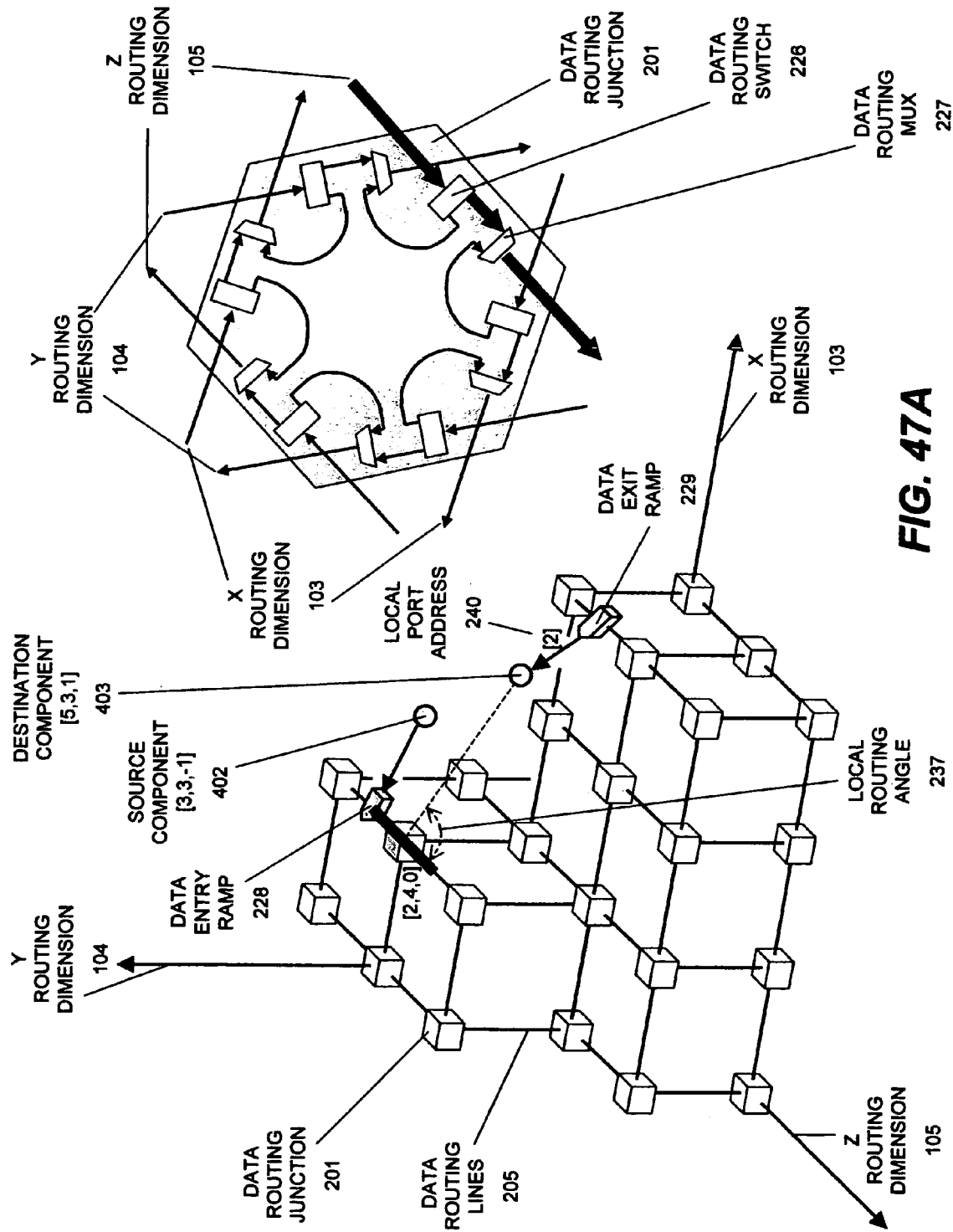
FIG. 47A shows a data packet entering the fabric from its source component via a data entry ramp.

In this embodiment a data packet 301 is turned counter-clockwise to a new routing direction 102 if the local routing angle 237 between the direction of the current packet path and the line from the current packet location to the destination component 403 is smaller then 90 degrees. FIG. 47A shows the data packet 301 passing straight through the data routing junction 201 [2,4,0], since the local routing angle 237 is smaller then 90 degrees.

Figure 47B:
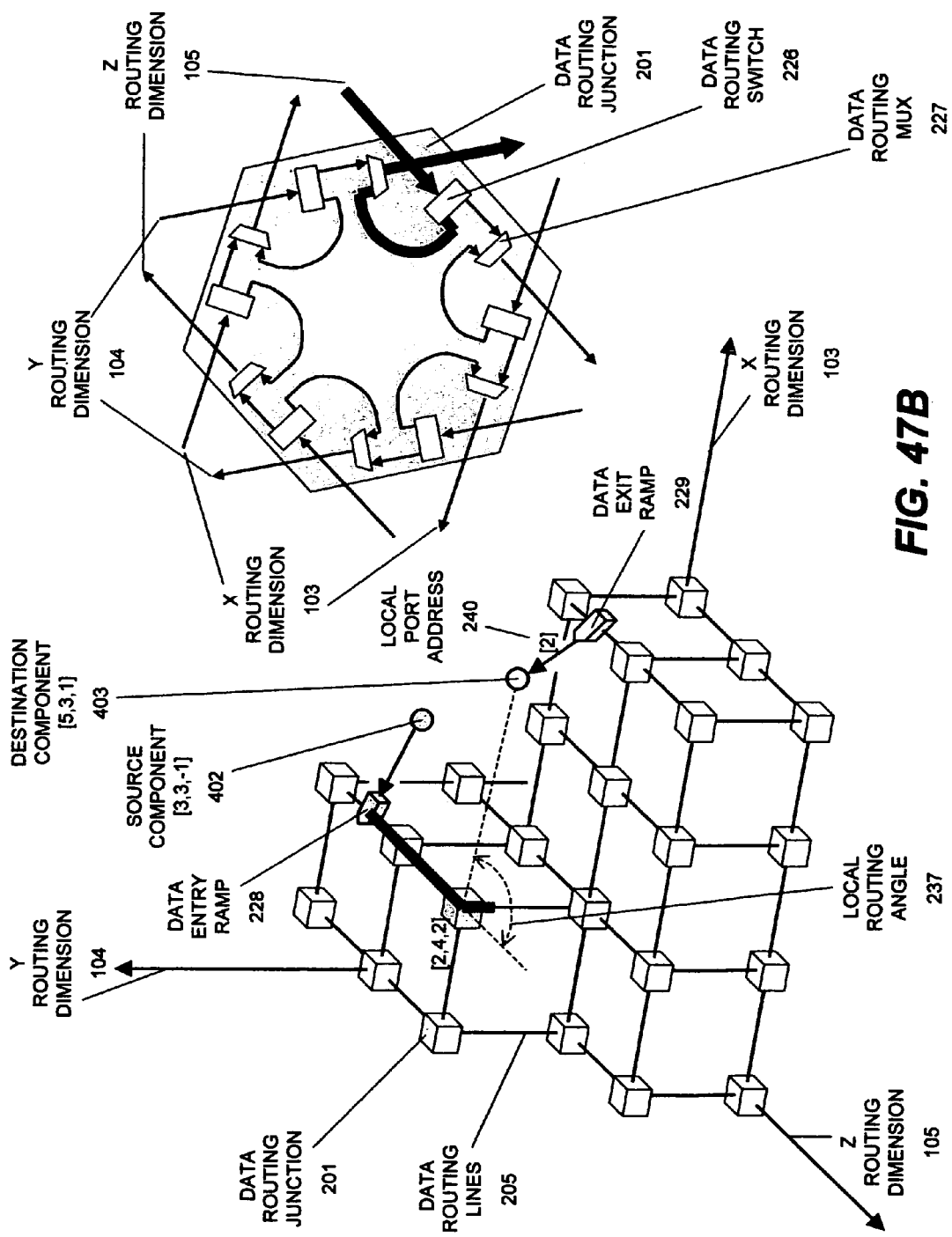
FIG. 47B shows a data packet traveling in the [Z] direction making a turn inside a data routing junction because its local routing angle is greater then 90 degrees.

FIG. 47B shows the data packet 301 turning to the negative routing direction 102 of the Y routing dimension 104 at the [2,4,2] data routing junction 201, because the local routing angle 237 is now larger then 90 degrees.

FIG. 47C shows the data packet 301 turning to the positive routing direction 102 of the X routing dimension 103 at the [2,2,2] data routing junction 201, because the local routing angle 237 is still larger then 90 degrees.

Figure 47D:
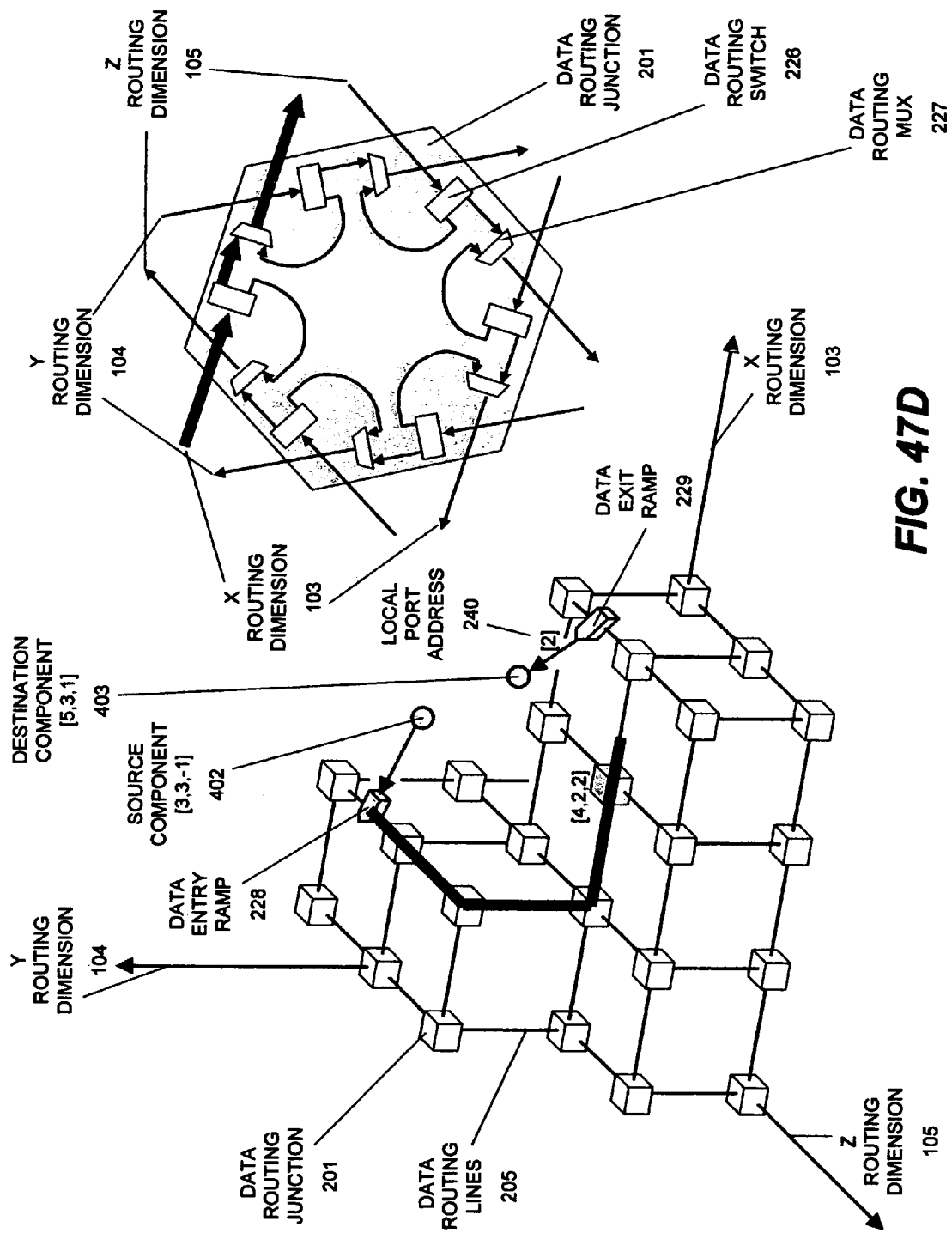
FIG. 47D shows a data packet traveling in the [X] direction passing straight through a data routing junction because its local routing angle is smaller then 90 degrees.

In FIG. 47D, the data packet 301 is passing straight through the [4,2,2] data routing junction 201, since the local routing angle 237 is once again smaller then 90 degrees.

Figure 47E:
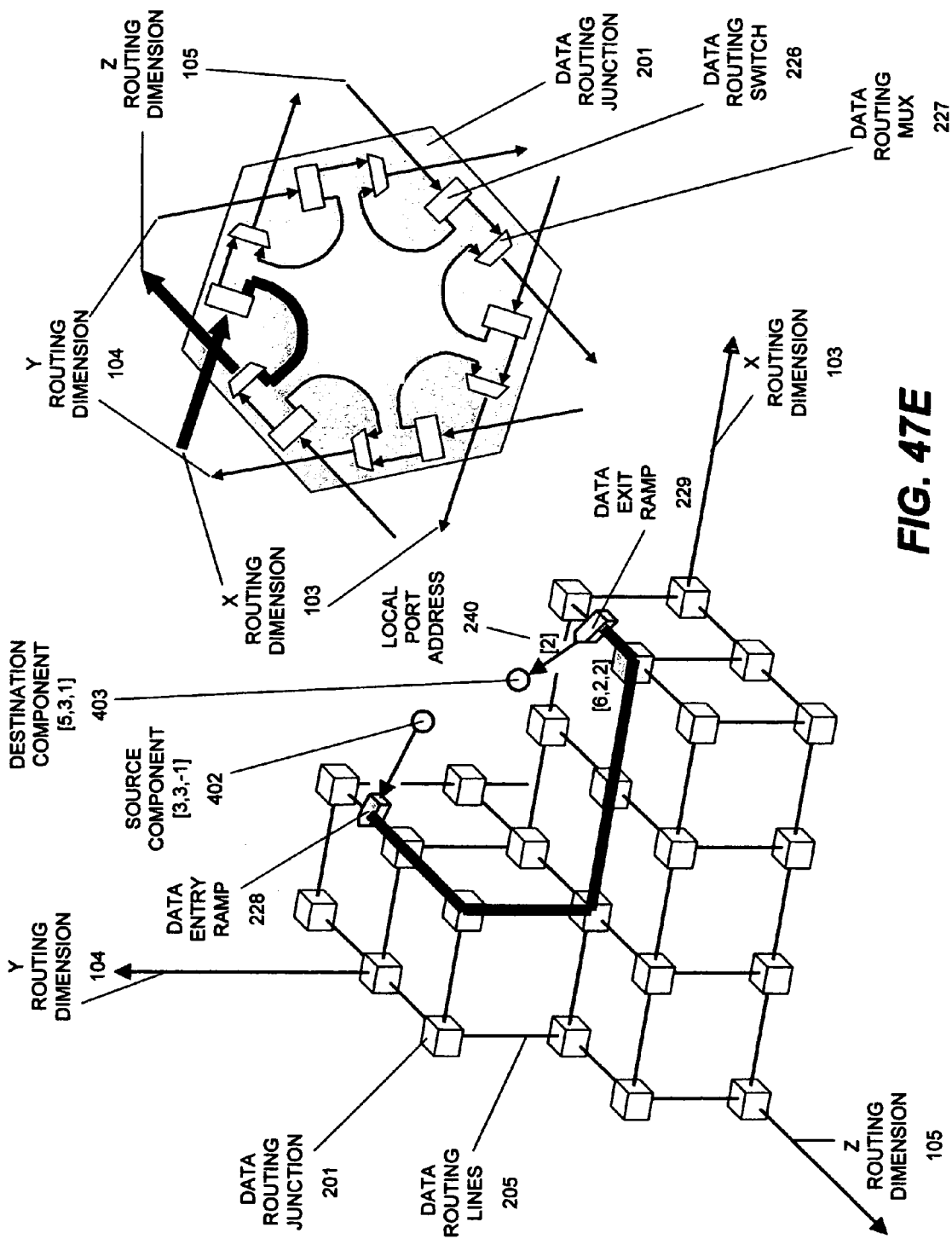
FIG. 47E shows a data packet traveling in the [X] direction making a turn inside a data routing junction because its local routing angle is greater then 90 degrees.

FIG. 47E shows the data packet 301 turning to the negative routing direction 102 of the Z routing dimension 105 at the [6,2,2] data routing junction 201, because the local routing angle 237 is once again larger then 90 degrees.

Immediately following the turn at [6,2,2] data routing junction 201, the data packet 301 enters the data exit ramp 229 leading to the [2] local port address 240 of the destination component 403 at [5,3,1] local coordinates 211.

At this point the data packet 301 exits the fabric into the destination component 403, since the destination region coordinates 313 and the destination port address 314 of the packet header now both match the local coordinates 211 and the local port address 240 that is stored in the data exit ramp 229 leading to the destination component 403.

If the packet destination region coordinates 313 match the local coordinates 211, but the packet destination port address 314 does not match the local port address 240, the data routing terminal 214 once again uses the size of the local routing angle 237 to determine whether to turn or to go straight, until the destination port address 314 matches the local port address 240.

While both the data processing system components 401 and the data routing junctions 201 of FIGS. 47A–E are placed at uniquely addressable [X,Y,Z] coordinates (even values for the routing junctions 201 and odd values for the components), the addressing range for a given size of the destination region coordinates 313 field inside the header of a data packet 301 can be doubled, if only the system components 401 are addressed directly, and where the locations of the data routing junctions 201 are implied to exist in-between the adjacent system components 401.

There are various possibilities in regards to how data packets 301 can be routed at the edges and corners of data processing systems. The edge turnaround lines 204 shown in FIGS. 5A–B perform U-turns to contain data packets 301 that are attempting to cross system boundaries. In alternative embodiments of the multi-dimensional data routing fabric, various derivatives of data routing junctions 201 can be used to handle data traffic at system's edges and corners. This type of additional system's edge routing can be obtained at lower gate counts than the data routing junctions 201 found in the interior of a data processing system. System's edge and corner routing functions can enable functional encapsulation of subsystems, and efficient data communications between subsystems arranged horizontally, vertically, or combination thereof.

Figure 48:
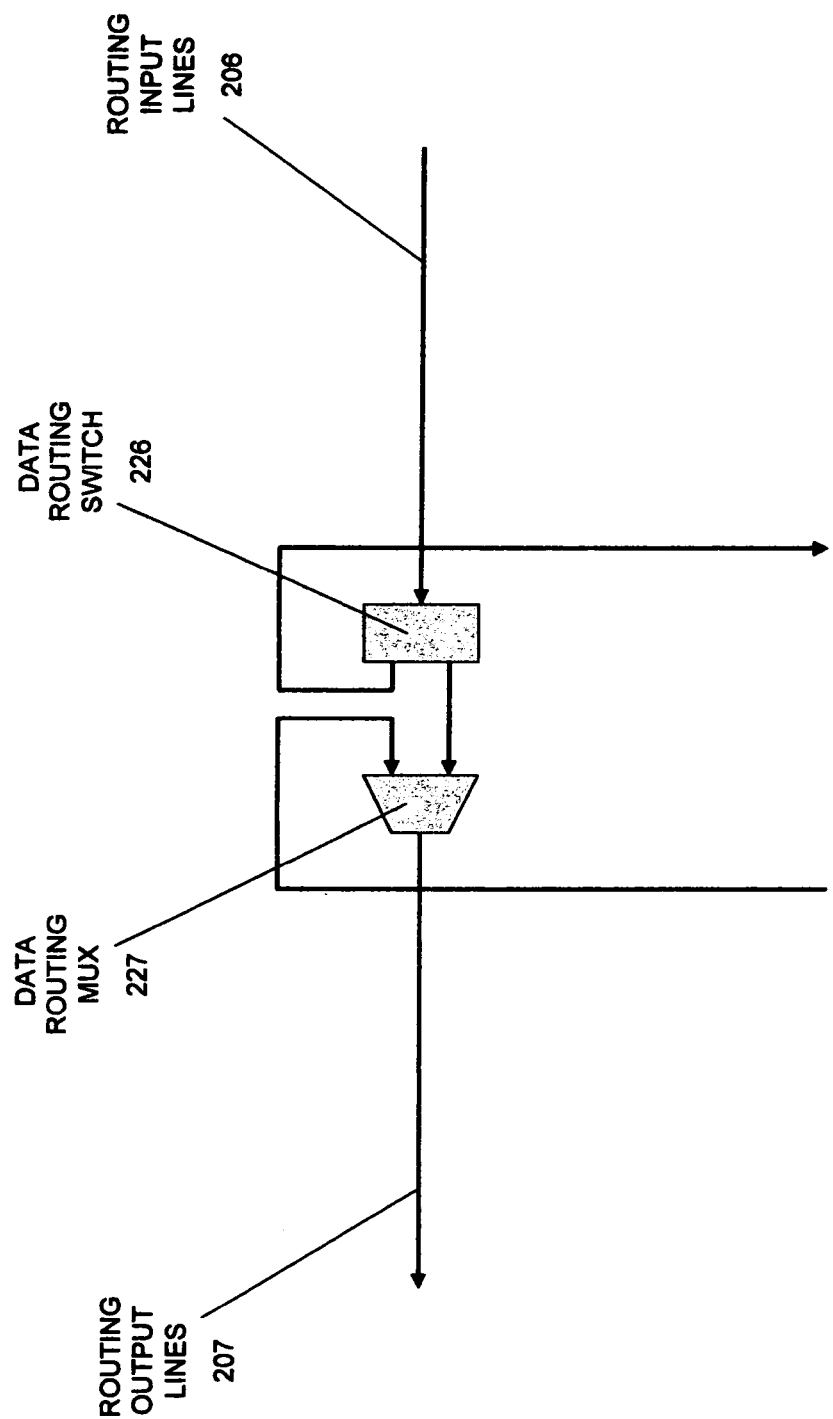
FIG. 48 shows an edge routing junction can be placed at an edge of a bounded 2-dimensional data routing fabric.

FIG. 48 shows an edge routing junction 241 located on a horizontal edge of a data processing system, composed of a single data routing switch 226 and a single data routing mux 227. The data routing switch 226 turns an edge-travelling data packet 301 down into the system if the packet's destination component 403 is behind the current position of the data packet 301. The data routing mux 227 also unconditionally turns every data packet 301 that arrives from the bottom of FIG. 48 to place it along the edge of the data processing system heading towards the left side of FIG. 48.

Figure 49:
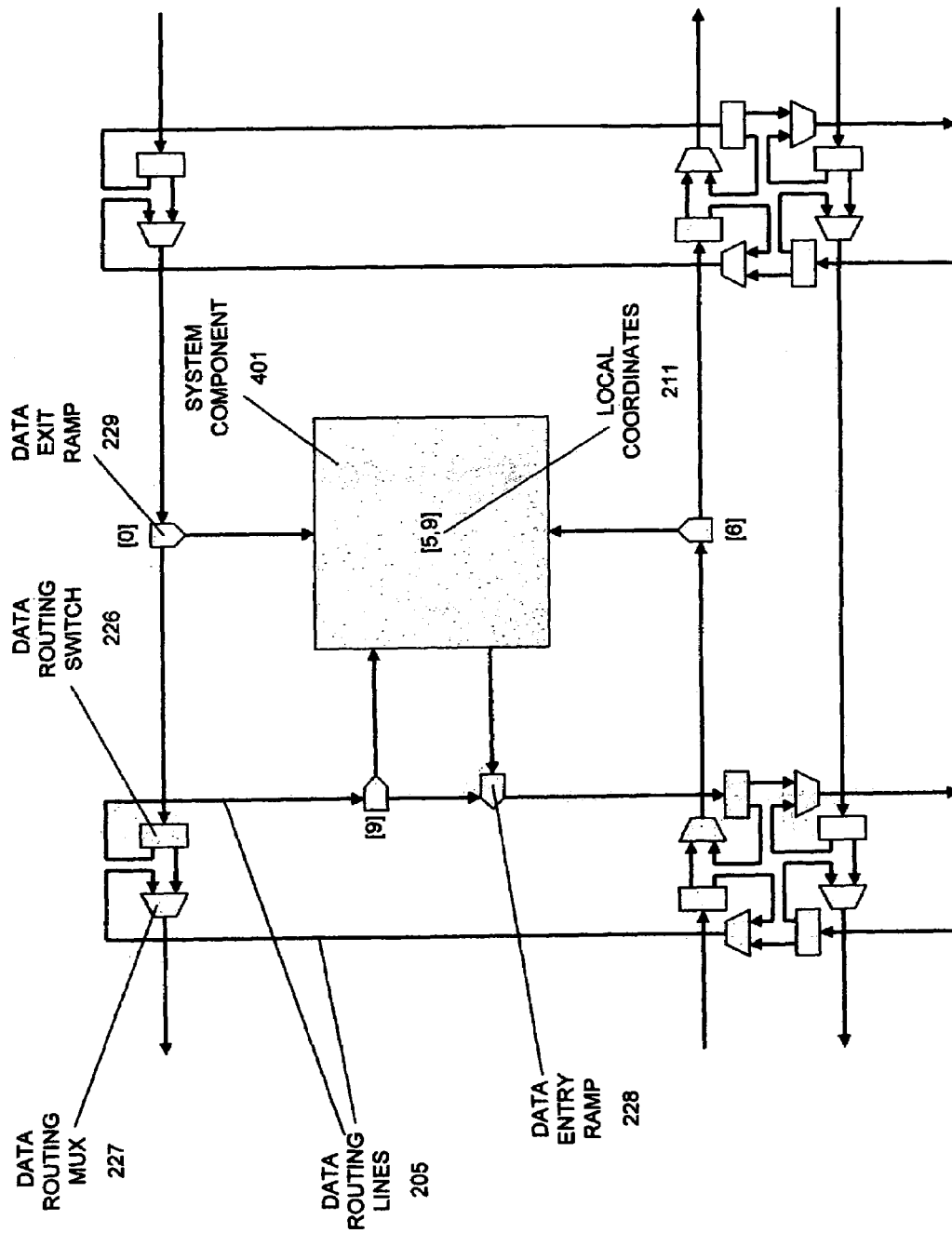
FIG. 49 shows two edge routing junctions, two internal data routing junctions, three data exit ramps and one data entry ramp surrounding a system component located at an edge of a 2-dimensional data routing fabric.

FIG. 49 shows two instances of the edge routing junction 241 of FIG. 48, along with two instances of the internal (non-edge) data routing junction 201. A system component 401 is sandwiched between the edge routing junctions 241 and the non-edge data routing junctions 201. As in previously described embodiments, a system component 401 uses a data entry ramp 228 to place outgoing data packets 301 on data routing lines 205, and data exit ramps 229 to receive incoming data packets 301 from data routing lines 205.

Figure 50:
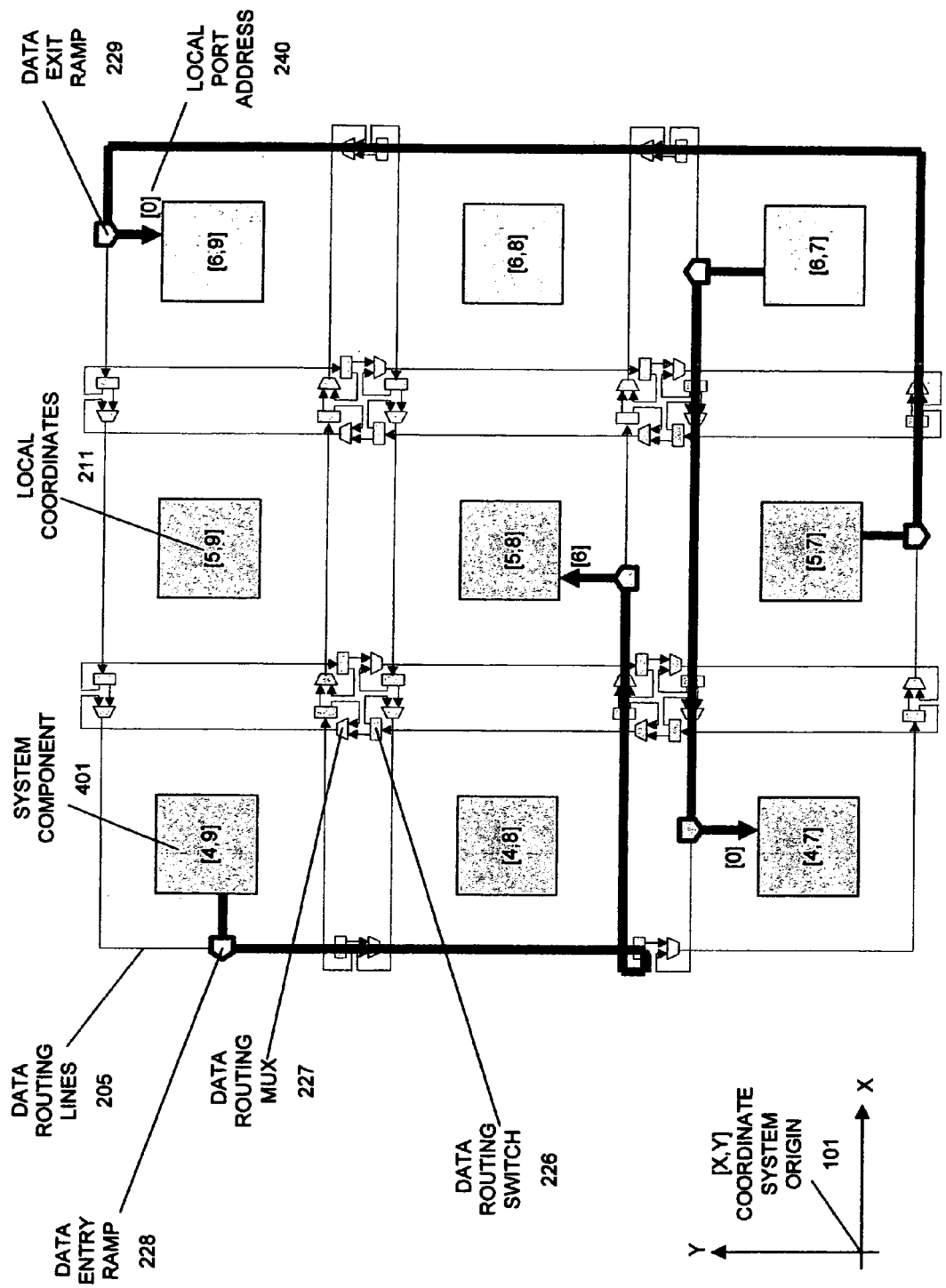
FIG. 50 shows three data transfers inside a bounded 2-dimensional data processing system with nine system components, eight edge routing junctions and four internal data routing junctions.

FIG. 50 shows an example of three simultaneous data transfers inside a data processing system composed of nine system components 401, four data routing junctions 201, and eight edge routing junctions 241. The data routing junctions 201 and the edge routing junctions 241 are aware of relative locations of neighboring system components 401. Inside the data routing junctions 201 and edge routing junctions 241, data routing switches 226 turn the path of data packets 301 if a packet's destination component 403 is behind or to the right of the respective data packet 301. This switching rule drives the spiral-like convergence of the data packets 301 towards the local coordinates 211 of respective destination components 403, and towards respective data exit ramps 229.

Figure 54:
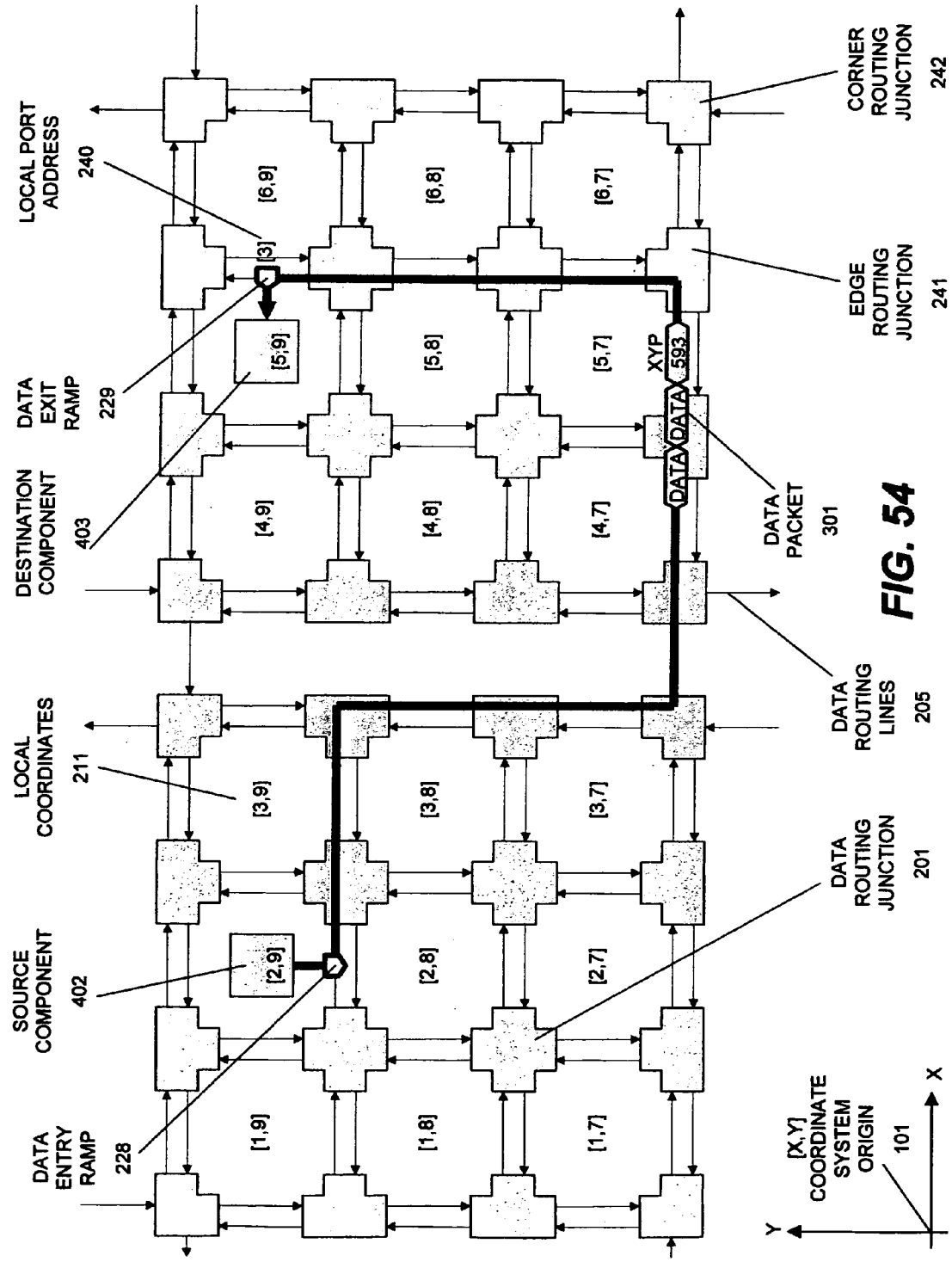
FIG. 54 shows a transfer of a data packet between two unbounded data processing subsystems of a 2-dimensional data routing fabric, each with nine system components, four corner routing junctions, eight edge routing junctions and four internal data routing junctions.

In contrast to a self-contained system of FIG. 50, some systems may be required to share data with other systems, thus becoming data processing subsystems 426 of a larger system (FIG. 54). Data processing subsystems 426 are often required to also be self-contained to a certain degree, thus having only limited external communications channels. There are various possibilities of how data processing subsystems 426 can be arranged relative to one another, and how the communication channels can be established to transfer data packets 301 between them. One method can use an edge routing junction 241 to propagate data packets toward a selected corner routing junction 242, with each corner routing junction having a set of routing input lines 206 and a set of routing output lines 207 to transfer data across the data processing subsystems 426.

Edge and corner routing junctions for subsystems often require additional functionality over the edge and corner routing junctions used inside contained systems.

Figure 51:
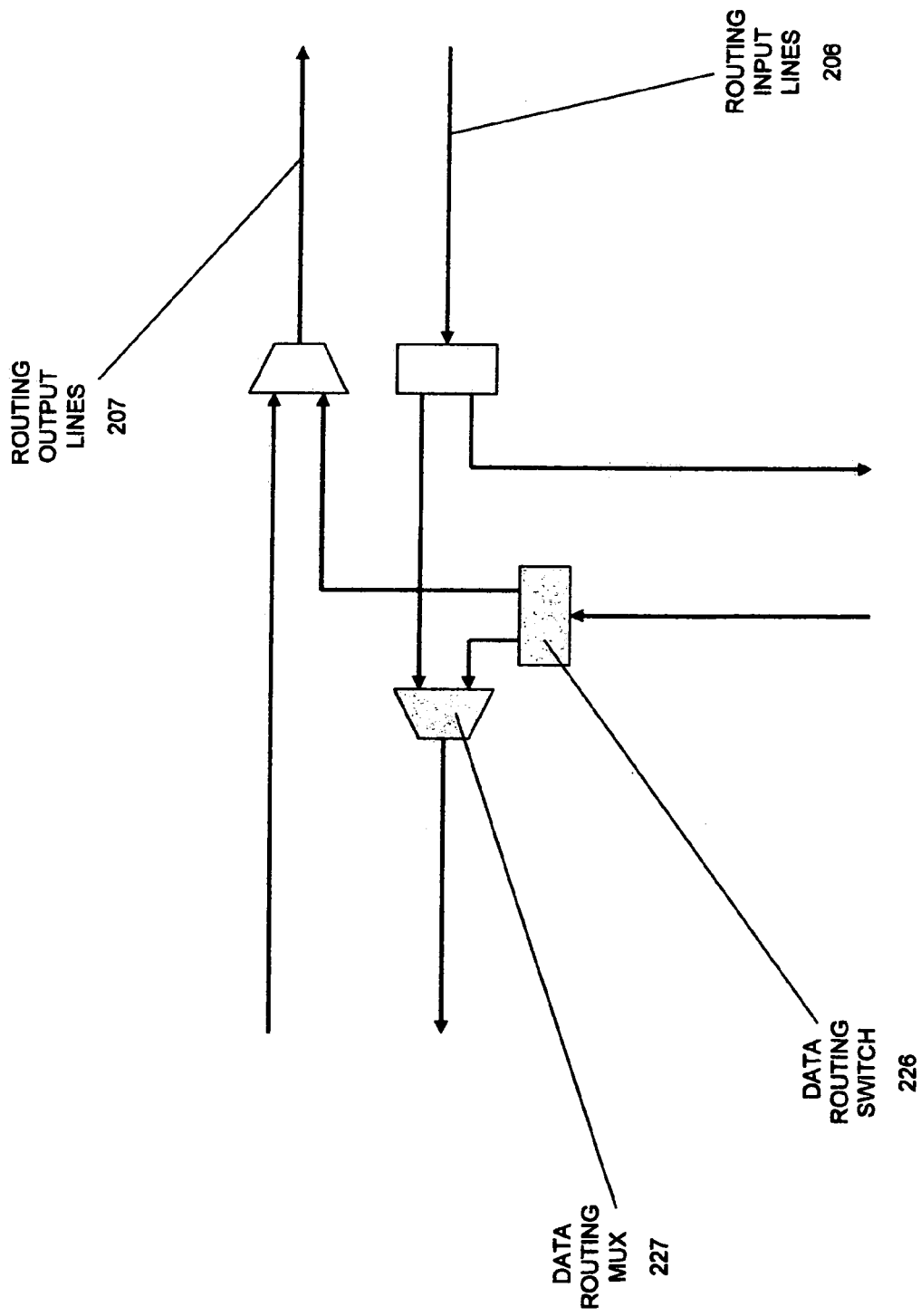
FIG. 51 shows an edge routing junction can be placed at an edge of an unbounded 2-dimensional data routing fabric.

FIG. 51 shows an edge routing junction 241 located on a horizontal edge of a data processing subsystem 426, composed of two data routing switches 226 and two data routing muxes 227. One data routing switch 226 turns an edge-travelling data packet 301 into the system if the packet's destination component 403 is behind or to the right of the data packet 301. The second data routing switch turns externally-bound data packets to the left if the destination component 403 is behind or to the right of current data packet 301 location, or to the right if the destination component 403 is in front and to the left. Left- or right-turning externally-bound data packets 301 follow the edge of the data processing subsystem 426 to a respective corner data routing junction 242, from which they leave the current data processing subsystem 426.

Figure 52:
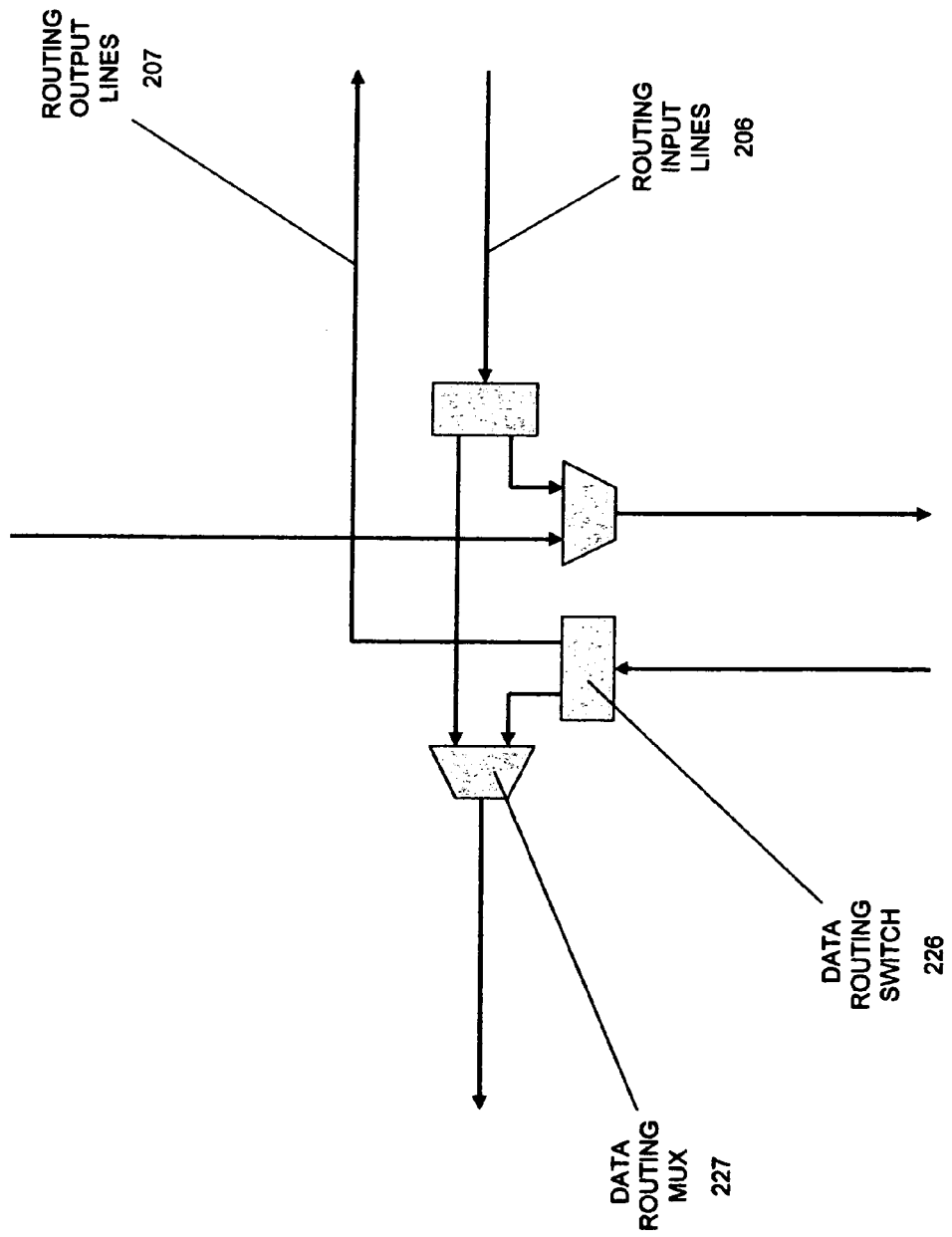
FIG. 52 shows a corner routing junction that can be placed at a corner of an unbounded 2-dimensional data routing fabric.

FIG. 52 shows a corner routing junction 242 located on a corner of a data processing subsystem 426, composed of two data routing switches 226 and two data routing muxes 227. Two local pairs of routing output lines 207 and routing input lines 206 define the upper-left corner of the data processing subsystem 426. A single set of routing input lines 206 and a single set of routing output lines 207 form a link to another data processing subsystem.

Externally generated data packets 301, arriving from the top of FIG. 52, enter the data processing subsystem 426 through one of the data routing muxes 227. Internally generated data packets 301 arriving at the corner routing junction 242 from the right of FIG. 52 turn left to the left edge of the current data processing subsystem 426, or continue straight to another data processing subsystem 426. Internal data packets 301 arriving from the bottom of FIG. 52 are routed to exit the current data processing subsystem by turning left, or turn right to follow the upper edge of the current data processing subsystem 426 towards another (upper-right) corner routing junction 242.

While the data routing switches 226 and data routing muxes 227 of the edge routing junction 241 in FIG. 51 and the corner routing junction 242 in FIG. 52 are interconnected differently, the data routing switches 226 of both junctions can operate under identical switching rules. In fact, the edge and corner switching rules can be identical to those of internal data routing junctions 201, like the ones shown in FIG. 50 or in FIG. 41.

Therefore, the internal, edge or corner data routing functionality can be obtained by properly interconnecting standard sets of data routing switches 226 and data routing muxes 227. This simplifies overall system architectures and reduces design complexity.

Figure 53:
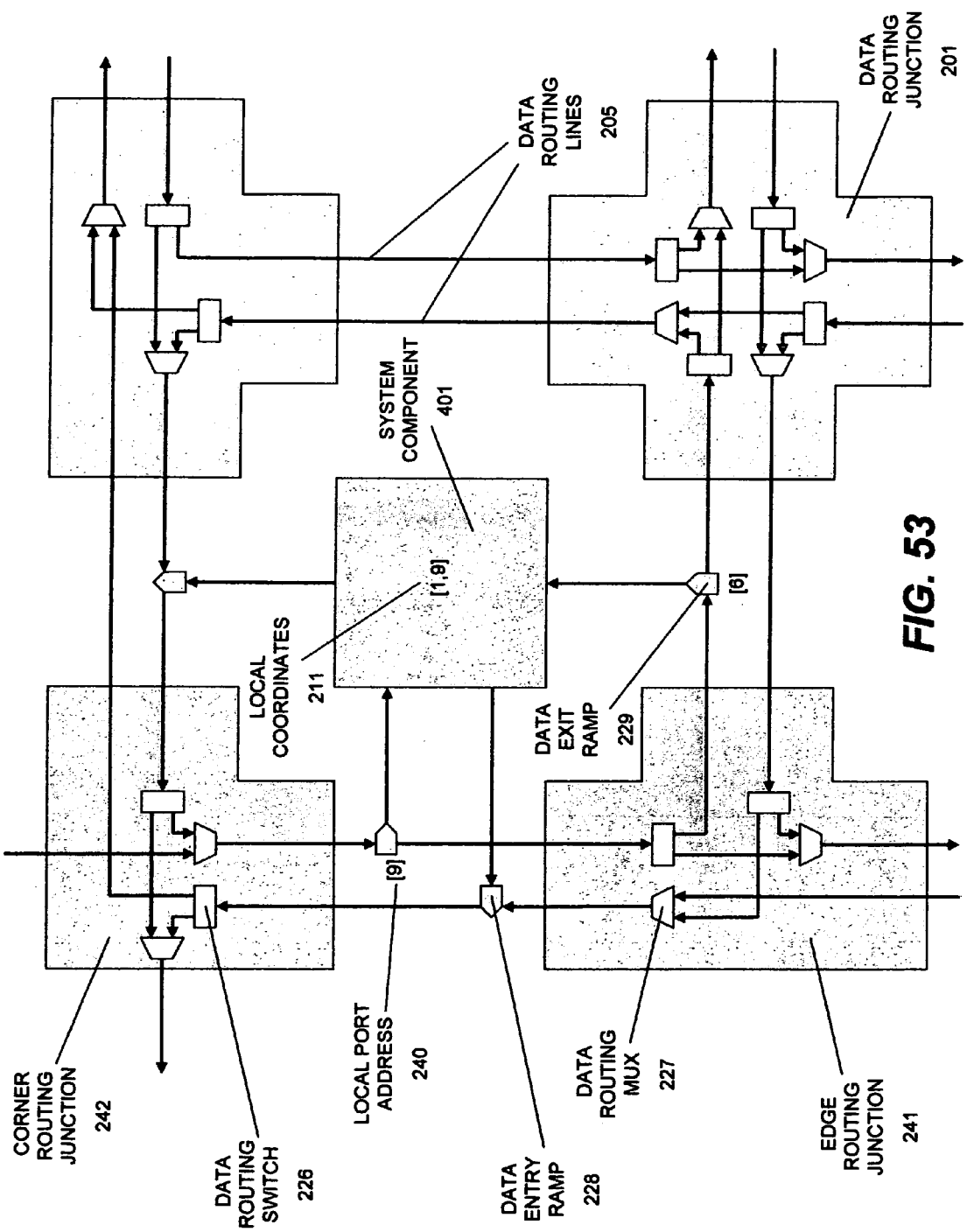
FIG. 53 shows the internal data routing structure and the external connections for a data processing subsystem of a grid-like 2-dimensional data routing fabric, where the adjacent 2-dimensional subsystems are horizontally interconnected at every corner junction.

FIG. 53 shows two instances of an edge routing junction 241 of FIG. 52, one instance of a corner routing junction 242, and one instance of an internal (non-edge) data routing junction 201. A system component 401 is placed between the edge routing junctions 241, the corner routing junction 242, and the non-edge data routing junction 201. As in previously described embodiments, a system component 401 uses a data entry ramp 228 to place outgoing data packets 301 on data routing lines 205, and data exit ramps 229 to receive incoming data packets 301 from data routing lines 205.

FIG. 53 provides a detailed view of corner areas of the two data processing subsystems of FIG. 54. In order to preserve clarity, FIG. 54 replaces the internal details of the corner routing junctions 242, the edge routing junctions 241, and the internal routing junctions 201, with corresponding graphical symbols. Also, to preserve clarity, some of the system components 401 of FIG. 54 are depicted only through their local coordinates 211.

FIG. 54 shows a transfer of a single data packet 301 between two data processing subsystems, each subsystem containing 9 system components, four data routing junctions 201, eight edge routing junctions 241 and 4 corner routing junctions 242. Each system component is assigned a set of [X,Y] local coordinates 201 relative to the origin of a 2-dimensional coordinate system 101.

The data transfer of FIG. 54 starts when the [2,9] source component 402 launches a data packet 301 through a data entry ramp 228 into a horizontal set of data routing lines 205. Next, the data packet 301 is autonomously guided by data routing junctions 201, edge routing junctions 241 and corner routing junctions 242 towards the [3] data exit ramp 229 leading to the [5,9] destination system component 403, as defined in the header of the data packet 301.

The 2-dimensional embodiment of the multi-dimensional data routing fabric of FIG. 54 turns a data packet 301 to the left, when a destination system component 403 is behind or to the right of the current location of the data packet 301. In addition to the left-turn rule, the edge routing junctions 241 can also turn data packets 301 to the right when they come against edges of a data processing subsystems 426. If the above left-turn or right-turn rules are not met, the data packet 301 continues along a straight path.

These left-turn and right-turn routing rules cause the data packet 301 of FIG. 54 to converge on its destination. While at the system level the data packets can turn left or right, the data routing switches 226 that cause the turns in this case only need to know the left-turn rule. The right-turns can be implemented inside edge routing junctions 241 by bending a selected set of routing output lines 207 to the right (see FIG. 52).

Various other routing rules, in addition to the above left-hand rules and right-hand rules, can be used inside data routing junctions 201, edge routing junctions 241, corner routing junctions 242, and data routing switches 226 of other embodiments of the multi-dimensional data routing fabric. These rules can also successfully drive the convergence of data packets 301 with their respective destination components 403, even across only a few sets of data routing lines 205 between data processing subsystems 426, as if these subsystems were interconnected with a full set of data routing lines 205.

When connecting chips and boards, restricting the number of data routing lines between data processing subsystems 426 is often desirable, given the physical realities of limited pin counts on semiconductor chips or limited number of connectors that can be placed on printed circuit boards. Using edge routing junctions 241 and corner routing junctions 242 at the boundaries and corners of chips and boards ensures compliance with such physical limitations while providing full communications capability between system components 401 located in otherwise physically isolated data processing subsystems 426.

Figure 55A:
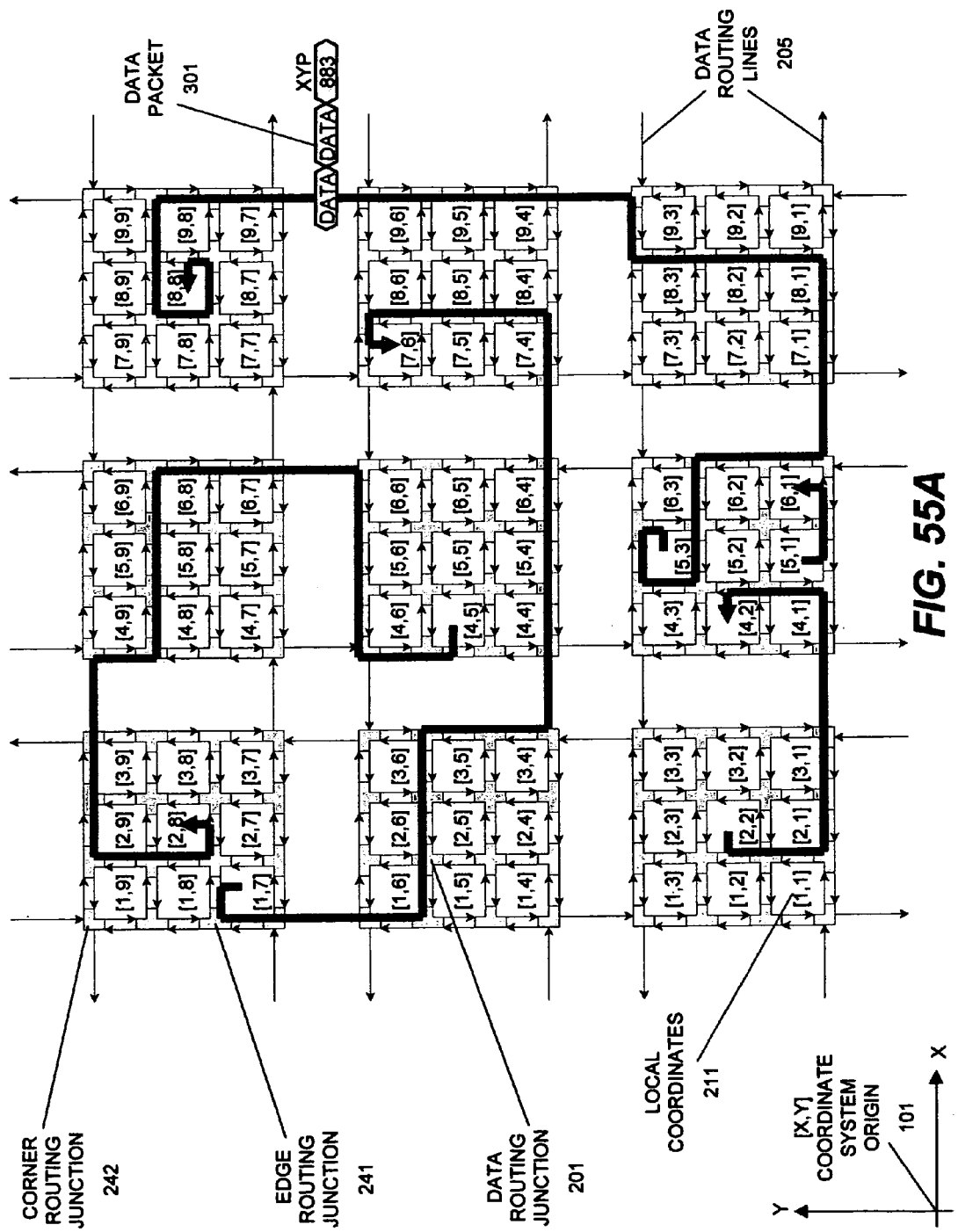
FIG. 55A shows five transfers of data packets between nine topographically similar data processing subsystems linked with a 2-dimensional data routing fabric.
Figure 55B:
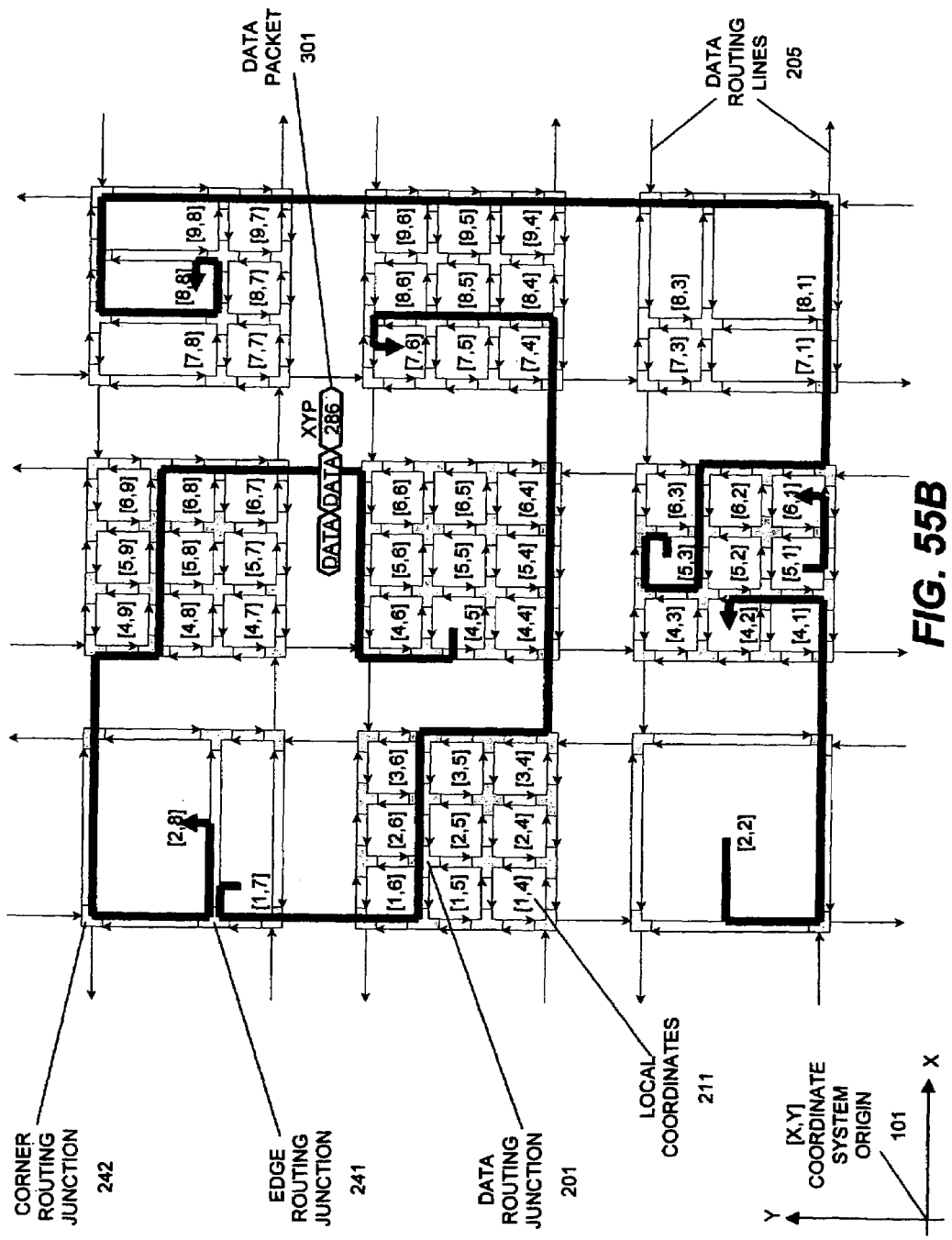
FIG. 55B shows five transfers of data packets between nine data processing subsystems linked with a 2-dimensional data routing fabric, where the individual subsystems may vary in the number and size of data processing components that they contain.
Figure 55C:
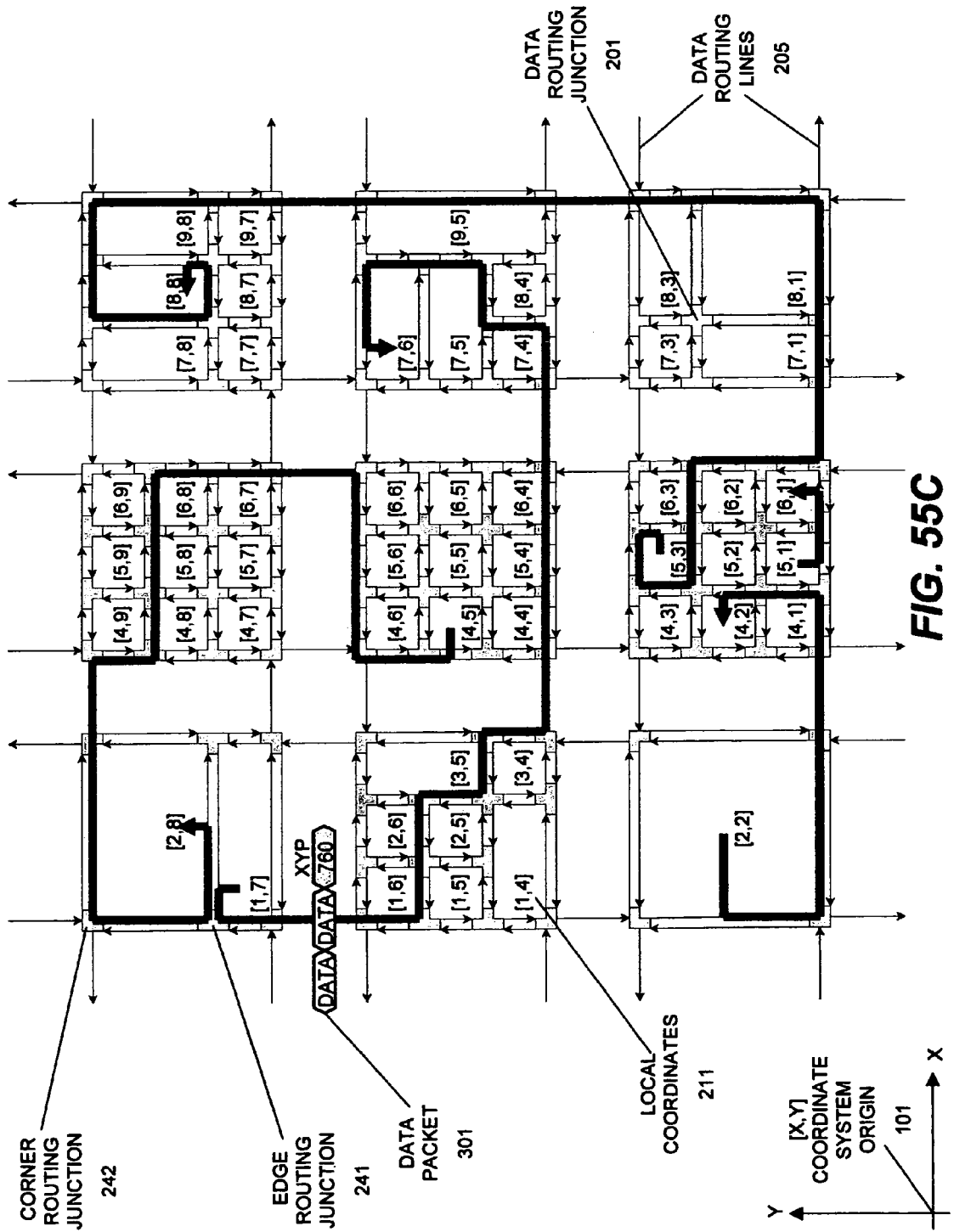
FIG. 55C shows five transfers of data packets between nine data processing subsystems linked with a 2-dimensional data routing fabric, where some of the subsystems also contain 3-way edge routing junctions internally to the subsystems (in addition to the subsystem edge locations)

FIGS. 55A–55C, each with nine data processing subsystems 426, show expanded versions of the 2-subsystem example of FIG. 54. In order to preserve clarity, the data entry ramps 228, data exit ramps 229 and component symbols have been omitted for all data transfers, and only one transfer in each figure shows the contents of the corresponding data packet 301.

FIG. 55A shows a 2-dimensional embodiment of the multi-dimensional data routing fabric containing 81 homogeneously distributed system components 401 arranged in 9 data processing subsystems 426, with 9 system components 401 per subsystem. All five of shown data transfers make left turns when their corresponding destinations are behind or to the right of current data packet 301 locations, make right turns when the data packets 301 come up against the subsystem edges, or continue moving straight when not turning left or right.

Other paths are also possible in alternative embodiments of the multi-dimensional data routing fabric, where conditions that trigger right and left turns are swapped or where the turns are made under different rules all together. For example, data transfer paths can make right turns when their corresponding destination components 403 are behind or to the left of current data packet 301 locations, and make left turns when the data packets 301 come up against the subsystem edges.

Other possible data transfer paths can make right or left turns when the corresponding destination components 403 are behind the current data packet 301 locations, and make left or right turns when the data packets 301 come against the subsystem edges.

Arriving at its destination, a data packet 301 may spiral to the left around a corresponding destination component 403 until it finds a matching data exit ramp 229 through which it exits into the corresponding destination component 403. In FIGS. 55A–55C, the destination matching condition is that the [X,Y] local coordinates 211 and [P] local port address 240 of a data exit ramp 229 are the same as those inside the data packet 301. Different types of destination matching conditions are also possible in other alternative embodiments of the multi-dimensional data routing fabric.

FIG. 55B shows the five data transfers of FIG. 55A navigating across different data routing topologies, where the system components 401 are no longer evenly distributed inside the data processing subsystems 426. In this case, some system components 401 are larger than others, taking up more than just one set of local coordinates 211.

In an extreme case, a single system component 401 [2,2] fills up an entire data processing subsystem 426. Because it takes up a whole 3×3 grid of local coordinates 211, it can be also be referred to by [X,Y] local coordinates 211 of [1,1], [2,1], [3,1], [1,2], [3,2], [1,3], [2,3] or [3,3].

The five data transfers of FIGS. 55A and 55B can be visualized by comparing them to vehicular traffic inside a city, with system components 401 representing city blocks, sets of data routing lines 205 representing streets and avenues, and data routing junctions 201 representing traffic lights at 4-way intersections.

In addition to 4-way intersections, other types of intersections are possible as well. For example, alternative embodiments of the multi-dimensional data routing fabric can use edge routing junctions 241 to model the 3-way T-intersections inside data processing subsystems 426 with system components 401 of substantially varying widths and heights.

FIG. 55C shows the five data transfers of FIGS. 55A–B navigating across 2-dimensional data transfer topography that also includes 3-way edge routing junctions 241 in addition to the 4-way data routing junctions 201. Each time a data packet 301 comes up against a T-like edge routing junction 241, it first makes a right turn to avoid the obstacle, followed by a first possible left turn somewhere down the road, to get back on the heading leading to the corresponding destination component 403.

For example, one of the data packets of FIG. 55C makes 3 right turns and 7 left turns before converging on the [7,6] destination component 403 through the [0] local port address 240.

Various other types of data routing structures are possible in addition to the 3-way edge routing junctions 241 and the 4-way data routing junctions 201 of FIGS. 55A–C. For example, alternative embodiments of the multi-dimensional data routing fabric can also use 6-way, 8-way and 12-way derivatives of the 4-way data routing junction 201, the 3-way edge routing junction 241 or the 2-way corner routing junction 242.

While the data processing subsystems 426 of FIGS. 55A–C are interconnected in a 2-dimensional data routing structure resembling a horizontal plane, alternative embodiments of the multi-dimensional data routing fabric can interconnect data processing subsystems 426 in more than two dimensions. In fact, any number of data routing dimensions can be used to link subsystems, and the data processing subsystems 426 themselves can be defined in any number of data routing dimensions as well.

Additionally, the number of routing dimensions used to interconnect data processing subsystems 426, could be the same or different than the number of routing dimensions used to interconnect system components 401 inside the data processing subsystems 426.

Figure 56:
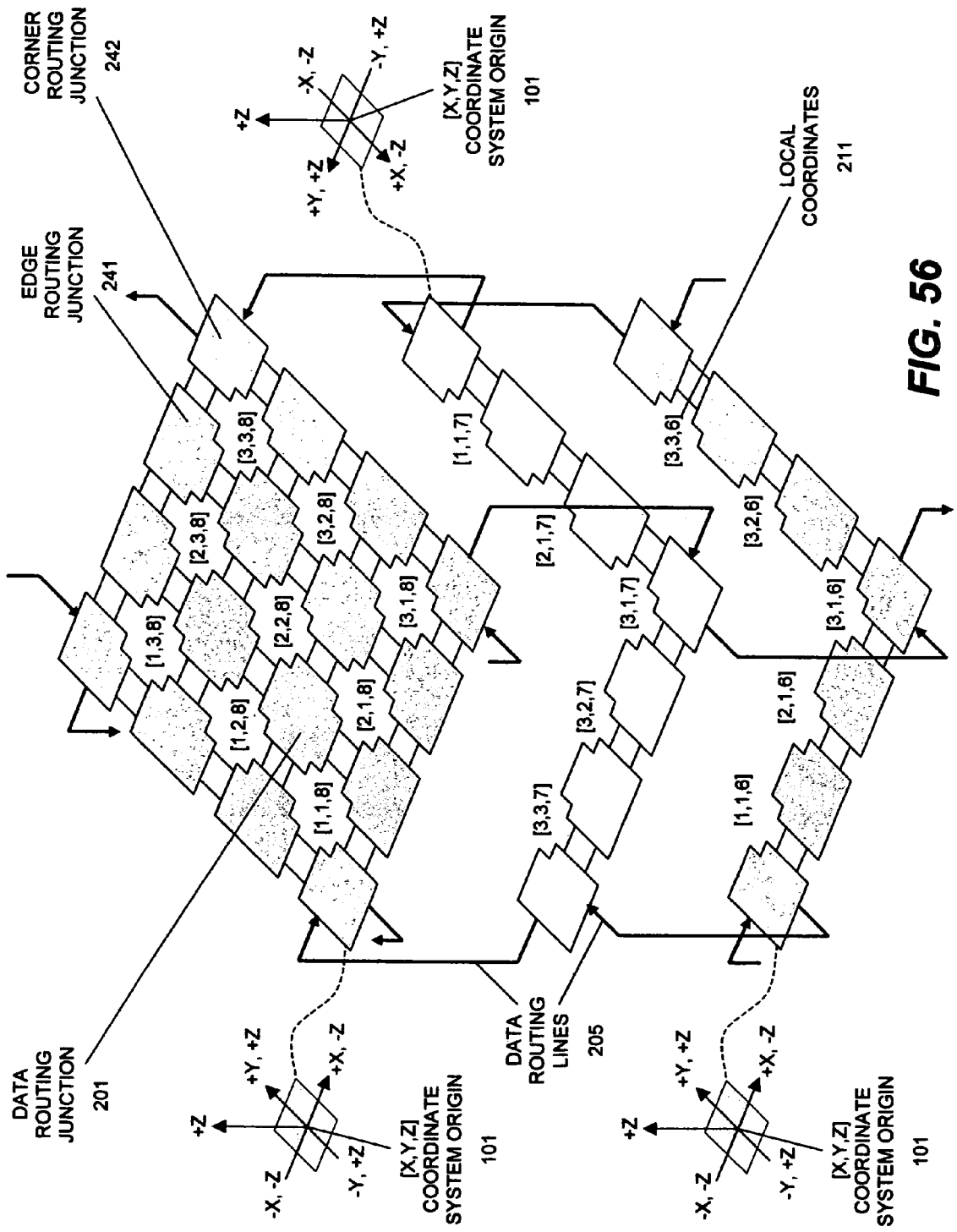
FIG. 56 shows a 3-dimensional data routing fabric formed by a chain-like linkage of three 2-dimensional data processing subsystems, with vertical chain connections applied at the corners of the subsystems.

For example, FIG. 56 shows three 2-dimensional data processing subsystems 426 similar to those of FIGS. 55A–C, but interconnected in a single vertical routing dimension along two routing directions (up and down).

The top and the bottom data processing subsystems 426 (shaded gray) are oriented relative to gray shaded [X,Y,Z] coordinate system origin 101, while the center data processing subsystem 426 (white) is flipped upside-down and rotated 90 degrees relative to its neighbors, as evident by the orientation of its white [X,Y,Z] coordinate system origin 101 (FIG. 56).

This type of alignment between consecutive data processing subsystems 426 inside a system stack enables sets of data routing lines 205 from any one subsystem to directly connect to corresponding sets of data routing lines 205 of the neighboring subsystems above and below.

The arrangement of data routing subsystems 426 in FIG. 56, forms a contiguous chain-like data routing structure, where the X-aligned outputs from a selected subsystem feed directly into the corresponding Y-aligned inputs of one adjacent subsystem, and where the Y-aligned outputs from the selected subsystem feed directly into the corresponding X-aligned inputs of the other adjacent subsystem.

Alternative embodiments of the multi-dimensional data routing fabric can use various other angles of rotation between stacked data processing subsystems 426. Other means of alignment between subsystem inputs and outputs may be used as well. For example, the effect of flipping over of every other subsystem can be also achieved by changing the directions of sets of data routing lines 205 and reversing the routing turns inside selected data processing subsystems 426. Alignment of subsystem inputs with outputs could also be achieved by crossing selected sets of data routing lines 205 between adjacent data processing subsystems 426.

Figure 57:
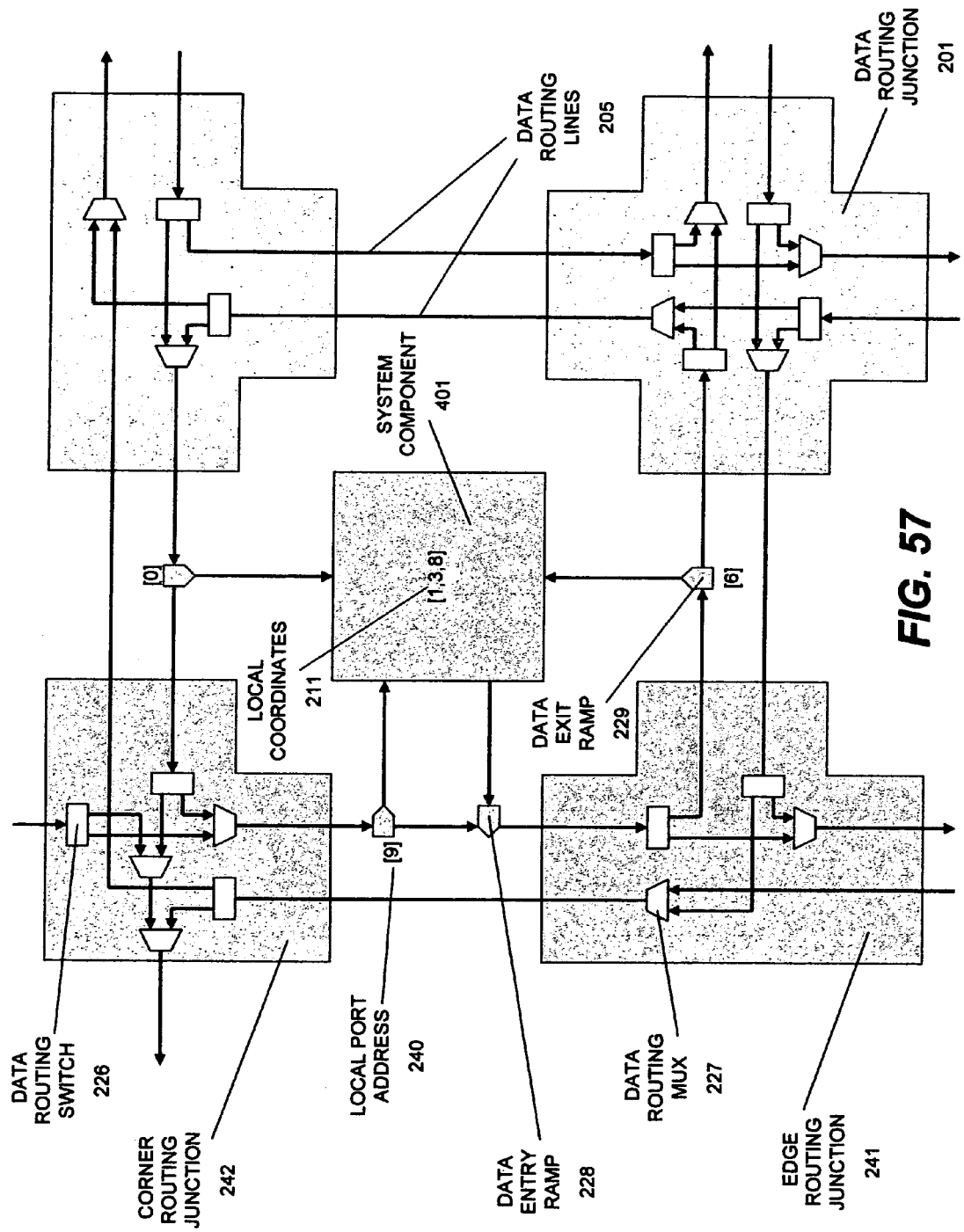
FIG. 57 shows the internal data routing structure and the external connections for a data processing subsystem of a chain-like 3-dimensional data routing fabric, where the adjacent 2-dimensional subsystems are vertically interconnected at every corner junction.

FIG. 57 provides a detailed view of the corner areas of the three data processing subsystems of FIG. 56. In order to preserve clarity, FIG. 56 replaces the internal details of the corner routing junctions 242, the edge routing junctions 241, and the internal routing junctions 201, with the corresponding graphical symbols. Also, to preserve clarity, the system components 401 of FIG. 56 are depicted only through their local coordinates 211.

While the data routing junctions 201, edge routing junctions 241 and corner routing junctions 242 of the stacked data processing subsystems of FIG. 57 may look similar to their counterparts of FIG. 53, they route data packets 301 in three dimensions instead two dimensions. In other words, the location of every system component in FIG. 56 is defined with a unique [X,Y,Z] set of coordinates instead of [X,Y] coordinates.

In order to accommodate the additional Z dimension, the data routing switches 226 of FIG. 57 are responsive to new routing rules in addition to those driving the 2-dimensional data routing switches 226 of FIG. 53. An additional plus-z rule guides a data packet 301 toward one of two subsystem edges connected to the neighboring subsystem above, when the destination component 403 is located above the current data processing subsystem 426. An additional minus-z rule guides a data packet 301 toward one of two subsystem edges connected to the neighboring subsystem below, when the destination component 403 is located below the current data processing subsystem 426.

The 2-dimensional routing rules of data routing switches 226 in FIG. 53 also apply to the data routing switches 226 of FIG. 57, for local destinations with the same [Z] coordinate as the current data packet 301 location. That is, a data routing switch 226 can turn a data packet 301 to the left, when a destination system component 403 is behind or to the right of the current location of the data packet 301. The edge routing junctions 241 are also wired to turn data packets 301 to the right when they come up against edges of the data processing subsystems 426. If any of the above plus-z, minus-z, left-turn or right-turn conditions are not met, the data packet 301 continues traveling along a straight path.

When compared to FIG. 53, the corner routing junction of FIG. 57 includes an additional data routing switch 226 for preventing data packets 301 from entering data processing subsystems 426 with a [Z] coordinate that is different from the [Z] coordinate of the destination component 403. This data routing switch 226 follows the same routing rules as every other routing switch 226 of FIG. 57, and its special function is achieved by the way in which it is wired with other data routing switches 226 and data routing muxes 227 inside the corner routing junction 242.

Figure 58A:
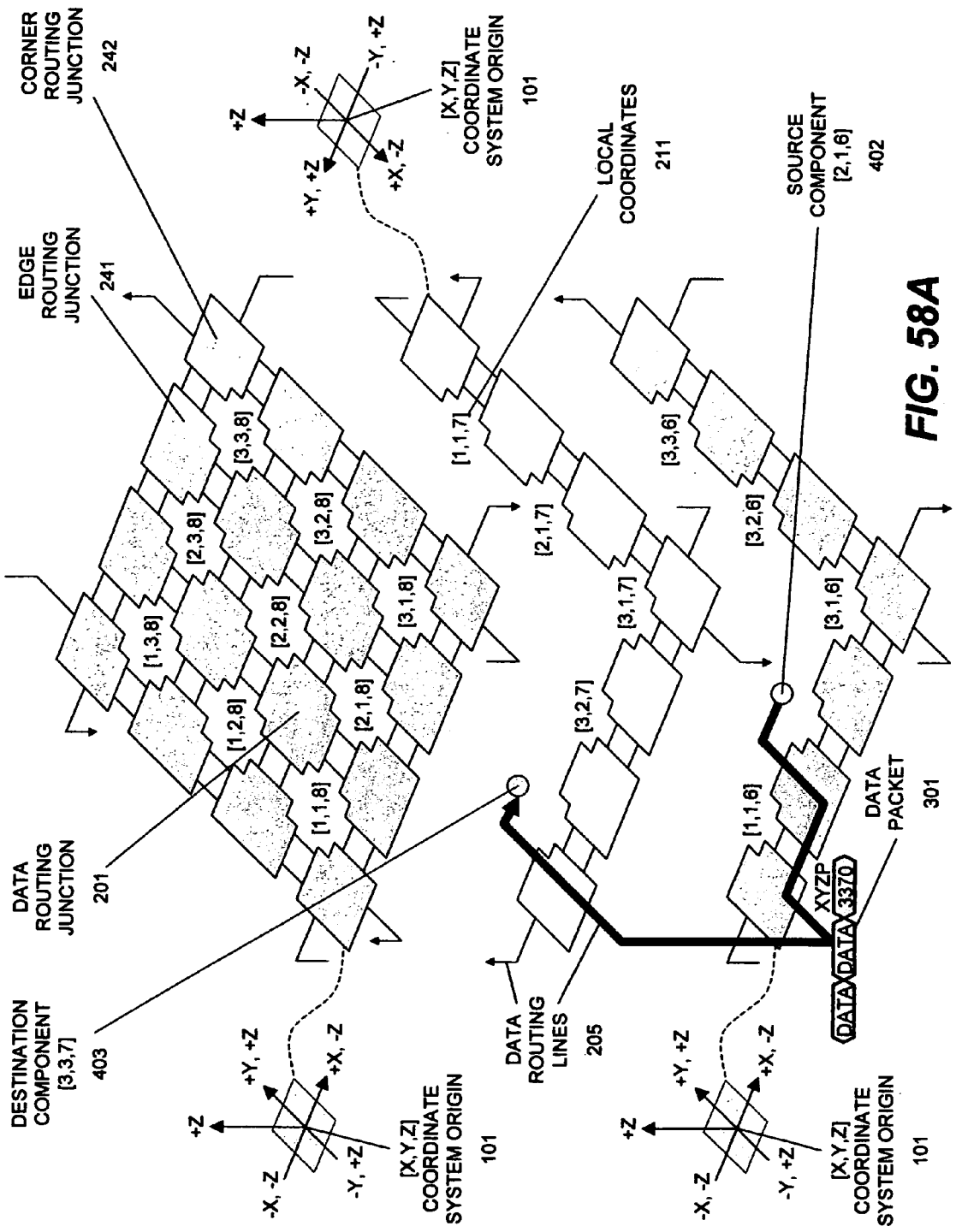
FIG. 58A shows a double-width chain-like 3-dimensional data routing fabric using a corner set of data routing lines to transfer a data packet between two adjacent data processing subsystems of a vertical stack of 2-dimensional subsystems.
Figure 58B:
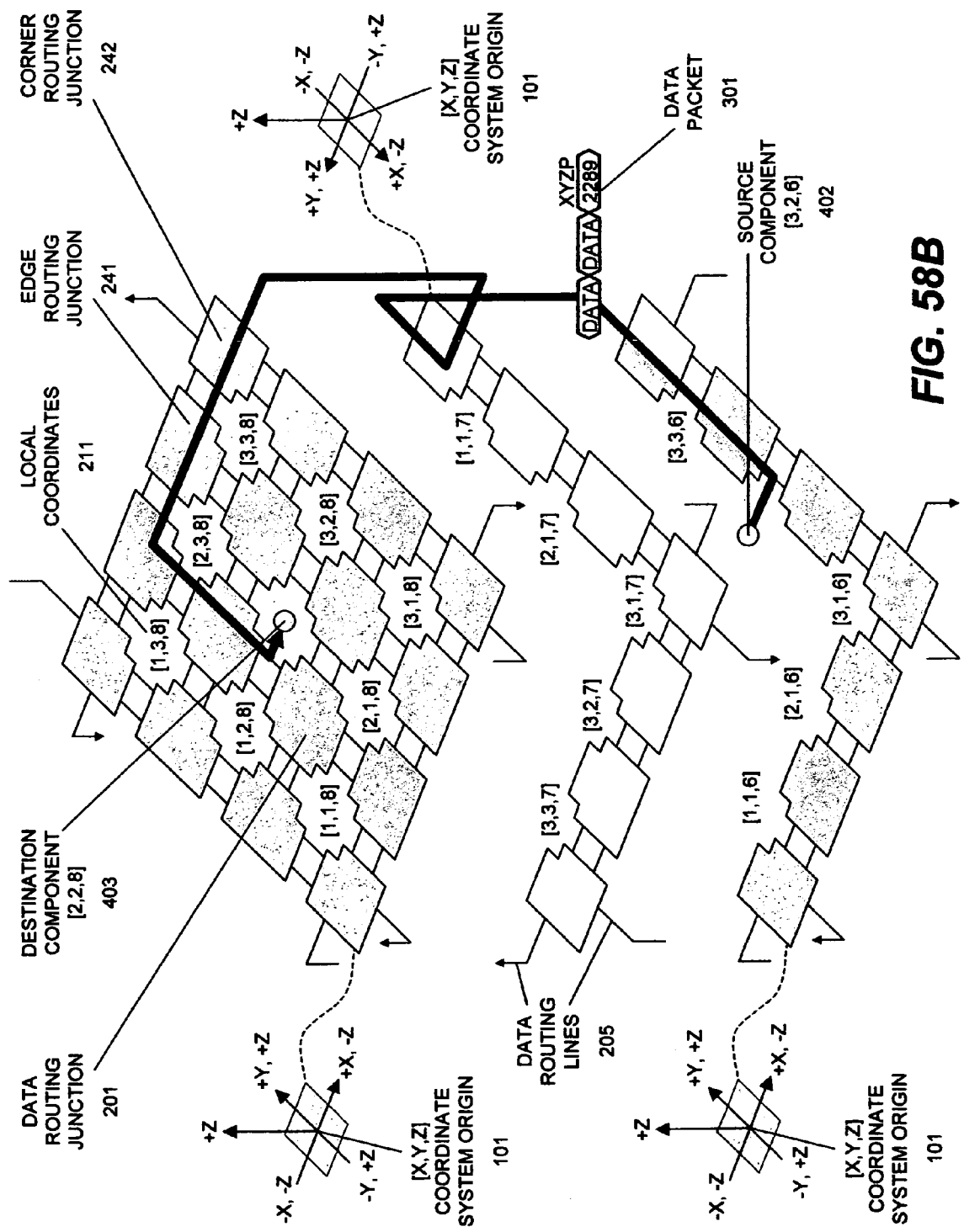
FIG. 58B shows a double-width chain-like 3-dimensional data routing fabric using two corner sets of data routing lines to transfer a data packet between the top and bottom data processing subsystems of a vertical stack of 2-dimensional subsystems.
Figure 58C:
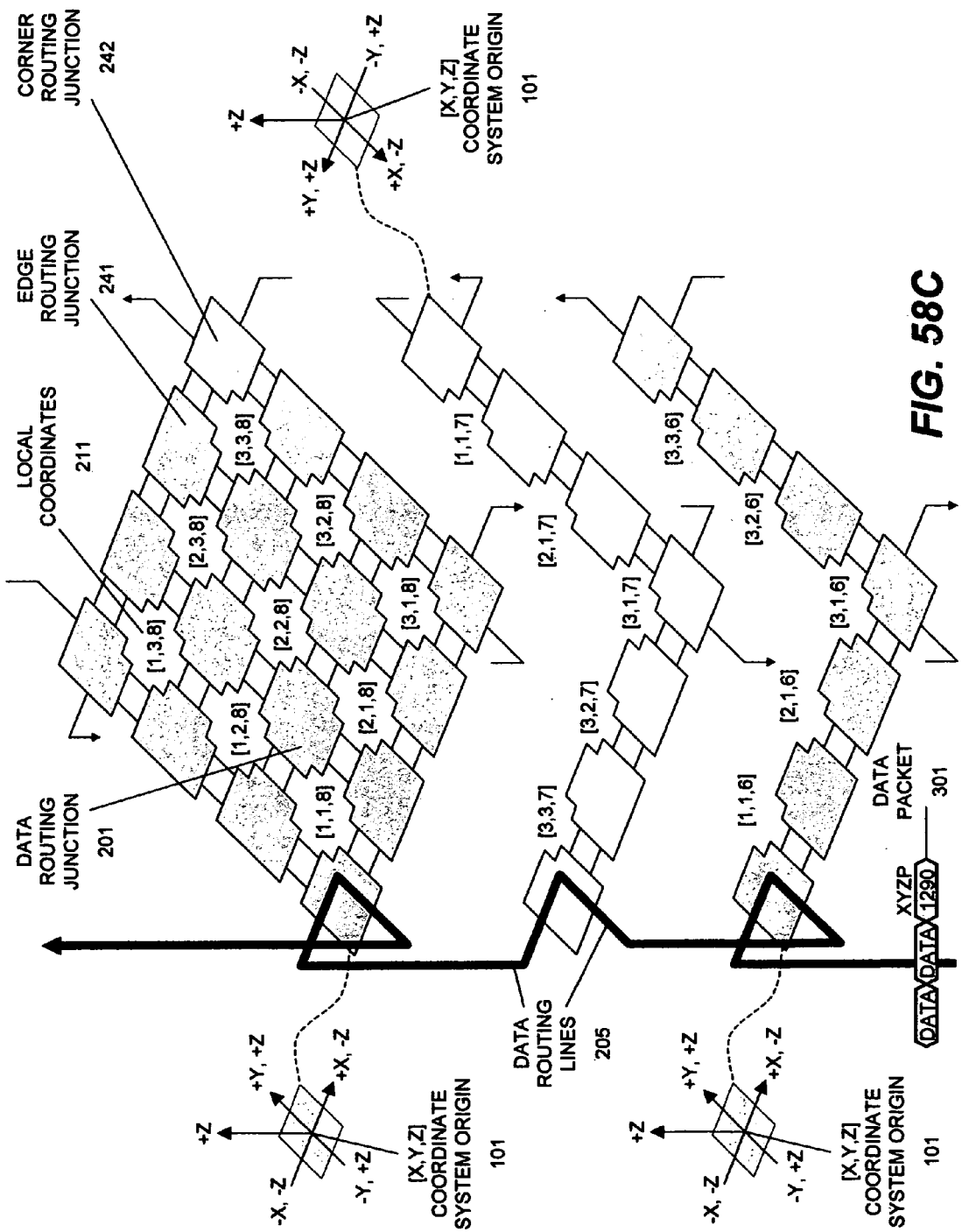
FIG. 58C shows a double-width chain-like 3-dimensional data routing fabric using multiple corner sets of data routing lines to transfer a data packet through a vertical stack of 2-dimensional subsystems.

The data transfer examples of FIGS. 58A–C show three data packets 301 being routed within a vertical stack of data processing subsystems 426 of the type shown in FIGS. 56–57. In order to preserve clarity, only the source components 402 and the destination components 403 are highlighted with symbols, and other components are depicted only through their local coordinates 211. Also to preserve clarity, FIGS. 58A–C hide all data entry ramps 228 and data exit ramps 229 connecting system components 401 to data routing lines 205. And, in order to prevent line clutter, most of the vertical sets of data routing lines 205 connecting adjacent data processing subsystems 426 are only partially visible.

The data transfer of FIG. 58A begins with the [2,1,6] source component 402 sending a 3-word data packet 301 containing the [X,Y,Z] packet destination coordinates 302 of [3,3,7] and the [P] destination port address 314 of [0]. In accordance with the packet routing rules associated with FIG. 57, the data packet 301, being below its destination, follows the edge of the bottom data processing subsystem to a corner routing junction 242 with data routing lines 205 leading in the up direction.

Upon arriving from below at the middle data processing subsystem 426 of FIG. 58A, the data packet 301 enters that subsystem to converge on the [3,3,7] destination component 403 through a local data exit ramp 229 with the [0] local port address 240.

The data transfer of FIG. 58B begins with the [3,2,6] source component 402 sending a 3-word packet containing the [X,Y,Z] packet destination coordinates 302 of [2,2,8] and the [P] destination port address 314 of [9]. In accordance with the packet routing rules established along with FIG. 57, the data packet 301, being below its destination, follows a predetermined edge of the bottom data processing subsystem 426 towards a corner routing junction 242 with data routing lines 205 leading in the up direction.

Upon arriving from below at the middle data processing subsystem 426 of FIG. 58B, the data packet 301 immediately exits the corner routing junction 242 through which it had just arrived, as its destination component 403 is still one level up.

Finally, upon arriving from below at the top data processing subsystem 426 of FIG. 58B, the data packet 301 enters the top subsystem to converge on the [2,2,8] destination component 403 through a local data exit ramp 229 with the [9] local port address 240.

The data transfer of FIG. 58C begins, below the bottom data processing subsystem, with a source component 402 sending up a 3-word packet containing the [X,Y,Z] packet destination coordinates 302 of [1,2,9] and the [P] destination port address 314 of [0].

Upon arriving from below at the bottom data processing subsystem 426 of FIG. 58C, the data packet 301 immediately exits the corner routing junction 242 through which it had just arrived, as its destination component 403 is still 3 levels up.

Upon arriving from below at the middle data processing subsystem 426 of FIG. 58C, the data packet 301 immediately exits the corner routing junction 242 through which it had just arrived, as its destination component 403 is still two levels up.

Next, upon arriving from below at the top data processing subsystem 426 of FIG. 58C, the data packet 301 immediately exits the corner routing junction 242 through which it had just arrived, as its destination component 403 is still one level up (level Z=9).

In the vertically stacked subsystem embodiments of the multi-dimensional data routing fabric, the global data traffic between data processing subsystems 426 is substantially isolated from the local data traffic within the data processing subsystems 426. This is because the global data traffic mostly uses the edge and vertical data routing resources (edge routing junctions 241 and corner routing junctions 242), while the local traffic mostly uses the data routing junctions 201 internal to subsystems.

Isolating the local data streams from the global data traffic significantly reduces data transfer conflicts, thus substantially increasing system performance. Further more, despite the global-local data flow isolation, both types of data transfers appear functionally identical to the source components 402 that originate them.

This type of universal addressing is possible because both local and global transfers use the same [X,Y,Z,P] addressing mechanism to define their destinations. Having such common transfer mechanism for sending data to any location within a system substantially simplifies system design, verification, operation, and maintenance in many data processing applications.

Universal addressing inherent to these embodiments of the multi-dimensional data routing fabric adds a lot of flexibility when implementing system changes, because it enables data processing components to be moved from one subsystem to another by changing only a few addressing parameters. This type of architectual flexibility is well suited to many kinds of design automation processes that are often applied at various stages of the design flow.

Universal addressing flexibility is further evident by the lack of restrictions on the component addressing range within a system. This is because there are no inherent limits on the size of the addressing parameters. For example, allocating four bits to each of the [X],[Y],[Z] destination coordinates 302 and to the [P] destination port address 314 addressing parameter (inside an [X,Y,Z,P] data packet 301 header), results in an addressing range of 4096 system components 401, each with 16 possible individual access ports.

Comparing the vertically stacked subsystem embodiments of the multi-dimensional data routing fabric to the more homogeneous preferred embodiment, it is evident that the preferred embodiment enables higher overall data rates between system components, as all system components, and not just the edge components, are interconnected along the third dimension.

But, while the purely performance-driven applications may be better served by the preferred embodiment of the multi-dimensional data routing fabric, the vertically stacked subsystem embodiments may be well suited in cost-effective applications that require simple cooling and testing access to system components.

For example, in board level implementations, the chain-like structure of the vertically stacked subsystem embodiments of the multi-dimensional data routing fabric provide unobstructed openings through each link of the chain. In other words, the cooling air or fluid can move freely between any two adjacent boards (each representing one or several data processing subsystems 426, for example), because every pair of boards always has two opposite facing sides that are free of air-obstructing board-to-board connectors.

Further more, since all data traffic between the data processing subsystem 426 boards flows at system's outside edges, it is very easy to tap into the global data flow in order to, for example, verify system performance or to debug application glitches.

Vertically stacked subsystem embodiments of the multi-dimensional data routing fabric also allow stacking of multiple copies of identical printed circuit boards. This feature enables designers to easily add or remove data processing capability to better match requirements of specific applications.

In addition to saving costs by designing only one board and replicating it multiple times, the ability to directly stack identical boards also removes the need for using expensive back-planes for connecting system boards, thus enabling further system cost reduction.

Figure 59:
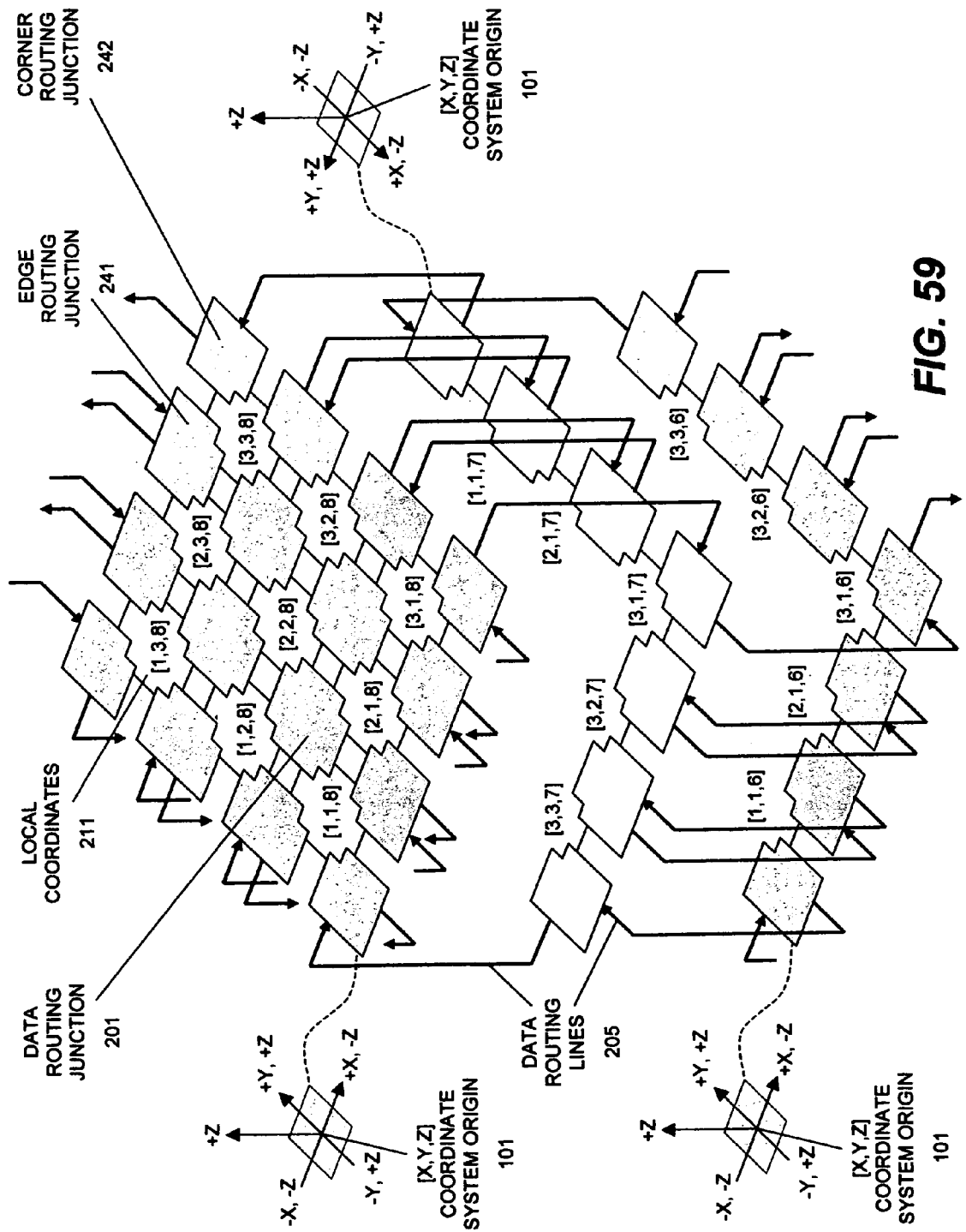
FIG. 59 shows a 3-dimensional data routing fabric formed by a chain-like linkage of three 2-dimensional data processing subsystems, with vertical chain connections applied at the edges and corners of the subsystems.

FIG. 59 shows three 2-dimensional data processing subsystems 426 interconnected in a single vertical routing dimension along two routing directions (up and down). In contrast to the system of FIG. 56, which had only a few corner connections between the data processing subsystems 426, the subsystems of FIG. 59 are connected with multiple sets of vertical data routing lines 205 spanning entire edges of the subsystems.

The top and the bottom data processing subsystems 426 (shaded gray) are oriented relative to gray shaded [X,Y,Z] coordinate system origin 101, while the center data processing subsystem 426 (white) is flipped upside-down and rotated 90 degrees relative to its neighbors, as evident by the orientation of its white [X,Y,Z] coordinate system origin 101 (FIG. 59).

This type of alignment between vertically stacked data processing subsystems 426 inside a system enables sets of data routing lines 205 from any one subsystem to directly connect to corresponding sets of data routing lines 205 of the neighboring subsystems above and below.

The arrangement of data routing subsystems 426 in FIG. 59, forms a contiguous chain-like data routing structure, where the X-aligned outputs from a selected subsystem feed directly into the corresponding Y-aligned inputs of one adjacent subsystem, and where the Y-aligned outputs from the selected subsystem feed directly into the corresponding X-aligned inputs of the other adjacent subsystem.

Figure 60:
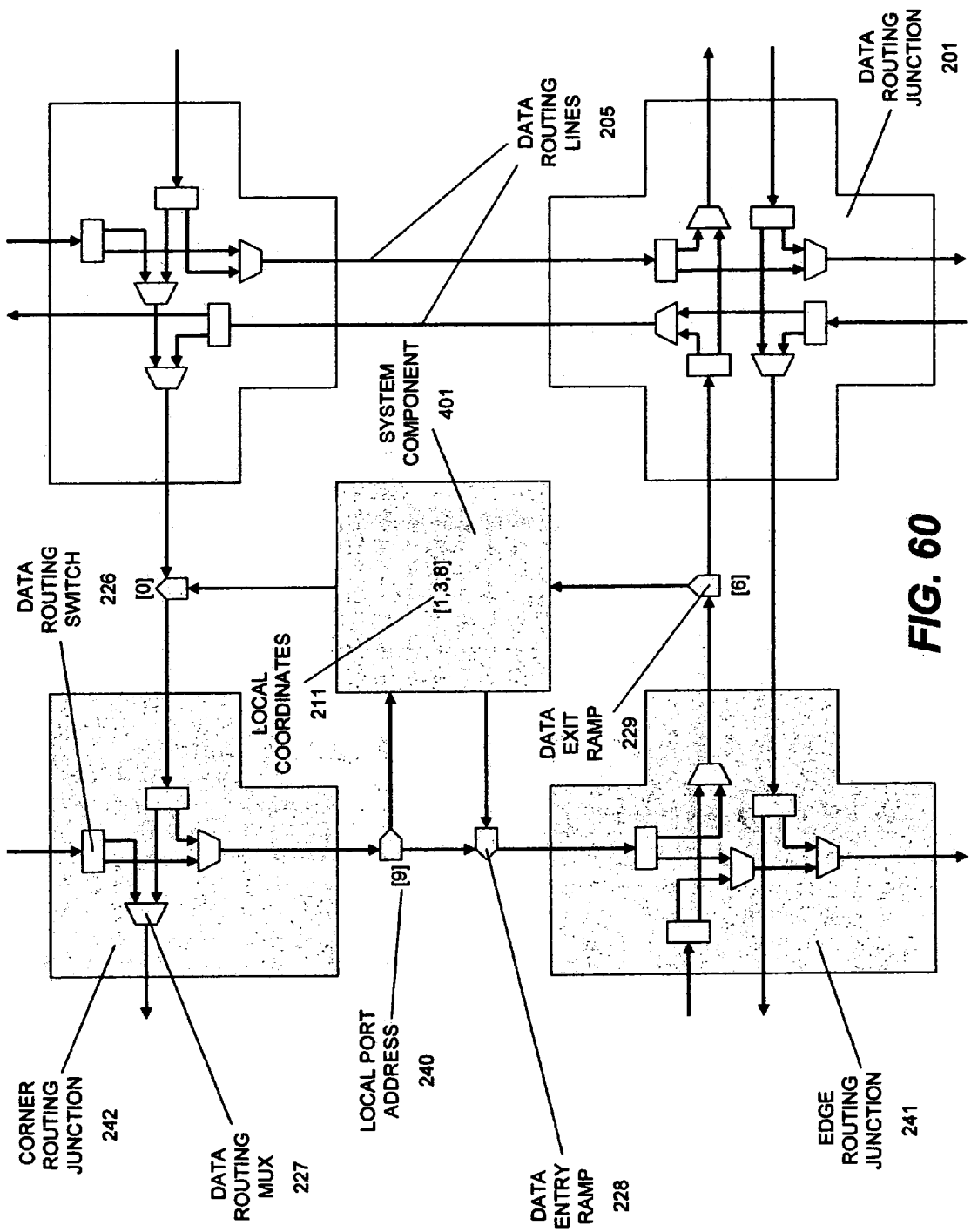
FIG. 60 shows the internal data routing structure and the external connections for a data processing subsystem of a chain-like 3-dimensional data routing fabric, where the adjacent 2-dimensional subsystems are vertically inter-connected at every edge and corner junction.

FIG. 60 provides a detailed view of the corner areas of the three data processing subsystems of FIG. 59. In order to preserve clarity, FIG. 59 replaces the internal details of the corner routing junctions 242, the edge routing junctions 241, and the internal routing junctions 201, with the corresponding graphical symbols. Also, to preserve clarity, the system components 401 of FIG. 59 are depicted only through their local coordinates 211.

Comparing FIG. 60 to FIG. 57, it is evident that the data routing junctions 201 are identical in both figures, but the corner routing junction 242 and the edge routing junctions 241 in FIG. 60 are constructed differently in order to accommodate the extra channels of global communications. Despite these differences, the data routing muxes 227 and the data routing switches 226, on which the routing structures are based on, can still have the same functionality in both figures.

This shows that the functional essence of many embodiments of the multi-dimensional data routing fabric (in this case the plus-z, minus-z, left-turn, and right-turn routing rules) can be encapsulated at the most primitive level of a low-level data routing switch 226, and then reused in various embodiments by mixing the data routing switches 226 with the data routing muxes 227 in various application-specific combinations and numbers.

Figure 61A:
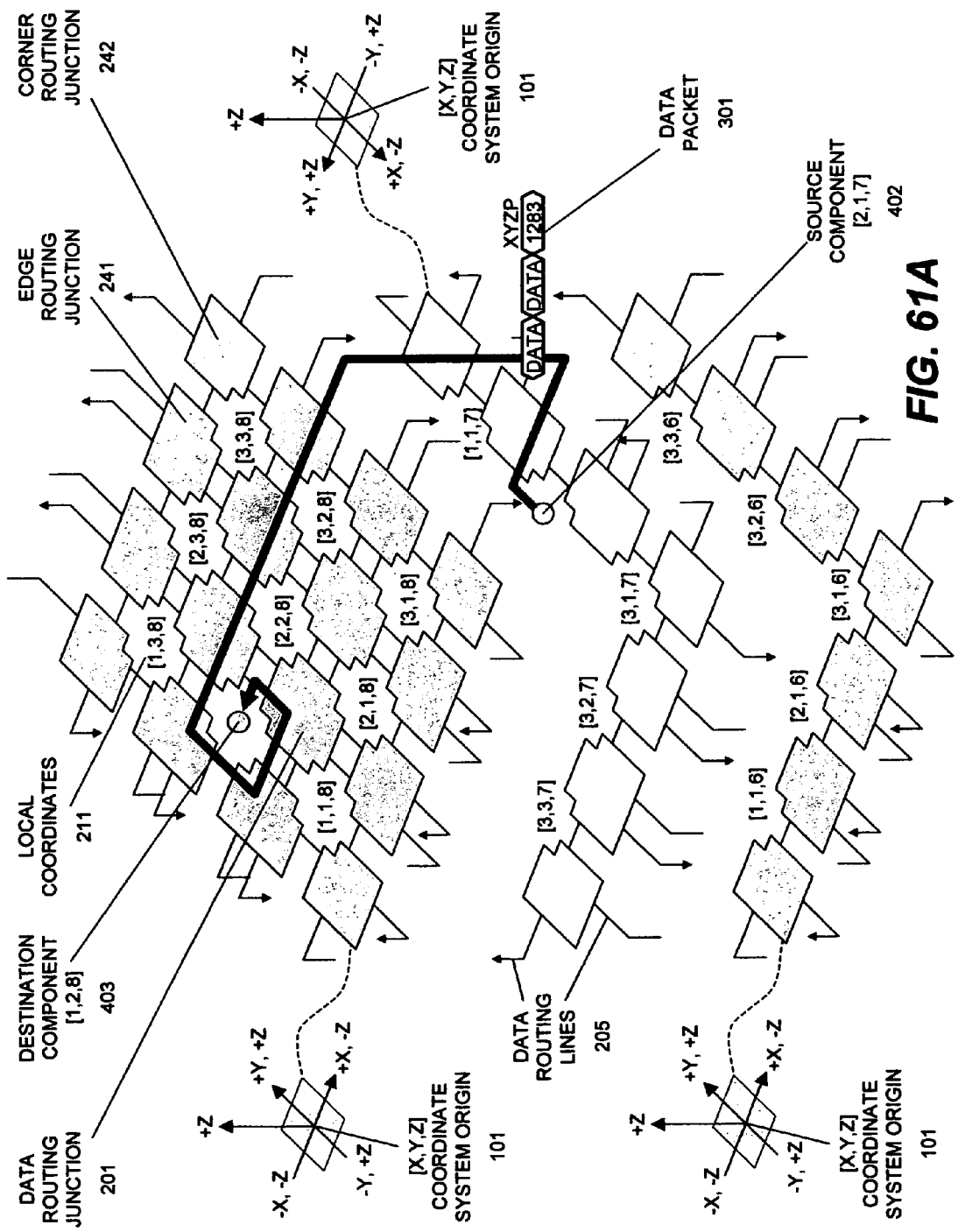
FIG. 61A shows an octal-width chain-like 3-dimensional data routing fabric using an edge set of data routing lines to transfer a data packet between two adjacent data processing subsystems of a vertical stack of 2-dimensional subsystems.
Figure 61B:
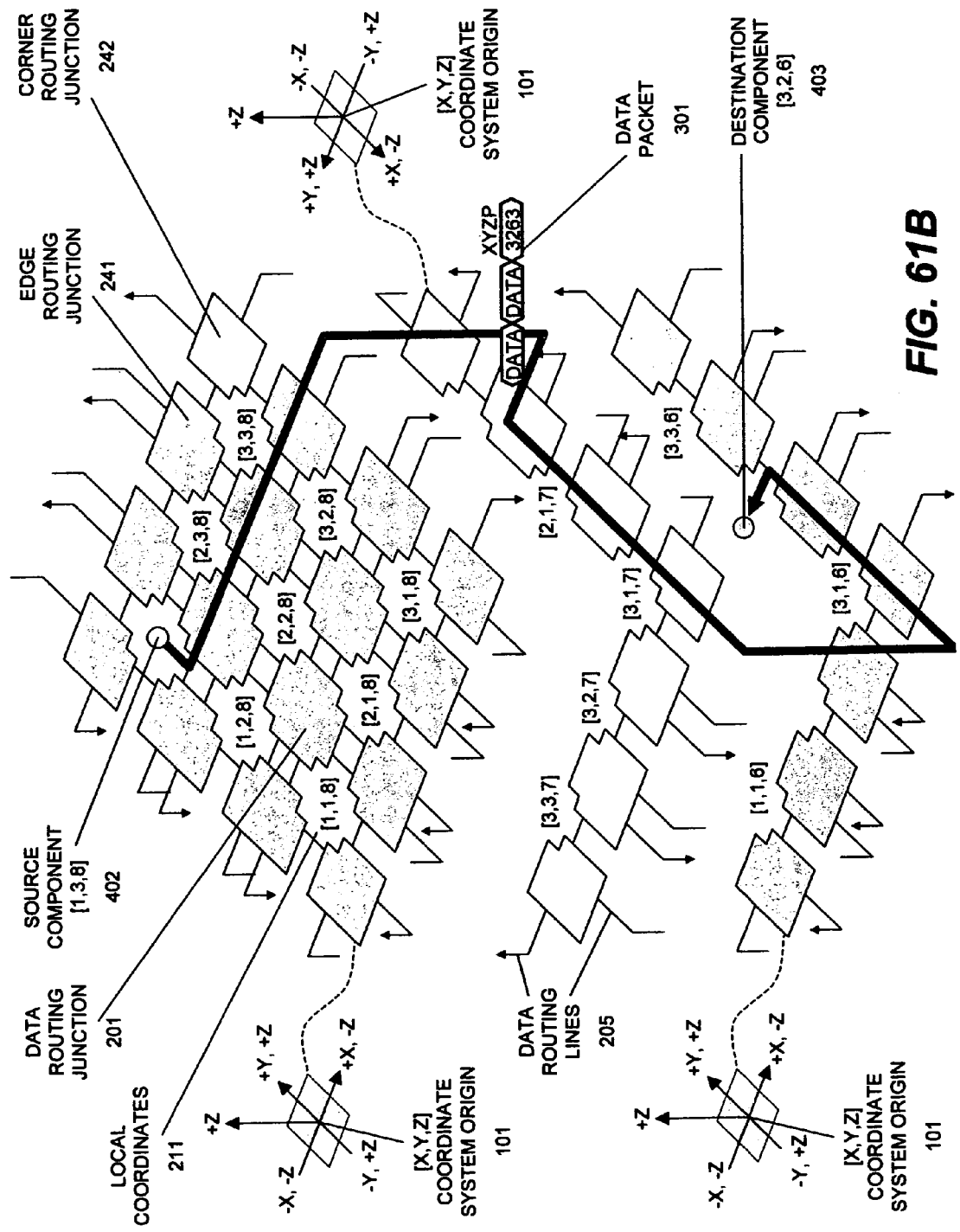
FIG. 61B shows an octal-width chain-like 3-dimensional data routing fabric using an edge set and a corner set of data routing lines to transfer a data packet between the top and bottom data processing subsystems of a vertical stack of 2-dimensional subsystems.
Figure 61C:
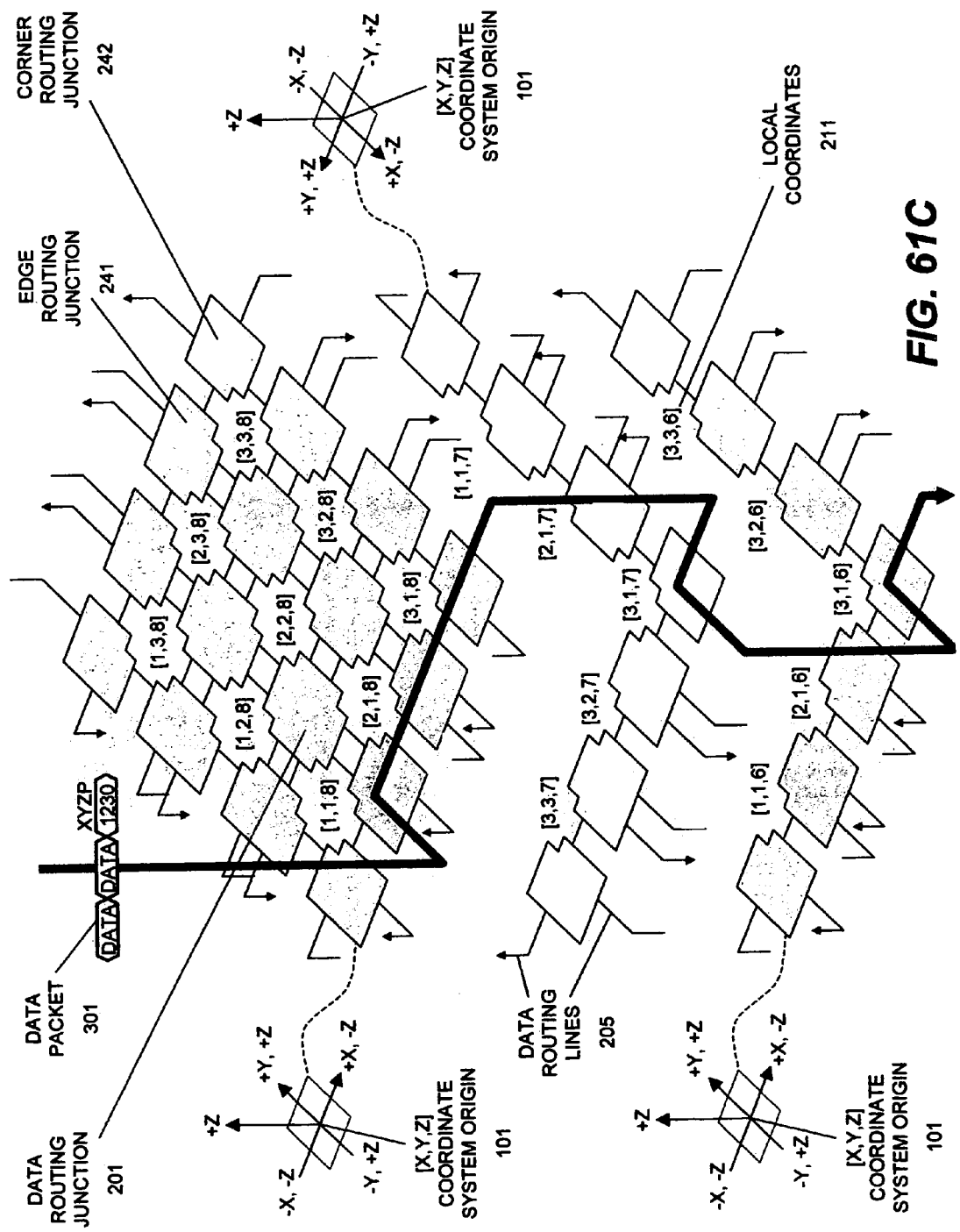
FIG. 61C shows an octal-width chain-like 3-dimensional data routing fabric using an edge set and multiple corner sets of data routing lines to transfer a data packet through a vertical stack of 2-dimensional subsystems.

The data transfer examples of FIGS. 61A–C show three data packets 301 being routed within a vertical stack of data processing subsystems 426 of type shown in FIGS. 59–60. In order to preserve clarity, only the source components 402 and the destination components 403 are highlighted with symbols, while other components are depicted only through their local coordinates 211.

Also to preserve clarity, FIGS. 61A–C hide all data entry ramps 228 and data exit ramps 229 connecting system components 401 to data routing lines 205. And, in order to prevent line clutter, most of the vertical sets of data routing lines 205 connecting adjacent data processing subsystems 426 are only partially visible.

The data transfer of FIG. 61A begins with the [2,1,7] source component 402 sending a 3-word data packet 301 containing the [X,Y,Z] packet destination coordinates 302 of [1,2,8] and the [P] destination port address 314 of [3]. In accordance with the packet routing rules associated with FIG. 57 and FIG. 60, the data packet 301, being below its destination, is routed to a nearby edge routing junction 241 with data routing lines 205 leading in the up direction.

Upon arriving from below at the top data processing subsystem 426 of FIG. 61A, the data packet 301 enters that subsystem to converge on the [1,2,8] destination component 403 through a local data exit ramp 229 with the [3] local port address 240.

The data transfer of FIG. 61B begins with the [1,3,8] source component 402 sending a 3-word packet containing the [X,Y,Z] packet destination coordinates 302 of [3,2,6] and the [P] destination port address 314 of [3]. In accordance with the packet routing rules established for FIG. 57 and FIG. 60, the data packet 301, being above its destination, is routed toward the edge of the top data processing subsystem 426 that is connected to sets of data routing lines 205 leading in the down direction.

Upon arriving from above at the middle data processing subsystem 426 of FIG. 61B, the data packet 301, still being above its destination, is routed toward the subsystem system edge that is connected to sets of data routing lines 205 leading in the down direction.

Upon arriving from above at the bottom data processing subsystem 426 of FIG. 61B, the data packet 301 enters that subsystem to converge on the [3,2,6] destination component 403 through a local data exit ramp 229 with the [3] local port address 240.

The data transfer of FIG. 61C begins, immediately above the top data processing subsystem 426, with a source component 402 sending down a 3-word packet containing the [X,Y,Z] packet destination coordinates 302 of [1,2,3] and the [P] destination port address 314 of [0].

Upon arriving from above at the top data processing subsystem 426 of FIG. 61C, the data packet 301, still being above its destination, follows the currently engaged edge of the top data processing subsystem 426 towards a second edge connected to sets of data routing lines 205 leading in the down direction.

Upon arriving from above at the middle data processing subsystem 426 of FIG. 61C, the data packet 301 immediately exits the corner routing junction 242 through which it had just arrived, as its destination component 403 is several levels down.

Next, upon arriving from above at the bottom data processing subsystem 426 of FIG. 61C, the data packet 301 once again exits the corner routing junction 242 through which it had just arrived, as its destination component 403 is still several levels down.

As evident from FIG. 58C and FIG. 61C, the path of a data packet 301 traveling between data processing subsystems 426, converges shortly after launch on a predetermined system edge and corner leading to set of vertical data routing lines 205 in a direction of the data packet's 301 destination. Once at the corner, it continues traveling up or down the system along that corner until it reaches the destination data processing subsystems 426.

Driving the inter-subsystem global data flows toward system's corners and edges reduces interference with local data flows inside the data processing subsystems 426, thus improving the overall data transfer performance. Such vertically stacked subsystem embodiments of the multi-dimensional data routing fabric also simplify system design and maintenance because both the global and local data flows use common data routing resources, while at the same time being effectively isolated from each other.

While the system connectivity structure of FIG. 59 forms a vertical stack of individual data processing subsystems 426, other alternative embodiments of the multi-dimensional data routing fabric can include vertical stacks of sets of data processing subsystems 426, with each set containing multiple subsystems. Furthermore, the stacking of subsystems is not limited to only the vertical dimension, as the stacks of data processing subsystems 426 or sets of subsystems can just as well be arranged horizontally or at any other orientation.

Figure 62:
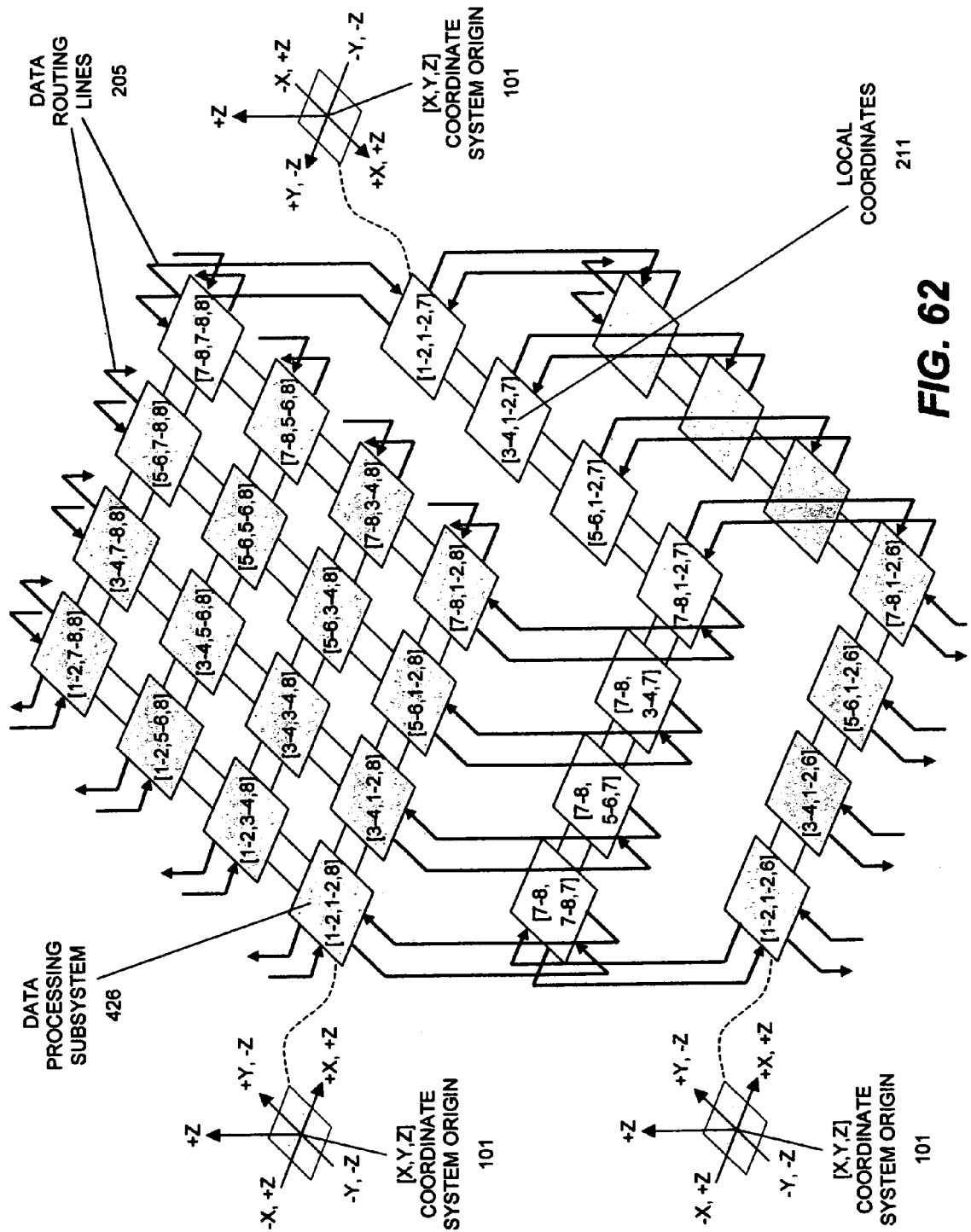
FIG. 62 shows a 3-dimensional data routing fabric formed by a chain-like linkage of three 2-dimensional sets of 2-dimensional data processing subsystems, with two vertical chain connections applied at each outside edge of every edge and corner subsystem of each set.

FIG. 62 shows three 2-dimensional sets of data processing subsystems 426, each set being interconnected with the adjacent sets in two routing directions (up and down) along a vertical routing dimension. Externally, the sets of data processing subsystems 426 are linked with multiple sets of vertical data routing lines 205, spanning the entire edges of the subsystems. Internally, each of the three sets of subsystems includes a 4×4 grid of data processing subsystems 426, of the type shown in FIG. 63.

As seen in FIG. 62, the top and bottom sets of data processing subsystems 426 (shaded gray) are oriented relative to the gray shaded [X,Y,Z] coordinate system origin 101, while the center set of data processing subsystems 426 (white) is flipped upside-down and rotated 90 degrees relative to its neighbors, as evident by the orientation of its white [X,Y,Z] coordinate system origin 101.

Figure 63:
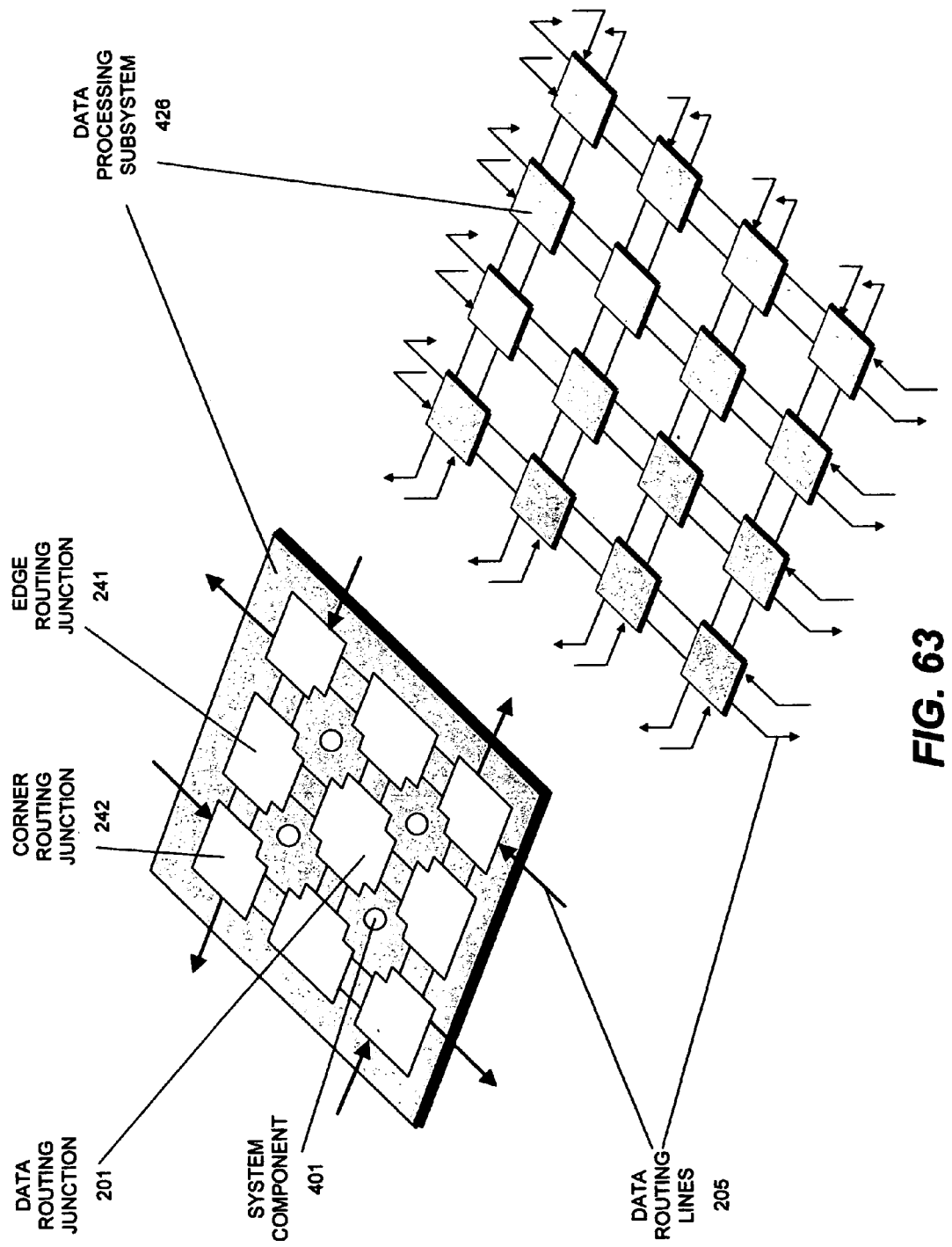
FIG. 63 shows a 4×4 set of data routing subsystems with all edge connections being bent up or down (in the same direction at opposite facing edges) to connect to the hidden sets above and below.

In addition to defining the 2-dimensional connectivity structure linking the 16 data processing subsystems 426 of each subsystem set, FIG. 63 also shows the internal details of the subsystems themselves. These include the four data processing components 401, four corner routing junctions 242, four edge routing junctions 241 and one internal data routing junction 201.

In this alternative embodiment of the multi-dimensional data routing fabric, the corner routing junctions 242, the edge routing junctions 241 and the internal data routing junction 201 can have the same structure and follow the same routing rules (plus-z, minus-z, left-turn and right-turn) as their respective counterparts of FIG. 57. However, in order to preserve clarity, FIG. 63 omits showing the routing primitives, and hides the data entry ramps 228 and data exit ramps 229 linking the system components 401 to data routing lines 205.

Figure 64A:
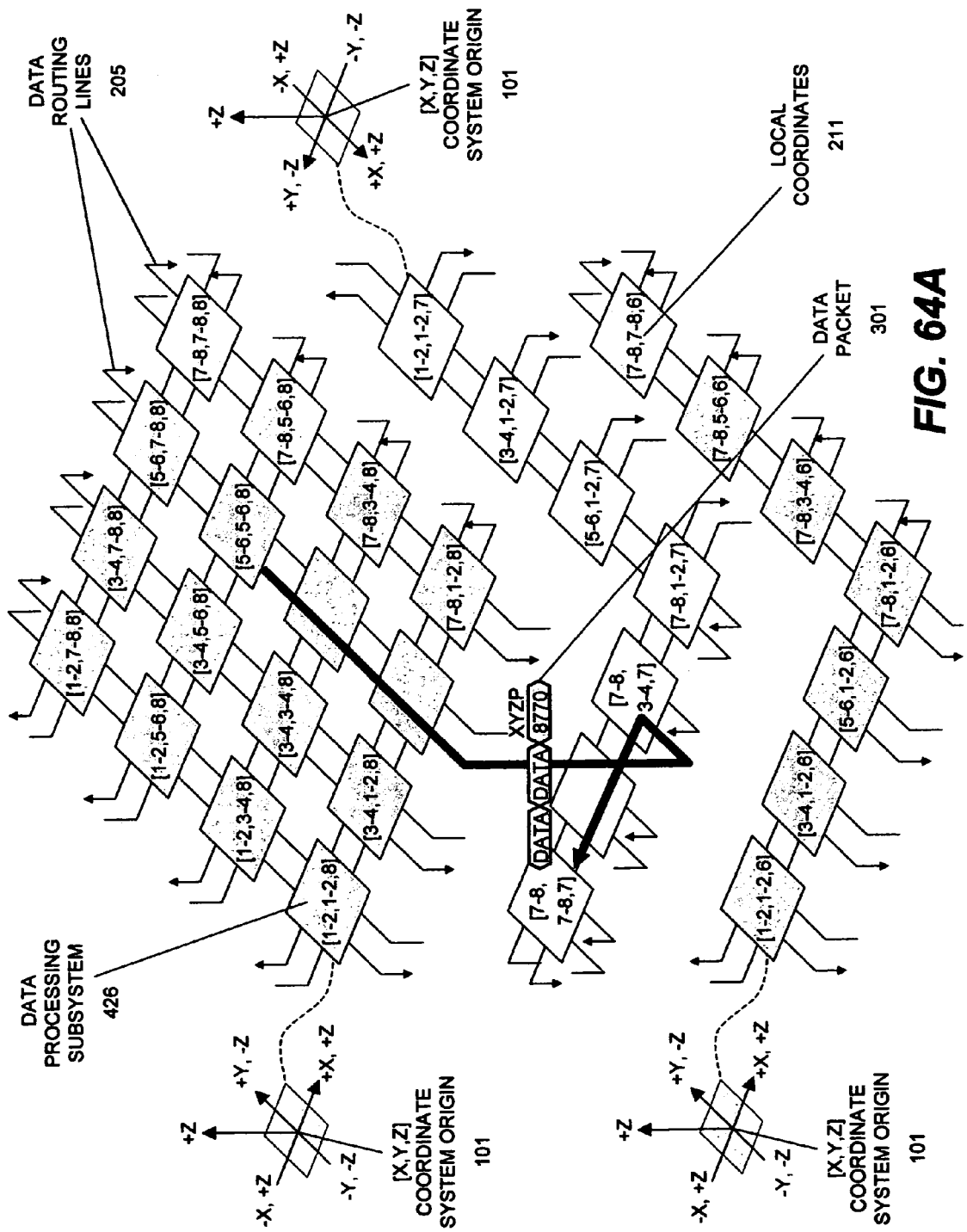
FIG. 64A shows an octal-width chain-like 3-dimensional data routing fabric using an edge set of data routing lines to transfer a data packet between two adjacent sets of data processing subsystems of a vertical stack of 2-dimensional sets of 2-dimensional subsystems.
Figure 64B:
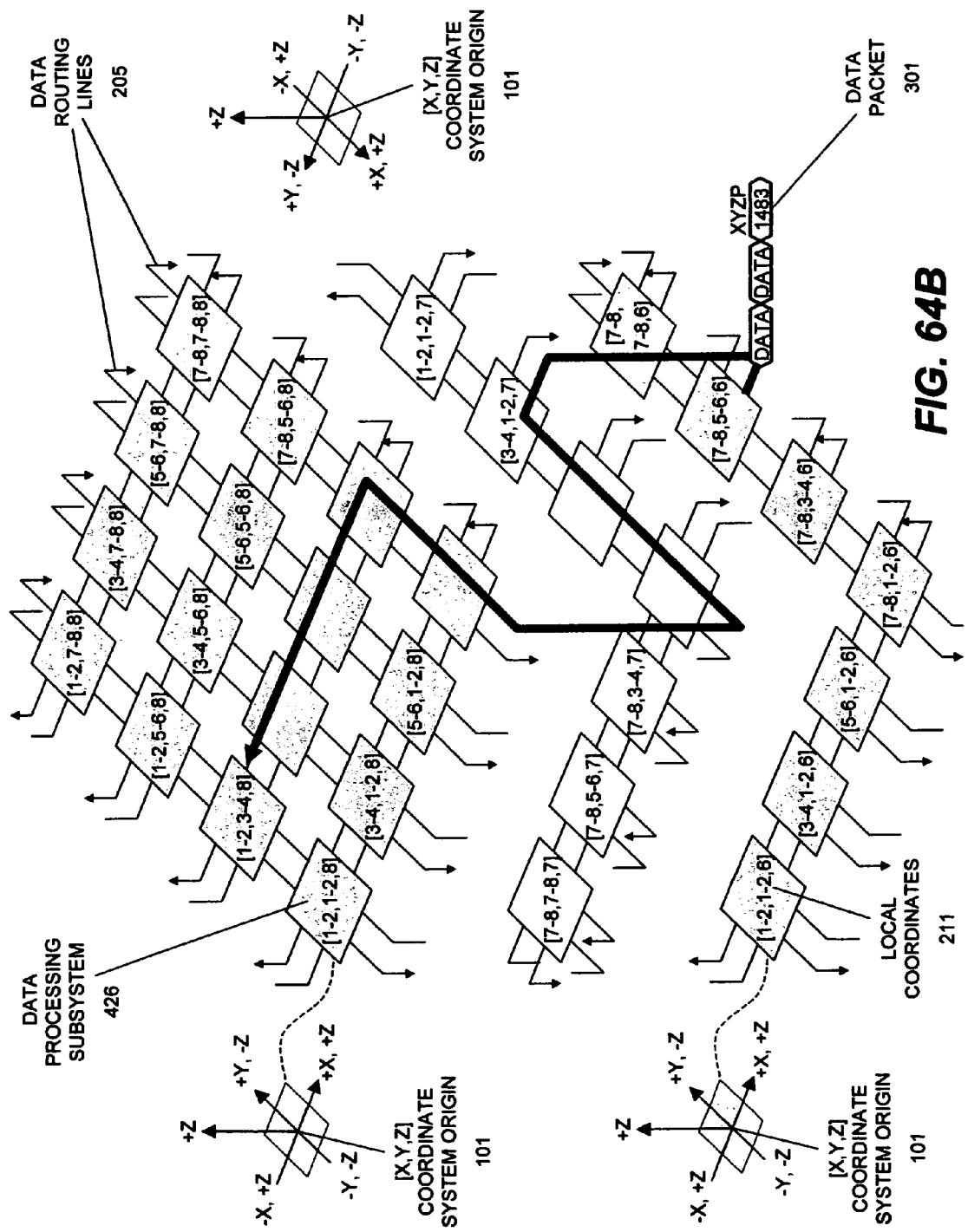
FIG. 64B shows an octal-width chain-like 3-dimensional data routing fabric using an edge set and a corner set of data routing lines to transfer a data packet between the bottom and top sets of data processing subsystems of a vertical stack of 2-dimensional sets of 2-dimensional subsystems.
Figure 64C:
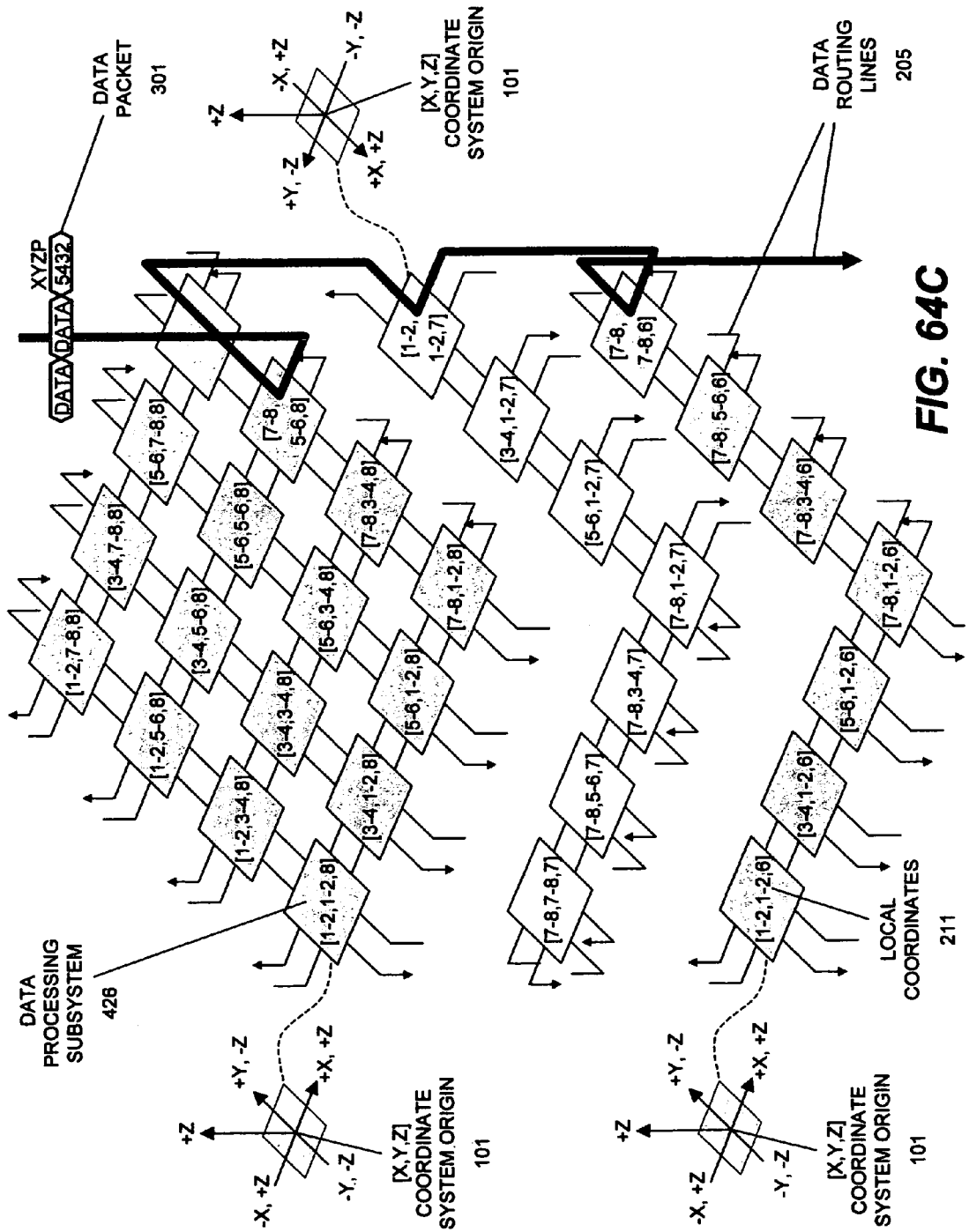
FIG. 64C shows an octal-width chain-like 3-dimensional data routing fabric using an edge set and multiple corner sets of data routing lines to transfer a data packet through a vertical stack of 2-dimensional sets of 2-dimensional subsystems.

The data transfer examples of FIGS. 64A–C show three data packets 301 being routed across a vertical stack of sets of data processing subsystems 426 of the type shown in FIGS. 62–63. In order to prevent line clutter, most of the vertical sets of data routing lines 205 connecting the adjacent data processing subsystems 426 are only partially visible. Also, in order to improve clarity, FIGS. 64A–C depict data processing subsystems 426 as square symbols, while hiding the system components 401 and the internal data routing structure of the subsystems.

The system components 401 that exist inside each data processing subsystem 426 can be indirectly identified through the local coordinate 211 ranges assigned to each square symbol. For example, local coordinate 211 range of [5-6,8] identifies a subsystem containing four system components with [X,Y,Z] local coordinates 211 of [5,3,8], [5,4,8], [6,3,8] and [6,4,8].

The data transfer of FIG. 64A begins with a source component 402 of the [5-6,8] data processing subsystem 426 sending a 3-word data packet 301 containing [X,Y,Z] packet destination coordinates 302 of [8,7,7] and [P] destination port address 314 of [0]. In accordance with the packet routing rules associated with FIG. 57, the data packet 301, being above its destination, is routed to a predetermined down-edge data processing subsystem 426 with data routing lines 205 leading in the down direction.

Upon arriving from above at the middle set of data processing subsystems 426 of FIG. 64A, the data packet 301 enters an edge subsystem in that set to autonomously converge across another edge data processing subsystem 426 onto the [8,7,7] destination component 403 residing inside subsystem [7-8,7]. The destination component 403 is entered through a local data exit ramp 229 with the [0] local port address 240.

The data transfer of FIG. 64B begins with a source component 402 of the [7-8,6] data processing subsystem 426 sending a 3-word packet containing the [X,Y,Z] packet destination coordinates 302 of [1,4,8] and [P] destination port address 314 of [3]. In accordance with the packet routing rules associated with FIG. 57, the data packet 301, being below its destination, is first routed up through a set of up-leading data routing lines 205 that are connected to the [7-8,6] source data processing subsystem 426.

Upon arriving from below at the middle set of data processing subsystems 426 of FIG. 64B, the data packet 301, still being below its destination, is routed toward a predetermined up-edge subsystem that is connected to a set of data routing lines 205 leading in the up direction.

Upon arriving from below at the top set of data processing subsystems 426 of FIG. 64B, the data packet 301 enters that set to converge on the [1,4,8] destination component 403 inside the [1-2,8] subsystem. The destination component 403 is entered through a local data exit ramp 229 with a [3] local port address 240.

The data transfer of FIG. 64C begins, immediately above the top set of data processing subsystems 426, with a source component 402 sending down a 3-word packet containing the [X,Y,Z] packet destination coordinates 302 of [5,4,3] and the [P] destination port address 314 of [2].

Upon arrival from above at the top set of data processing subsystems 426 of FIG. 64C, the data packet 301, being above its destination, follows the currently engaged edge of the top set of data processing subsystems 426 towards a predetermined down-edge with sets of data routing lines 205 leading in the down direction.

Upon arriving from above at the middle set of data processing subsystems 426 of FIG. 64C, the data packet 301 immediately down-exits the corner data processing subsystem 426 into which it had just arrived, as its destination component 403 is several levels down.

Next, upon arrival from above at the bottom set of data processing subsystems 426 of FIG. 64C, the data packet 301 once again down-exits the corner data processing subsystem 426 into which it had just arrived, as its destination component 403 is still several levels down.

Figure 65:
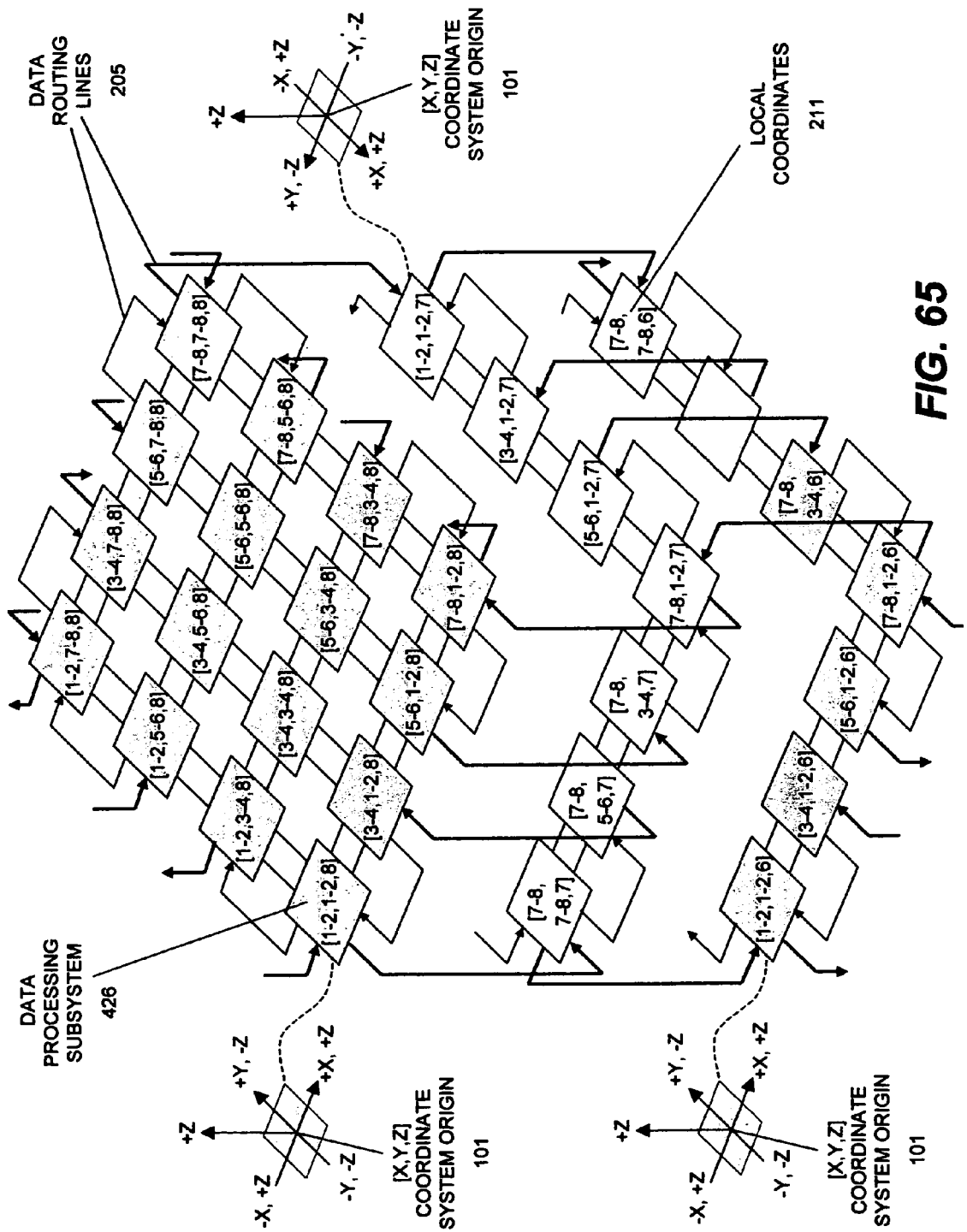
FIG. 65 shows a 3-dimensional data routing fabric formed by a chain-like linkage of three 2-dimensional sets of 2-dimensional data processing subsystems, with a vertical chain connection applied at each outside edge of every edge and corner subsystem of each set.

FIG. 65 shows three 2-dimensional sets of data processing subsystems 426, each set being interconnected with the adjacent sets in two routing directions 102 (up and down) of a vertical routing dimension. Externally, the sets of data processing subsystems 426 are linked with half as many sets of vertical data routing lines 205 as were used in the system of FIG. 62, since the other half of edge data routing lines are looped-back between adjacent edge subsystems. Internally, each of the three sets of subsystems includes a 4×4 grid of data processing subsystems 426, of the type shown in FIG. 66.

As seen in FIG. 65, the top and bottom sets of data processing subsystems 426 (shaded gray) are oriented relative to the gray shaded [X,Y,Z] coordinate system origin 101, while the center set of data processing subsystems 426 (white) is flipped upside-down and rotated 90 degrees relative to its neighbors, as evident by the orientation of its white [X,Y,Z] coordinate system origin 101.

Figure 66:
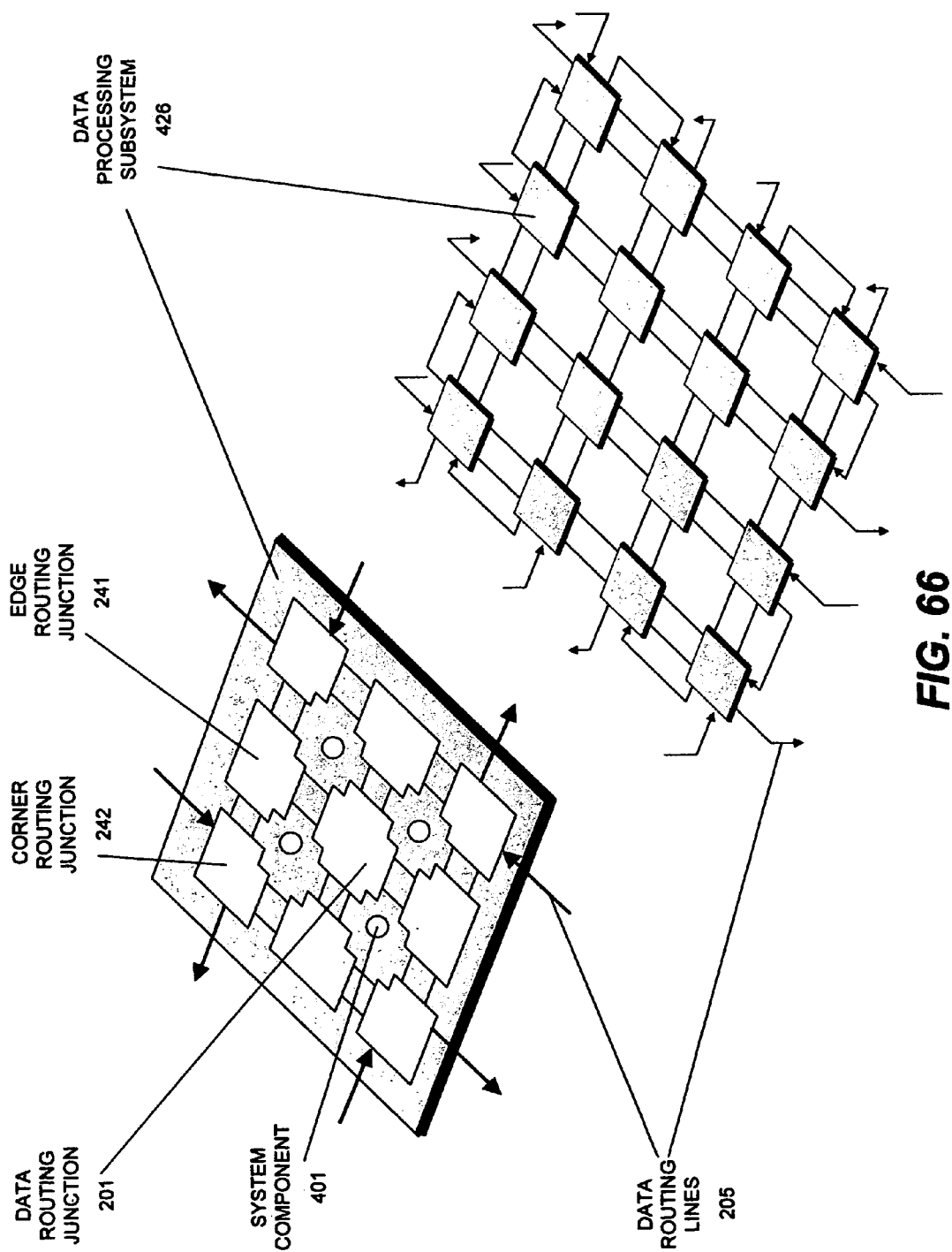
FIG. 66 shows a 4×4 set of data routing subsystems with half of edge connections being bent up or down (in the same direction at opposite facing edges) to connect to the hidden sets above and below, while the other half of the edge connections loop-back to adjacent subsystems within the shown set.

In addition to defining the 2-dimensional connectivity structure linking the 16 data processing subsystems 426 of each subsystem set, FIG. 66 also shows the internal details of the subsystems themselves. These include the four data processing components 401, four corner routing junctions 242, four edge routing junctions 241 and one internal data routing junction 201.

In this alternative embodiment of the multi-dimensional data routing fabric, the edge routing junctions 241 and the internal data routing junction 201 can be functionally identical to their respective counterparts of FIG. 57. However, the corner routing junctions 242 need additional functionality in order to be able to handle the edge loop-back routing feature of FIGS. 65 and 66.

FIG. 69 shows the internal routing structure of the corner routing junctions 242, edge routing junctions 241 and the internal data routing junctions 201 used in FIGS. 65 and 66. The loop-back routing function is achieved by wiring an additional data routing switch 226 to the corner routing junction 242, and altering some of the connections between the other two data routing switches 226 and two data routing muxes 227, as compared to how they were connected in FIG. 57.

The internal functionality of all data routing switches 226 used in FIG. 69 can remain the same for each switch, and also be identical to the functionality of data routing switches 226 used in FIGS. 57 and 60. In other words, data packets 301 turn left inside a switch when (1) their destination is at the same [Z] level and behind or to the right of the current packet location, (2) when they are not heading toward a down-edge and their destination is below the current subsystem (minus-z), or (3) when they are not heading toward an up-edge and their destination is above the current subsystem (plus-z). Otherwise, data packets 301 continue traveling along their current direction.

Data packets 301 can also effectively perform right turns as a result of bending of data routing lines 205 between the data routing switches 226 and data routing muxes 227 inside the corner routing junctions 242, edge routing junctions 241, and internal routing junctions 201 (FIG. 69). This is the mechanism that, for example, allows data packets 301 to turn right when they come up against subsystem edges.

In addition to the stated left-turn, right-turn, minus-z and plus-z routing rules, various other data routing rules are possible in other alternative embodiments of the multi-dimensional data routing fabric. For example, the left and right turn conditions can be reversed, routing primitives can be wired differently, or entirely new rules can be assigned to corner routing junctions 242, edge routing junctions 241, and internal routing junctions 201.

But regardless how the individual routing rules may change between various embodiments, many embodiments have one thing in common that is fundamentally different from other data routing methods that do not operate in multiple dimensions. The common thread in many embodiments of the multi-dimensional data routing fabric is the sensitivity of the data routing primitives (when implementing the routing rules) to the current multi-dimensional direction of data in transit, and the multi-dimensional direction of the destination relative to the current position of the data.

In other words, the data routing results at each routing step depend on the current direction of the data and the position of the destination relative to the current position of the data, as measured relative to a predetermined coordinate system origin 101 of a multi-dimensional coordinate system. For example, a data routing switch 226 may cause a data packet 301 to turn when it is oriented in one direction, but may cause the same data packet 301 not to turn when it is oriented in a different direction.

Figure 67A:
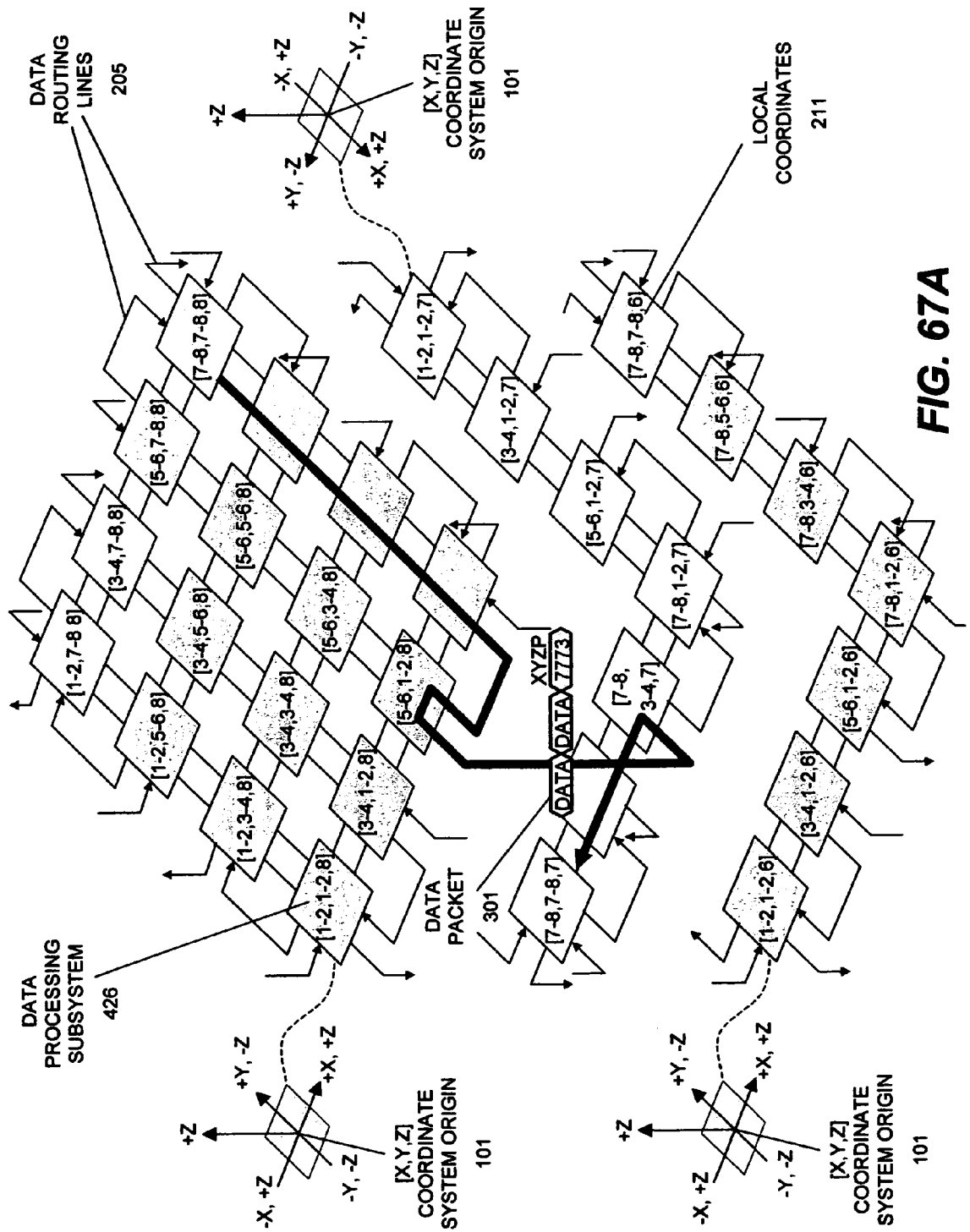
FIG. 67A shows a quadruple-width chain-like 3-dimensional data routing fabric using an edge set of data routing lines to transfer a data packet between two adjacent sets of data processing subsystems of a vertical stack of 2-dimensional sets of 2-dimensional subsystems.
Figure 67B:
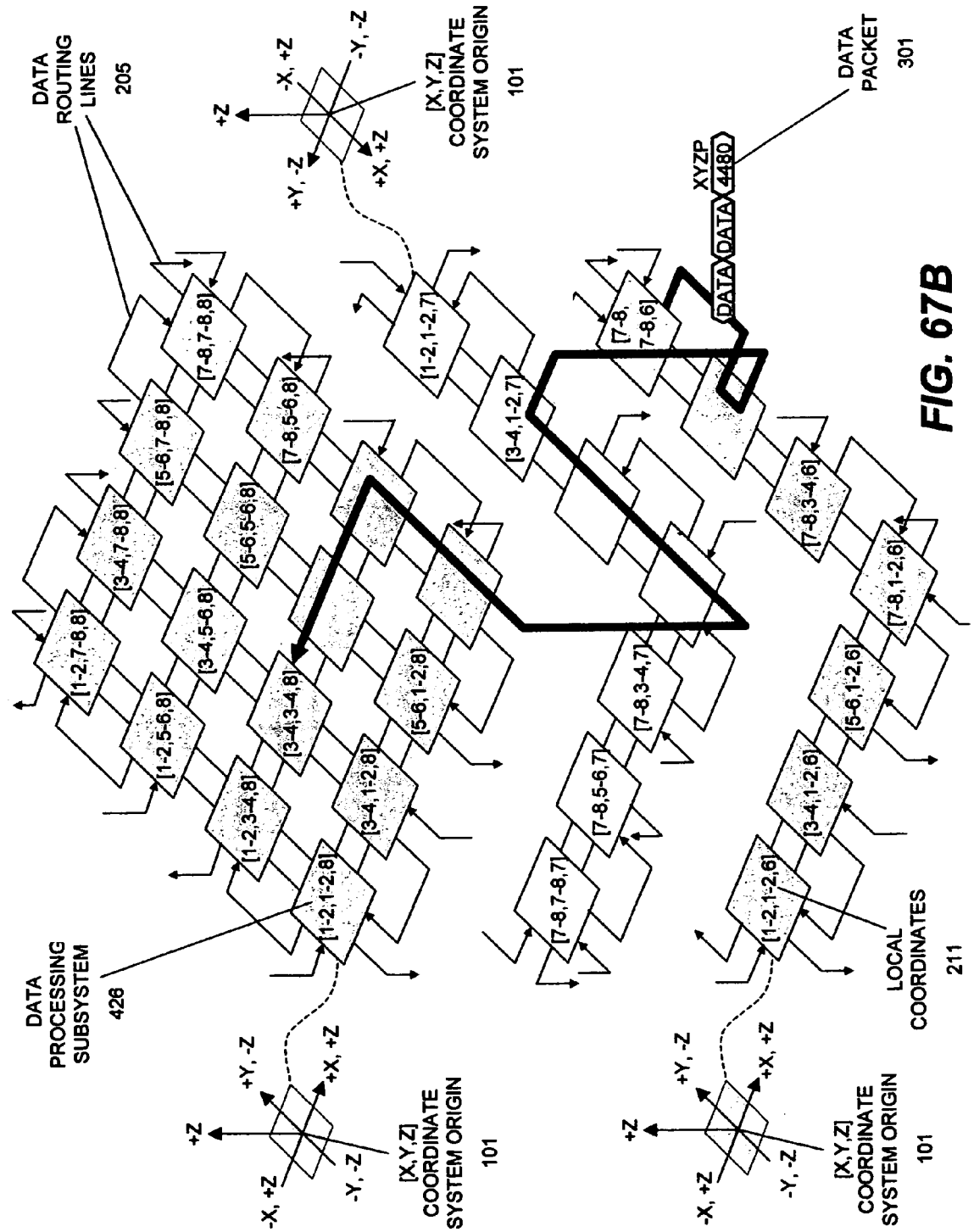
FIG. 67B shows a quadruple-width chain-like 3-dimensional data routing fabric using an edge set and a corner set of data routing lines to transfer a data packet between the bottom and top sets of data processing subsystems of a vertical stack of 2-dimensional sets of 2-dimensional subsystems.
Figure 67C:
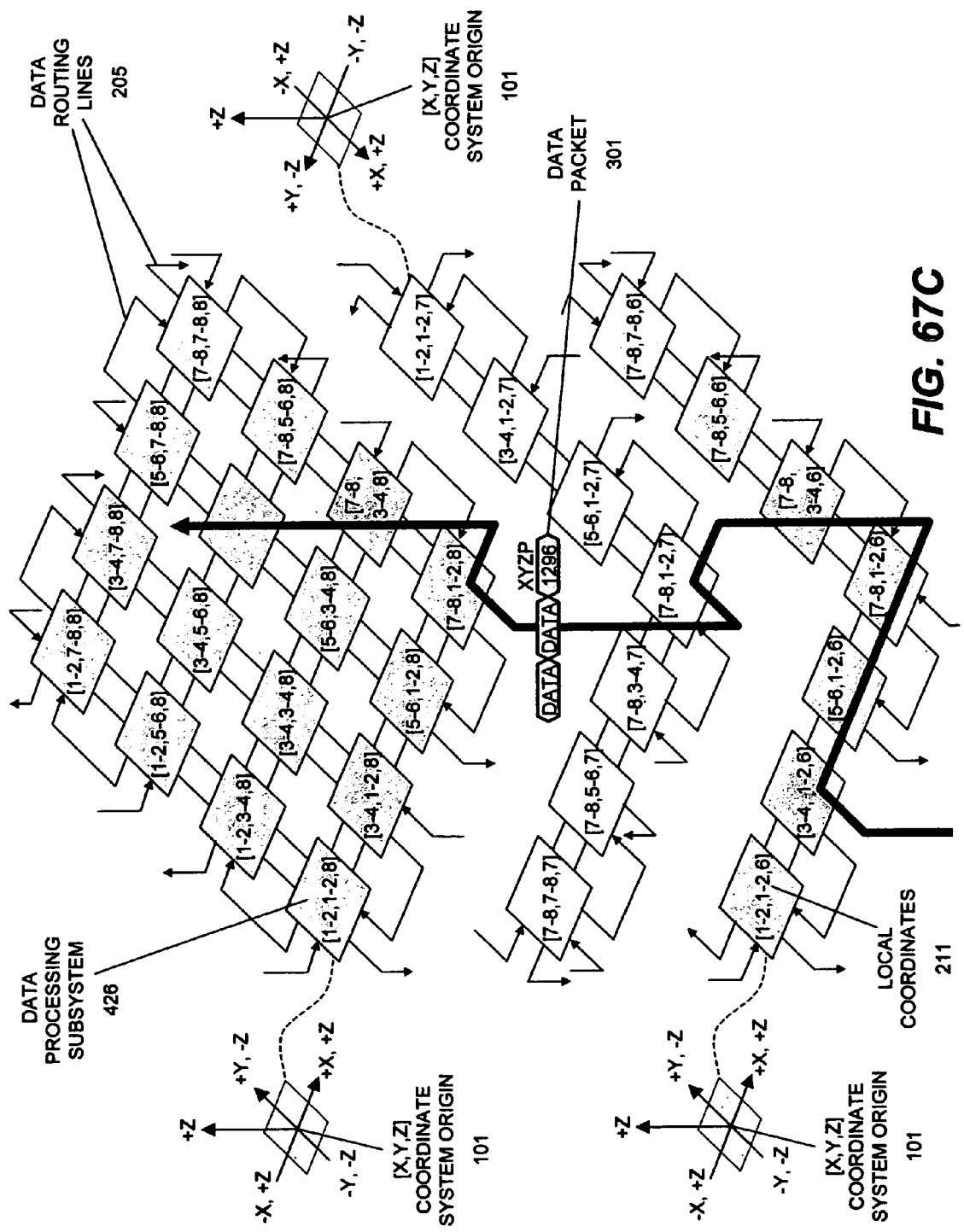
FIG. 67C shows a quadruple-width chain-like 3-dimensional data routing fabric using an edge set and multiple corner sets of data routing lines to transfer a data packet through a vertical stack of 2-dimensional sets of 2-dimensional subsystems.

The data transfer examples of FIGS. 67A–C show three data packets 301 being routed across a vertical stack of sets of data processing subsystems 426 of the type shown in FIGS. 65–66. In order to prevent line clutter, most of the vertical sets of data routing lines 205 connecting adjacent data processing subsystems 426 are only partially visible. Also, in order to improve clarity, FIGS. 67A–C depict data processing subsystems 426 as square symbols, while hiding the system components 401 and the internal data routing structure of the subsystems.

The system components 401 that exist inside each data processing subsystem 426 can be indirectly identified through the local coordinate 211 ranges assigned to each square symbol. For example, local coordinate 211 range of [1-2,6] identifies a subsystem containing four system components with [X,Y,Z] local coordinates 211 of [1,1,6], [1,2,6], [2,1,6] and [2,2,6].

The data transfer of FIG. 67A begins with a source component 402 of the [7-8,8] data processing subsystem 426 sending a 3-word data packet 301 containing [X,Y,Z] packet destination coordinates 302 of [7,7,7] and [P] destination port address 314 of [3]. In accordance with the packet routing rules associated with FIG. 69, the data packet 301, being above its destination, is routed to a predetermined down-edge data processing subsystem 426 with data routing lines 205 leading in the down direction.

Arriving at the edge data processing subsystem 426 [7-8,1-2,8] the data packet wants to go down, but since this subsystem is lacking a down path, the packet loops-back along the down-edge to an adjacent subsystem [5-6,8], where it attempts to go down again. This time it is successful, as the subsystem [5-6,1-2,8] is indeed connected to a down-leading set of data routing lines 205.

Upon arriving from above at the middle set of data processing subsystems 426 of FIG. 67A, the data packet 301 enters an edge subsystem in that set to autonomously converge across another edge data processing subsystem 426 onto the [7,7,7] destination component 403 residing inside subsystem [7-8,7]. The destination component 403 is entered through a local data exit ramp 229 with the [3] local port address 240.

The data transfer of FIG. 67B begins with a source component 402 of the [7-8,6] data processing subsystem 426 sending a 3-word packet containing the [X,Y,Z] packet destination coordinates 302 of [4,4,8] and [P] destination port address 314 of [0]. In accordance with the packet routing rules associated with FIG. 69, the data packet 301, being below its destination, heads for the up-edge of the subsystem [7-8,6] with the intention of going up.

Arriving at the edge of the data processing subsystem 426 [7-8,6] the data packet wants to go up, but since this subsystem is lacking an up path, the packet loops-back along the up-edge to an adjacent subsystem [7-8,6], where it attempts to go up again. This time it is successful, as the subsystem [7-8,6] is indeed connected to an up-leading set of data routing lines 205.

Upon arriving from below at the middle set of data processing subsystems 426 of FIG. 67B, the data packet 301, still being below its destination, is routed toward a predetermined up-edge subsystem that is connected to a set of data routing lines 205 leading in the up direction.

Upon arriving from below at the top set of data processing subsystems 426 of FIG. 67B, the data packet 301 enters that set to converge on the [4,4,8] destination component 403 inside the (3-4,8] subsystem. The destination component 403 is entered through a local data exit ramp 229 with a [0] local port address 240.

The data transfer of FIG. 67C begins, immediately below the bottom set of data processing subsystems 426, with a source component 402 sending up a 3-word packet containing the [X,Y,Z] packet destination coordinates 302 of [1,2,9] and the [P] destination port address 314 of [6].

Upon arrival from below at the bottom set of data processing subsystems 426 of FIG. 67C, the data packet 301, being below its destination, follows the currently engaged edge of the bottom set of data processing subsystems 426 towards a predetermined up-edge with sets of data routing lines 205 leading in the up direction.

Upon arriving from below at the middle set of data processing subsystems 426 of FIG. 67C, the data packet 301 immediately up-exits the corner data processing subsystem 426 into which it had just arrived, as its destination component 403 is two levels up.

Next, upon arrival from below at the top set of data processing subsystems 426 of FIG. 67C, the data packet 301 once again up-exits the corner data processing subsystem 426 into which it had just arrived, as its destination component 403 is still one level up (Z=9 level).

Figure 68:
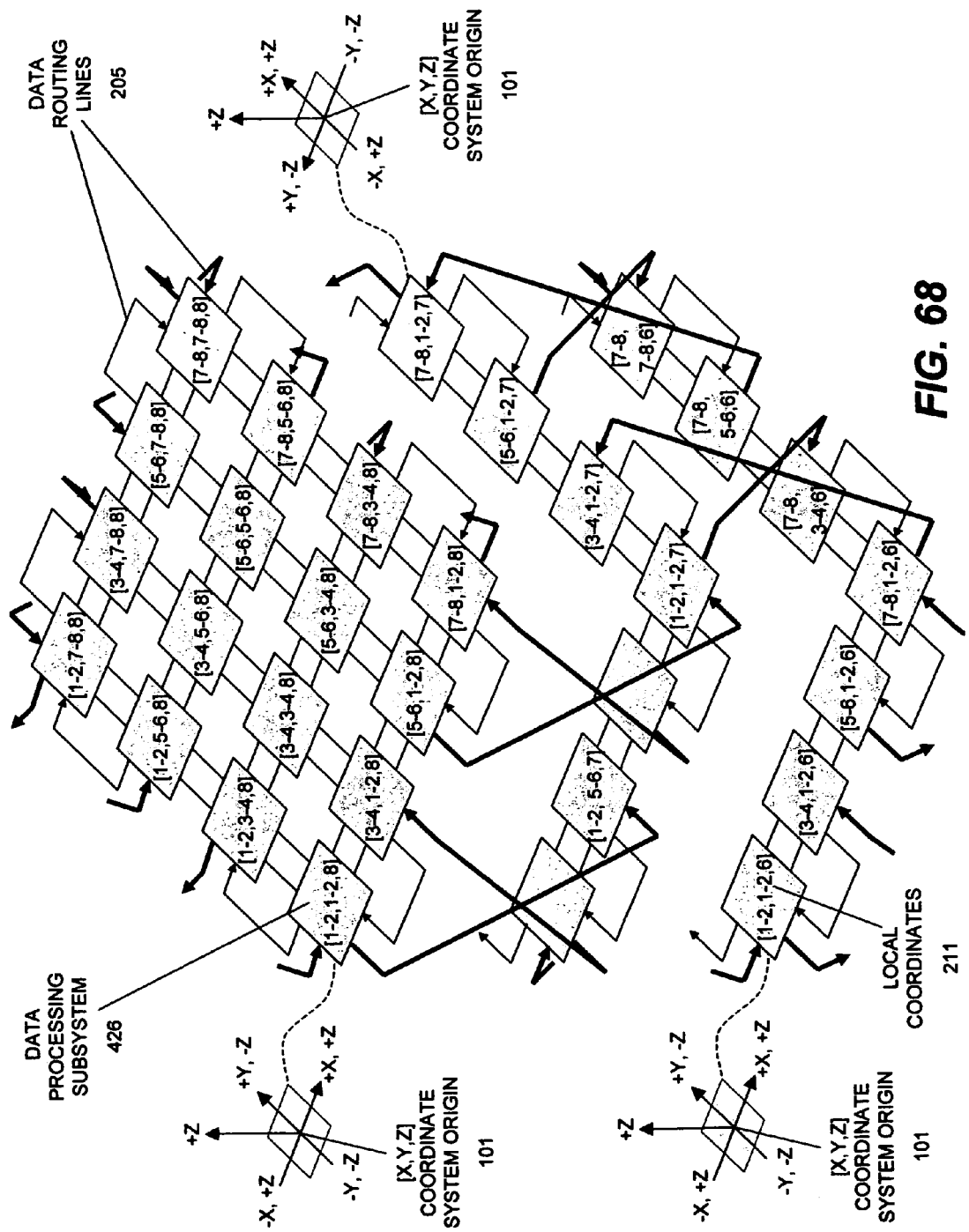
FIG. 68 shows a 3-dimensional data routing fabric formed by a chain-like linkage of three 2-dimensional sets of 2-dimensional data processing subsystems, with a slanted x-like chain connection applied at each outside edge of every edge and corner subsystem of each set.

FIG. 68 shows three 2-dimensional sets of data processing subsystems 426, each set being interconnected with the adjacent sets in two routing directions 102 (up and down) of a vertical routing dimension. Externally, the sets of data processing subsystems 426 are linked with four sets of vertical data routing lines 205 per edge, with the remaining sets of edge data routing lines 205 looping-back between adjacent edge-based subsystems of individual sets. Internally, each of the three sets of subsystems includes a 4×4 grid of data processing subsystems 426, of the type shown in FIG. 66.

As shown in FIG. 68, the top and bottom sets of gray data processing subsystems 426 are identically oriented relative to the top and bottom gray shaded [X,Y,Z] coordinate system origins 101, while the center set of data processing subsystems 426 (also shaded gray) is rotated 90 degrees relative to its neighbors, as evident by the orientation of the middle [X,Y,Z] coordinate system origin 101.

Comparing FIG. 68 with FIGS. 62 and 65, it is evident that while all center sets of data processing subsystems 426 are rotated 90 degrees relative to the corresponding top and bottom subsystem sets, the center set of data processing subsystems 426 of FIG. 68 is not flipped upside-down as are the center subsystem sets of FIGS. 62 and 65.

Since all 3 sets of data processing subsystems 426 of FIG. 68 have their top faces pointing in the same top direction, the sets of vertical data routing lines 205 between the subsystem sets must be crossed with one another in order to match the corresponding inputs with outputs.

While the alternative embodiments of the multi-dimensional data routing fabric of FIGS. 62, 65 and 68 use the flip upside-down subsystem placement or crossing of data routing lines 205 to align edge inputs and outputs between the adjacent sets of data processing subsystems 426, other alignment methods are possible as well. For example, data routing topography of every other set of data processing subsystems 426 can be a mirror image of the neighboring sets.

The internal structure of the data processing subsystems 426 of FIG. 68 is shown in FIG. 66, and the internal routing details of the corner routing junctions 242, edge routing junctions 241 and the internal data routing junction 201 of FIG. 66 are shown in FIG. 69.

The data transfer examples of FIGS. 70A–C show three data packets 301 being routed across a vertical stack of sets of data processing subsystems 426 of the type shown in FIG. 68. In order to prevent line clutter, most of the vertical sets of data routing lines 205 connecting adjacent data processing subsystems 426 are only partially visible. Also, in order to improve clarity, FIGS. 70A–C depict data processing subsystems 426 as square symbols, while hiding the system components 401 and the internal data routing structure of the subsystems.

The system components 401 that exist inside each data processing subsystem 426 can be indirectly identified through the local coordinate 211 ranges assigned to each square symbol. For example, local coordinate 211 range of [1-2,7] identifies a subsystem containing four system components with [X,Y,Z] local coordinates 211 of [1,5,7], [1,6,7], [2,5,7] and [2,6,7].

The data transfer of FIG. 70A begins with a source component 402 of the [7-8,6] data processing subsystem 426 sending a 3-word packet containing the [X,Y,Z] packet destination coordinates 302 of [4,3,8] and [P] destination port address 314 of [0]. In accordance with the packet routing rules associated with FIG. 69, the data packet 301, being below its destination, heads for the up-edge of the subsystem [7-8,6] with the intention of going up.

Arriving at the edge of the data processing subsystem 426 [7-8,6] the data packet 301 wants to go up, but since this subsystem is lacking an up-path, the packet loops-back along the up-edge to an adjacent subsystem [7-8,6], where it attempts to go up again. This time it is successful, as the subsystem [7-8,6] is indeed connected to an up-leading set of data routing lines 205.

Upon arriving from below at the middle set of data processing subsystems 426 of FIG. 70A, the data packet 301 immediately up-exits the corner data processing subsystem 426 into which it had just arrived, as its destination component 403 is still one level up.

Upon arriving from below at the top set of data processing subsystems 426 of FIG. 70A, the data packet 301 enters that set to converge on the [4,3,8] destination component 403 inside the [3-4,8] subsystem. The destination component 403 is entered through a local data exit ramp 229 with a [0] local port address 240.

The data transfer of FIG. 70B begins with a source component 402 inside the [3-4,8] data processing subsystem 426 sending a 3-word packet containing the [X,Y,Z] packet destination coordinates 302 of [7,1,6] and [P] destination port address 314 of [9]. In accordance with the packet routing rules associated with FIG. 69, the data packet 301, being above its destination, heads for the down-edge of the top set of data processing subsystems 426 with the intention of going down.

Arriving at the edge of the data processing subsystem 426 [3-4,8] the data packet 301 wants to go down, but since this subsystem is lacking a down path, the packet loops-back along the down-edge to an adjacent subsystem [1-2,8], where it attempts to go down again. This time it is successful, as the subsystem [1-2,8] is indeed connected to a down-leading set of data routing lines 205.

Upon arriving from above at the middle set of data processing subsystems 426 of FIG. 70B, the data packet 301, still being above its destination, is routed toward a down-edge subsystem that is connected to a set of data routing lines 205 leading in the down direction.

Upon arriving from above at the bottom set of data processing subsystems 426 of FIG. 70B, the data packet 301 enters that set to converge on the [7,1,6] destination component 403 inside the [7-8,6] subsystem. The destination component 403 is entered through a local data exit ramp 229 with a [9] local port address 240.

The data transfer of FIG. 70C begins, below the bottom set of data processing subsystems 426, with a source component 402 sending up a 3-word packet containing the [X,Y,Z] packet destination coordinates 302 of [4,6,9] and the [P] destination port address 314 of [3].

Upon arrival from below at the bottom set of data processing subsystems 426 of FIG. 70C, the data packet 301, being below its destination, follows the currently engaged edge of the bottom set of data processing subsystems 426 towards an up-edge with sets of data routing lines 205 leading in the up direction.

Upon arrival from below at the middle set of data processing subsystems 426 of FIG. 70C, the data packet 301, being two levels below its destination, follows the currently engaged edge of the middle set of data processing subsystems 426 towards a another up-edge with sets of data routing lines 205 leading in the up direction.

Upon arrival from below at the top set of data processing subsystems 426 of FIG. 70C, the data packet 301, still being one level below its destination, follows the currently engaged edge of the top set of data processing subsystems 426 towards yet another up-edge with sets of data routing lines 205 leading in the up direction.

FIG. 71 shows three 2-dimensional sets of data processing subsystems 426, each set being interconnected with the adjacent sets in two routing directions 102 (up and down) of a vertical routing dimension. Externally, the sets of data processing subsystems 426 are linked with two sets of vertical data routing lines 205 per edge, with the remaining edge data routing lines 205 looping-back between adjacent edge-based subsystems of individual sets. Internally, each of the three sets of subsystems includes a 4×4 grid of data processing subsystems 426, of the type shown in FIG. 72.

As shown in FIG. 71, the top and bottom sets of gray data processing subsystems 426 are identically oriented relative to the top and bottom gray shaded [X,Y,Z] coordinate system origins 101, while the center set of data processing subsystems 426 (also shaded gray) is rotated 90 degrees relative to its neighbors, as evident by the orientation of the middle [X,Y,Z] coordinate system origin 101.

The internal structure of the data processing subsystems 426 of FIG. 71 is shown in FIG. 72, and the internal routing details of the corner routing junctions 242, edge routing junctions 241 and the internal data routing junction 201 of FIG. 72 are shown in FIG. 69.

Comparing FIG. 71 with FIG. 68, it is evident that the system of FIG. 71 has half as many data routing lines 205 vertically connecting adjacent sets of data processing subsystems 426 as are present in FIG. 68, and that all of the vertically slanted global routing lines 205 of FIG. 71 are attached only at the corner data processing subsystems 426 of each of the 3 subsystem sets.

Limiting the number of vertical connections between sets of data processing subsystems 426 to only those attached to corner subsystems reduces the total number of system interconnect points, and the associated interconnect costs. This method of cost reduction can is attractive in many low-cost applications.

Other alternative embodiments of the multi-dimensional data routing fabric can adopt different ratios of edge data routing lines 205 that vertically span the adjacent sets of data processing subsystems 426, versus those that are looped-back at the edge subsystems within a given set.

The data transfer examples of FIGS. 73A–C show three data packets 301 being routed across a vertical stack of sets of data processing subsystems 426 of the type shown in FIG. 71. In order to prevent line clutter, most of the vertical sets of data routing lines 205 connecting adjacent data processing subsystems 426 are only partially visible. Also, in order to improve clarity, FIGS. 73A–C depict data processing subsystems 426 as square symbols, while hiding the system components 401 and the internal data routing structure of the subsystems.

The system components 401 that exist inside each data processing subsystem 426 can be indirectly identified through the local coordinate 211 ranges assigned to each square symbol. For example, local coordinate 211 range of [7-8,8] identifies a subsystem containing four system components with [X,Y,Z] local coordinates 211 of [7,3,8], [7,4, 8], [8,3,8] and [8,4,8].

The data transfer of FIG. 73A begins with a source component 402 of the [3-4,7] data processing subsystem 426 sending a 3-word packet containing the [X,Y,Z] packet destination coordinates 302 of [4,4,8] and [P] destination port address 314 of [3]. In accordance with the packet routing rules associated with FIG. 69, the data packet 301, being below its destination, heads for the edge of the subsystem [1-2,7] with the intention of going up.

Arriving at the edge of the data processing subsystem 426 [1-2,7] the data packet 301 wants to go up, but since this subsystem is lacking an up-path, the packet loops-back along the up-edge to an adjacent subsystem [1-2,7], where it attempts to go up again.

Arriving at the edge of the data processing subsystem 426 [1-2,7] the data packet 301 wants to go up, but since this subsystem is also lacking an up-path, the packet loops-back along the up-edge to the next adjacent subsystem [1-2,7], where it attempts to go up again.

Arriving at the edge of the data processing subsystem 426 [1-2,7] the data packet 301 wants to go up, but since this subsystem is also lacking an up-path, the packet loops-back along the up-edge to the next adjacent subsystem [1-2,7], where it attempts to go up again. This time it is successful, as the subsystem [1-2,7] is indeed connected to an up-leading set of data routing lines 205.

Upon arriving from below at the top set of data processing subsystems 426 of FIG. 73A, the data packet 301 enters that set to converge on the [4,4,8] destination component 403 inside the [3-4,8] subsystem. The destination component 403 is entered through a local data exit ramp 229 with a [3] local port address 240.

The data transfer of FIG. 73B begins with a source component 402 of the [5-6,8] data processing subsystem 426 sending a 3-word packet containing the [X,Y,Z] packet destination coordinates 302 of [7,1,6] and [P] destination port address 314 of [9]. In accordance with the packet routing rules associated with FIG. 69, the data packet 301, being above its destination, heads for the down-edge of the subsystem [5-6,8] with the intention of going down.

Arriving at the edge of the data processing subsystem 426 [5-6,8] the data packet 301 wants to go down, but since this subsystem is lacking a down-path, the packet loops-back along the down-edge to an adjacent subsystem [3-4,8], where it attempts to go down again.

Arriving at the edge of the data processing subsystem 426 [3-4,8] the data packet 301 again wants to go down, but since this subsystem is also lacking a down-path, the packet loops-back along the down-edge to the next adjacent subsystem [1-2,8], where it attempts to go down again. This time it is successful, as the subsystem [1-2,8] is indeed connected to a down-leading set of data routing lines 205.

Upon arriving from above at the middle set of data processing subsystems 426 of FIG. 73B, the data packet 301 immediately down-exits the corner data processing subsystem 426 into which it had just arrived, as its destination component 403 is still one level down.

Upon arriving from above at the bottom set of data processing subsystems 426 of FIG. 73B, the data packet 301 enters that set to converge on the [7,1,6] destination component 403 inside the [7-8,6] subsystem. The destination component 403 is entered through a local data exit ramp 229 with a [9] local port address 240.

The data transfer of FIG. 73C begins, above the top set of data processing subsystems 426, with a source component 402 sending down a 3-word packet containing the [X,Y,Z] packet destination coordinates 302 of [1,1,4] and the [P] destination port address 314 of [6].

Upon arriving from above at the top set of data processing subsystems 426 of FIG. 73C, the data packet 301 immediately down-exits the same corner data processing subsystem 426 into which it had just arrived, as its destination component 403 is several levels down.

Upon arriving from above at the middle set of data processing subsystems 426 of FIG. 73C, the data packet 301 immediately down-exits the same corner data processing subsystem 426 into which it had just arrived, as its destination component 403 is still several levels down.

Upon arriving from above at the bottom set of data processing subsystems 426 of FIG. 73C, the data packet 301 once again down-exits the same corner data processing subsystem 426 into which it had just arrived, as its destination component 403 is still 2 levels down (level Z=4).

Examining FIG. 73C and FIG. 70C, it is evident that data packets 301 passing through multiple levels of sets of data processing subsystems 426 do so in a spiral fashion resembling a helix structure. In the case of FIG. 73C, the vertical communications between subsystems take the form of one double helix for the up direction, and another double helix for transferring packets down. In the case of FIG. 70C, the number of helix-like paths implementing vertical data transfers is doubled because there are twice as many data routing lines 205 interconnecting neighboring sets of data processing subsystems 426.

FIG. 74 shows three 2-dimensional sets of data processing subsystems 426, each being interconnected with the adjacent sets in two routing directions 102 (up and down) of a vertical routing dimension. Externally, the sets of data processing subsystems 426 are linked with two sets of vertical data routing lines 205 per edge, with the remaining edge data routing lines 205 looping-back between adjacent edge-based subsystems of individual sets. Internally, each of the three sets of subsystems includes a 4×4 grid of data processing subsystems 426, of the type shown in FIG. 72.

As shown in FIG. 74, the top, middle and bottom sets of gray data processing subsystems 426 are all identically oriented relative to the gray shaded [X,Y,Z] coordinate system origins 101.

The internal structure of the data processing subsystems 426 of FIG. 74 is shown in FIG. 72, and the internal routing details of the corner routing junctions 242, edge routing junctions 241 and the internal data routing junction 201 of FIG. 72 are shown in FIG. 69.

Comparing FIG. 74 with FIG. 71, it is evident that the adjacent data processing subsystems of FIG. 74 are not rotated relative to one another in order to line up the inputs with outputs, as was the case in FIG. 71. Instead, the corner data routing lines 205 are arranged in a lacing pattern to connect subsystem corners above and below, without going to other corners.

Containing the vertical data routing lines 205 along the vertically aligned edges reduces the total length of the vertical interconnect wires used, while clearing the sides of the system of interconnect obstacles for improved test and cooling access.

Other alternative embodiments of the multi-dimensional data routing fabric can adopt various other methods to align edge inputs with outputs between adjacent data processing subsystems 426, for example, by using flexible cables or custom-configured connecting boards.

The data transfer examples of FIGS. 75A–C show three data packets 301 being routed across a vertical stack of sets of data processing subsystems 426 of the type shown in FIG. 74. In order to prevent line clutter, most of the vertical sets of data routing lines 205 connecting adjacent data processing subsystems 426 are only partially visible. Also, in order to improve clarity, FIGS. 75A–C depict data processing subsystems 426 as square symbols, while hiding the system components 401 and the internal data routing structure of the subsystems.

The system components 401 that exist inside each data processing subsystem 426 can be indirectly identified through the local coordinate 211 ranges assigned to each square symbol. For example, local coordinate 211 range of [7-8,6] identifies a subsystem containing four system components with [X,Y,Z] local coordinates 211 of [7,3,6], [7,4,6], [8,3,6] and [8,4,6].

The data transfer of FIG. 75A begins with a source component 402 of the [7-8,7] data processing subsystem 426 sending a 3-word packet containing the [X,Y,Z] packet destination coordinates 302 of [4,4,8] and [P] destination port address 314 of [3]. In accordance with the packet routing rules associated with FIG. 69, the data packet 301, being below its destination, heads for the edge of the subsystem [7-8,7] with the intention of going up.

Arriving at the edge of the data processing subsystem 426 [7-8,7] the data packet 301 wants to go up, but since this subsystem is lacking an up-path, the packet loops-back along the up-edge to an adjacent subsystem [7-8,7], where it attempts to go up again. This time it is successful, as the subsystem [7-8,7] is indeed connected to an up-leading set of data routing lines 205.

Upon arriving from below at the top set of data processing subsystems 426 of FIG. 75A, the data packet 301 enters that set to converge on the [4,4,8] destination component 403 inside the [3-4,8] subsystem. The destination component 403 is entered through a local data exit ramp 229 with a [3] local port address 240.

The data transfer of FIG. 75B begins with a source component 402 of the [5-6,8] data processing subsystem 426 sending a 3-word packet containing the [X,Y,Z] packet destination coordinates 302 of [7,1,6] and [P] destination port address 314 of [9]. In accordance with the packet routing rules associated with FIG. 69, the data packet 301, being above its destination, heads for the down-edge of the subsystem [5-6,8] with the intention of going down.

Arriving at the edge of the data processing subsystem 426 [5-6,8] the data packet 301 wants to go down, but since this subsystem is lacking a down-path, the packet loops-back along the down-edge to an adjacent subsystem [3-4,8], where it attempts to go down again.

Arriving at the edge of the data processing subsystem 426 [3-4,8] the data packet 301 again wants to go down, but since this subsystem is also lacking a down-path, the packet loops-back along the down-edge to the next adjacent subsystem [1-2,8], where it attempts to go down again. This time it is successful, as the subsystem [1-2,8] is indeed connected to a down-leading set of data routing lines 205.

Upon arriving from above at the middle set of data processing subsystems 426 of FIG. 75B, the data packet 301 immediately down-exits the corner data processing subsystem 426 into which it had just arrived, as its destination component 403 is still one level down.

Upon arriving from above at the bottom set of data processing subsystems 426 of FIG. 75B, the data packet 301 enters that set to converge on the [7,1,6] destination component 403 inside the [7-8,6] subsystem. The destination component 403 is entered through a local data exit ramp 229 with a [9] local port address 240.

The data transfer of FIG. 75C begins, above the top set of data processing subsystems 426, with a source component 402 sending down a 3-word packet containing the [X,Y,Z] packet destination coordinates 302 of [1,1,4] and the [P] destination port address 314 of [6].

Upon arriving from above at the top set of data processing subsystems 426 of FIG. 75C, the data packet 301 immediately down-exits the same corner data processing subsystem 426 into which it had just arrived, as its destination component 403 is several levels down.

Upon arriving from above at the middle set of data processing subsystems 426 of FIG. 75C, the data packet 301 immediately down-exits the same corner data processing subsystem 426 into which it had just arrived, as its destination component 403 is still several levels down.

Upon arriving from above at the bottom set of data processing subsystems 426 of FIG. 75C, the data packet 301 once again down-exits the same corner data processing subsystem 426 into which it had just arrived, as its destination component 403 is still 2 levels down (level Z=4).

The types and quantities of structures connecting edges of sets of data processing subsystems 426 can vary between various embodiments of the multi-dimensional data routing fabric, depending on such factors as number of edges in each set and number of external data routing lines allocated per edge.

For example, a set of data processing subsystems 426 of a an alternative embodiment the multi-dimensional data routing fabric may have 6 edges, with each edge having 2 sets of slightly spiraling data routing lines 205 connecting it to an edge of an adjacent set of subsystems.

In another alternative embodiment of the multi-dimensional data routing fabric, a set of data processing subsystems 426 may have 8 edges, with each edge having 2 sets of substantially spiraling data routing lines 205 connecting it to an edge of a first adjacent set of subsystems, and 2 sets of non-spiral lines connecting it to an edge of a second adjacent set of subsystems.

The 3-dimensional systems of FIGS. 62, 65, 68, 71 and 74 are constructed from stacks of 2-dimensional layers containing arrays of data processing subsystems 426, which in turn are organized as 2-dimensional arrays of system components 401 and data routing junctions 201. This type of nesting of a 2-dimensional array of components inside 2-dimensional arrays of subsystems stacked in an additional vertical layering dimension can be considered to be contained within a single level of hierarchy, as every component is addressable from any other component through a common type of destination coordinates.

Various alternative embodiments of the multi-dimensional data routing fabric can use arrays of subsystems grouped in multiple layers of hierarchy. In other words, each subsystem in a first level of hierarchy can be composed of arrays of subsystems of a second level of the hierarchy, where the addressing method of the first level of hierarchy can be different from the addressing method of the second level. Also, the quantity and type of dimensions used to address subsystems of the first level of hierarchy may be different from the quantity and the type of dimensions used to address subsystems of the second level.

FIG. 76 shows a hierarchical version of an array of data processing subsystem 426 of FIG. 72, where each gray subsystem represents an array of white subsystems, and where each white subsystem can be composed of yet another array of intermediate subsystems or be an array of actual data processing components.

For example, each white subsystem could represent an entire 3-dimensional system of FIG. 71, with the 8 sets of external data routing lines of the white subsystem connecting to the untied 4 top and 4 bottom sets of data routing lines of the 3-layer stack.

This type of hierarchical nesting of data processing subsystems 426 requires a dedicated set of packet destination coordinates 302 (inside the headers of data packets 301 that cross hierarchical boundaries) for each level of hierarchy used.

Advantages

From the description above, a number of advantages of my multi-dimensional data routing fabric become evident:

(a) its de-centralized structure enables multiple data transfers to occur simultaneously without interference, thus increasing system data communication performance and enabling multiple components to work in parallel;

(b) its flexible packet structure and small headers provide for direct and efficient data transfers between small or large numbers of components, ranging from two to two hundred, or thousands;

(c) its autonomous operation enables system components to directly send and receive data at transfer endpoints, without having to track, arbitrate or otherwise manage the transfers;

(d) its scalable architecture enables true plug-and-play system integration by allowing glue-less (without external logic) addition and removal of system components without requiring any hardware or software changes to other components;

(e) its sets of short point-to-point data routing lines are in many cases non-intersecting, thus making it easy for place-and-route tools to implement designs in chips and boards. Because its data routing lines never cross one another, a 2-dimensional embodiment of the multi-dimensional data routing fabric can be fully interconnected using only one signal layer;

(f) its distributed structure inherently scales the I/O bandwidth with performance, increasing the I/O bandwidth in step with increased performance when new components are added, thus always preserving the balance between data processing and I/O performance in subsequent revisions of products;

(g) its uniform and deterministic I/O structure allows system components to be easily moved from one device to another, thus enabling system re-partitioning even late in the design cycle;

(h) its simple, processor-independent data transport structure with only 4 types of signals enables re-use of system components, where components from one system can be easily re-used in other systems using the same or different processors;

(i) its deterministic data transfer latency allows for both the data and control transfers to share the same sets of data routing lines, thus reducing system size by eliminating the need for separate sets of data routing lines for control and data;

(j) its uniform and deterministic I/O structure allows most system verification cycles to be pushed inside the components, requiring fewer cycles at the system level where verification is more difficult;

(k) its inherently redundant I/O topography, with multiple I/O paths available to access each component, improves system reliability by enabling components to bypass disabled or incapacitated communication links by re-directing affected data transfers across a different redundant path;

(l) Its simple interface to data processing subsystems makes it compatible with most presently existing fixed-function components and processors, and rendering data communications between processors to be glue-less and as easy as accessing local memory;

(m) Its point-to-point data routing lines are inherently fast while consuming very little power, because they are short and because they only have to drive one load. Fast and low power data transport capability enables smaller and cheaper end-products, thus providing a significant competitive advantage.

(n) Its structure is based on multiple instances of a single core (data routing junction), one type of data routing lines and one type of communication protocol. This makes it easy to verify system operation and to isolate and fix problems.

(o) Its HDL-compatible (Hardware Description Language) architecture can be implemented with standard offthe-shelf synthesis and implementation tools, removing the need for exotic and expensive custom development platforms.

(p) Its deterministic operation de-couples component functionality from system connectivity, making it possible for system components not to have to have any knowledge of the system in order to communicate with other system components. This enables component cores to be developed once, then encapsulated, without having to be touched again.

(r) Its distributed and elastic nature removes the need for data buffering at the system level, and its autonomous self-guiding data transfers remove the need for power-hungry centralized data routing structures like Bus Bridges, Arbiters and DMAs (Direct Memory Access peripherals). This often results in reduction of power consumption and lower gate counts.

(s) Its distributed architecture removes data transfer bottlenecks by dispersing system data flow over the entire surface area of designs. Distributed connectivity also increases system performance by enabling multiple data transfers to occur simultaneously.

(t) Its flexible addressing method enables sharing of fixed-function components by multiple hardware data flow threads. Sharing of components reduces component idle time and shrinks the overall surface design area by eliminating unnecessary replication of components.

(u) Its uniform and distributed data transfer topography removes hardware, software and connectivity dependencies between system components. Elimination of dependencies enables parallel development of hardware and software subsystems, resulting in lower design and verification costs. Elimination of dependencies also reduces customer support costs, product maintenance/documentation costs, and accelerates design schedules by streamlining interfaces between project teams.

(v) Its inherently symmetrical data transfer structure enables board-level data processing subsystems (including identical boards) to be stacked on top of one another by rotating adjacent boards by 90 degrees, for example, without having to use a backplane. This feature saves design costs because backplanes can be taken off the bill of materials. Additional cost savings can be achieved by duplicating existing boards to increase system performance (instead of designing new boards). Board stacking also provides an added degree of design flexibility, as boards can be easily added or deleted from systems to better match design requirements.

(w) Its inherently symmetrical architecture enables various custom types of data transfer structures to be constructed from as few as two basic data routing primitives, by varying the number of primitive instances used and how they are interconnected. This feature reduces system development costs and enables better matching of system architectures with their applications.

(x) Its inherently non-interfering data flow patterns enable autonomous isolation of global and local data transfers by containing the global data traffic at the system's edges, while the local traffic is mostly contained inside the subsystems or inside the sets of subsystems.

(y) Its common addressing mechanism for various types of data transfers (including local and global transfers) simplifies system design and enables design automation.

(z) Its inherently obstruction-free access to system components enables simplified methods of component testing and cooling, even in systems that have 3-dimensional (or higher) data routing architectures.

CONCLUSIONS, RAMIFICATIONS, AND SCOPE

Accordingly, the reader will see that, by spreading the system data communication flow over multiple routing dimensions, the multi-dimensional data routing fabric makes it possible for multiple data transfers to occur simultaneously and without interference. Simultaneous, non-interfering transfers remove data communication bottlenecks, thus improving data transfer performance and reducing data transfer latency. Improved data transfer performance and latency have a direct benefiting impact on data processing performance and system cost.

In addition, while enabling efficient communication, the uniform and deterministic structure of the multi-dimensional data routing fabric removes dependencies between system components, thus allowing each component to be developed, verified and supported independently of other components. This reduces product time-to-market as system components can be developed and verified in parallel, each by a dedicated design team. The benefits of non inter-dependent components reach beyond system design and verification, also improving product documentation, support and maintenance.

Furthermore, the multi-dimensional data routing fabric has additional advantages in that it de-centralizes system communications and functionally encapsulates system components. De-centralized (or distributed) system communication provides a scalable data connectivity framework in which components can be easily added, removed or moved around without affecting other components. De-centralized communications further improve system design and verification by allowing design changes even late in the design cycle, thus providing flexibility to respond to changing product requirements in sufficient time to intercept market windows.

While my above description contains many specificities, these should not be construed as limitations on the scope of this invention, but rather as an exemplification of a preferred embodiment and some of its derivatives. Many other variations are possible.

For example, in the preferred embodiment, units of data transferred between adjacent data routing junctions are implemented as packets comprising data payload and information about the destination. While small data packets are used in the preferred method for transfer of data between adjacent data routing junctions, data packets of different types and lengths, or other point-to-point data transport methods (such as serial links or parallel links containing data and address) can also be used to transfer data between adjacent data routing junctions.

Just as the type of data transfer links can differ from one embodiment to another, the embodiments can also vary the number and directions of links between adjacent pairs of data routing junctions. For example, one embodiment can have a single set of data routing lines connecting adjacent component pairs in a given routing direction of a routing dimension, while a different embodiment may connect adjacent pairs of components with two or more sets of data routing lines in both directions of a routing dimension.

In addition, certain relationships between routing dimensions and spatial dimensions should be clarified. While multi-dimensional data routing structures of 3, 5 or 7 routing dimensions are fully functional and easily definable in HDL entity headers (Hardware Description Language used to synthesize logic circuits), chip or board implementations of a multi-dimensional mesh of data routing lines will in most cases collapse the physical layout of data routing lines to two or three spatial dimensions.

This is similar to a 3-dimensional fishing net-like mesh collapsing to a 2-dimensional shape when it is stretched out on the ground. In the same spirit, while a 4-dimensional design (for example) may be physically placed-and-routed in 2-dimensions, the underlying 4-dimensional data routing structure is fully retained in function, along with all the benefits of the multi-dimensional data routing fabric.

Furthermore, the multi-dimensional data routing fabric can connect components inside one chip, as well as chips on a board or boards in a chassis. While the above embodiments may be viewed as connecting components inside one chip, data routing terminals can be easily modified to carry packets chip-to-chip or board-to-board. Other embodiments can thus add clock synchronization circuitry at the point of entry of data routing lines to data routing terminals, to synchronize the incoming data packets with the local clock.

Clock synchronization circuits may be used to compensate for the loss of clock synchronization when packets with source-synchronous transfer clocks pass through chip output and input buffers, where the signal delays can be longer then the clock period. Such packet synchronization circuits have an additional benefit of desensitizing designs to buffer changes or migrations from one semiconductor technology node to another.

Alternative embodiments may use other types of clock synchronization circuits inside data routing junctions, for example, to connect data processing components located in different clock domains anywhere in the system (including on-chip and chip-to-chip locations).

While some of the above embodiments use left-turn spiral-like trajectories to transfer data packets from source components to destination components, other routing algorithms are possible as well. The above spiral-like transfer paths combined with system edge turnaround lines guarantee autonomous packet delivery regardless of the direction in which the packets are launched in, even if the packets temporarily attempt to cross the edge of the system. The autonomous convergence of packets on their destinations can also be achieved with other types of routing algorithms (such as right-turn spiral or trajectories using left and right turns) and alternative means of reflecting data packets of the system's edges.

Furthermore, while the data routing junctions of the above embodiments of the multi-dimensional data routing fabric use specified combinations of data routing switches and data routing muxes, some alternative embodiments may use various other combinations and quantities of these routing primitives.

Also, other alternative embodiments may use data routing methods that emulate routing functions of logic-based data routing switches, data routing muxes and data routing junctions that were shown in this specification. For example, a left-turn function of a data routing junction implemented with FPGA (Field Programmable Gate Array) logic gates, could also be emulated by a combination of software and microprocessor, memory device, other types of programmable logic arrays, electro-mechanical device or a mechanical device.

While various embodiments of the present invention have been described above, it should be understood that they have been presented by way of example only, and not limitation. Thus, the breadth and scope of the present invention should not be limited by any of the above described exemplary embodiments, but should be defined in accordance with the following claims and their equivalents.

I claim:

1. A data routing terminal, comprising:
a first data routing switch coupled to a first routing set of data input lines for communicating data packets from said first routing set of data input lines to said first data routing switch;
a first data routing mux coupled to said first data routing switch for communicating data packets from said first data routing switch to said first data routing mux;
a switch set of data output lines coupled to said first data routing switch for communicating data packets from said first data routing switch to said set of switch data output lines;
a mux set of data input lines coupled to said first data routing mux for communicating data packets from said mux set of data input lines to said first data routing mux;
a first routing set of data output lines coupled to said first data routing mux for communicating data packets from said first data routing mux to said first routing set of data output lines;
said first data routing switch responsive to a first header of a first data packet received from said first routing set of data input lines to selectively route said first data packet to (1) said first data routing mux, (2) said switch set of data output lines, or (3) said first data routing mux and said switch set of data output lines dependent on said first header;
said first data routing mux capable of multiplexing data packets received from said first data routing switch with data packets received from said mux set of data input lines onto said first routing set of data output lines.

2. The data routing terminal of claim 1, wherein:
said first packet header further includes a predetermined set of destination addresses;
said first data routing switch further includes:
a routing address unit storing a predetermined set of routing addresses, and
a routing address comparator coupled to said routing address unit and to said first routing set of data input lines for comparing said set of routing addresses to said set of destination addresses of said first packet header;
said first data routing switch routing said first data packet to said first data routing mux when a first comparison of said set of routing addresses with said set of destination addresses is in compliance with a true state of a predetermined first matching condition;
said first data routing switch routing said first data packet to said switch set of data output lines when a second comparison of said set of routing addresses with said set of destination addresses is in compliance with a true state of a predetermined second matching condition.

3. The data routing terminal of claim 2, wherein:
said first routing set of data output lines is aligned with a vertical dimension of a plurality of dimensions for transfer of data packets in a negative direction of said vertical dimension;
said plurality of dimensions has a coordinate origin that is capable of being a reference point for measurement of positions and directions in said plurality of dimensions;
said set of routing addresses includes a set of local coordinates defining a local position of a local region relative to said coordinate origin in said plurality of dimensions;

said set of destination addresses includes a set of destination coordinates defining a destination position of a destination region relative to said coordinate origin in said plurality of dimensions;

said first matching condition and said second matching condition are both determined by comparing said negative direction of said vertical dimension with the direction of said destination region relative to said local region in said plurality of dimensions.

4. The data routing terminal of claim 3, wherein:

said plurality of dimensions further includes a horizontal dimension;

each dimension of said plurality of dimensions has a negative direction and a positive direction;

said first routing set of data input lines and said switch set of data output lines are both oriented to transfer data packets in said positive direction along said horizontal dimension;

said mux set of data input lines and said first routing set of data output lines are both oriented to transfer data packets in said negative direction along said vertical dimension;

said first data routing mux is capable of routing data packets arriving in said negative direction of said vertical dimension to exit in said negative direction of said vertical dimension;

said first data routing switch and said first data routing mux are collectively capable of routing data packets arriving in said positive direction of said horizontal dimension to exit in said positive direction of said horizontal dimension or in said negative direction of said vertical dimension dependent upon the respective packet headers.

5. The data routing terminal of claim 1, further comprising:

a data entry ramp coupled to said first routing set of data input lines for communicating data packets from said data entry ramp to said first routing set of data input lines;

a second routing set of data input lines coupled to said data entry ramp for communicating data packets from said second routing set of data input lines to said data entry ramp;

a local set of data input lines coupled to said data entry ramp for communicating data packets from said local set of data input lines to said data entry ramp;

wherein said data entry ramp is capable of multiplexing data packets received from said local set of data input lines with data packets received from said second routing set of data input lines onto said first routing set of data input lines.

6. The data routing terminal of claim 5, wherein:

a second header of a second data packet received by said data entry ramp from said local set of data input lines includes a set of packet destination addresses and a set of packet type bits;

said data entry ramp further includes a destination lookup table storing at least one set of replacement destination addresses;

said data entry ramp capable of selectively replacing said set of packet destination addresses with a selected set of said at least one set of replacement destination addresses according to the content of said set of packet type bits, so as to change the destination of said second data packet to a replacement destination upon its exit from said data entry ramp.

7. The data routing terminal of claim 1, further comprising:

a data exit ramp coupled to said first routing set of data input lines for communicating data packets from said data exit ramp to said first routing set of data input lines;

a second routing set of data input lines coupled to said data exit ramp for communicating data packets from said second routing set of data input lines to said data exit ramp;

a local set of data output lines coupled to said data exit ramp for communicating data packets from said data exit ramp to said local set of data output lines;

wherein said data exit ramp responsive to a third header of a third data packet received from said second routing set of data input lines to selectively route said third data packet to (1) said first routing set of data input lines, (2) said local set of data output lines, or (3) both said first routing set of data input lines and said local set of data output lines dependent on said third header.

8. The data routing terminal of claim 1, further comprising:

a data entry ramp coupled to said first routing set of data output lines for communicating data packets from said first routing set of data output lines to said data entry ramp;

a second routing set of data output lines coupled to said data entry ramp for communicating data packets from said data entry ramp to said second routing set of data output lines;

a local set of data input lines coupled to said data entry ramp for communicating data packets from said local set of data input lines to said data entry ramp;

wherein said data entry ramp is capable of multiplexing data packets received from said local set of data input lines with data packets received from said first routing set of data output lines onto said second routing set of data output lines.

9. The data routing terminal of claim 1, further comprising:

a data exit ramp coupled to said first routing set of data output lines for communicating data packets from said first routing set of data output lines to said data exit ramp;

a second routing set of data output lines coupled to said data exit ramp for communicating data packets from said data exit ramp to said second routing set of data output lines;

a local set of data output lines coupled to said data exit ramp for communicating data packets from said data exit ramp to said local set of data output lines;

wherein said data exit ramp responsive to a fourth header of a fourth data packet received from said first routing set of data output lines to selectively route said fourth data packet to (1) said second routing set of data output lines, (2) said local set of data output lines, or (3) both said second routing set of data output lines and said local set of data output lines dependent on said fourth header.

10. The data routing terminal of claim 9, wherein:

said fourth packet header further includes a set of destination addresses;

said data exit ramp further includes:

a routing address unit storing a predetermined set of routing addresses, and a routing address comparator coupled to said routing address unit and to said first routing set of data output lines for comparing said set of routing addresses to said set of destination addresses of said fourth packet header;

said data exit ramp routing said fourth data packet to said local set of data output lines when a first comparison of said set of routing addresses with said set of destination addresses is in compliance with a true state of a predetermined first matching condition;

said first data routing switch routing said fourth data packet to said second routing set of data output lines when a second comparison of said set of routing addresses with said set of destination addresses is in compliance with a true state of a predetermined second matching condition.

11. The data routing terminal of claim 1, further comprising:
- a second data routing mux coupled to said first routing set of data output lines for communicating data packets from said first routing set of data output lines to said second data routing mux;
- a second routing set of data output lines coupled to said second data routing mux for communicating data packets from said second data routing mux to said second routing set of data output lines;
- a local set of data input lines coupled to said second data routing mux for communicating data packets from said local set of data input lines to said second data routing mux;
- wherein said second data routing mux is capable of multiplexing data packets received from said local set of data input lines with data packets received from said first routing set of data output lines onto said second routing set of data output lines.

12. The data routing terminal of claim 1, further comprising:
- a second data routing switch coupled to said first routing set of data input lines for communicating data packets from said second data routing switch to said first routing set of data input lines;
- a second routing set of data input lines coupled to said second data routing switch for communicating data packets from said second routing set of data output lines to said second data routing switch;
- a local set of data output lines coupled to said second data routing switch for communicating data packets from said second data routing switch to said local set of data output lines;
- wherein said second data routing switch responsive to a fifth header of a fifth data packet received from said second routing set of data input lines to selectively route said fifth data packet to (1) said first routing set of data input lines, (2) said local set of data output lines, or (3) both said first routing set of data input lines and said local set of data output lines dependent on said fifth header.

* * * * *